US011710988B2

(12) United States Patent
Larsson et al.

(10) Patent No.: US 11,710,988 B2
(45) Date of Patent: *Jul. 25, 2023

(54) MAGNETIC ALIGNMENT SYSTEMS WITH NFC FOR ELECTRONIC DEVICES

(71) Applicant: Apple Inc., Cupertino, CA (US)

(72) Inventors: Karl Ruben F. Larsson, Los Altos, CA (US); Aaron A. Oro, Palo Alto, CA (US); Timothy J. Rasmussen, San Jose, CA (US); Christopher S. Graham, San Francisco, CA (US); Eric S. Jol, San Jose, CA (US); James C. Wu, Redwood City, CA (US); Demetrios B. Karanikos, San Francisco, CA (US); Miranda L. Daly, Mountain View, CA (US); Paul J. Thompson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/028,256

(22) Filed: Sep. 22, 2020

(65) Prior Publication Data

US 2021/0099027 A1 Apr. 1, 2021

Related U.S. Application Data

(60) Provisional application No. 63/061,752, filed on Aug. 5, 2020, provisional application No. 62/907,332, filed on Sep. 27, 2019.

(51) Int. Cl.
*H02J 5/00* (2016.01)
*H02J 50/90* (2016.01)
(Continued)

(52) U.S. Cl.
CPC ............ *H02J 50/90* (2016.02); *H02J 50/005* (2020.01); *H02J 50/10* (2016.02); *H02J 50/80* (2016.02)

(58) Field of Classification Search
CPC ....................................................... H02J 50/90
(Continued)

(56) References Cited

U.S. PATENT DOCUMENTS 8,073,324 B2    12/2011   Tsai
8,688,037 B2    4/2014    Chatterjee et al.
(Continued)

FOREIGN PATENT DOCUMENTS

CN      205670700 U    11/2016
CN      106877429 A     6/2017
(Continued)

OTHER PUBLICATIONS

Machine translation of foreign patent publication TW-M414057-U (Year: 2011).*

(Continued)

*Primary Examiner* — Edward Tso
*Assistant Examiner* — Ahmed H Omar
(74) *Attorney, Agent, or Firm* — Kilpatrick Townsend & Stockton LLP

(57) ABSTRACT

A magnetic alignment system can include a primary annular magnetic alignment component and a secondary annular magnetic alignment component. The primary alignment component can include an inner annular region having a first magnetic orientation, an outer annular region having a second magnetic orientation opposite to the first magnetic orientation, and a non-magnetized central annular region disposed between the primary inner annular region and the primary outer annular region. The secondary alignment component can have a magnetic orientation with a radial (Continued)

component. Additional features, such as a rotational magnetic alignment component and/or an NFC coil and circuitry can be included.

13 Claims, 90 Drawing Sheets

(51) Int. Cl.
  *H02J 50/80* (2016.01)
  *H02J 50/10* (2016.01)
  *H02J 50/00* (2016.01)
(58) Field of Classification Search
  USPC .......................................................... 320/108
  See application file for complete search history.

(56) References Cited

U.S. PATENT DOCUMENTS

| | | | |
|---|---|---|---|
| 8,907,752 | B2 | 12/2014 | Wodrich et al. |
| 9,106,083 | B2 | 8/2015 | Partovi |
| 9,112,364 | B2 | 8/2015 | Partovi |
| 9,413,191 | B2 | 8/2016 | Kim et al. |
| 9,627,130 | B2 | 4/2017 | Golko et al. |
| 10,153,666 | B2 | 12/2018 | Lee et al. |
| 10,243,402 | B2 | 3/2019 | Park et al. |
| 10,273,942 | B2 | 4/2019 | Nakamura |
| 10,404,089 | B2 | 9/2019 | Kasar et al. |
| 10,491,041 | B2 | 11/2019 | Wittenberg et al. |
| 10,622,842 | B2 | 4/2020 | Lee et al. |
| 2009/0212637 | A1* | 8/2009 | Baarman ............... H04B 5/0037 307/104 |
| 2009/0278642 | A1* | 11/2009 | Fullerton ................. H01F 7/02 335/284 |
| 2012/0112553 | A1 | 5/2012 | Stoner, Jr. et al. |
| 2012/0146576 | A1* | 6/2012 | Partovi .................... H02J 50/70 320/108 |
| 2012/0306440 | A1 | 12/2012 | Yeh |
| 2013/0187596 | A1 | 7/2013 | Eastlack |
| 2013/0260677 | A1 | 10/2013 | Partovi |
| 2016/0105047 | A1 | 4/2016 | Cui |
| 2016/0128210 | A1* | 5/2016 | Lee ..................... F16M 11/2021 248/206.5 |
| 2016/0261133 | A1 | 9/2016 | Wang |
| 2017/0005399 | A1* | 1/2017 | Ito ............................ H01Q 1/38 |
| 2018/0248406 | A1 | 8/2018 | Bae et al. |
| 2018/0301936 | A1 | 10/2018 | Lee et al. |
| 2019/0089188 | A1 | 3/2019 | Chien et al. |
| 2019/0198212 | A1* | 6/2019 | Levy ......................... H01F 7/02 |
| 2019/0363565 | A1 | 11/2019 | Graham et al. |
| 2020/0346006 | A1* | 11/2020 | Eigentler ............... A61N 1/375 |

FOREIGN PATENT DOCUMENTS

| | | | | |
|---|---|---|---|---|
| CN | 207442540 | U | | 6/2018 |
| CN | 208581077 | U | | 3/2019 |
| EP | 0823717 | A2 | | 2/1998 |
| JP | 2013120837 | A | | 6/2013 |
| JP | 3197750 | U | | 5/2015 |
| JP | 2015171166 | A | | 9/2015 |
| JP | 3213041 | U | | 10/2017 |
| JP | 6233504 | B2 | | 11/2017 |
| TW | M414057 | U | * | 10/2011 ............. H02J 50/10 |
| TW | 201347349 | A | | 11/2013 |
| TW | 201711335 | A | | 3/2017 |
| WO | 2010129369 | A2 | | 11/2010 |
| WO | 2011156768 | A2 | | 12/2011 |
| WO | 2016053633 | A1 | | 4/2016 |

OTHER PUBLICATIONS

"International Search Report and Written Opinion," dated Nov. 23, 2020 in International Application No. PCT/US2020/052004. 15 pages.
"International Search Report and Written Opinion," dated Dec. 23, 2020 in International Application No. PCT/US2020/052045. 13 pages.
"Extended European Search Report," dated Feb. 19, 2021 in European Application No. 20198834.2. 7 pages.
"First Examination Report," dated Aug. 11, 2021 in Indian Patent Application No. 202014041736. 5 pages (includes English translation).
"Examination report No. 1 for standard patent application," dated Aug. 19, 2021 in Australian Patent Application No. 2020239723. 4 pages.
"Japanese Office Action," dated Aug. 30, 2021 in Japanese Patent Application No. 2020-160758. 23 pages (includes English translation).
"Office Action," dated Jun. 2, 2021 in Taiwan Patent Application No. 109133234. 17 pages (includes English translation).
U.S. Appl. No. 17/028,275, Non-Final Office Action, dated May 12, 2022, 13 pages.
U.S. Appl. No. 17/028,325, Non-Final Office Action, dated May 12, 2022, 21 pages.
Application No. EP20198834.2, Office Action, dated Jun. 24, 2022, 5 pages.
Application No. JP2020-160758, Office Action, dated Jun. 10, 2022, 4 pages (translated).
U.S. Appl. No. 17/028,295, Notice of Allowance, dated Jan. 13, 2022, 11 pages.
AU2020239723, "Notice of Acceptance", dated Mar. 25, 2022, 3 pages.
U.S. Appl. No. 17/028,231, "Non-Final Office Action", dated Apr. 28, 2022, 18 pages.
"Non-Final Office Action," dated Nov. 25, 2022 in U.S. Appl. No. 17/028,325. 22 pages.
"Final Office Action," dated Oct. 26, 2022 in U.S. Appl. No. 17/028,231. 26 pages.
"Final Office Action," dated Nov. 25, 2022 in U.S. Appl. No. 17/028,275. 18 pages.
"First Examination Report," dated Jan. 5, 2023 in (India) Application No. 2022150009381. 6 pages.
"First Examination Report," dated Jan. 5, 2023 in (India) Patent Application No. 2022150009382. 6 pages.
U.S. Appl. No. 17/028,310, Non-Final Office Action, dated Sep. 30, 2022, 32 pages.
Application No. JP2020-160758, Notice of Allowance, dated Oct. 21, 2022, 3 pages.
Application No. KR10-2020-0124248, Office Action, dated Aug. 29, 2022, 13 pages.

* cited by examiner

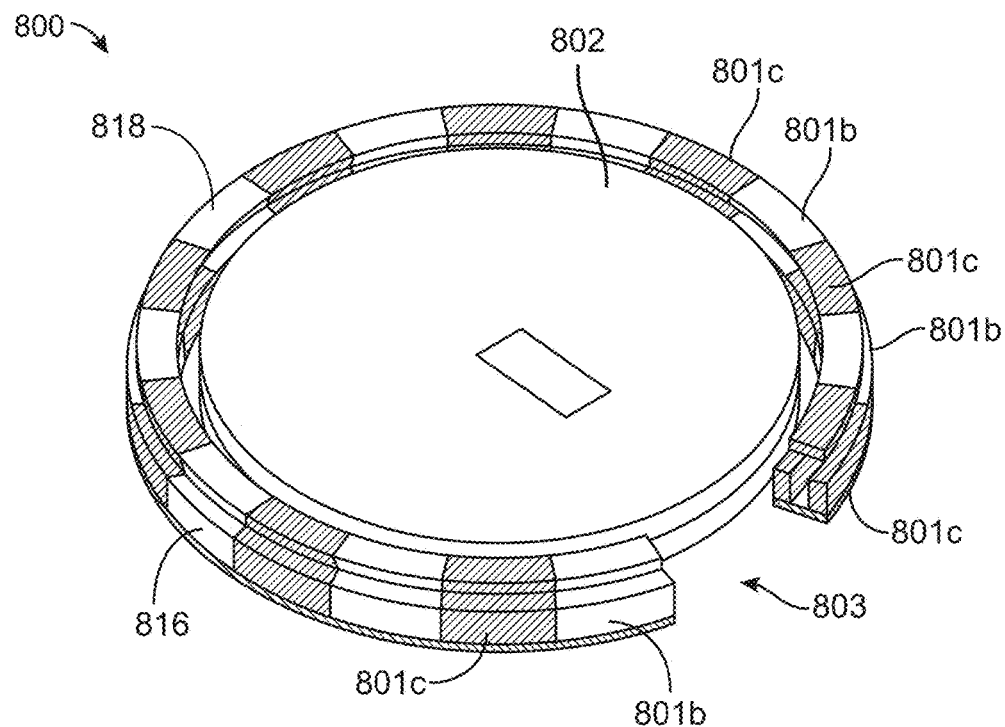
FIG. 8A
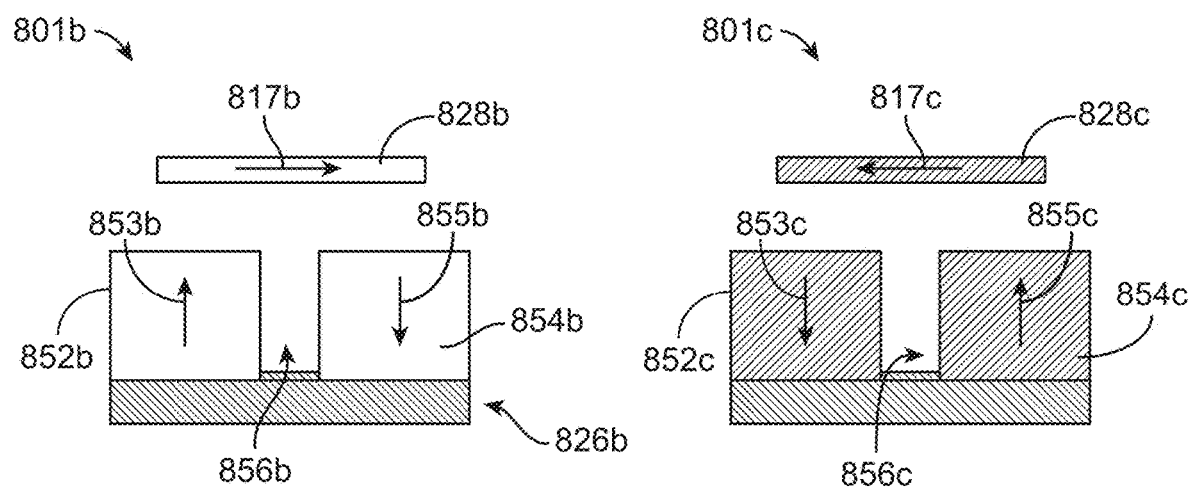
FIG. 8B
FIG. 8C

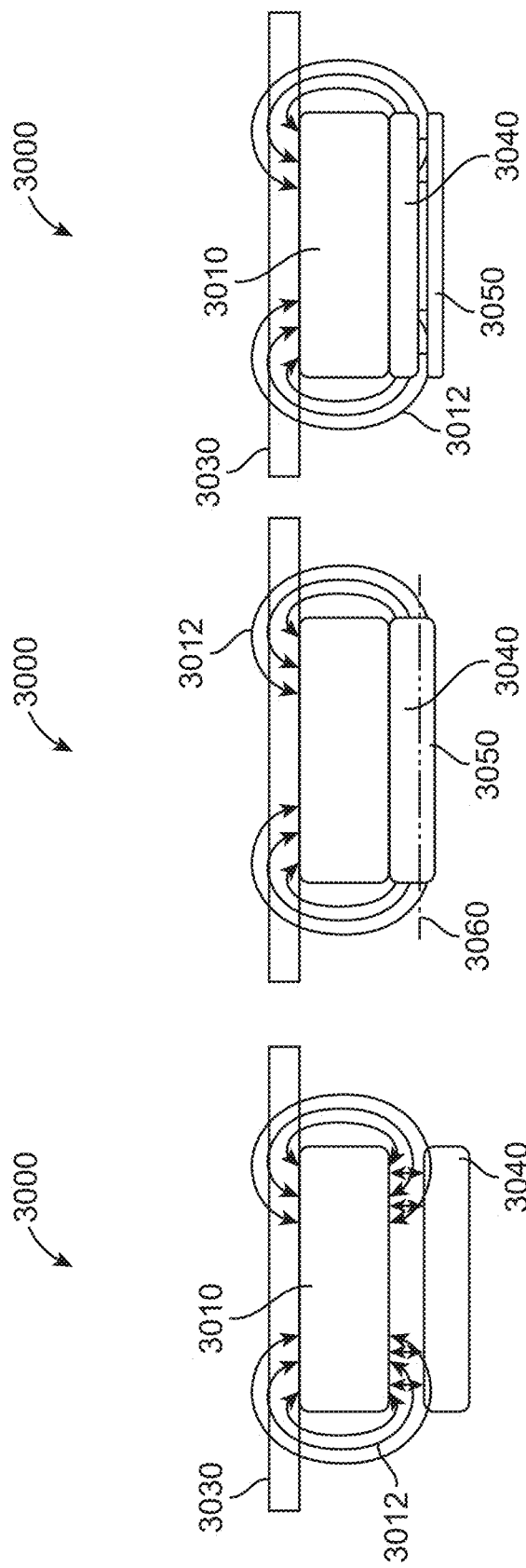

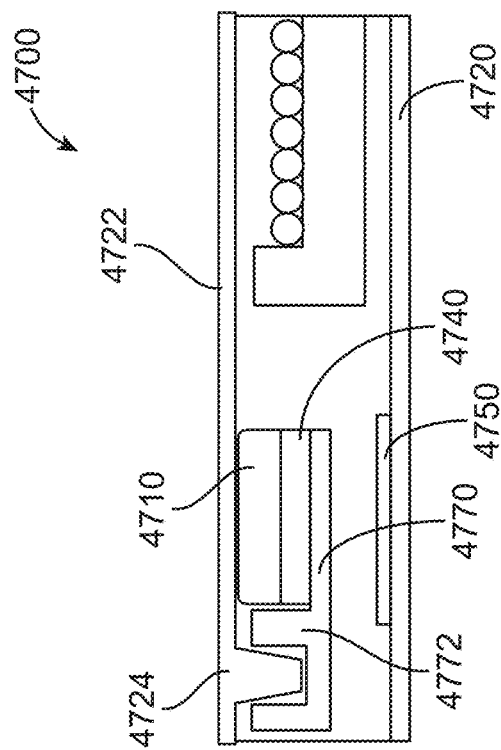
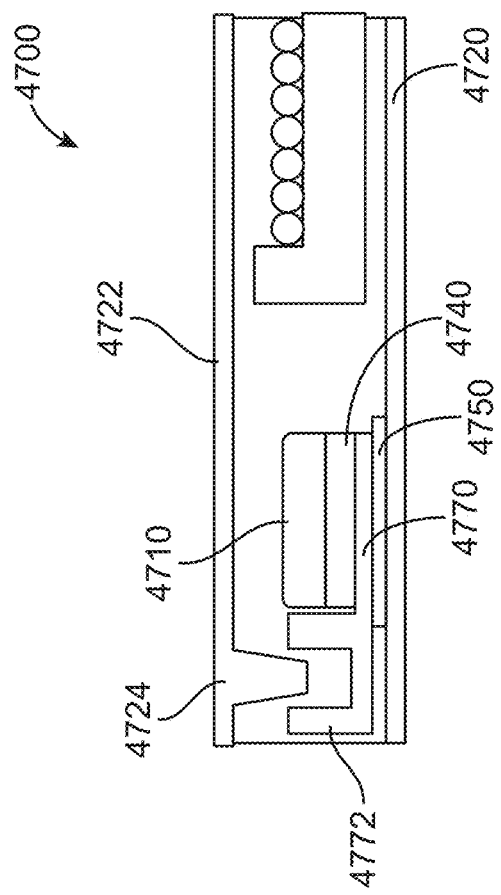
FIG. 47A
FIG. 47B

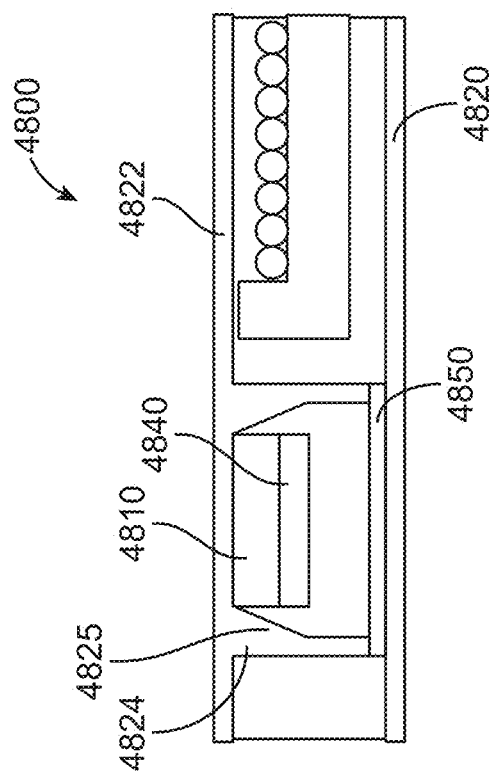
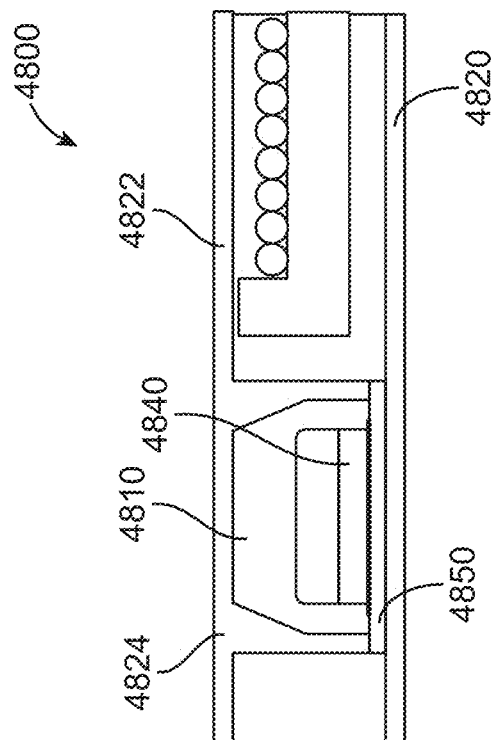

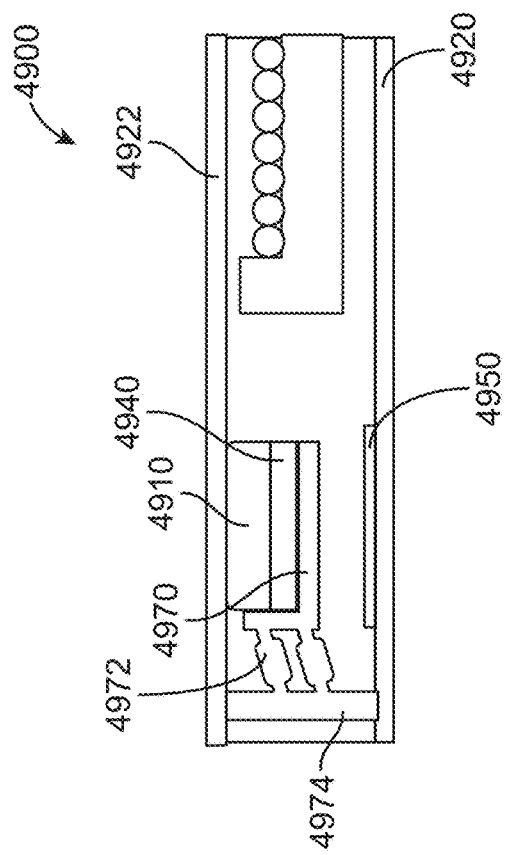
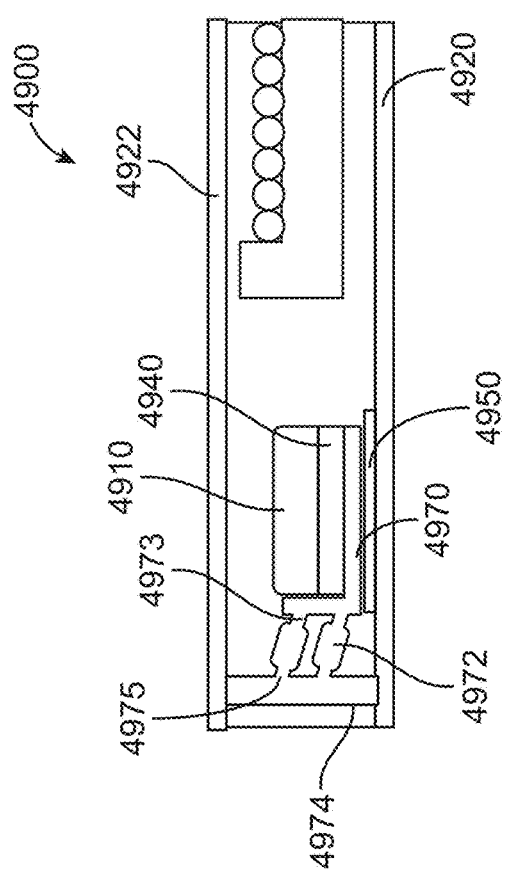
FIG. 49B
FIG. 49A

MAGNETIC ALIGNMENT SYSTEMS WITH NFC FOR ELECTRONIC DEVICES

CROSS-REFERENCE TO RELATED APPLICATIONS

This application claims the benefit of U.S. Provisional Application No. 62/907,332, filed Sep. 27, 2019, and of U.S. Provisional Application No. 63/061,752, filed Aug. 5, 2020. The disclosures of both provisional applications are incorporated by reference herein for all purposes.

The following five U.S. patent applications, filed on the same day as this application, Sep. 22, 2020, also claim the benefit of the above-referenced provisional applications: U.S. application Ser. No. 17/028,231, titled "Magnetic Alignment Systems for Electronic Devices"; U.S. application Ser. No. 17/028,275, titled "Magnetic Alignment Systems with Rotational Alignment Component for Electronic Devices"; U.S. application Ser. No. 17/028,295, titled "Magnetic Alignment Systems with Proximity Detection for Electronic Devices"; U.S. application Ser. No. 17/028,310, titled "Wireless Charging Modules with Magnetic Alignment Components"; and U.S. application Ser. No. 17/028,325, titled "Accessory Insert Modules with Magnetic Alignment Components."

BACKGROUND

The present disclosure relates generally to consumer electronic devices and more particularly to magnetic alignment components and systems that facilitate establishing and maintaining a desired alignment between two (or more) devices, e.g., for purposes of enabling efficient wireless power transfer between the devices.

Portable electronic devices (e.g., mobile phones, media players, electronic watches, and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. Additionally, using a charging cord requires the mobile device to have a connector, typically a receptacle connector, configured to mate with a connector, typically a plug connector, of the charging cord. The receptacle connector includes a cavity in the portable electronic device that provides an avenue via which dust and moisture can intrude and damage the device. Further, a user of the portable electronic device has to physically connect the charging cable to the receptacle connector in order to charge the battery.

To avoid such shortcomings, wireless charging technologies have been developed that exploit electromagnetic induction to charge portable electronic devices without the need for a charging cord. For example, some portable electronic devices can be recharged by merely resting the device on a charging surface of a wireless charger device. A transmitter coil disposed below the charging surface is driven with an alternating current that produces a time-varying magnetic flux that induces a current in a corresponding receiver coil in the portable electronic device. The induced current can be used by the portable electronic device to charge its internal battery. Some portable electronic devices have been designed to not only receive power wirelessly but also to transmit power wirelessly to other portable electronic devices, such as accessory devices.

SUMMARY

Among other factors, the efficiency of wireless power transfer depends on the alignment between the transmitter and receiver coils. For instance, a transmitter coil and receiver coil may perform best when they are aligned coaxially. Where a portable electronic device has a flat surface with no guiding features, finding the proper alignment can be difficult. Often, alignment is achieved by trial and error, with the user shifting the relative positions of the device and charger and observing the effect on charging performance. Establishing optimal alignment in this manner can be time-consuming. Further, the absence of surface features can make it difficult to maintain optimal alignment. For example, if the portable electronic device and/or charger are jostled during charging, they may be shifted out of alignment. For these and other reasons, improved techniques for establishing and maintaining alignment between electronic devices would be desirable.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory.

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. It should be understood that any device that has an annular alignment component might or might not also have a rotational alignment component, and rotational alignment components may be categorized as primary, secondary, or auxiliary depending on the type of device.

In some embodiments, magnetic alignment components can be fixed in position within a device housing. Alternatively, any or all of the magnetic alignment components in a device (including annular and/or rotational alignment components) can be made movable in the axial and/or lateral direction. A movable magnetic alignment component can allow the magnets to be moved (e.g., axially) into closer proximity to increase magnetic forces holding the devices in alignment or moved away from each other to reduce the magnetic forces holding the devices in alignment.

In some embodiments, a magnetic alignment system can also include a near-field communication (NFC) coil and supporting circuitry to allow devices to identify themselves to each other using an NFC protocol. An NFC coil in a particular device can be an annular coil that is disposed inboard of the annular alignment component or outboard of the annular alignment component. For example, in a device that has an annular alignment component surrounding an inductive charging coil, the NFC coil can be disposed in an annular gap between the inductive charging coil and the annular alignment component. It should be understood that an NFC component is optional in the context of providing magnetic alignment and can be used with moving or fixed magnetic alignment components.

The following detailed description, together with the accompanying drawings, will provide a better understanding of the nature and advantages of the present invention.

BRIEF DESCRIPTION OF THE DRAWINGS

FIG. 8A shows a perspective view of a magnetic alignment system according to some embodiments, and FIGS. 8B and 8C show axial cross-section views through different portions of the system of FIG. 8A.

FIGS. 30A-30C illustrate moving magnets according to an embodiment of the present invention.

FIGS. 47A and 47B illustrate structures for constraining motions of magnets in an electronic device according to an embodiment of the present invention.

FIGS. 48A and 48B illustrate structures for constraining motions of magnets in an electronic device according to an embodiment of the present invention.

FIGS. 49A and 49B illustrate structures for constraining motions of magnets an electronic device according to an embodiment of the present invention.

DETAILED DESCRIPTION

Figure 1:
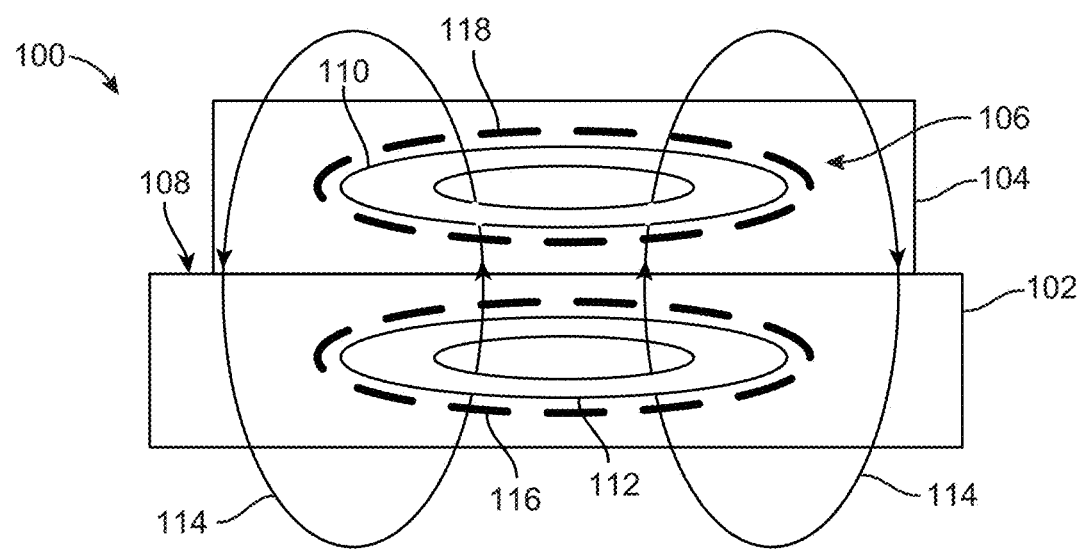
FIG. 1 shows a simplified representation of a wireless charging system incorporating a magnetic alignment system according to some embodiments.

Described herein are various embodiments of magnetic alignment systems and components thereof. A magnetic alignment system can include annular alignment components, where each annular alignment component can comprise a ring of magnets (or a single annular magnet) having a particular magnetic orientation or pattern of magnetic orientations such that a "primary" annular alignment component can attract and hold a complementary "secondary" annular alignment component. Magnetic alignment components can be incorporated into a variety of devices, and a magnetic alignment component in one device can attract another device having a complementary magnetic alignment component into a desired alignment and/or hold the other device in a desired alignment. (Devices aligned by a magnetic alignment system may be said to be "attached" to each other.)

For purposes of the present description, a number of different categories of devices can be distinguished. As used herein, a "portable electronic device" refers generally to any electronic device that is portable and that consumes power and provides at least some interaction with the user. Examples of portable electronic devices include: smart phones and other mobile phones; tablet computers; laptop computers; wearable devices (e.g., smart watches, headphones, earbuds); and any other electronic device that a user may carry or wear. Other portable electronic devices can include robotic devices, remote-controlled devices, personal-care appliances, and so on.

An "accessory device" (or "accessory") refers generally to a device that is useful in connection with a portable electronic device to enhance the functionality and/or esthetics of the portable electronic device. Many categories of accessories may incorporate magnetic alignment. For example, one category of accessories includes wireless charger accessories. As used herein, a "wireless charger accessory" (or "wireless charger device" or just "wireless charger") is an accessory that can provide power to a portable electronic device using wireless power transfer techniques. A "battery pack" (or "external battery") is a type of wireless charger accessory that incorporates a battery to store charge that can be transferred to the portable electronic device. In some embodiments, a battery pack may also receive power wirelessly from another wireless charger accessory. Wireless charger accessories may also be referred to as "active" accessories, in reference to their ability to provide and/or receive power. Other accessories are "passive accessories" that do not provide or receive power. For example, some passive accessories are "cases" that can cover one or more surfaces of the portable electronic device to provide protection (e.g., against damage caused by impact of the portable electronic device with other objects), esthetic enhancements (e.g., decorative colors or the like), and/or functional enhancements (e.g., cases that incorporate storage pockets, batteries, card readers, or sensors of various types). Cases can have a variety of form factors. For example, a "tray" can refer to a case that has a rear panel covering the back surface of the portable electronic device and side surfaces to secure the portable electronic device in the tray while leaving the front surface (which may include a display) exposed. A "sleeve" can refer to a case that has front and back panels with an open end (or "throat") into which a portable electronic device can be inserted so that the front and back surfaces of the device are covered; in some instances, the front panel of a sleeve can include a window through which a portion (or all) of a display of the portable electronic device is visible. A "folio" can refer to a case that has a retention portion that covers at least the back surface (and sometimes also one or more side surfaces) of the portable electronic device and a cover that can be closed to cover the display or opened to expose the display. It should be understood that not all cases are passive accessories. For example, a "battery case" can incorporate a battery pack in addition to protective and/or esthetic features; a battery case can be shaped generally as a tray, sleeve, or folio. Other examples of active cases can include cases that incorporate card readers, sensors, batteries, or other electronic components that enhance functionality of a portable electronic device.

In the present description, a distinction is sometimes made between a "charge-through accessory," which is an accessory that can be positioned between a portable electronic device and a wireless charger device without interfering with wireless power transfer between the wireless charger device and the portable electronic device, and a "terminal accessory," which is an accessory that is not a charge-through accessory. A wireless charging accessory is typically a terminal accessory, but not all terminal accessories provide wireless charging of a portable electronic device. For example some terminal accessories can be "mounting" accessories that are designed to hold the portable electronic device in a particular position. Examples of mounting include tripods, docking stations, other stands, or mounts that can hold a portable electronic device in a desired position and/or orientation (which might or might not be adjustable). Such accessories might or might not incorporate wireless charging capability.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. (It will be apparent that an annular magnetic alignment component can also be used in a device that does not have an inductive charging coil.) In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory. (In this disclosure, adjectives such as "annular," "magnetic," "primary," "secondary" and "auxiliary" may be omitted when the context is clear.) The primary and secondary annular alignment components have magnetic orientations that are complementary, such that the primary and secondary annular alignment components can attract each other and attach devices containing these components in a desired alignment. For example, a primary annular alignment component can have a "quad-pole" magnetic configuration, with an inner annular region having a magnetic polarity in a first axial direction, an outer annular region having a magnetic polarity in a second axial direction opposite the first direction, and a central non-magnetized region between the inner annular region and the outer annular region. A secondary annular alignment component can have a radial magnetic configuration (e.g., with north pole oriented radially inward or radially outward, either exactly or approximately; examples are described below). When aligned, the primary and secondary annular alignment components can form a closed magnetic loop such that the DC magnetic flux is largely contained within the magnets. Alternatively, a secondary annular alignment component can also have a quad-pole magnetic configuration matching that of the primary annular alignment component. An auxiliary annular alignment component can operate as a "repeater" and can have a quad-pole configuration matching that of the primary annular alignment component.

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. The magnet(s) of a rotational alignment component can have complementary orientations, such the rotational alignment components in two devices can attract each other and attach the two devices containing these components in a desired rotational orientation. For example, a rotational alignment component can have a quad-pole configuration with a first magnetized region (e.g., extending along one side of a rectangular magnet) having a magnetic polarity in a first axial direction, a second magnetized region (e.g., extending along the opposite side of the rectangular magnet) having a magnetic polarity in a second axial direction opposite the first direction, and a central non-magnetized region. As another example, a rotational alignment component can have a triple-pole configuration with a first magnetized region (e.g., extending along one side of a rectangular magnet) having a magnetic polarity in a first axial direction, a second magnetized region (e.g., extending along the opposite side of the rectangular magnet) also having a magnetic polarity the first axial direction, a central magnetized region having a magnetic polarity in a second axial direction opposite the first direction, and non-magnetized regions between the central magnetized region and each of the first and second magnetized regions. Other magnetic configurations can be substituted. It should be understood that any device that has an annular magnetic alignment component might or might not also have a rotational magnetic alignment component, and rotational alignment components may be categorized as primary, secondary, or auxiliary, e.g., depending on the type of device.

In some embodiments, magnetic alignment components can be fixed in position within a device housing. Alternatively, any or all of the magnetic alignment components in a device (including annular and/or rotational alignment components) can be made movable in the axial and/or lateral direction. A movable magnetic alignment component can allow the magnets to be moved (e.g., axially) into closer proximity to increase magnetic forces holding the devices in alignment or moved away from each other to reduce the magnetic forces holding the devices in alignment.

In some embodiments, a magnetic alignment system can also include a near-field communication (NFC) coil and supporting circuitry to allow devices to identify themselves to each other using an NFC protocol. An NFC coil in a particular device can be an annular coil that is disposed inboard of the annular alignment component or outboard of the annular alignment component. For example, in a device that has an annular alignment component surrounding an inductive charging coil, the NFC coil can be disposed in an annular gap between the inductive charging coil and the annular alignment component. It should be understood that an NFC component is optional in the context of providing magnetic alignment.

Accordingly, while the following description focuses on specific examples incorporating various combinations of components, it should be understood that any device can have has an annular magnetic alignment component, which can be, for example, any of the primary, secondary, or auxiliary annular magnetic alignment components described herein. Further, any device that has an annular magnetic alignment component can also have a rotational magnetic alignment component, which can be, for example, any of the rotational magnetic alignment components described herein. Further, any device that has an annular magnetic alignment component, regardless of whether it also has a rotational magnetic alignment component, can also have an NFC coil (and supporting reader circuitry and/or tag circuitry), which can be implemented, e.g., according to any of the examples described herein.

1. Primary and Secondary Annular Magnetic Alignment Components 1.1. Overview of Magnetic Alignment Systems FIG. 1 shows a simplified representation of a wireless charging system 100 incorporating a magnetic alignment system 106 according to some embodiments. A portable electronic device 104 is positioned on a charging surface 108 of a wireless charger device 102. Portable electronic device 104 can be a consumer electronic device, such as a smart phone, tablet, wearable device, or the like, or any other electronic device for which wireless charging is desired. Wireless charger device 102 can be any device that is configured to generate time-varying magnetic flux to induce a current in a suitably configured receiving device. For instance, wireless charger device 102 can be a wireless charging mat, puck, docking station, or the like. Wireless charger device 102 can include or have access to a power source such as battery power or standard AC power.

To enable wireless power transfer, portable electronic device 104 and wireless charger device 102 can include inductive coils 110 and 112, respectively, which can operate to transfer power between them. For example, inductive coil 112 can be a transmitter coil that generates a time-varying magnetic flux 114, and inductive coil 110 can be a receiver coil in which an electric current is induced in response to time-varying magnetic flux 114. The received electric current can be used to charge a battery of portable electronic device 104, to provide operating power to a component of portable electronic device 104, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 112 and 110. According to some embodiments, magnetic alignment system 106 can provide such alignment. In the example shown in FIG. 1, magnetic alignment system 106 includes a primary magnetic alignment component 116 disposed within or on a surface of wireless charger device 102 and a secondary magnetic alignment component 118 disposed within or on a surface of portable electronic device 102. Primary and secondary alignment components 116 and 118 are configured to magnetically attract one another into an aligned position in which inductive coils 110 and 112 are aligned with one another to provide efficient wireless power transfer.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

1.2. Magnetic Alignment Systems with a Single Axial Magnetic Orientation

Figure 2A:
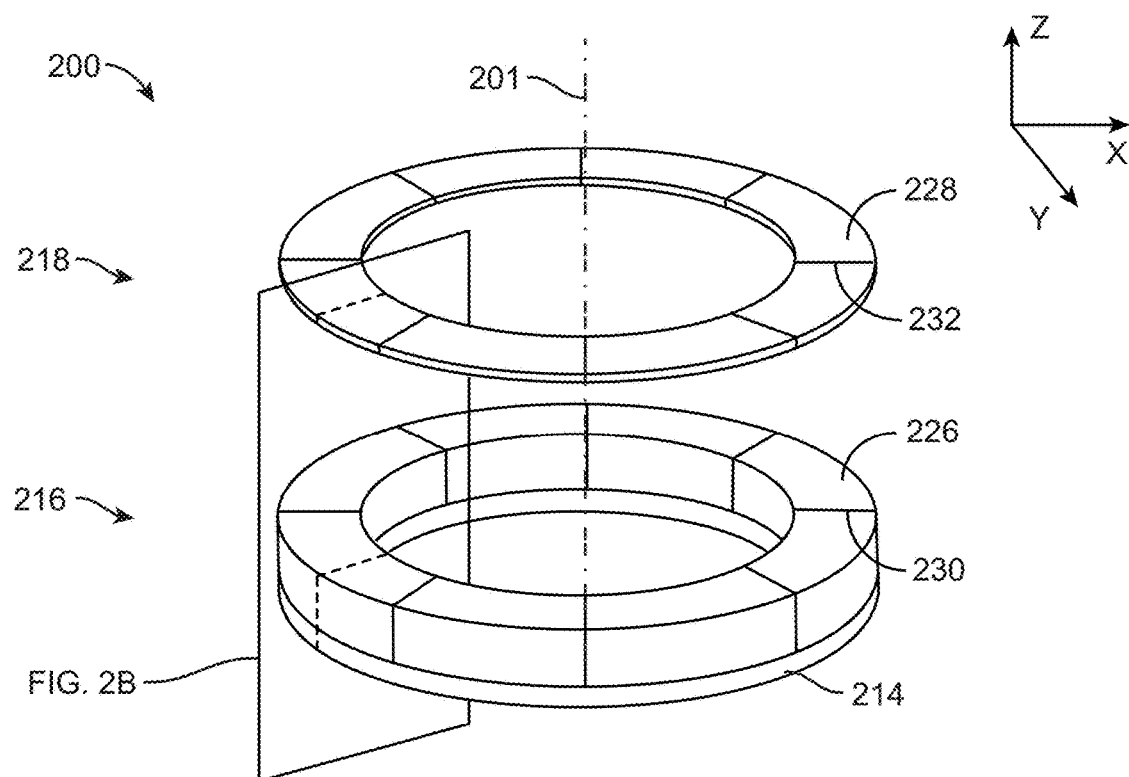
FIG. 2A shows a perspective view of a magnetic alignment system according to some embodiments.

FIG. 2A shows a perspective view of a magnetic alignment system 200 according to some embodiments, and FIG.

2B shows a cross-section through magnetic alignment system 200 across the cut plane indicated in FIG. 2A. Magnetic alignment system 200 can be an implementation of magnetic alignment system 106 of FIG. 1. In magnetic alignment system 200, the alignment components all have magnetic polarity oriented in the same direction (along the axis of the annular configuration). For convenience of description, an "axial" direction (also referred to as a "longitudinal" or "z" direction) is defined to be parallel to an axis of rotational symmetry 201 of magnetic alignment system 200, and a transverse plane (also referred to as a "lateral" or "x" or "y" direction) is defined to be normal to axis 201. The term "proximal side" or "proximal surface" is used herein to refer to a side or surface of one alignment component that is oriented toward the other alignment component when the magnetic alignment system is aligned, and the term "distal side" or "distal surface" is used to refer to a side or surface opposite the proximal side or surface. (The terms "top" and "bottom" may be used in reference to a particular view shown in a drawing but have no other significance.)

As shown in FIG. 2A, magnetic alignment system 200 can include a primary alignment component 216 (which can be an implementation of primary alignment component 116 of FIG. 1) and a secondary alignment component 218 (which can be an implementation of secondary alignment component 118 of FIG. 1). Primary alignment component 216 and secondary alignment component 218 have annular shapes and may also be referred to as "annular" alignment components. The particular dimensions can be chosen as desired. In some embodiments, primary alignment component 216 and secondary alignment component 218 can each have an outer diameter of about 54 mm and a radial width of about 4 mm. The outer diameters and radial widths of primary alignment component 216 and secondary alignment component 218 need not be exactly equal. For instance, the radial width of secondary alignment component 218 can be slightly less than the radial width of primary alignment component 216 and/or the outer diameter of secondary alignment component 218 can also be slightly less than the radial width of primary alignment component 216 so that, when in alignment, the inner and outer sides of primary alignment component 216 extend beyond the corresponding inner and outer sides of secondary alignment component 218. Thicknesses (or axial dimensions) of primary alignment component 216 and secondary alignment component 218 can also be chosen as desired. In some embodiments, primary alignment component 216 has a thickness of about 1.5 mm while secondary alignment component 218 has a thickness of about 0.37 mm.

Primary alignment component 216 can include a number of sectors, each of which can be formed of one or more primary arcuate magnets 226, and secondary alignment component 218 can include a number of sectors, each of which can be formed of one or more secondary arcuate magnets 228. In the example shown, the number of primary magnets 226 is equal to the number of secondary magnets 228, and each sector includes exactly one magnet, but this is not required. Primary magnets 226 and secondary magnets 228 can have arcuate (or curved) shapes in the transverse plane such that when primary magnets 226 (or secondary magnets 228) are positioned adjacent to one another end-to-end, primary magnets 226 (or secondary magnets 228) form an annular structure as shown. In some embodiments, primary magnets 226 can be in contact with each other at interfaces 230, and secondary magnets 228 can be in contact with each other at interfaces 232. Alternatively, small gaps or spaces may separate adjacent primary magnets 226 or secondary magnets 228, providing a greater degree of tolerance during manufacturing.

In some embodiments, primary alignment component 216 can also include an annular shield 214 (also referred to as a DC magnetic shield or DC shield) disposed on a distal surface of primary magnets 226. In some embodiments, shield 214 can be formed as a single annular piece of material and adhered to primary magnets 226 to secure primary magnets 226 into position. Shield 214 can be formed of a material that has high magnetic permeability, such as stainless steel, and can redirect magnetic fields to prevent them from propagating beyond the distal side of primary alignment component 216, thereby protecting sensitive electronic components located beyond the distal side of primary alignment component 216 from magnetic interference.

Primary magnets 226 and secondary magnets 228 (and all other magnets described herein) can be made of a magnetic material such as an NdFeB material, other rare earth magnetic materials, or other materials that can be magnetized to create a persistent magnetic field. In some embodiments, the magnets can be plated with a thin layer (e.g., 7-13 µm) of NiCuNi or similar materials. Each primary magnet 226 and each secondary magnet 228 can have a monolithic structure having a single magnetic region with a magnetic polarity aligned in the axial direction as shown by magnetic polarity indicators 215, 217 in FIG. 2B. For example, each primary magnet 226 and each secondary magnet 228 can be a bar magnet that has been ground and shaped into an arcuate structure having an axial magnetic orientation. (As will be apparent, the term "magnetic orientation" refers to the direction of orientation of the magnetic polarity of a magnet or magnetized region.) In the example shown, primary magnet 226 has its north pole oriented toward the proximal surface and south pole oriented toward the distal surface while secondary magnet 228 has its south pole oriented toward the proximal surface and north pole oriented toward the distal surface. In other embodiments, the magnetic orientations can be reversed such that primary magnet 226 has its south pole oriented toward the proximal surface and north pole oriented toward the distal surface while secondary magnet 228 has its north pole oriented toward the proximal surface and south pole oriented toward the distal surface.

Figure 2B:
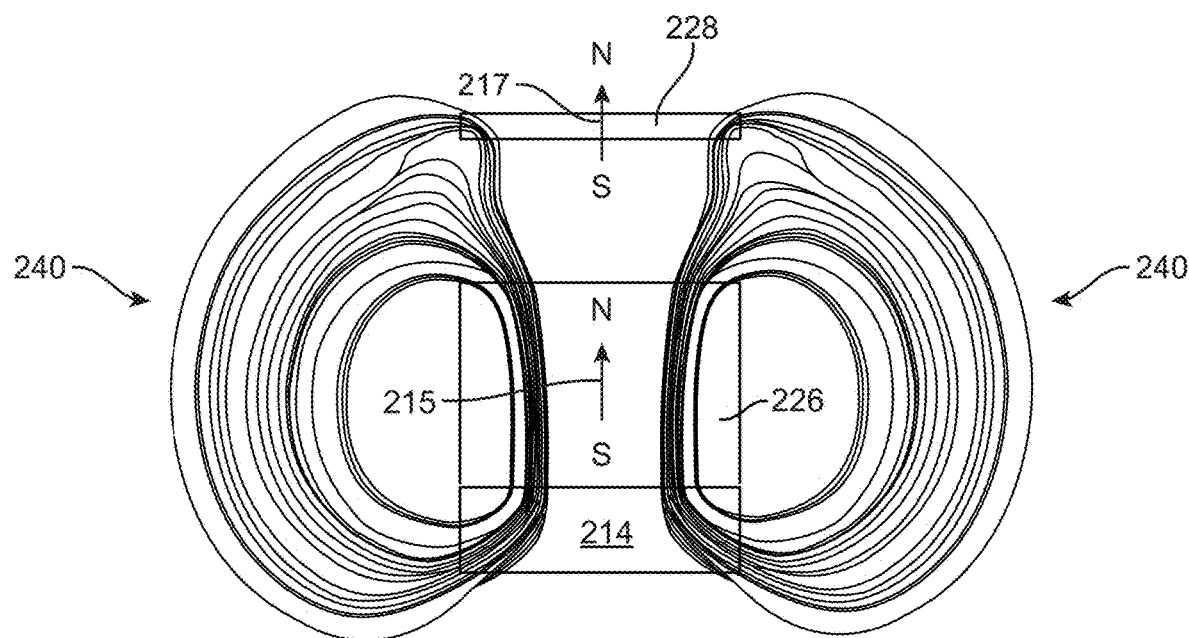
FIG. 2B shows a cross-section through the magnetic alignment system of FIG. 2A.

As shown in FIG. 2B, the axial magnetic orientation of primary magnet 226 and secondary magnet 228 can generate magnetic fields 240 that exert an attractive force between primary magnet 226 and secondary magnet 228, thereby facilitating alignment between respective electronic devices in which primary alignment component 216 and secondary alignment component 218 are disposed (e.g., as shown in FIG. 1). While shield 214 can redirect some of magnetic fields 240 away from regions below primary magnet 226, magnetic fields 240 may still propagate to regions laterally adjacent to primary magnet 226 and secondary magnet 228. In some embodiments, the lateral propagation of magnetic fields 240 may result in magnetic field leakage to other magnetically sensitive components. For instance, if an inductive coil having a ferromagnetic shield is placed in the interior (or inboard) region of annular primary alignment component 216 (or secondary alignment component 218), leakage of magnetic fields 240 may saturate the ferrimagnetic shield, which can degrade wireless charging performance.

It will be appreciated that magnetic alignment system 200 is illustrative and that variations and modifications are possible. For instance, while primary alignment component 216 and secondary alignment component 218 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 216 and/or secondary alignment component 218 can each be formed of a single, monolithic annular magnet; however, segmenting magnetic alignment components 216 and 218 into arcuate magnets may improve manufacturing because (for some types of magnetic material) smaller arcuate segments may be less brittle than a single, monolithic annular magnet and less prone to yield loss due to physical stresses imposed on the magnetic material during manufacturing.

1.3. Magnetic Alignment Systems with Closed-Loop Configurations

As noted above with reference to FIG. 2B, a magnetic alignment system with a single axial magnetic orientation may allow lateral leakage of magnetic fields, which may adversely affect performance of other components of an electronic device. Accordingly, some embodiments provide magnetic alignment systems with a "closed-loop" configuration that reduces magnetic field leakage. Examples will now be described.

Figure 3A:
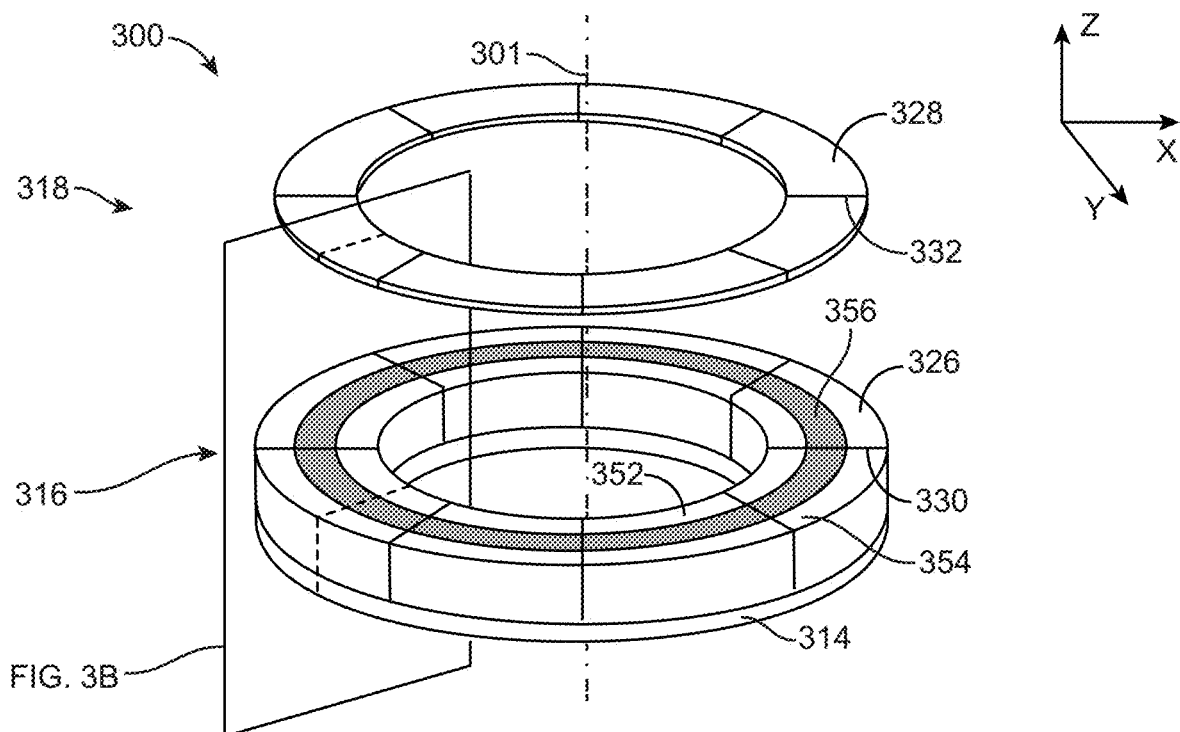
FIG. 3A shows a perspective view of a magnetic alignment system according to some embodiments.
Figure 3B:
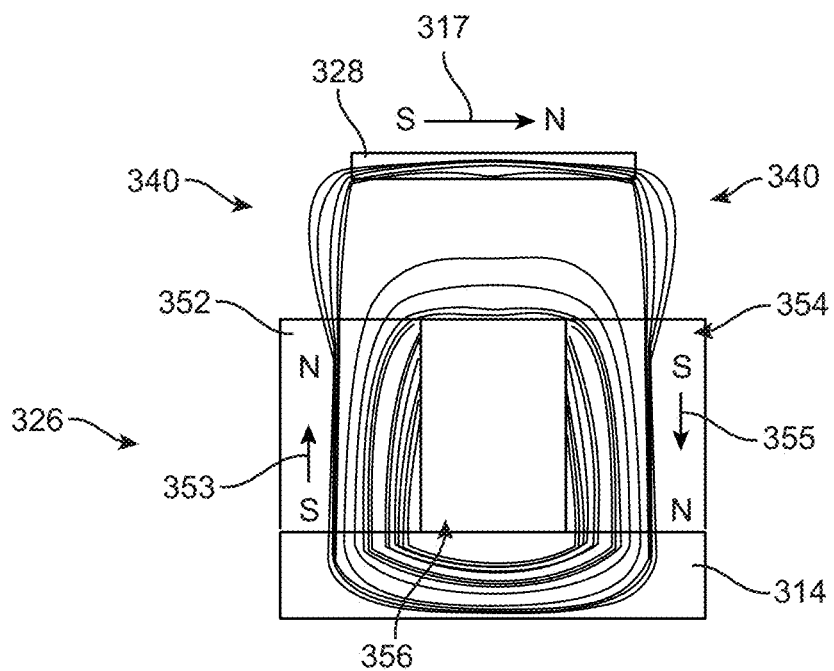
FIG. 3B shows a cross-section through the magnetic alignment system of FIG. 3A.

FIG. 3A shows a perspective view of a magnetic alignment system 300 according to some embodiments, and FIG. 3B shows a cross-section through magnetic alignment system 300 across the cut plane indicated in FIG. 3A. Magnetic alignment system 300 can be an implementation of magnetic alignment system 106 of FIG. 1. In magnetic alignment system 300, the alignment components have magnetic components configured in a "closed loop" configuration as described below.

As shown in FIG. 3A, magnetic alignment system 300 can include a primary alignment component 316 (which can be an implementation of primary alignment component 116 of FIG. 1) and a secondary alignment component 318 (which can be an implementation of secondary alignment component 118 of FIG. 1). Primary alignment component 316 and secondary alignment component 318 have annular shapes and may also be referred to as "annular" alignment components. The particular dimensions can be chosen as desired. In some embodiments, primary alignment component 316 and secondary alignment component 318 can each have an outer diameter of about 54 mm and a radial width of about 4 mm. The outer diameters and radial widths of primary alignment component 316 and secondary alignment component 318 need not be exactly equal. For instance, the radial width of secondary alignment component 318 can be slightly less than the radial width of primary alignment component 316 and/or the outer diameter of secondary alignment component 318 can also be slightly less than the radial width of primary alignment component 316 so that, when in alignment, the inner and outer sides of primary alignment component 316 extend beyond the corresponding inner and outer sides of secondary alignment component 318. Thicknesses (or axial dimensions) of primary alignment component 316 and secondary alignment component 318 can also be chosen as desired. In some embodiments, primary alignment component 316 has a thickness of about 1.5 mm while secondary alignment component 318 has a thickness of about 0.37 mm. (All numerical values herein are examples and may be varied as desired.)

Primary alignment component 316 can include a number of sectors, each of which can be formed of a number of primary magnets 326, and secondary alignment component 318 can include a number of sectors, each of which can be formed of a number of secondary magnets 328. In the example shown, the number of primary magnets 326 is equal to the number of secondary magnets 328, and each sector includes exactly one magnet, but this is not required; for example, as described below a sector may include multiple magnets. Primary magnets 326 and secondary magnets 328 can have arcuate (or curved) shapes in the transverse plane such that when primary magnets 326 (or secondary magnets 328) are positioned adjacent to one another end-to-end, primary magnets 326 (or secondary magnets 328) form an annular structure as shown. In some embodiments, primary magnets 326 can be in contact with each other at interfaces 330, and secondary magnets 328 can be in contact with each other at interfaces 332. Alternatively, small gaps or spaces may separate adjacent primary magnets 326 or secondary magnets 328, providing a greater degree of tolerance during manufacturing.

In some embodiments, primary alignment component 316 can also include an annular shield 314 (also referred to as a DC magnetic shield or DC shield) disposed on a distal surface of primary magnets 326. In some embodiments, shield 314 can be formed as a single annular piece of material and adhered to primary magnets 326 to secure primary magnets 326 into position. Shield 314 can be formed of a material that has high magnetic permeability and/or high magnetic saturation value, such as stainless steel or low-carbon steel, and can redirect magnetic fields to prevent them from propagating beyond the distal side of primary alignment component 316, thereby protecting sensitive electronic components located beyond the distal side of primary alignment component 316 from magnetic interference.

Primary magnets 326 and secondary magnets 328 can be made of a magnetic material such as an NdFeB material, other rare earth magnetic materials, or other materials that can be magnetized to create a persistent magnetic field. Each secondary magnet 328 can have a single magnetic region with a magnetic polarity having a component in the radial direction in the transverse plane (as shown by magnetic polarity indicator 317 in FIG. 3B). As described below, the magnetic orientation can be in a radial direction with respect to axis 301 or another direction having a radial component in the transverse plane. Each primary magnet 326 can include two magnetic regions having opposite magnetic orientations. For example, each primary magnet 326 can include an inner arcuate magnetic region 352 having a magnetic orientation in a first axial direction (as shown by polarity indicator 353 in FIG. 3B), an outer arcuate magnetic region 354 having a magnetic orientation in a second axial direction opposite the first direction (as shown by polarity indicator 355 in FIG. 3B), and a central non-magnetized region 356 that does not have a magnetic orientation. Central non-magnetized region 356 can magnetically separate inner arcuate region 352 from outer arcuate region 354 by inhibiting magnetic fields from directly crossing through central region 356. Magnets having regions of opposite magnetic orientation separated by a non-magnetized region are sometimes referred to herein as having a "quad-pole" configuration.

In some embodiments, each secondary magnet 328 can be made of a magnetic material that has been ground and shaped into an arcuate structure, and a magnetic orientation having a radial component in the transverse plane can be created, e.g., using a magnetizer. Similarly, each primary magnet 326 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 326 can be a compound structure with two arcuate pieces of magnetic material providing inner arcuate magnetic region 352 and outer arcuate magnetic region 354; in such embodiments, central non-magnetized region 356 can be formed of an arcuate piece of nonmagnetic (or demagnetized) material or formed as an air gap defined by sidewalls of inner arcuate magnetic region 352 and outer arcuate magnetic region 354. DC shield 314 can be formed of a material that has high magnetic permeability and/or high magnetic saturation value, such as stainless steel or low-carbon steel, and can be plated, e.g., with 5-10 µm of matte Ni. Alternatively, DC shield 314 can be formed of a magnetic material having a radial magnetic orientation (in the opposite direction of secondary magnets 328). In some embodiments, DC shield 314 can be omitted entirely.

As shown in FIG. 3B, the magnetic polarity of secondary magnet 328 (shown by indicator 317) can be oriented such that when primary alignment component 316 and secondary alignment component 318 are aligned, the south pole of secondary magnet 328 is oriented toward the north pole of inner arcuate magnetic region 352 (shown by indicator 353) while the north pole of secondary magnet 328 is oriented toward the south pole of outer arcuate magnetic region 354 (shown by indicator 355). Accordingly, the respective magnetic orientations of inner arcuate magnetic region 352, secondary magnet 328 and outer arcuate magnetic region 356 can generate magnetic fields 340 that exert an attractive force between primary magnet 326 and secondary magnet 328, thereby facilitating alignment between respective electronic devices in which primary alignment component 316 and secondary alignment component 318 are disposed (e.g., as shown in FIG. 1). Shield 314 can redirect some of magnetic fields 340 away from regions below primary magnet 326. Further, the "closed-loop" magnetic field 340 formed around central non-magnetized region 356 can have tight and compact field lines that do not stray outside of primary and secondary magnets 326 and 328 as far as magnetic field 240 strays outside of primary and secondary magnets 226 and 228 in FIG. 2B. Thus, magnetically sensitive components can be placed relatively close to primary alignment component 316 with reduced concern for stray magnetic fields. Accordingly, as compared to magnetic alignment system 200, magnetic alignment system 300 can help to reduce the overall size of a device in which primary alignment component 316 is positioned and can also help reduce noise created by magnetic field 340 in adjacent components or devices, such as an inductive receiver coil positioned inboard of secondary alignment component 318.

While each primary magnet 326 includes two regions of opposite magnetic orientation, it should be understood that the two regions can but need not provide equal magnetic field strength. For example, outer arcuate magnetized region 354 can be more strongly polarized than inner arcuate magnetized region 352. Depending on the particular implementation of primary magnets 326, various techniques can be used to create asymmetric polarization strength. For example, inner arcuate region 352 and outer arcuate region 354 can have different radial widths; increasing radial width of a magnetic region increases the field strength of that region due to increased volume of magnetic material. Where inner arcuate region 352 and outer arcuate region 354 are discrete magnets, magnets having different magnetic strength can be used.

In some embodiments, having an asymmetric polarization where outer arcuate region 354 is more strongly polarized than inner arcuate region 352 can create a flux "sinking" effect toward the outer pole. This effect can be desirable in various situations. For example, when primary magnet 326 is disposed within a wireless charger device and the wireless charger device is used to charge a "legacy" portable electronic device that has an inductive receiver coil but does not have a secondary (or any) annular magnetic alignment component, the (DC) magnetic flux from the primary annular alignment component may enter a ferrite shield around the inductive receiver coil. The DC magnetic flux can contribute to saturating the ferrite shield and reducing charging performance. Providing a primary annular alignment component with a stronger field at the outer arcuate region than the inner arcuate region can help to draw DC magnetic flux away from the ferrite shield, which can improve charging performance when a wireless charger device having an annular magnetic alignment component is used to charge a portable electronic device that lacks an annular magnetic alignment component.

It will be appreciated that magnetic alignment system 300 is illustrative and that variations and modifications are possible. For instance, while primary alignment component 316 and secondary alignment component 318 are each shown as being constructed of eight arcuate magnets, other embodiments may use a different number of magnets, such as 16 magnets, 18 magnets, 32 magnets, 36 magnets, or any other number of magnets, and the number of primary magnets need not be equal to the number of secondary magnets. In other embodiments, secondary alignment component 318 can be formed of a single, monolithic annular magnet. Similarly, primary alignment component 316 can be formed of a single, monolithic annular piece of magnetic material with an appropriate magnetization pattern as described above, or primary alignment component 316 can be formed of a monolithic inner annular magnet and a monolithic outer annular magnet, with an annular air gap or region of nonmagnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 4:
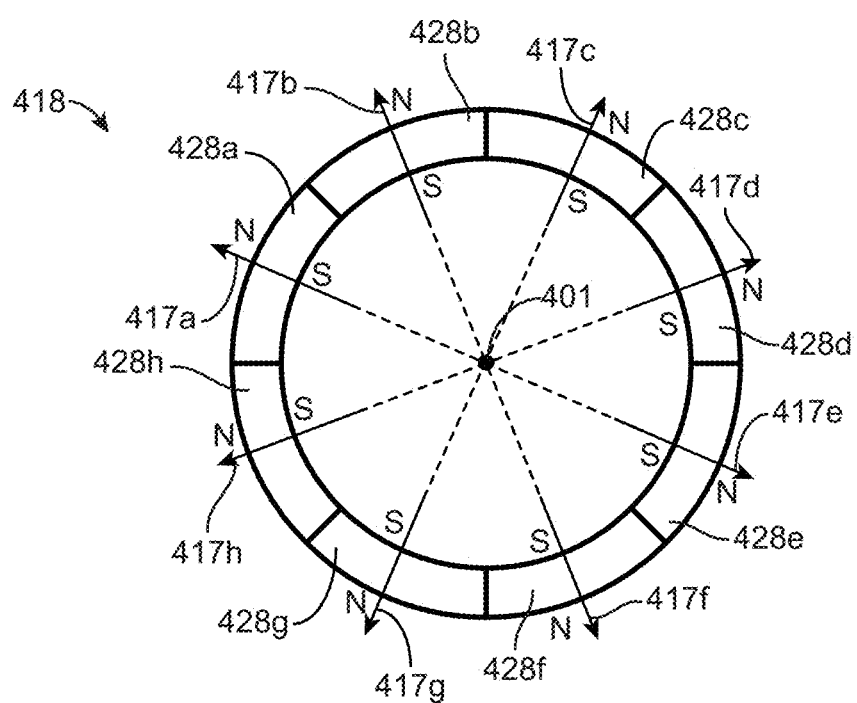
FIG. 4 shows a simplified top-down view of a secondary alignment component according to some embodiments.

1.4. Magnetic Orientation for a Closed-Loop Magnetic Alignment System 1.4.1. Radially Symmetric Orientation As noted above, in embodiments of magnetic alignment systems having closed-loop magnetic orientations, such as magnetic alignment system 300, secondary alignment component 318 can have a magnetic orientation with a radial component. For example, in some embodiments, secondary alignment component 318 can have a magnetic polarity in a radial orientation. FIG. 4 shows a simplified top-down view of a secondary alignment component 418 according to some embodiments. Secondary alignment component 418, like secondary alignment component 318, can be formed of arcuate magnets 428a-h having radial magnetic orientations as shown by magnetic polarity indicators 417a-h. In this example, each arcuate magnet 428a-h has a north magnetic pole oriented toward the radially outward side and a south magnetic pole toward the radially inward side; however, this orientation can be reversed, and the north magnetic pole of each arcuate magnet 428a-h can be oriented toward the radially inward side while the south magnetic pole is oriented toward the radially outward side.

Figure 5A:
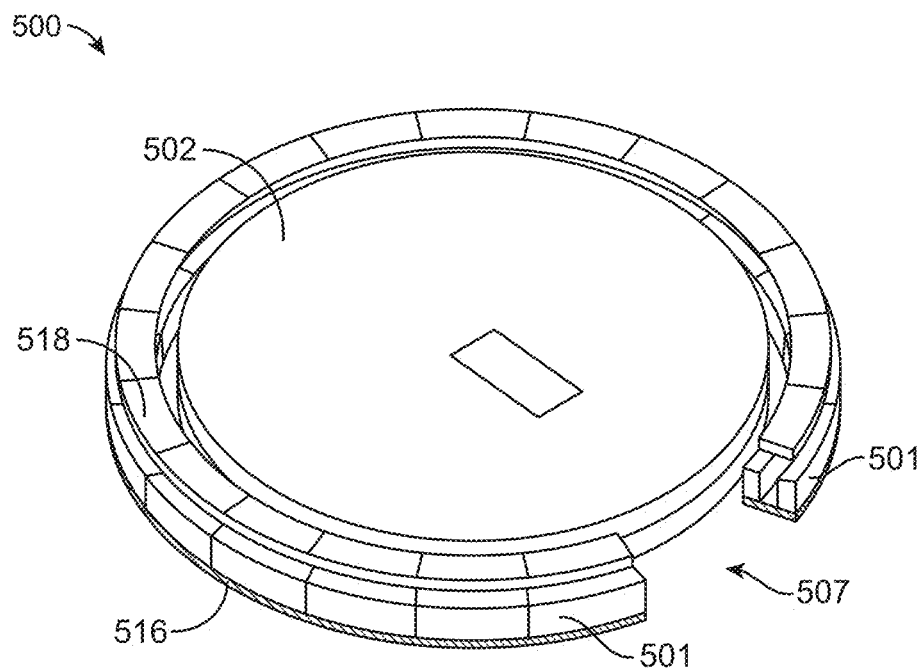
FIG. 5A shows a perspective view of a magnetic alignment system according to some embodiments.

FIG. 5A shows a perspective view of a magnetic alignment system 500 according to some embodiments. Magnetic alignment system 500, which can be an implementation of magnetic alignment system 300, includes a secondary alignment component 518 having a radially outward magnetic orientation (e.g., as shown in FIG. 4) and a complementary primary alignment component 516. In this example, magnetic alignment system 500 includes a gap 507 between two of the sectors; however, gap 507 is optional and magnetic alignment system 500 can be a complete annular structure. Also shown are components 502, which can include, for example an inductive coil assembly or other components located within the central region of primary magnetic alignment component 516 or secondary magnetic alignment component 518. Magnetic alignment system 500 can have a closed-loop configuration similar to magnetic alignment system 300 (as shown in FIG. 3B) and can include arcuate sectors 501, each of which can be made of one or more arcuate magnets. In some embodiments, the closed-loop configuration of magnetic alignment system 500 can reduce or prevent magnetic field leakage that may affect components 502.

Figure 5B:
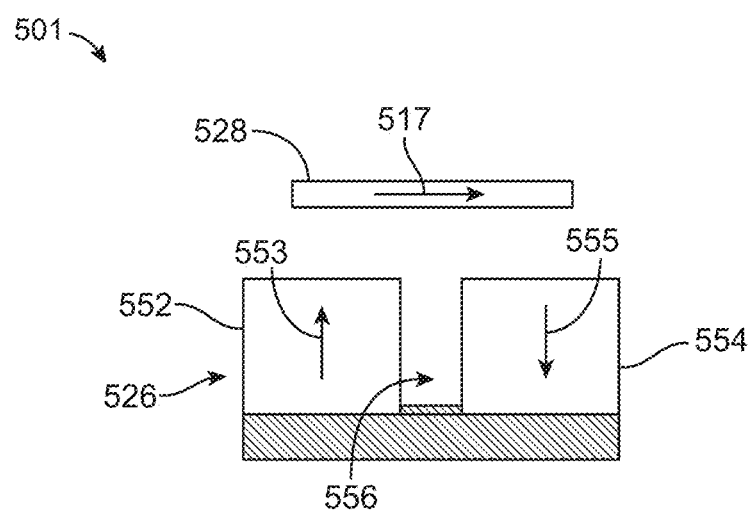
FIG. 5B shows an axial cross-section view through a portion of the system of FIG. 5A.

FIG. 5B shows an axial cross-section view through one of arcuate sectors 501. Arcuate sector 501 includes a primary magnet 526 and a secondary magnet 528. As shown by orientation indicator 517, secondary magnet 528 has a magnetic polarity oriented in a radially outward direction, i.e., the north magnetic pole is toward the radially outward side of magnetic alignment system 500. Like primary magnets 326 described above, primary magnet 526 includes an inner arcuate magnetic region 552, an outer arcuate magnetic region 554, and a central non-magnetized region 556 (which can include, e.g., an air gap or a region of nonmagnetic or non-magnetized material). Inner arcuate magnetic region 552 has a magnetic polarity oriented axially such that the north magnetic pole is toward secondary magnet 528, as shown by indicator 553, while outer arcuate magnetic region 554 has an opposite magnetic orientation, with the south magnetic pole oriented toward secondary magnet 528, as shown by indicator 555. As described above with reference to FIG. 3B, the arrangement of magnetic orientations shown in FIG. 5B results in magnetic attraction between primary magnet 526 and secondary magnet 528. In some embodiments, the magnetic polarities can be reversed such that the north magnetic pole of secondary magnet 528 is oriented toward the radially inward side of magnetic alignment system 500, the north magnetic pole of outer arcuate region 554 of primary magnet 526 is oriented toward secondary magnet 528, and the north magnetic pole of inner arcuate region 552 is oriented away from secondary magnet 528.

When primary alignment component 516 and secondary alignment component 518 are aligned, the radially symmetrical arrangement and directional equivalence of magnetic polarities of primary alignment component 516 and secondary alignment component 518 allow secondary alignment component 518 to rotate freely (relative to primary alignment component 516) in the clockwise or counterclockwise direction in the lateral plane while maintaining alignment along the axis.

Figure 5C:
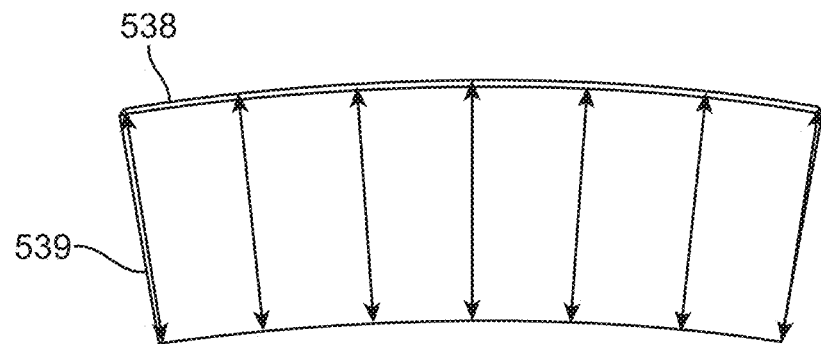
FIGS. 5C-5E show examples of arcuate magnets with radial magnetic orientation according to some embodiments.
Figure 5D:
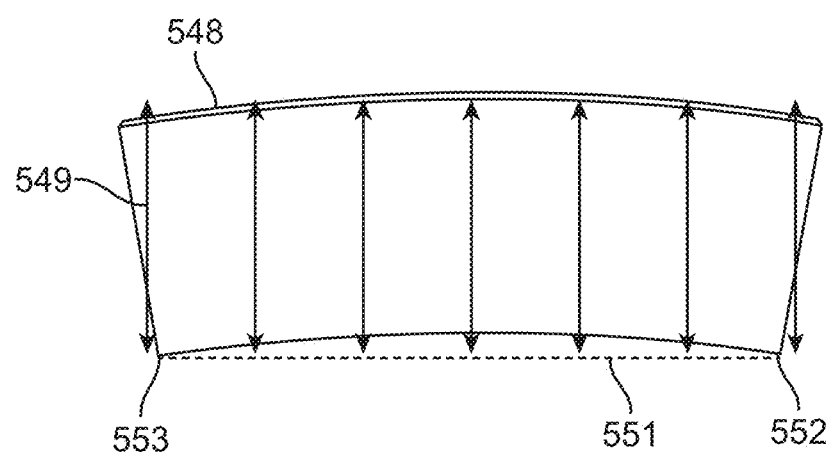
Figure 5E:
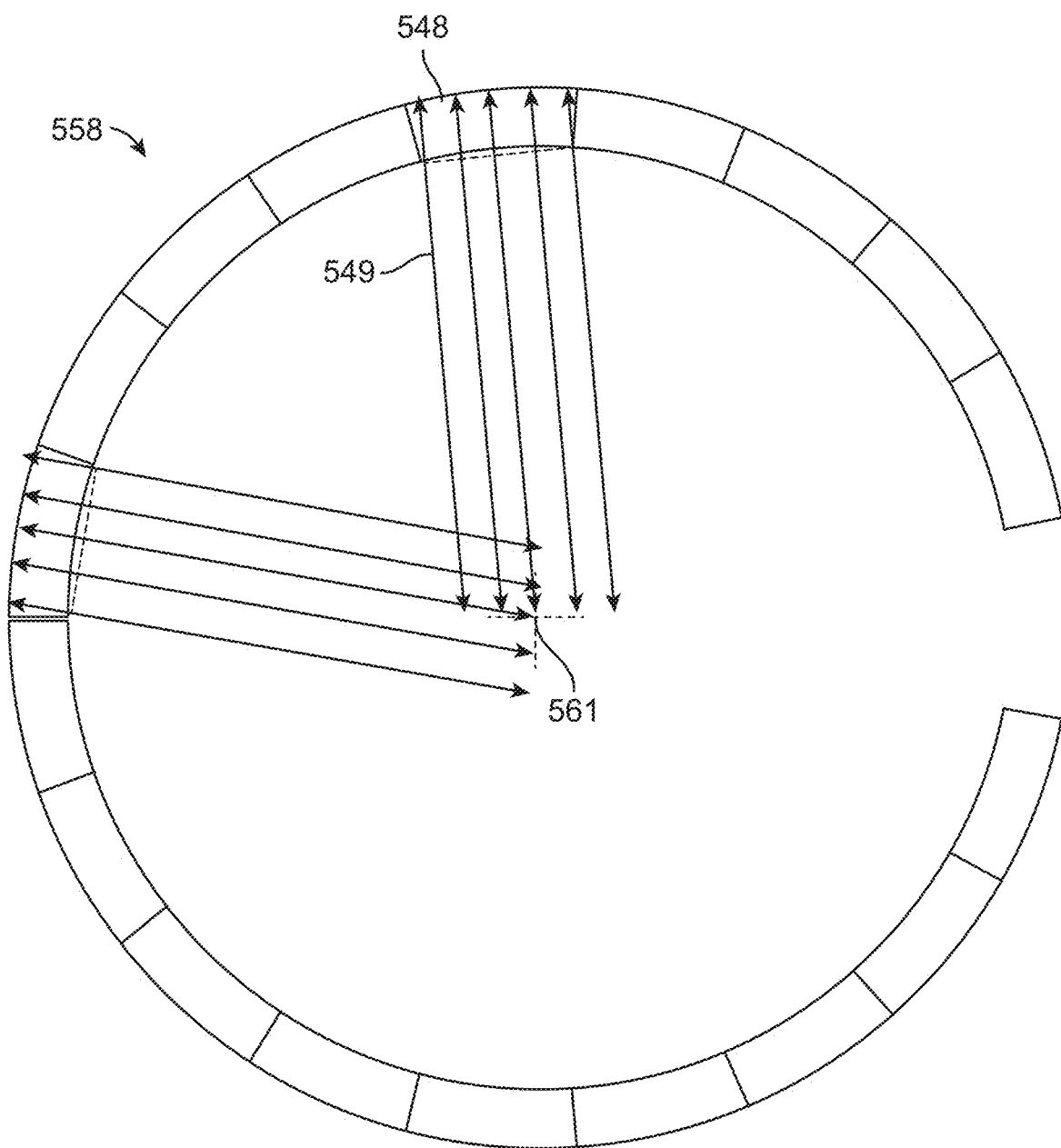

As used herein, a "radial" orientation need not be exactly or purely radial. For example, FIG. 5C shows a secondary arcuate magnet 538 according to some embodiments. Secondary arcuate magnet 538 has a purely radial magnetic orientation, as indicated by arrows 539. Each arrow 539 is directed at the center of curvature of magnet 538; if extended inward, arrows 539 would converge at the center of curvature. However, achieving this purely radial magnetization requires that magnetic domains within magnet 538 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 5C. FIG. 5D shows a secondary arcuate magnet 548 with pseudo-radial magnetic orientation according to some embodiments. Magnet 548 has a magnetic orientation, shown by arrows 549, that is perpendicular to a baseline 551 connecting the inner corners 552, 553 of arcuate magnet 548. If extended inward, arrows 549 would not converge. Thus, neighboring magnetic domains in magnet 548 are parallel to each other, which is readily achievable in magnetic materials such as NdFeB. The overall effect in a magnetic alignment system, however, can be similar to the purely radial magnetic orientation shown FIG. 5C. FIG. 5E shows a secondary annular alignment component 558 made up of magnets 548 according to some embodiments. Magnetic orientation arrows 549 have been extended to the center point 561 of annular alignment component 558. As shown the magnetic field direction can be approximately radial, with the closeness of the approximation depending on the number of magnets 548 and the inner radius of annular alignment component 558. In some embodiments, 18 magnets 548 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 518 (e.g., as shown in FIG. 5B) provides a magnetic force profile between secondary alignment component 518 and primary alignment component 516 that is the same around the entire circumference of the magnetic alignment system. The radial magnetic orientation can also result in greater magnetic permeance, which allows secondary alignment component 518 to resist demagnetization as well as enhancing the attractive force in the axial direction and improving shear force in the lateral directions when the two components are aligned.

Figure 6A:
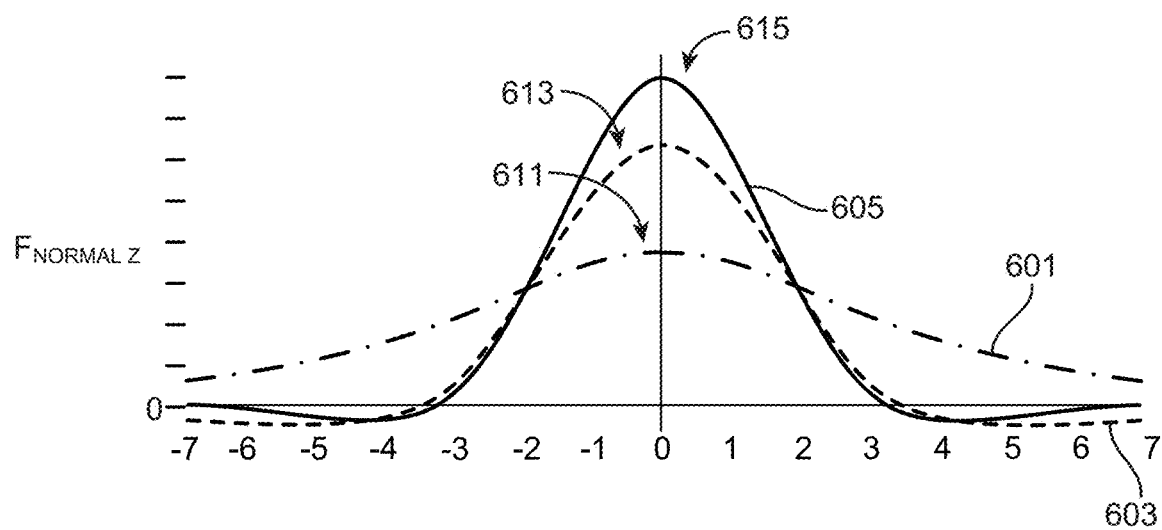
FIGS. 6A and 6B show graphs of force profiles for different magnetic alignment systems, according to some embodiments.
Figure 6B:
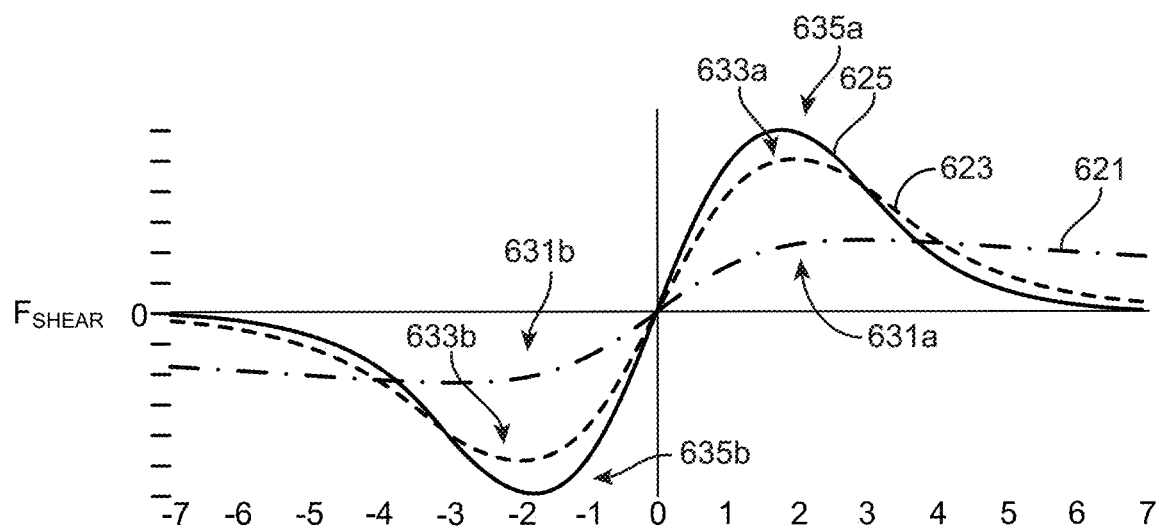

FIGS. 6A and 6B show graphs of force profiles for different magnetic alignment systems, according to some embodiments. Specifically, FIG. 6A shows a graph 600 of vertical attractive (normal) force in the axial (z) direction for different magnetic alignment systems of comparable size and using similar types of magnets. Graph 600 has a horizontal axis representing displacement from a center of alignment, where 0 represents the aligned position and negative and positive values represent displacements from the aligned position in opposite directions (in arbitrary units), and a vertical axis showing the normal force ($F_{NORMAL}$) as a function of displacement in the lateral plane (also in arbitrary units). For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 600 shows normal force profiles for three different types of magnetic alignment systems. A first type of magnetic alignment system uses "central" alignment components, such as a pair of complementary disc-shaped magnets placed along an axis; a representative normal force profile for a central magnetic alignment system is shown as line 601 (dot-dash line). A second type of magnetic alignment system uses annular alignment components with axial magnetic orientations, e.g., magnetic alignment system 200 of FIGS. 2A and 2B; a representative normal force profile for such an annular-axial magnetic alignment system is shown as line 603 (dashed line). A third type of magnetic alignment system uses annular alignment components with closed-loop magnetic orientations and radial symmetry (e.g., magnetic alignment system 500 of FIGS. 5A and 5B); a representative normal force profile for a radially symmetric closed-loop magnetic alignment system is shown as line 605 (solid line).

Similarly, FIG. 6B shows a graph 620 of lateral (shear) force in a transverse direction for different magnetic alignment systems. Graph 620 has a horizontal axis representing lateral displacement in opposing directions from a center of alignment, using the same convention as graph 600, and a vertical axis showing the shear force ($F_{SHEAR}$) as a function of direction (in arbitrary units). For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 620 shows shear force profiles for the same three types of magnetic alignment systems as graph 600: a representative shear force profile for a central magnetic alignment system is shown as line 621 (dot-dash line); a representative shear force profile for an annular-axial magnetic alignment system is shown as line 623 (dashed line); and a representative normal force profile for a radially symmetric closed-loop magnetic alignment system is shown as line 625 (solid line).

As shown in FIG. 6A, each type of magnetic alignment system achieves the strongest magnetic attraction in the axial direction (i.e., normal force) when the primary and secondary alignment components are in the aligned position (0 on the horizontal axis), as shown by respective peaks 611, 613, and 615. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 500 of FIG. 5) provides stronger magnetic attraction when in the aligned position than the other types of magnetic alignment systems. This strong attractive normal force can overcome small misalignments and can help to hold devices in the aligned position, thereby can achieving a more accurate and robust alignment between the primary and secondary alignment components, which in turn can provide a more accurate and robust alignment between a portable electronic device and a wireless charger device within which the magnetic alignment system is implemented.

As shown in FIG. 6B, the strongest shear forces are obtained when the primary and secondary alignment components are laterally just outside of the aligned position, e.g., at −2 and +2 units of separation from the aligned position, as shown by respective peaks 631*a-b*, 633*a-b*, and 635*a-b*. These shear forces act to urge the alignment components toward the aligned position. Similarly to the normal force, the peak strength of shear force depends on the type of magnetic alignment system. In particular, a radially-symmetric closed-loop magnetic alignment system (e.g., magnetic alignment system 500 of FIG. 5) provides higher magnitude of shear force when just outside of the aligned position than the other types of magnetic alignment systems. This strong shear force can provide tactile feedback (sometimes described as a sensation of "snappiness") to help the user identify when the two components are aligned. In addition, like the normal force, the shear force can overcome small misalignments due to frictional force and can achieve a more accurate and robust alignment between the primary and secondary alignment components, which in turn can provide a more accurate and robust alignment between a portable electronic device and a wireless charger device within which the magnetic alignment system is implemented.

Depending on the particular configuration of magnets, various design choices can be used to increase the sensation of snappiness for a closed-loop magnetic alignment system. For example, reducing the amount of magnetic material in the devices in areas near the magnetic alignment components—e.g., by using less material or by increasing the distance between the magnetic alignment component and the other magnetic material—can reduce stray fields and increase the perceived "snapping" effect of the magnetic alignment components. As another example, increasing the magnetic-field strength of the alignment magnets (e.g., by increasing the amount of material) can increase both shear and normal forces. As yet another example, the widths of the magnetized regions in the primary annular alignment component (and/or the relative strength of the magnetic field in each region) can be optimized based on the particular magnetic orientation pattern for the secondary annular alignment component (e.g., whether the secondary annular alignment components have the purely radial magnetic orientation of FIG. 5C or the pseudo-radial magnetic orientation of FIG. 5D). Another consideration can be the coefficient of friction between the surfaces of the devices containing primary and secondary alignment components; lower friction decreases resistance to the shear force exerted by the annular magnetic alignment components.

A radially-symmetric closed-loop magnetic alignment system (e.g., magnetic alignment system 500 of FIGS. 5A and 5B) can provide accurate and robust alignment in the axial and lateral directions. Further, because of the radial symmetry, the alignment system does not have a preferred rotational orientation in the lateral plane about the axis; the shear force profile can be the same regardless of relative rotational orientation of the electronic devices being aligned.

1.4.2. Alternating Radial Orientation

Figure 7:
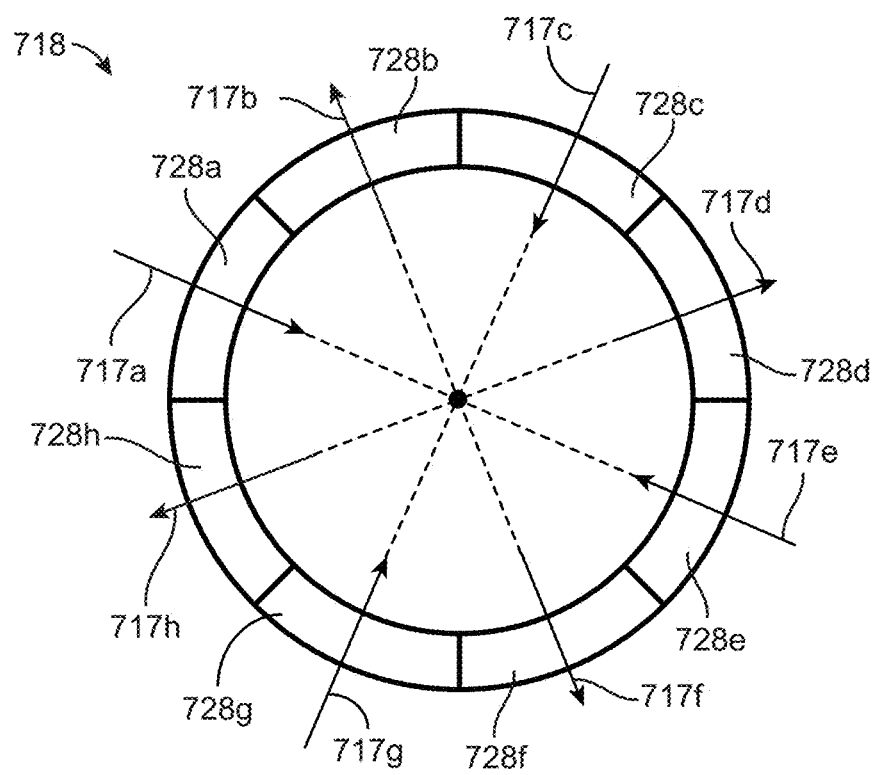
FIG. 7 shows a simplified top-down view of a secondary alignment component according to some embodiments.

In some embodiments, a closed-loop magnetic alignment system can be designed to provide one or more preferred rotational orientations. FIG. 7 shows a simplified top-down view of a secondary alignment component 718 according to some embodiments. Secondary alignment component 718 includes sectors 728*a-h* having radial magnetic orientations as shown by magnetic polarity indicators 717*a-h*. Each of sectors 728*a-h* can include one or more secondary arcuate magnets. In this example, secondary magnets in sectors 728*b*, 728*d*, 728*f*, and 728*h* each have a north magnetic pole oriented toward the radially outward side and a south magnetic pole toward the radially inward side, while secondary magnets in sectors 728*a*, 728*c*, 728*e*, and 728*g* each have a north magnetic pole oriented toward the radially inward side and a south magnetic pole toward the radially outward side. In other words, magnets in adjacent sectors 728a-h of secondary alignment component 718 have alternating magnetic orientations.

A complementary primary alignment component can have sectors with correspondingly alternating magnetic orientations. For example, FIG. 8A shows a perspective view of a magnetic alignment system 800 according to some embodiments. Magnetic alignment system 800 includes a secondary alignment component 818 having alternating radial magnetic orientations (e.g., as shown in FIG. 7) and a complementary primary alignment component 816. Some of the arcuate sections of magnetic alignment system 800 are not shown in order to reveal internal structure; however, it should be understood that magnetic alignment system 800 can be a complete annular structure. Also shown are components 802, which can include, for example, inductive coil assemblies or other components located within the central region of primary annular alignment component 816 and/or secondary annular alignment component 818. Magnetic alignment system 800 can be a closed-loop magnetic alignment system similar to magnetic alignment system 300 described above and can include arcuate sectors 801b, 801c of alternating magnetic orientations, with each arcuate sector 801b, 801c including one or more arcuate magnets in each of primary annular alignment component 816 and secondary annular alignment component 818. In some embodiments, the closed-loop configuration of magnetic alignment system 800 can reduce or prevent magnetic field leakage that may affect component 802. Like magnetic alignment system 500, magnetic alignment system 800 can include a gap 803 between two sectors.

FIG. 8B shows an axial cross-section view through one of arcuate sectors 801b, and FIG. 8C shows an axial cross-section view through one of arcuate sectors 801c. Arcuate sector 801b includes a primary magnet 826b and a secondary magnet 828b. As shown by orientation indicator 817b, secondary magnet 828b has a magnetic polarity oriented in a radially outward direction, i.e., the north magnetic pole is toward the radially outward side of magnetic alignment system 800. Like primary magnets 326 described above, primary magnet 826b includes an inner arcuate magnetic region 852b, an outer arcuate magnetic region 854b, and a central non-magnetized region 856b (which can include, e.g., an air gap or a region of nonmagnetic or non-magnetized material). Inner arcuate magnetic region 852b has a magnetic polarity oriented axially such that the north magnetic pole is toward secondary magnet 828b, as shown by indicator 853b, while outer arcuate magnetic region 854b has an opposite magnetic orientation, with the south magnetic pole oriented toward secondary magnet 828b, as shown by indicator 855b. As described above with reference to FIG. 3B, the arrangement of magnetic orientations shown in FIG. 8B results in magnetic attraction between primary magnet 826b and secondary magnet 828b.

As shown in FIG. 8C, arcuate sector 801c has a "reversed" magnetic orientation relative to arcuate sector 801b. Arcuate sector 801c includes a primary magnet 826c and a secondary magnet 828c. As shown by orientation indicator 817c, secondary magnet 828c has a magnetic polarity oriented in a radially inward direction, i.e., the north magnetic pole is toward the radially inward side of magnetic alignment system 800. Like primary magnets 326 described above, primary magnet 826c includes an inner arcuate magnetic region 852c, an outer arcuate magnetic region 854c, and a central non-magnetized region 856c (which can include, e.g., an air gap or a region of nonmagnetic or non-magnetized material). Inner arcuate magnetic region 852c has a magnetic polarity oriented axially such that the south magnetic pole is toward secondary magnet 828c, as shown by indicator 853c, while outer arcuate magnetic region 854c has an opposite magnetic orientation, with the north magnetic pole oriented toward secondary magnet 828c, as shown by indicator 855c. As described above with reference to FIG. 3B, the arrangement of magnetic orientations shown in FIG. 8C results in magnetic attraction between primary magnet 826c and secondary magnet 828c.

An alternating arrangement of magnetic polarities as shown in FIGS. 7 and 8A-8C can create a "ratcheting" feel when secondary alignment component 818 is aligned with primary alignment component 816 and one of alignment components 816, 818 is rotated relative to the other about the common axis. For instance, as secondary alignment component 816 is rotated relative to primary alignment component 816, each radially-outward magnet 828b alternately comes into proximity with a complementary magnet 826b of primary alignment component 816, resulting in an attractive magnetic force, or with an anti-complementary magnet 826c of primary alignment component 816, resulting in a repulsive magnetic force. If primary magnets 826b, 826c and secondary magnets 828b, 828c have the same angular size and spacing, in any given orientation, each pair of magnets will experience similar net (attractive or repulsive) magnetic forces such that alignment is stable and robust in rotational orientations in which complementary magnet pairs 826b, 828b and 826c, 828c are in proximity. In other rotational orientations, a torque toward a stable rotational orientation can be experienced.

Figure 9A:
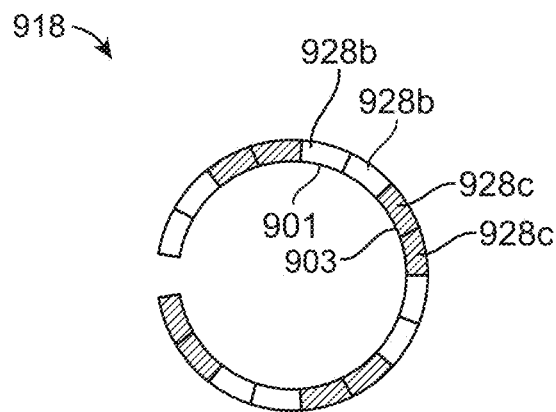
FIGS. 9A and 9B show simplified top-down views of secondary alignment components according to various embodiments.
Figure 9B:
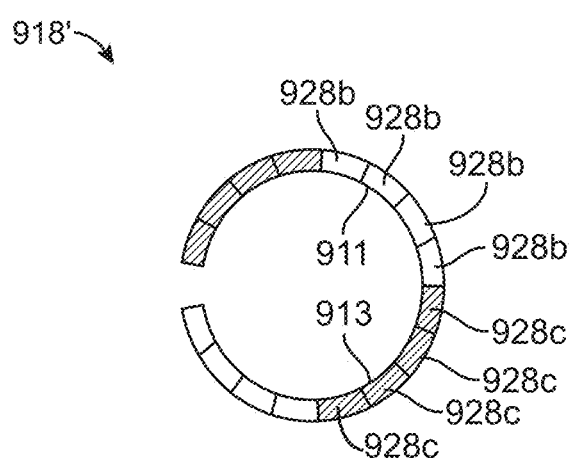

In the examples shown in FIGS. 7 and 8A-8C, each sector includes one magnet, and the direction of magnetic orientation alternates with each magnet. In some embodiments, a sector can include two or more magnets having the same direction of magnetic orientation. For example, FIG. 9A shows a simplified top-down view of a secondary alignment component 918 according to some embodiments. Secondary alignment component 918 includes secondary magnets 928b with radially outward magnetic orientations and secondary magnets 928c with radially inward orientations, similarly to secondary alignment component 818 described above. In this example, the magnets are arranged such that a pair of outwardly-oriented magnets 928b (forming a first sector 901) are adjacent to a pair of inwardly-oriented magnets 928c (forming a second sector 903 adjacent to first sector 901). The pattern of alternating sectors (with two magnets per sector) repeats around the circumference of secondary alignment component 918. Similarly, FIG. 9B shows a simplified top-down view of another secondary alignment component 918' according to some embodiments. Secondary alignment component 918' includes secondary magnets 928b with radially outward magnetic orientations and secondary magnets 928c with radially inward orientations. In this example, the magnets are arranged such that a group of four radially-outward magnets 928b (forming a first sector 911) is adjacent to a group of four radially-inward magnets 928c (forming a second sector 913 adjacent to first sector 911). The pattern of alternating sectors (with four magnets per sector) repeats around the circumference of secondary alignment component 918'. Although not shown in FIGS. 9A and 9B, the structure of a complementary primary alignment component for secondary alignment component 918 or 918' should be apparent in view of FIGS. 8A-8C. A shear force profile for the alignment components of FIGS. 9A and 9B can be similar to the ratcheting profile described above, although the number of rotational orientations that provide stable alignment will be different.

1.4.3. Other Magnetic Orientations

Figure 10:
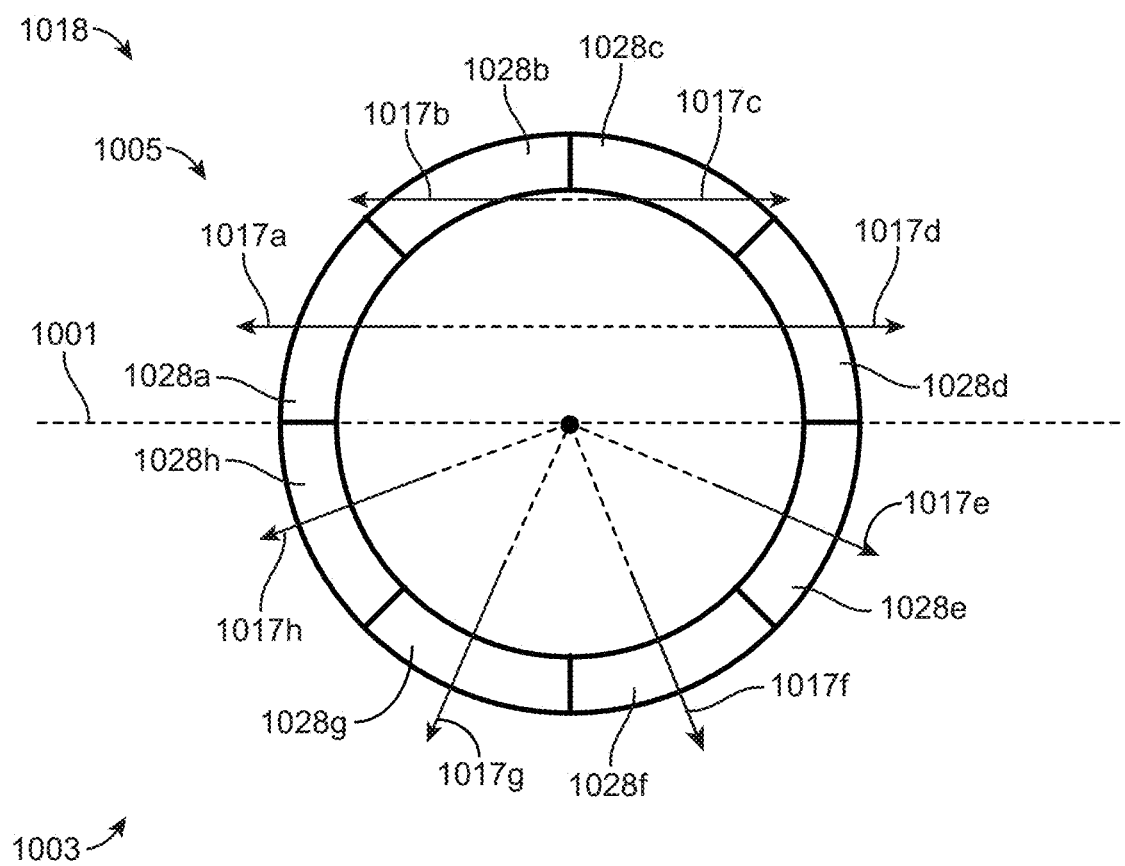
FIG. 10 shows a simplified top-down view of a secondary alignment component according to some embodiments.

In other embodiments, a variety of force profiles can be created by changing the magnetic orientations of different sectors within the primary and/or secondary alignment components. As just one example, FIG. 10 shows a simplified top-down view of a secondary alignment component 1018 according to some embodiments. Secondary alignment component has sectors 1028a-h with sector-dependent magnetic orientations as shown by magnetic polarity indicators 1017a-h. In this example, secondary alignment component 1018 can be regarded as bisected by bisector line 1001, which defines two halves of secondary alignment component 1018. In a first half 1003, sectors 1028e-h have magnetic polarities oriented radially outward, similarly to examples described above.

In the second half 1005, sectors 1028a-d have magnetic polarities oriented substantially parallel to bisector line 1001 rather than radially. In particular, sectors 1028a and 1028b have magnetic polarities oriented in a first direction parallel to bisector line 1001, while sectors 1028c and 1028d have magnetic polarities oriented in the direction opposite to the direction of the magnetic polarities of sectors 1028a and 1028b. A complementary primary alignment component can have an inner annular region with magnetic north pole oriented toward secondary alignment component 1018, an outer annular region with magnetic north pole oriented away from secondary alignment component 1018, and a central non-magnetized region, providing a closed-loop magnetic orientation as described above. The asymmetric arrangement of magnetic orientations in secondary alignment component 1018 can modify the shear force profile such that secondary alignment component 1018 generates less shear force resisting motion in the direction toward second half 1005 (upward in the drawing) than in the direction toward first half 1003 (downward in the drawing). In some embodiments, an asymmetrical arrangement of this kind can be used where the primary alignment component is mounted in a docking station and the secondary alignment component is mounted in a portable electronic device that docks with the docking station. Assuming secondary annular alignment component 1018 is oriented in the portable electronic device such that half-annulus 1005 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

In the embodiments described above, the secondary annular magnetic alignment component has a magnetic orientation that is generally aligned in the transverse plane. In some alternative embodiments, a secondary annular magnetic alignment component can instead have a quad-pole configuration similar to that of primary annular magnetic alignment component 316 of FIGS. 3A and 3B, with or without a DC shield (which, if present, can be similar to DC shield 314 of FIGS. 3A and 3B) on the distal surface of the secondary arcuate magnets. Using quad-pole magnetic configurations in both the primary and secondary alignment components can provide a closed-loop DC magnetic flux path and a strong sensation of "snappiness"; however, the thickness of the secondary magnetic alignment component may need to be increased to accommodate the quad-pole magnets and DC shield, which may increase the overall thickness of a portable electronic device that houses the secondary magnetic alignment component. To reduce thickness, the DC shield on the distal surface of the secondary alignment component can be omitted; however, omitting the DC shield may result in increased flux leakage into neighboring components.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations that exert forces toward the desired position of alignment. Different combinations of magnetic orientations may create different shear force profiles, and the selection of magnetic orientations may be made based on a desired shear force profile (e.g., high snappiness), avoidance of DC flux leakage into other components, and other design considerations.

1.5. Annular Magnetic Alignment Components with Gaps

In examples described above, the primary alignment component and secondary alignment component have annular shapes. As described above (e.g., with reference to FIG. 3A), the annulus can be completely closed. In other embodiments (e.g., as shown in FIGS. 5A and 8A), a primary or secondary annular alignment component can include one or more gaps, where each gap can be a section of an annulus where magnetic material (or indeed any material) is absent.

Figure 11:
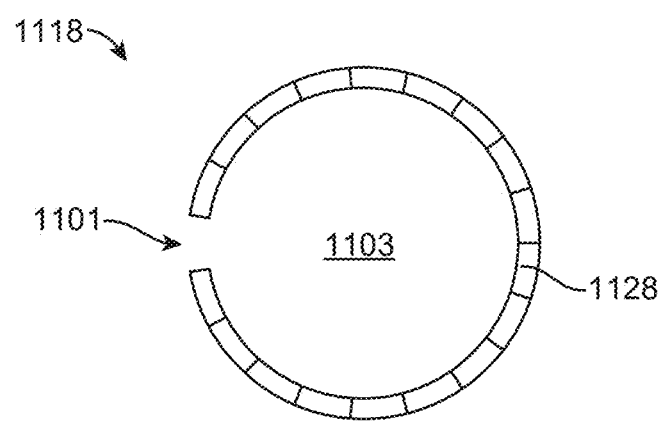
FIG. 11 illustrates an example of an annular alignment component having a gap according to some embodiments.

FIG. 11 illustrates an example of an alignment component 1118 (which can be a primary or secondary annular magnetic alignment component) having a gap according to some embodiments. As shown, alignment component 1118 can include a number of arcuate magnets 1128 forming an annular shape. In this embodiment, a gap 1101 between two magnets is created by omitting one of arcuate magnets 1128. More generally, a gap such as gap 1101 can be created using various techniques. For example, the angle $\phi$ subtended by each arcuate magnet can be selected such that $360°/\phi$ is not an integer. Thus, the size of gap 1101 may be equal to or smaller than (or larger than) the size of an arcuate magnet 1128. In various embodiments of a magnetic alignment system, a gap such as gap 1101 may be formed in either or both of a secondary alignment component and a primary alignment component, and the size, number, and location of gaps can be different between the primary and secondary alignment components. To provide reliable magnetic alignment, the size of gap 1101 or other gaps can be limited, e.g., to 20° of arc or less.

In some embodiments, a gap such as gap 1101 may provide a convenient path for electrical connections to components located in interior region 1103 inboard of alignment component 1118. For example, as described above, an inductive coil (or other electronic component) may be disposed in interior region 1103, and gap 1101 in alignment component 1118 may provide a convenient path for electrical connections between the inductive coil (or other component) and a battery (or other components) located outboard of alignment component 1118. It should be understood that electrical connections can also be made by routing connection paths over or under magnets 1128 (into or out of the plane of FIG. 11); however, routing connection paths over or under the magnets may result in increased thickness of the device in which alignment component 1118 is disposed.

It should be understood that a gap such as gap 1101 can be included in a primary alignment component, a secondary alignment component, or both. In some embodiments where gaps are provided in both the primary alignment component and the secondary alignment component, the presence of the gaps may alter the shear force profile in a manner that creates a preferred rotational orientation. The extent to which a preferred orientation arises may depend on the size of the gaps and the particular configuration of magnets.

1.6. Portable Electronic Devices Incorporating Magnetic Alignment Components

Figure 12A:
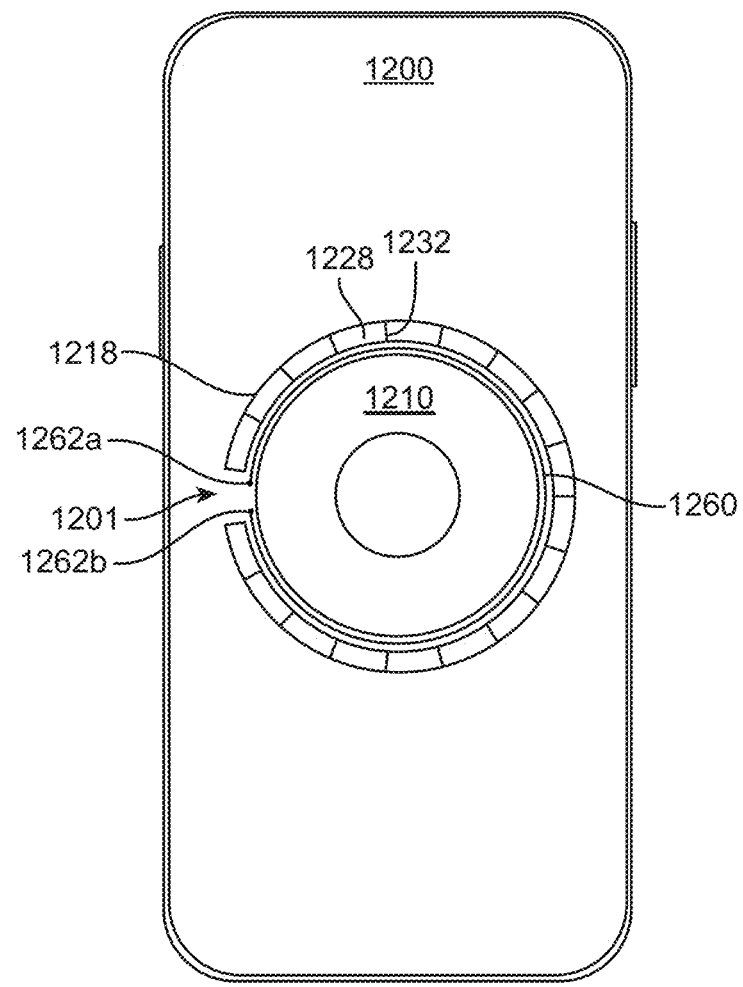
FIGS. 12A and 12B show examples portable electronic devices incorporating a magnetic alignment component according to some embodiments.
Figure 12B:
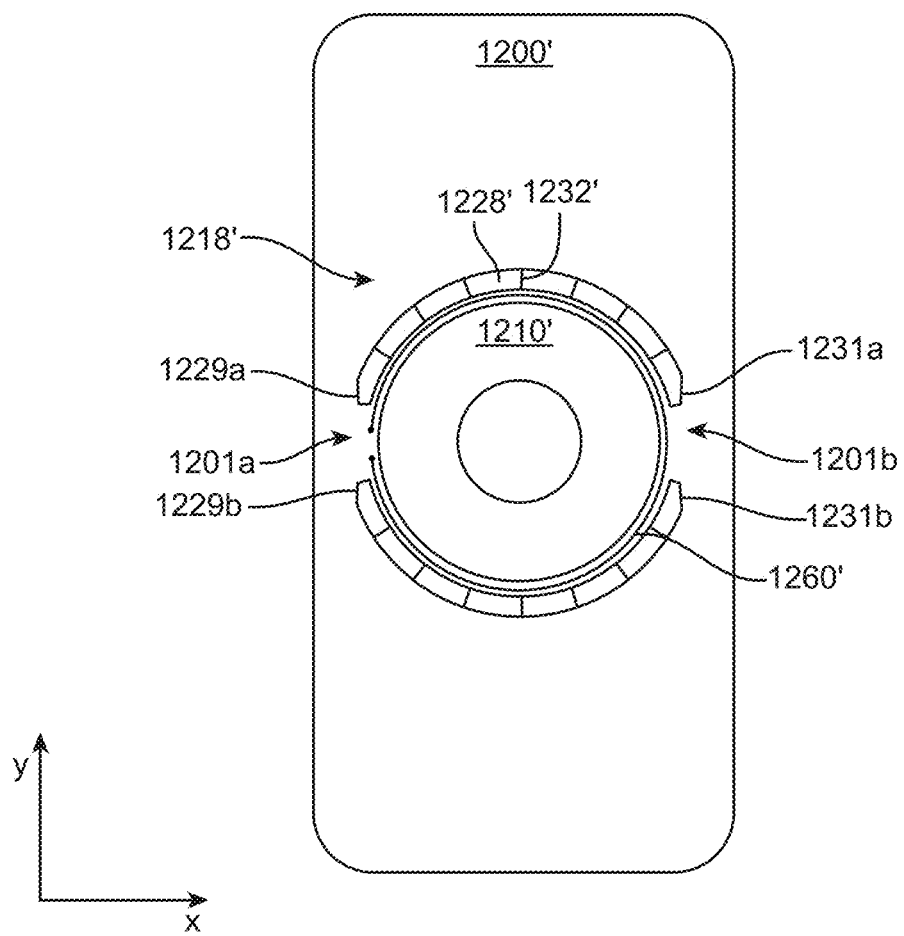

FIGS. 12A and 12B show simplified rear views of portable electronic devices incorporating magnetic alignment components according to some embodiments. In the examples shown, the portable electronic devices incorporate secondary magnetic alignment components having a radial magnetic orientation, which can allow for a thinner device profile; however, it should be understood that a portable electronic device can instead incorporate a primary magnetic alignment component.

FIG. 12A shows a smart phone 1200 as an example of a portable electronic device that can incorporate a magnetic alignment component according to some embodiments. Smart phone 1200 can support a variety of computing and communication activities and can draw operating power from an onboard battery (not shown). In some embodiments, the battery can be recharged using wireless power transfer. For example, smart phone 1200 can include a coil assembly 1210, which can be configured as an inductive receiver coil for wireless power transfer. Such time-varying magnetic fields can be provided by a transmitter coil in a wireless charger device (not shown in FIG. 12A). In addition or instead, coil assembly 1210 may be operable as an inductive transmitter coil for wireless power transfer and may be operable to generate time-varying magnetic fields that can be used to charge an accessory device such as a wireless headset, an external battery, or another portable electronic device (e.g., another smart phone). Coil assembly 1210 can include an inductive receiver coil (e.g., a wound coil of electrically conductive wire) coupled to a power storage device (e.g., a battery) or power consuming device. In some embodiments, coil assembly 1210 can also include electromagnetic shielding (e.g., one or more pieces of ferrite) placed over the distal surface, inner annular surface, and/or outer annular surface of the coil.

For optimal wireless charging performance, it is desirable to align coil 1210 with a coil in the transmitting (or receiving) device. Annular magnetic alignment component 1218 can be, for example, an implementation of any of the secondary magnetic alignment components described above and can include an annular arrangement of magnets 1228 with interfaces 1232, which can be air gaps or surfaces where adjacent magnets contact one another. The magnetic polarities of magnets 1228 can be oriented in varying directions in the lateral plane, e.g., in a radial direction as described above with reference to FIG. 4. In the example shown, magnetic alignment component 1218 includes a gap 1201, which can provide electrical connection paths for wires (or conductive traces) to connect between coil 1210 and components outboard of magnetic alignment component 1218.

Coil 1210 can be optimized to support wireless power transfer between devices. In some embodiments, it may also be desirable to support wireless data transfer between devices, for instance to allow different devices that incorporate magnetic alignment systems to identify themselves. Accordingly, in some embodiments, a near-field communication (NFC) coil 1260 can be provided in the region between coil 1210 and magnets 1228. An NFC reader circuit and/or other components (not shown) can connect to termination ends 1262a, 1226b of NFC coil 1260 through gap 1201. Example embodiments of NFC coil 1210 are described in section 5 below.

In some embodiments, a magnetic alignment component such as component 1218 can be modified to fit portable electronic devices of different sizes while preserving a constant outer diameter and radial width of the annulus. By way of example, FIG. 12B shows a smart phone 1200' as another example of a portable electronic device that can incorporate a magnetic alignment component according to some embodiments. Like smart phone 1200 of FIG. 12A, smart phone 1200' can support a variety of computing and communication activities and may draw operating power from an onboard battery (not shown). One difference between smart phone 1200 and smart phone 1200' can be that smart phone 1200' has a smaller form factor than smart phone 1200. For instance smart phone 1200' may be narrower (in the x direction) and/or shorter (in the y direction) than smart phone 1200. However, it may be desirable for these smart phones of different form factors to interoperate with the same wireless charger devices and/or other accessories. Accordingly, smart phone 1200' can include a wireless charging coil 1210' that can be identical to wireless charging coil 1210 of smart phone 1200.

To provide alignment of coil 1210' with a coil in another device, smart phone 1200' can include a magnetic alignment component 1218'. Magnetic alignment component 1218' can be for example, an implementation of any of the secondary magnetic alignment components described above and can include an annular arrangement of arcuate magnets 1228' with interfaces 1232', which can be air gaps or surfaces where adjacent magnets 1228' contact one another. The magnetic polarities of magnets 1228' can be oriented in varying directions in the lateral plane, e.g., in a radial direction as described above. In addition, NFC coil 1260' can be provided in the region between coil 1210' and magnets 1228', similarly to NFC coil 1260 of FIG. 12A.

In the example shown, to accommodate the narrower width of smart phone 1200' magnetic alignment component 1218' includes diametrically opposed gaps 1201a, 1201b. In addition to decreasing the width (in the x direction) of magnetic alignment component 1218', gaps 1201a and/or 1201b can also provide electrical connection paths for wires (or conductive traces) to connect between coil 1210' and components outboard of magnetic alignment component 1218'. In some embodiments, the arcuate magnet sections 1228' adjacent to gaps 1201a, 1201b can have beveled corners 1229a-b and 1231a-b, which can further reduce the width of alignment component 1218' without reducing the outer diameter.

It should be understood that smart phones 1200 and 1200' are just examples, and a variety of portable electronic devices having a range of different form factors can accommodate an annular alignment component of a given diameter and width. Further, while FIGS. 12A and 12B show alignment components 1218, 1218' and coils 1210, 1210' on the rear of smart phones 1200, 1200', it should be understood that these components can be inside the rear housing of smart phones 1200, 1200' and that the rear housing may be opaque so that alignment components 1218, 1218' and coils 1210, 1210' need not be visible to users.

1.7. Wireless Charger Devices Incorporating Magnetic Alignment Components

Figure 13:
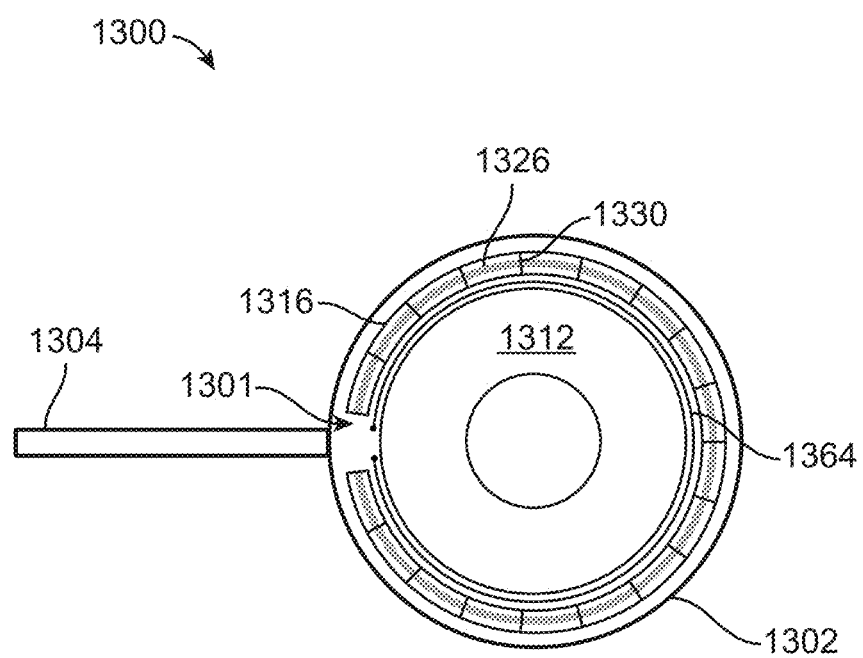
FIG. 13 shows a simplified view of a wireless charger device incorporating a magnetic alignment component according to some embodiments.

FIG. 13 shows a simplified view of a wireless charger device 1300 incorporating a magnetic alignment component according to some embodiments. In the example shown, the wireless charger device incorporates a primary alignment component; however, it should be understood that a wireless charger device can instead incorporate a secondary magnetic alignment component.

Wireless charger device 1300 can support inductive power transfer for charging a portable electronic device (such as smart phone 1200 of FIG. 12A or smart phone 1200' of FIG. 12B). In this example, wireless charger device 1300 has a housing 1302 surrounding a transmitter coil assembly 1312. Although not shown in FIG. 13, it should be understood that transmitter coil assembly 1312 can include an inductive transmitter coil having wires that can be connected to an external power source (e.g., via cable 1304). In some embodiments, transmitter coil assembly 1312 can also include electromagnetic shielding (e.g., one or more pieces of ferrite placed over the distal surface, inner annular surface, and/or outer annular surface of the transmitter coil and/or a thin layer of metal placed over the proximal surface of the transmitter coil to reduce parasitic electric fields). Control circuitry to control the transmitter coil can be disposed within housing 1302 or elsewhere as desired. A primary magnetic alignment component 1316 is disposed around transmitter coil assembly 1312.

Components of wireless charger device 1300 can be enclosed in housing 1302, which can be made of aluminum, plastic, ceramic, or other durable material. Housing 1302 is shown as puck-shaped; however, other shapes can also be used. For instance, housing 1302 can be rectangular, elliptical, or any other shape that provides a charging surface. In some embodiments, housing 1302 can be a two-piece housing that includes an enclosure for the distal and side surfaces of wireless charger device 1300 and a top cap covering the proximal surface of transmitter coil assembly 1312. The top cap (not shown in FIG. 13) can be made of ceramic or other material that is permeable to electromagnetic fields, while the enclosure can be made of aluminum, plastic or other materials. The top cap and enclosure can be sealed together using an appropriate adhesive. Although FIG. 13 shows a view into the interior of wireless charger device 1300, it should be understood that housing 1302 can be opaque. Housing 1302 can include an opening to permit connection of cable 1304 to transmitter coil assembly 1312. In some embodiments, one end of cable 1304 is captively coupled to electronic components of transmitter coil assembly 1312 while the other end of cable 1304 (not shown) is coupled to a plug connector (e.g., a USB type A or USB-C connector) that can be used to draw power from the grid or other power source via an adapter.

For optimal wireless charging performance, it is desirable to align the transmitter coil of coil assembly 1312 with a corresponding coil in a receiving device such as smart phone 1200. Magnetic alignment component 1316 can be, for example, an implementation of any of the primary magnetic alignment components described above and can include an annular arrangement of magnets 1326 with interfaces 1330 between adjacent magnets 1326, which can be air gaps or surfaces where adjacent magnets 1326 contact one another. Magnets 1326 can provide a closed loop configuration as described above; for instance, each magnet 1326 can include an inner arcuate region having an axial magnetic orientation in a first direction, an outer arcuate region having an axial magnetic orientation in a second direction opposite the first direction, and a central arcuate region having no distinct magnetic orientation. In the example shown, magnetic alignment component 1316 includes a gap 1301, which can provide electrical connection paths for wires (or conductive traces) to connect between coil assembly 1312 and cable 1304 without adding to the axial thickness of wireless charger device 1300.

Coil assembly 1312 can be optimized to support wireless power transfer between devices. In some embodiments, it may also be desirable to support wireless data transfer between devices, for instance to allow different devices that incorporate magnetic alignment systems to identify themselves. Accordingly, in some embodiments, a near-field communication (NFC) coil 1364 can be provided in the region between coil assembly 1312 and magnetic alignment component 1316. In some embodiments, NFC coil 1364 can couple to a passive NFC tag that can be read by a suitably configured NFC reader (e.g., in smart phone 1200 of FIG. 12A). Example embodiments of NFC coil 1364 are described in section 5 below.

In various embodiments, primary magnetic alignment component 1316 can be used to facilitate alignment between wireless charger device 1300 and a variety of different portable electronic devices having different form factors (e.g., including portable electronic device 1200 and portable electronic device 1200'). As long as the portable electronic device being aligned with primary magnetic alignment component 1316 includes a complementary secondary alignment component having an annular shape matching primary alignment component 1316 and a magnetic field orientation complementary to primary alignment component 1316, primary alignment component 1316 can facilitate alignment of wireless charger device 1300 with the portable electronic device, regardless of any other dimensions of either device. It should also be understood that some embodiments of wireless charger device 1300 can be used to charge a portable electronic device that does not have a magnetic alignment component; however, in such instances, primary alignment component 1316 might not facilitate optimal alignment with the portable electronic device, and the user would need to align the devices using other techniques (e.g., manual adjustment based on charging performance or placing the devices in a cradle that holds the devices such that their respective charging coils are in alignment).

1.8. Wireless Charging Systems with Magnetic Alignment

Figure 14A:
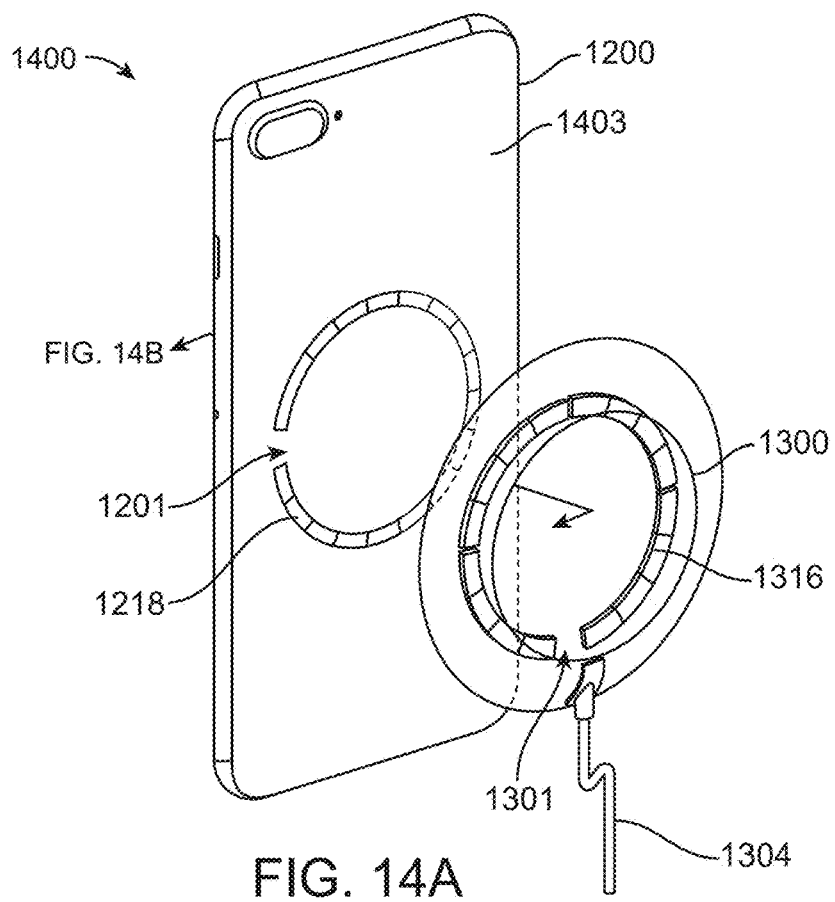
FIG. 14A shows a simplified perspective view of a system including a portable electronic device in alignment with a wireless charger device according to some embodiments.

FIG. 14A shows a simplified perspective view of a system 1400 including portable electronic device 1200 (of FIG. 12A) in alignment with wireless charger device 1300 (of FIG. 13) according to some embodiments. In FIG. 14A, portions of wireless charger device 1300 are shown using dashed lines to avoid obscuring other details. As shown, wireless charger device 1300 can be placed with its charging (or proximal) surface against the rear (or proximal) surface 1403 of portable electronic device 1200. When the devices are placed in this arrangement, secondary alignment component 1218 in portable electronic device 1200 can attract and hold primary magnetic alignment component 1316 of wireless charger device 1300 in alignment so that transmitter coil assembly 1312 of wireless charger device 1300 is aligned with coil assembly 1210 of portable electronic device 1200. As shown, wireless charger device 1300 can have any rotational orientation about an axis defined by the centers of primary magnetic alignment component 1316 and secondary magnetic alignment component 1218; for instance gap 1201 in secondary magnetic alignment component 1218 need not align with gap 1301 in primary magnetic alignment component 1316.

Figure 14B:
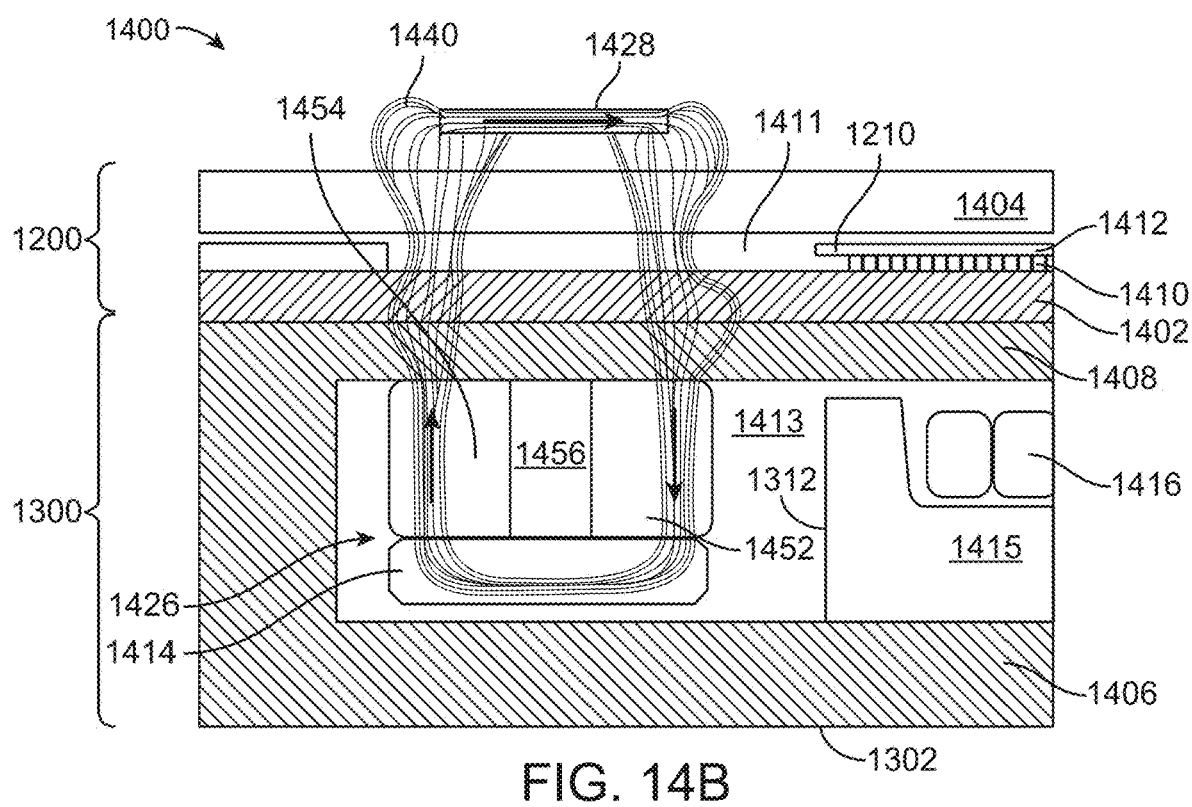
FIG. 14B shows a simplified partial cross section view of the system of FIG. 14A.

FIG. 14B shows a simplified partial cross section view of system 1400 according to some embodiments. Portable electronic device 1200 has a rear housing 1402 (which can be made of a material such as glass or plastic that is permeable to electromagnetic fields and to DC magnetic fields) and a front housing 1404 (which can include a touch screen display). Coil assembly 1210 can include an inductive receiver coil 1410 (which can be made, e.g., of stranded wire wound into a coil) and shielding 1412 (which can include, e.g., a ferrimagnetic shield). Secondary magnet 1428 forms a portion of secondary magnetic alignment component 1218 and can have a magnetic field oriented in a radially inward direction (as shown by the arrow). It should be understood that, although alignment component 1218 is shown in FIG. 14A, rear housing 1402 can be opaque and alignment component 1218 need not be visible to a user.

Wireless charger device 1300 has a housing 1302 that includes a single-piece enclosure 1406 forming distal and side surfaces of housing 1302 and a top cap 1408 forming a proximal surface of housing 1302. As described above, enclosure 1406 and top cap 1408 can be made of the same material or different materials, and top cap 1408 can be made of a material that is permeable to AC electromagnetic fields and to DC magnetic fields. Transmitter coil assembly 1312 can include an inductive transmitter coil 1416 (which can be made, e.g., of stranded wire wound into a coil) and electromagnetic shielding 1415 (which can include, e.g., a ferrimagnetic shield). Primary magnet 1426 forms a portion of primary magnetic alignment component 1316 and can include an inner arcuate region 1452 having a magnetic field oriented in a first axial direction, an outer arcuate region 1454 having a magnetic field oriented in a second axial direction opposite the first axial direction, and a non-magnetized central arcuate region 1456. As described above, a DC shield 1414 can be disposed on the distal surface of primary magnet 1426. It should be understood that, although alignment component 1316 is shown in FIG. 14A, housing 1302 can be opaque and alignment component 1316 need not be visible to a user.

When aligned, primary magnet 1426 and secondary magnet 1428 produce a closed-loop magnetic flux as shown by lines 1440. Magnetic flux 1440 can attract primary annular alignment component 1318 and secondary annular alignment component 1216 into alignment such that the respective centers of primary annular alignment component 1318 and secondary annular alignment component 1216 are aligned along a common axis. Since transmitter coil 1416 is fixed in a position concentric with primary alignment component 1316 and receiver coil 1410 is fixed in position concentric with secondary alignment component 1218, a result of aligning primary annular alignment component 1318 and secondary annular alignment component 1216 along a common axis is that transmitter coil 1416 and receiver coil 1410 are also aligned along a common axis, thereby enabling efficient wireless power transfer. For instance, transmitter coil 1416 can be driven with an alternating current to generate time-varying magnetic fields that induce a time-varying current in receiver coil 1416. Electromagnetic shielding (e.g., shielding 1415 and 1412) can confine the AC fields to the immediate vicinity of coils 1416 and 1410.

In particular, some embodiments provide a gap region 1411 between secondary magnet 1428 and receiver coil assembly 1210 that may experience low DC magnetic flux and may also experience low AC electromagnetic fields due to electromagnetic shielding 1412 around coil 1410. Similarly, some embodiments provide a gap region 1413 between primary magnet 1426 and transmitter coil assembly 1312 that may experience low DC magnetic flux and may also experience low AC electromagnetic fields due to electromagnetic shielding 1418 around transmitter coil 1416. In some embodiments, NFC antenna coils (not shown) may be placed in gap region 1411 and/or 1413, e.g., to support identification of wireless charger device 1300 by portable electronic device 1200. Example embodiments of NFC coil 1260 are described in section 5 below. It is noted that a similar gap region may be created when using a z-pole magnetic alignment system of the kind shown in FIG. 2; however, a larger space between the charging coils and magnets would be required.

As can be appreciated with reference to FIG. 14B, each secondary alignment magnet 1428 of secondary alignment component 1218 can have a thin axial dimension so that secondary alignment component 1218 does not require an increased thickness of portable electronic device 1200. For instance, the axial thickness of each secondary alignment magnet 1428 can be less than or equal to the thickness of receiver coil assembly 1210 (including coil 1410 and shielding 1412). Primary alignment component 1426 can have a thicker axial dimension, e.g., occupying all of the axial space between enclosure 1406 and top cap 1408. In some embodiments, primary alignment component 1426 can also have a radial width that is slightly larger than a radial width of secondary alignment component 1428.

Figure 15:
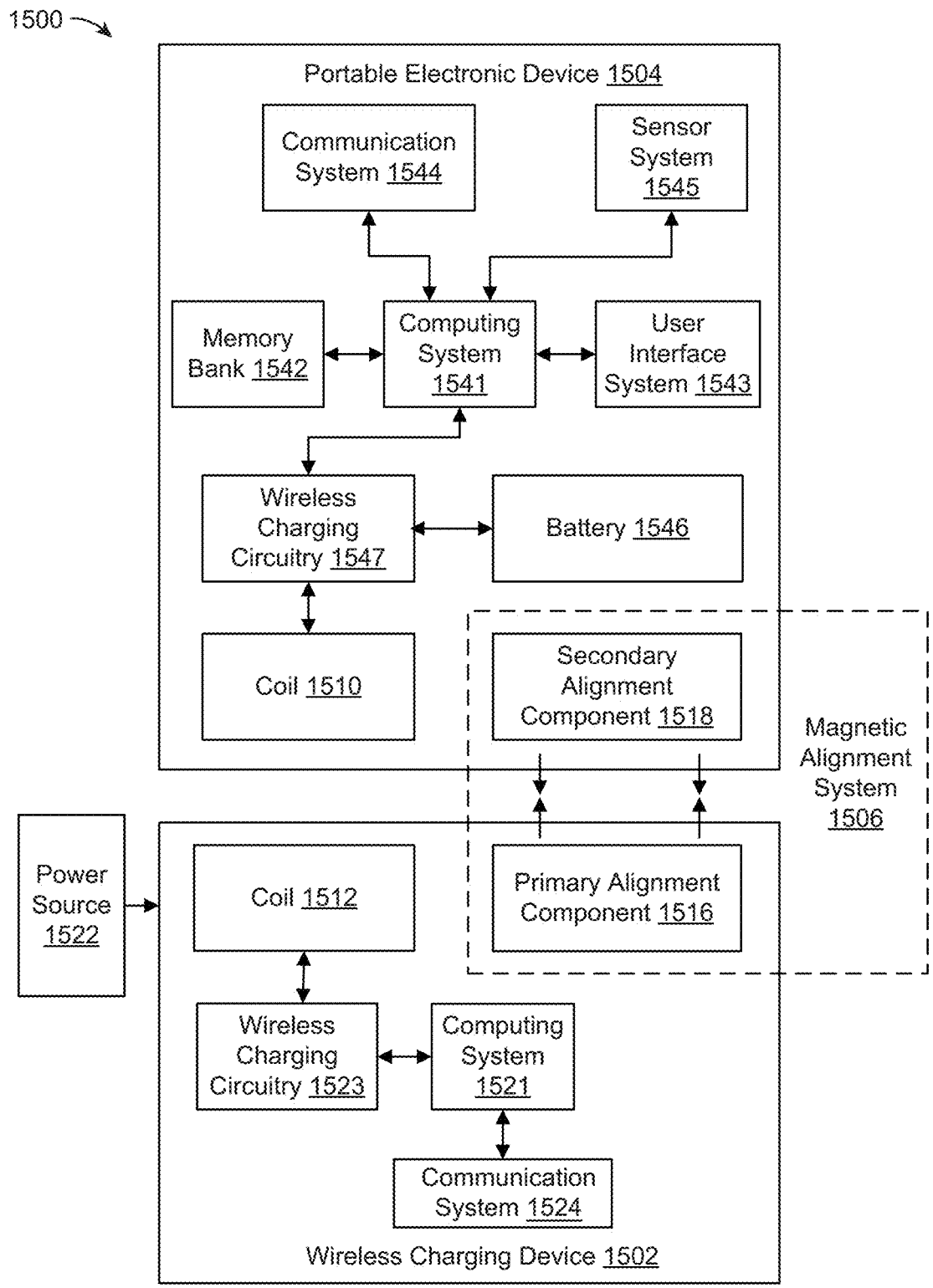
FIG. 15 is a block diagram illustrating an exemplary wireless charging system including devices that can be aligned together via a magnetic alignment system according to some embodiments.

FIG. 15 is a block diagram illustrating an exemplary wireless charging system 1500 including a portable electronic device 1504 (which can be, e.g., portable electronic device 1200 or any other portable electronic device described herein) and a wireless charger device 1502 (which can be, e.g., wireless charger device 1300 or any other wireless charger device described herein) that can be aligned together via a magnetic alignment system 1506 according to some embodiments. Magnetic alignment system 1506 can include a primary alignment component 1516 within wireless charger device 1502 and a secondary alignment component 1518 within portable electronic device 1504. Primary alignment component 1516 and secondary alignment component 1516 can be constructed according to any of the embodiments described herein. Portable electronic device 1504 can also include a computing system 1541 coupled to a memory bank 1542. Computing system 1541 can include control circuitry configured to execute instructions stored in memory bank 1542 for performing various functions for operating portable electronic device 1504. The control circuitry can include one or more programmable integrated logic circuits, such as microprocessors, central processing units (CPUs), graphics processing units (GPUs), field programmable gate arrays (FPGAs), or the like.

Computing system 1541 can also be coupled to a user interface system 1543, a communication system 1544, and a sensor system 1545 for enabling portable electronic device 1504 to perform one or more functions. For instance, user interface system 1543 can include a display, speaker, microphone, actuator for enabling haptic feedback, and one or more input devices such as a button, switch, capacitive screen for enabling the display to be touch sensitive, and the like. Communication system 1544 can include wireless telecommunication components, NFC components, Bluetooth components, and/or Wi-Fi components for enabling portable electronic device 1504 to make phone calls, interact with wireless accessories, and access the Internet. In some embodiments, communication system 1544 can include NFC reader circuitry that is used in connection with magnetic alignment system 1506 to identify an aligned device; examples are described in section 5 below. Sensor system 1545 can include light sensors, accelerometers, gyroscopes, temperature sensors, magnetometers, and/or any other type of sensor that can measure a parameter of an external entity and/or environment.

All of these electrical components require a power source to operate. Accordingly, portable electronic device 1504 also includes a battery 1546 that can discharge stored energy to power the electrical components of portable electronic device 1504. To replenish the energy discharged to power the electrical components, portable electronic device 1504 includes charging circuitry 1547 and an inductive coil 1510 that can receive power from wireless charger device 1502 coupled to an external power source 1522.

Wireless charger device 1502 can include a transmitter coil 1512 for generating time-varying magnetic flux capable of inducing an electrical current in coil 1510 of portable electronic device 1504. The induced current can be used by charging circuitry 1547 to charge battery 1546. Wireless charger device 1502 can further include a computing system 1521 coupled to a communication system 1524 and wireless charging circuitry 1523. Wireless charging circuitry can include circuit components to convert standard AC power having a first set of voltage and frequency characteristics (e.g., standard AC wall power) to AC power suitable for operating coil 1510. Suitable circuit components, including rectifiers (AC-to-DC converters), boost circuits (DC-to-DC voltage boosting circuits), inverters (DC-to-AC converters), and the like, are known in the art. Computing system 1521 can include logic circuitry (such as a microprocessor, microcontroller, FPGA, or the like) configured to control the operation of wireless charger device 1502, such as to control wireless charging circuitry 1523 to use power received from external power source 1522 to generate time-varying magnetic flux to induce current in coil 1510 to charge portable electronic device 1504. In some embodiments, computing system 1521 can implement functionality confirming to the Qi standard for wireless charging (promulgated by the Wireless Power Consortium).

In some embodiments, components implementing computing system 1521 and wireless charging circuitry 1523 can be disposed within the housing that holds coil 1512 and primary alignment component 1516 (e.g., within puck-shaped housing 1302 of FIGS. 13 and 14A-14B). In other embodiments, some or all of the components implementing computing system 1521 and wireless charging circuitry 1523 can be disposed elsewhere, e.g., at the distal end of cable 1304 in FIGS. 13 and 14A. For example, the logic circuitry implementing computing system 1521 can be disposed within housing 1302 while wireless charging circuitry 1532 is disposed in a boot of a plug connector at the distal end of cable 1304. (In this case, cable 1304 can provide AC power to wireless charger device 1300.) As another example, the logic circuitry implementing computing system 1521 and circuit components implementing portions of wireless charging circuitry 1523 can be disposed within housing 1302 while circuit components implementing other portions of wireless charging circuitry 1523 are disposed in a boot of a plug connector at the distal end of cable 1304. For instance, an inverter may be disposed within housing 1302 while a rectifier and boost circuit are disposed in the boot. (In this case, cable 1304 can provide DC power to wireless charger device 1300.)

While system 1500 is described with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices that use using any combination of circuitry and software to enable wireless charging operations and/or other operations where physical alignment between devices is desired.

2. Rotational Alignment Components

In various embodiments described above, a magnetic alignment system can provide robust alignment in a lateral plane and may or may not provide rotational alignment. For example, radially symmetric magnetic alignment system 500 of FIGS. 5A-5B may not define a preferred rotational orientation. Radially alternating magnetic alignment system 800 of FIGS. 8A-8C can define multiple equally preferred rotational orientations. For some applications, such as alignment of a portable electronic device with a wireless charger puck or mat, rotational orientation may not be a concern. In other applications, such as alignment of a portable electronic device in a docking station or other mounting accessory, a particular rotational alignment may be desirable. Accordingly, in some embodiments an annular magnetic alignment component can be augmented with one or more rotational alignment components positioned outboard of and spaced apart from the annular magnetic alignment components. The rotational alignment component(s) can help guide devices into a target rotational orientation relative to each other.

Figure 16:
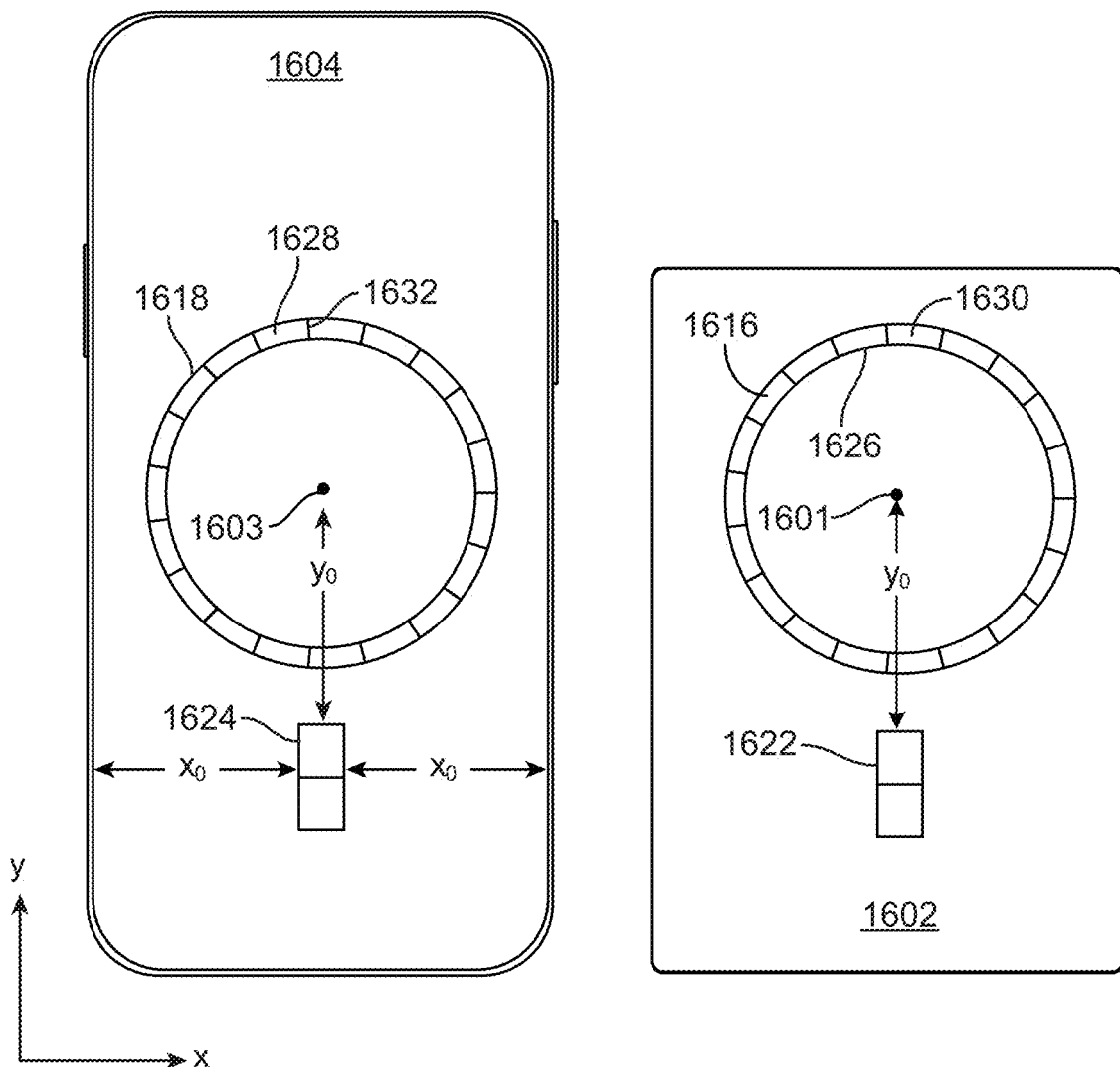
FIG. 16 shows an example of a portable electronic device and an accessory incorporating a magnetic alignment system with an annular alignment component and a rotational alignment component according to some embodiments.

FIG. 16 shows an example of a magnetic alignment system with an annular alignment component and a rotational alignment component according to some embodiments. FIG. 16 shows respective proximal surfaces of a portable electronic device 1604 and an accessory 1602. In this example, primary alignment components of the magnetic alignment system are included in an accessory device 1602, and secondary alignment components of the magnetic alignment system are included in a portable electronic device 1604. Portable electronic device 1604 can be, for example, a smart phone whose front surface provides a touchscreen display and whose back surface is designed to support wireless charging. Accessory device 1602 can be, for example, a charging dock that supports portable electronic device 1604 such that its display is visible and accessible to a user. For instance, accessory device 1602 can support portable electronic device 1604 such that the display is vertical or at a conveniently tilted angle for viewing and/or touching. In the example shown, accessory device 1602 supports portable electronic device 1604 in a "portrait" orientation (shorter sides of the display at the top and bottom); however, in some embodiments accessory device 1602 can support portable electronic device 1604 in a "landscape" orientation (longer sides of the display at the top and bottom). Accessory device 1602 can also be mounted on a swivel, gimbal, or the like, allowing the user to adjust the orientation of portable electronic device 1604 by adjusting the orientation of accessory device 1602.

As described above, components of a magnetic alignment system can include a primary annular alignment component 1616 disposed in accessory 1602 and a secondary annular alignment component 1618 disposed in portable electronic device 1604. Primary annular alignment component 1616 can be similar or identical to any of the primary alignment components described above. For example, primary annular alignment component 1616 can be formed of arcuate magnets 1626 arranged in an annular configuration. Although not shown in FIG. 16, one or more gaps can be provided in primary annular alignment component 1616, e.g., by omitting one or more of arcuate magnets 1626 or by providing a gap at one or more interfaces 1630 between adjacent arcuate magnets 1626. In some embodiments, each arcuate magnet 1626 can include an inner arcuate region having a first magnetic orientation (e.g., axially oriented in a first direction), an outer arcuate region having a second magnetic orientation opposite the first magnetic orientation (e.g., axially oriented opposite the first direction), and a central non-magnetized arcuate region between the inner and outer regions (as described above, the non-magnetized central region can include an air gap or a nonmagnetic material). In some embodiments, primary annular alignment component 1616 can also include a DC shield (not shown) on the distal side of arcuate magnets 1626.

Likewise, secondary annular alignment component 1618 can be similar or identical to any of the secondary alignment components described above. For example, secondary annular alignment component 1618 can be formed of arcuate magnets 1628 arranged in an annular configuration. Although not shown in FIG. 16, one or more gaps can be provided in secondary annular alignment component 1618, e.g., by omitting one or more arcuate magnets 1628 or by providing a gap at one or more interfaces 1632 between adjacent magnets 1628. As described above, arcuate magnets 1628 can provide radially-oriented magnetic polarities. For instance, all sectors of secondary annular alignment component 1618 can have a radially-outward magnetic orientation or a radially-inward magnetic orientation, or some sectors of secondary annular alignment component 1618 may have a radially-outward magnetic orientation while other sectors of secondary annular alignment component 1618 have a radially-inward magnetic orientation.

As described above, primary annular alignment component 1616 and secondary annular alignment component 1618 can provide shear forces that promote alignment in the lateral plane so that center point 1601 of primary annular alignment component 1616 aligns with center point 1603 of secondary annular alignment component 1618. However, primary annular alignment component 1616 and secondary annular alignment component 1618 might not provide torque forces that favor any particular rotational orientation, such as portrait orientation.

Accordingly, in some embodiments, a magnetic alignment system can incorporate one or more rotational alignment components in addition to the annular alignment components. The rotational alignment components can include one or more magnets that provide torque about the common axis of the (aligned) annular alignment components, so that a preferred rotational orientation can be reliably established. For example, as shown in FIG. 16, a primary rotational alignment component 1622 can be disposed outboard of and spaced apart from primary annular alignment component 1616 while a secondary rotational alignment component 1624 is disposed outboard of and spaced apart from secondary annular alignment component 1618. Secondary rotational alignment component 1624 can be positioned at a fixed distance ($y_0$) from center point 1603 of secondary annular alignment component 1618 and centered between the side edges of portable electronic device 1604 (as indicated by distance xo from either side edge). Similarly, primary rotational alignment component 1622 can be positioned at the same distance $y_0$ from center point 1601 of primary annular alignment component 1616 and located at a rotational angle that results in a torque profile that favors the desired orientation of portable electronic device 1604 relative to accessory 1602 when secondary rotational alignment component 1624 is aligned with primary rotational alignment component 1622. It should be noted that the same distance $y_0$ can be applied in a variety of portable electronic devices having different form factors, so that a single accessory can be compatible with a family of portable electronic devices. A longer distance $y_0$ can increase torque toward the preferred rotational alignment; however, the maximum distance $y_0$ may be limited by design considerations, such as the size of the smallest portable electronic device in a family of portable electronic devices that incorporate mutually compatible magnetic alignment systems.

According to some embodiments, each of primary rotational alignment component 1622 and secondary rotational alignment component 1624 can be implemented using one or more magnets (e.g., rare earth magnets such as NdFeB) each of which has each been magnetized such that its magnetic polarity is oriented in a desired direction. In the example of FIG. 16, the magnets have rectangular shapes; however, other shapes (e.g., rounded shapes) can be substituted. The magnetic orientations of rotational alignment components 1622 and 1624 can be complementary so that when the proximal surfaces of rotational alignment components 1622 and 1624 are near each other, an attractive magnetic force is exerted. This attractive magnetic force can help to rotate portable electronic device 1604 and accessory 1602 into a preferred rotational orientation in which the proximal surfaces of rotational alignment components 1622 and 1624 are aligned with each other. Examples of magnetic orientations for rotational alignment components 1622 and 1624 that can be used to provide a desired attractive force are described below. In some embodiments, primary rotational alignment component 1622 and secondary rotational alignment component 1624 can have the same lateral (xy) dimensions and the same thickness. The dimensions can be chosen based on a desired magnetic field strength and/or torque, the dimensions of devices in which the rotational alignment components are to be deployed, and other design considerations. In some embodiments, the lateral dimensions can be about 6 mm (x direction) by about 16 mm (y direction), and the thickness can be anywhere from about 0.3 mm to about 1.5 mm; the particular dimensions can be chosen based on the sizes of the devices that are to be aligned. In some embodiments, the thickness of the rotational alignment component for a given device can be chosen to match the thickness of an annular alignment component in that device. In some embodiments, each of primary rotational alignment component 1622 and secondary rotational alignment component 1624 can be implemented using two or more rectangular blocks of magnetic material positioned adjacent to each other. As in other embodiments, a small gap may be present between adjacent magnets, e.g., due to manufacturing tolerances.

Figure 17A:
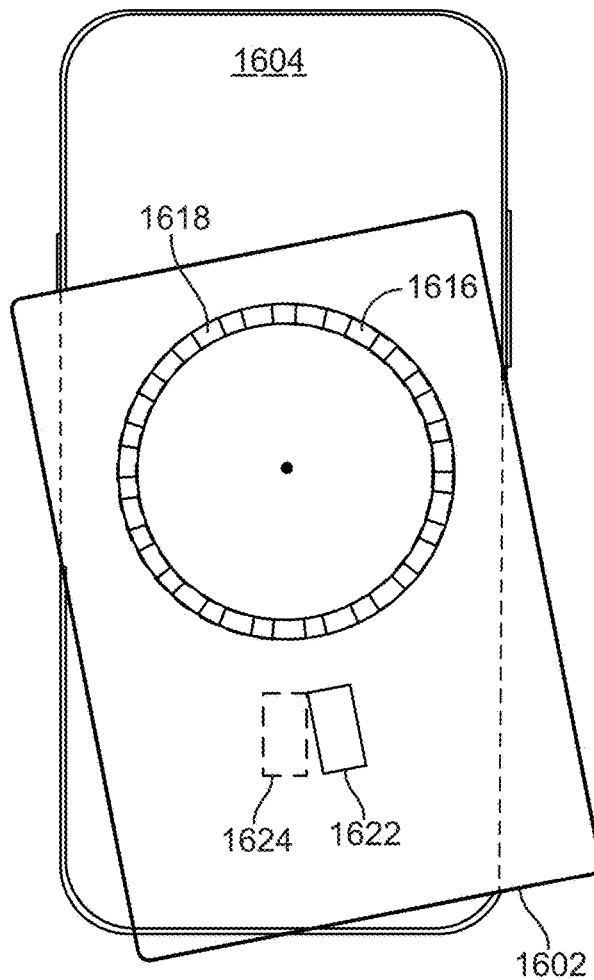
FIGS. 17A and 17B show an example of rotational alignment according to some embodiments.
Figure 17B:
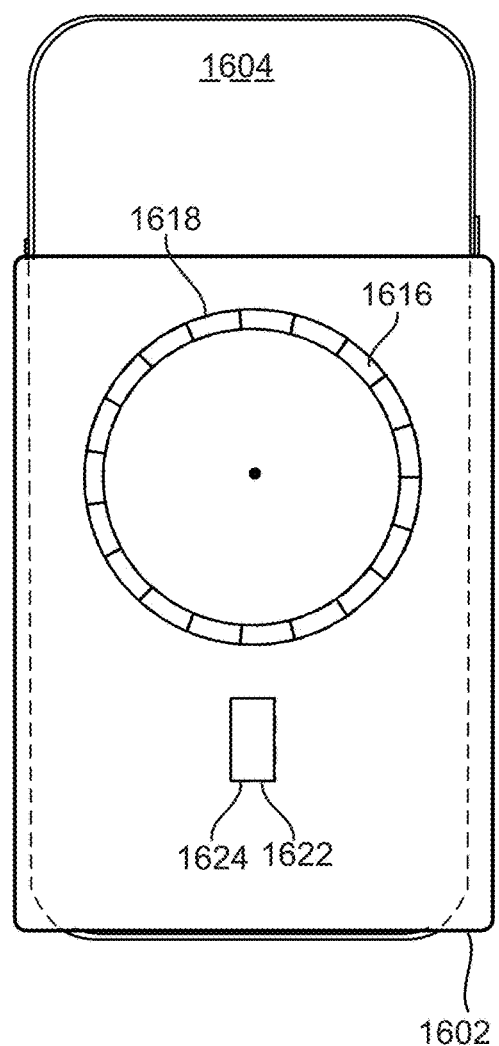

FIGS. 17A and 17B show an example of rotational alignment according to some embodiments. In FIG. 17A, accessory 1602 is placed on the back surface of portable electronic device 1604 such that primary annular alignment component 1616 and secondary alignment component 1618 are aligned with each other in the lateral plane such that, in the view shown, center point 1601 of primary annular alignment component 1616 overlies center point 1603 of secondary annular alignment component 1618. A relative rotation is present such that rotational alignment components 1622 and 1624 are not aligned. In this configuration, an attractive force between rotational alignment components 1622 and 1624 can urge portable electronic device 1604 and accessory 1602 toward a target rotational orientation. In FIG. 17B, the attractive magnetic force between rotational alignment components 1622 and 1624 has brought portable electronic device 1604 and accessory 1602 into the target rotational alignment with the sides of portable electronic device 1604 parallel to the sides of accessory 1602. In some embodiments, the attractive magnetic force between rotational alignment components 1622 and 1624 can also help to hold portable electronic device 1604 and accessory 1602 in a fixed rotational alignment.

Rotational alignment components 1622 and 1624 can have various patterns of magnetic orientations. As long as the magnetic orientations of rotational alignment components 1622 and 1624 are complementary to each other, a torque toward the target rotational orientation can be present when the devices are brought into lateral alignment and close to the target rotational orientation. FIGS. 18A-21B show examples of magnetic orientations for a rotational alignment component according to various embodiments. While the magnetic orientation is shown for only one rotational alignment component, it should be understood that the magnetic orientation of a complementary rotational alignment component can be complementary to the magnetic orientation of shown.

Figures 18A, 18B:
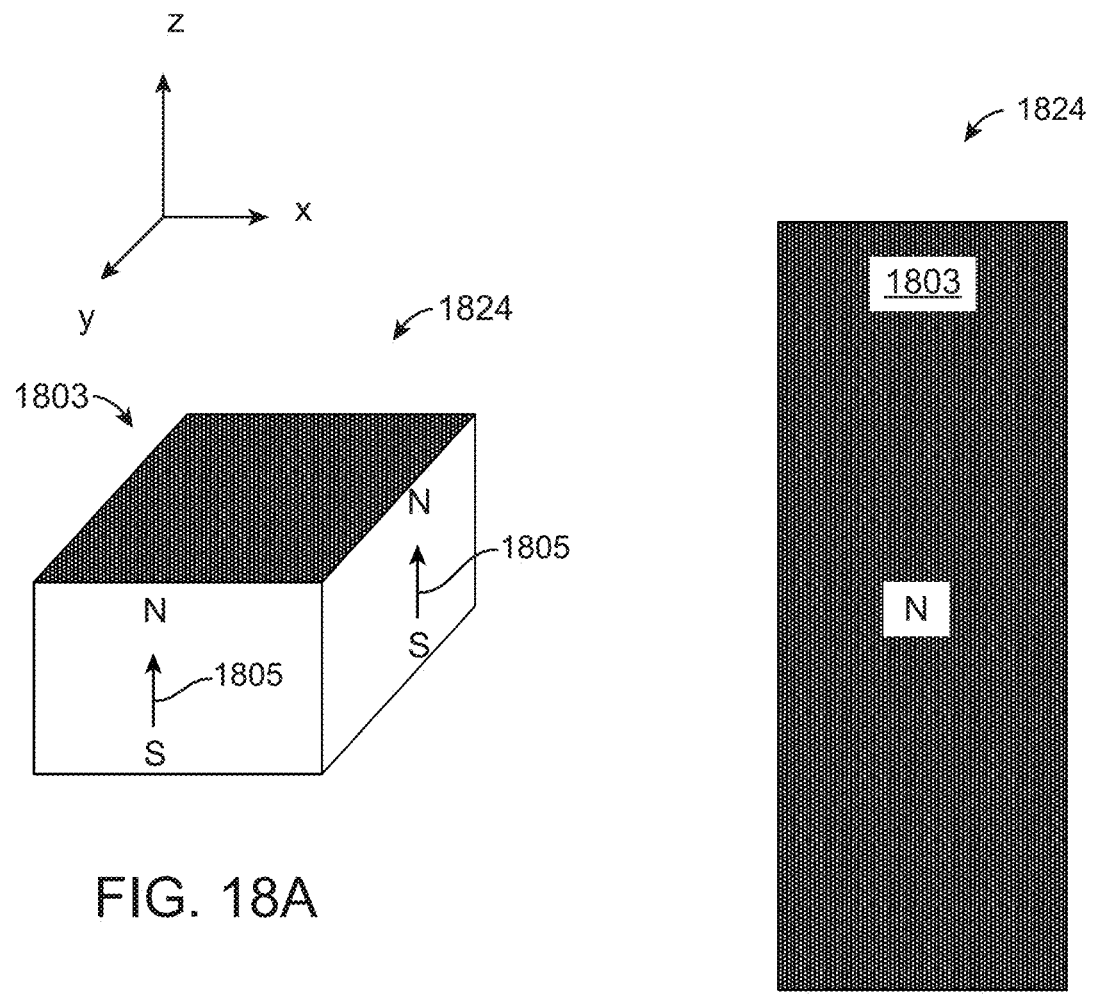
FIGS. 18A and 18B show a perspective view and a top view of a rotational alignment component having a "z-pole" configuration according to some embodiments.

FIGS. 18A and 18B show a perspective view and a top view of a rotational alignment component 1824 having a "z-pole" configuration according to some embodiments. It should be understood that the perspective view is not to any particular scale and that the lateral (xy) dimensions and axial (z) thickness can be varied as desired. As shown in FIG. 18A, rotational alignment component 1824 can have a uniform magnetic orientation along the axial direction, as indicated by arrows 1805. Accordingly, as shown in FIG. 18B, a north magnetic pole (N) may be nearest the proximal surface 1803 of rotational alignment component 1824. A complementary z-pole alignment component can have a uniform magnetic orientation with a south magnetic pole nearest the proximal surface. The z-pole configuration can provide reliable alignment.

Other configurations can provide reliable alignment as well as a stronger, or more salient, "clocking" sensation for the user. A "clocking sensation," in this context, refers to a user-perceptible torque about the common axis of the annular alignment components that urges toward the target rotational alignment and/or resists small displacements from the target rotational alignment. A greater variation of torque as a function of rotational angle can provide a more salient clocking sensation. Following are examples of magnetization configurations for a rotational alignment component that can provide more salient clocking sensations than the z-pole configuration of FIGS. 18A and 18B.

Figure 19A:
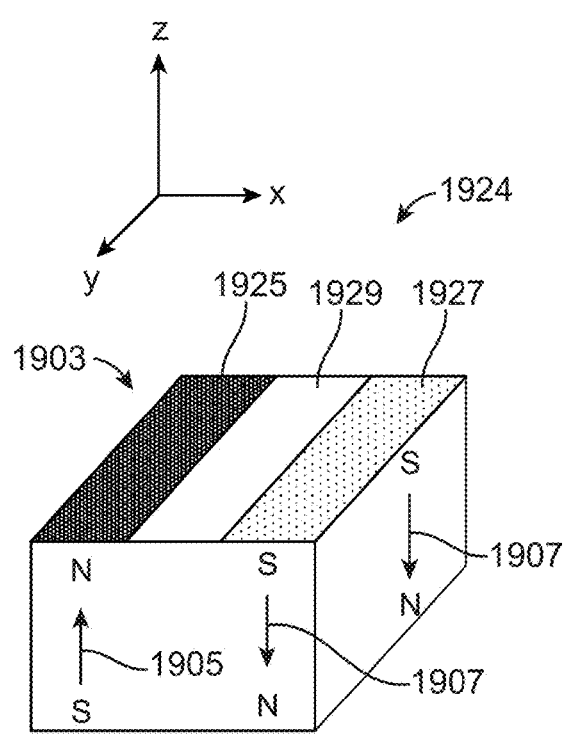
FIGS. 19A and 19B show a perspective view and a top view of a rotational alignment component having a "quad-pole" configuration according to some embodiments.
Figure 19B:
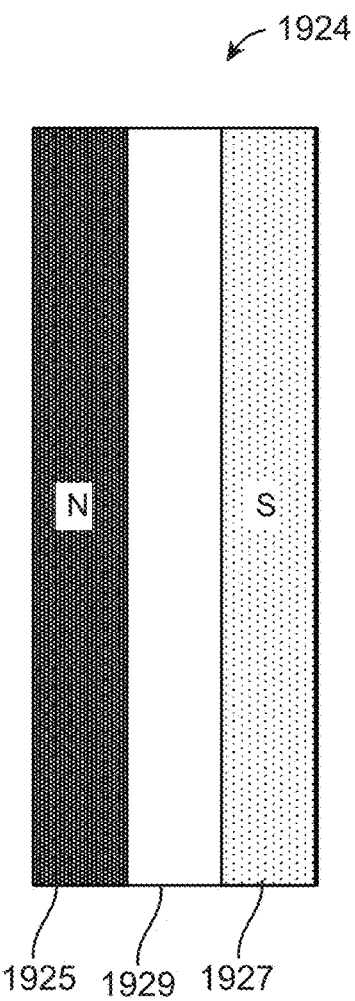

FIGS. 19A and 19B show a perspective view and a top view of a rotational alignment component 1924 having a "quad-pole" configuration according to some embodiments. It should be understood that the perspective view is not to any particular scale and that the lateral (xy) dimensions and axial (z) thickness can be varied as desired. As shown in FIG. 19A, rotational alignment component 1924 has a first magnetized region 1925 with a magnetic orientation along the axial direction such that the north magnetic pole (N) is nearest the proximal (+z) surface 1903 of rotational alignment component 1924 (as indicated by arrow 1905) and a second magnetized region 1927 with a magnetic orientation opposite to the magnetic orientation of the first region such that the south magnetic pole (S) is nearest to proximal surface 1903 (as indicated by arrows 1907). Between magnetized regions 1925 and 1927 is a central region 1929 that is not magnetized. In some embodiments, rotational alignment component 1924 can be formed from a single piece of magnetic material that is exposed to a magnetizer to create regions 1925, 1927, 1929. Alternatively, rotational alignment component 1924 can be formed using two pieces of magnetic material with a nonmagnetic material or an air gap between them. As shown in FIG. 19B, the proximal surface of rotational alignment component 1924 can have one region having a "north" polarity and another region having a "south" polarity. A complementary quad-pole rotational alignment component can have corresponding regions of south and north polarity at the proximal surface.

Figure 20A:
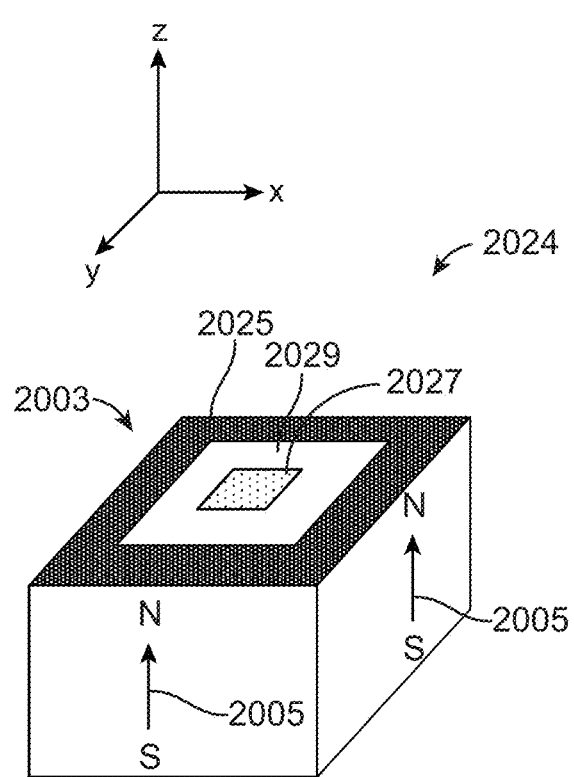
FIGS. 20A and 20B show a perspective view and a top view of a rotational alignment component having an "annulus design" configuration according to some embodiments.
Figure 20B:
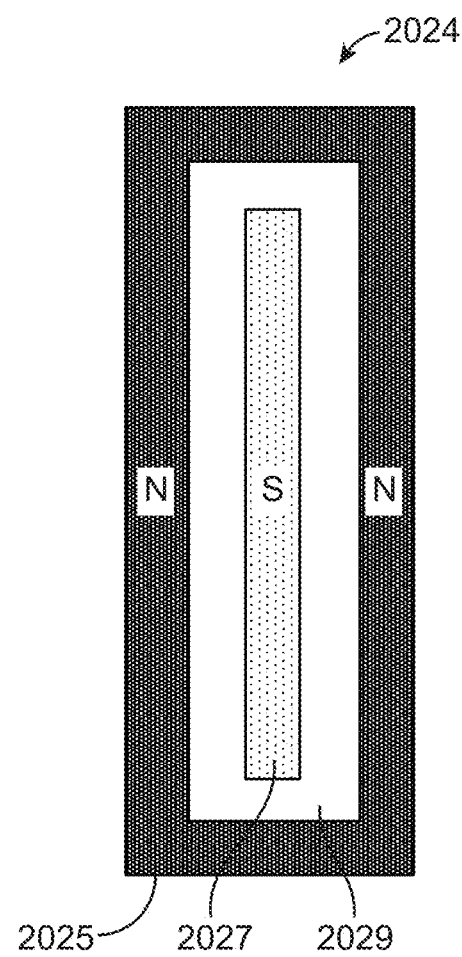

FIGS. 20A and 20B show a perspective view and a top view of a rotational alignment component 2024 having an "annulus design" configuration according to some embodiments. It should be understood that the perspective view is not to any particular scale and that the lateral (xy) dimensions and axial (z) thickness can be varied as desired. As shown in FIG. 20A, rotational alignment component 2024 has an annular outer magnetized region 2025 with a magnetic orientation along the axial direction such that the north magnetic pole (N) is nearest the proximal (+z) surface 2003 of rotational alignment component 2024 (as shown by arrows 2005) and an inner magnetized region 2027 with a magnetic orientation opposite to the magnetic orientation of the first region such that the south magnetic pole (S) is nearest to proximal surface 2003. Between magnetized regions 2025 and 2027 is a neutral annular region 2029 that is not magnetized. In some embodiments, rotational alignment component 2024 can be formed from a single piece of magnetic material that is exposed to a magnetizer to create regions 2025, 2027, 2029. Alternatively, rotational alignment component 2024 can be formed using two or more pieces of magnetic material with a nonmagnetic material or an air gap between them. As shown in FIG. 20B, the proximal surface of rotational alignment component 2024 can have an annular outer region having a "north" polarity and an inner region having a "south" polarity. The proximal surface of a complementary annulus-design rotational alignment component can have an annular outer region of south polarity and an inner region of north polarity.

Figure 21A:
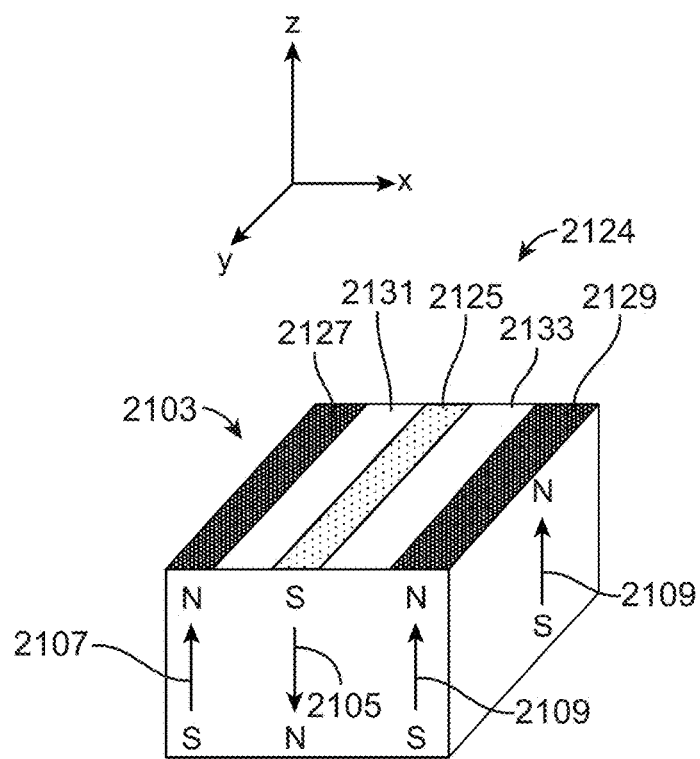
FIGS. 21A and 21B show a perspective view and a top view of a rotational alignment component having a "triple pole" configuration according to some embodiments.
Figure 21B:
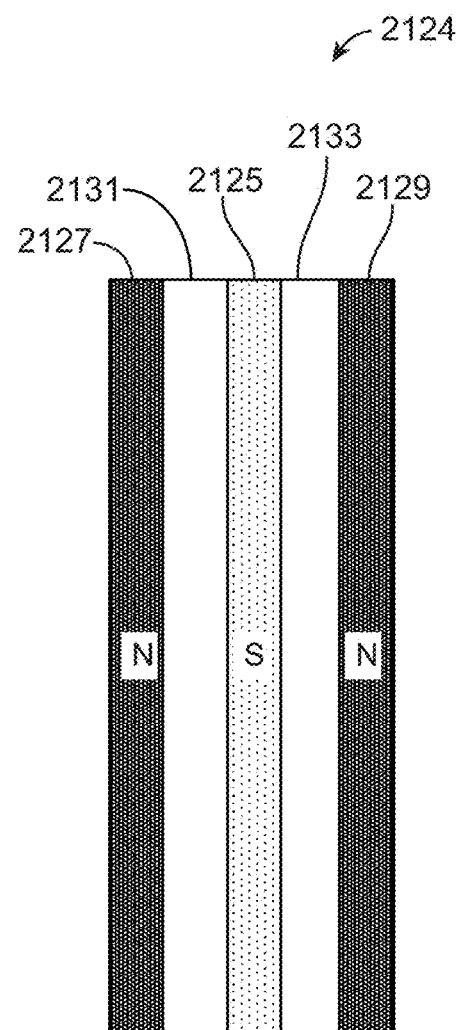

FIGS. 21A and 21B show a perspective view and a top view of a rotational alignment component 2124 having a "triple pole" configuration according to some embodiments. It should be understood that the perspective view is not to any particular scale and that the lateral (xy) dimensions and axial (z) thickness can be varied as desired. As shown in FIG. 21A, rotational alignment component 2124 has a central magnetized region 2125 with a magnetic orientation along the axial direction such that the south magnetic pole (S) is nearest the proximal (+z) surface 2103 of rotational alignment component 2124 (as shown by arrow 2105) and outer magnetized regions 2127, 2129 with a magnetic orientation opposite to the magnetic orientation of central region 2125 such that the north magnetic pole (N) is nearest to proximal surface 2103 (as shown by arrows 2107, 2109). Between central magnetized region 2125 and each of outer magnetized regions 2127, 2129 is a neutral region 2131, 2133 that is not strongly magnetized. In some embodiments, rotational alignment component 2124 can be formed from a single piece of magnetic material that is exposed to a magnetizer to create regions 2125, 2127, 2129. Alternatively, rotational alignment component 2124 can be formed using three (or more) pieces of magnetic material with nonmagnetic materials or air gaps between them. As shown in FIG. 21B, the proximal surface may have a central region having a "south" polarity with an outer region having "north" polarity to either side. The proximal surface of a complementary triple-pole rotational alignment component can have a central region of north polarity with an outer region of south polarity to either side.

It should be understood that the examples in FIGS. 18A-21B are illustrative and that other configurations may be used. The selection of a magnetization pattern for a rotational alignment component can be independent of the magnetization pattern of an annular alignment component with which the rotational alignment component is used.

In some embodiments, the selection of a magnetization pattern for a rotational alignment component can be based on optimizing the torque profile. For example, as noted above, it may be desirable to provide a salient clocking sensation to a user when close to the desired rotational alignment. The clocking sensation can be a result of torque about a rotational axis defined by the annular alignment components. The amount of torque depends on various factors, including the distance between the axis and the rotational alignment component (distance y0 in FIG. 16) and the length (in the y direction as defined in FIG. 16) of the rotational alignment component, as well as the strength of the magnetic fields of the rotational alignment components (which may depend on the size of the rotational alignment components), the coefficient of friction between the surfaces being aligned, and whether the annular alignment components exert any torque toward a preferred rotational orientation.

Figure 22:
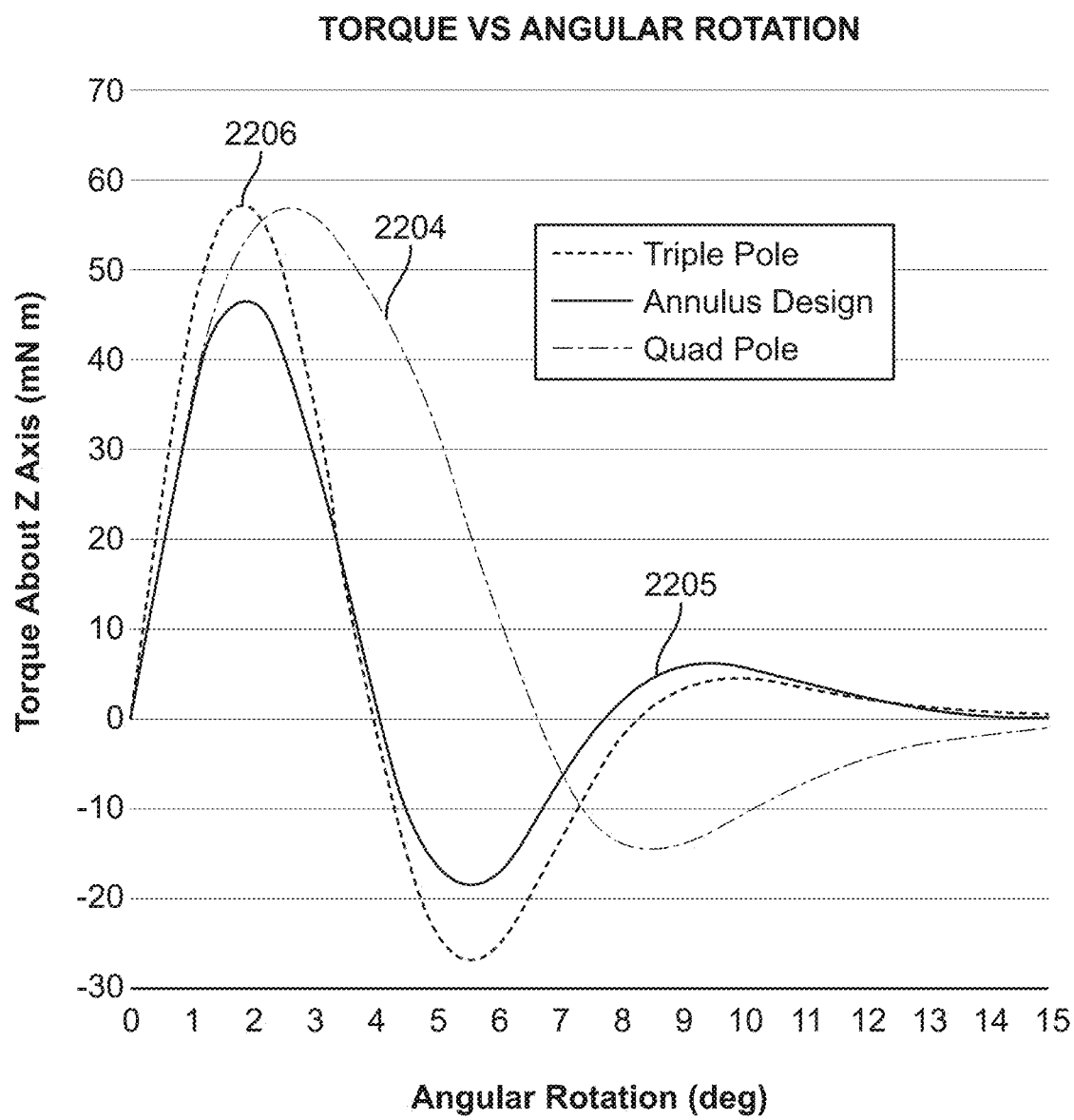
FIG. 22 shows graphs of torque as a function of angular rotation for magnetic alignment systems having rotational alignment components according to various embodiments.

FIG. 22 shows a graph of torque as a function of angular rotation (in degrees) for an alignment system of the kind shown in FIG. 16, for different magnetization configurations of the rotational alignment component according to various embodiments. Angular rotation is defined such that zero degrees corresponds to the target rotational alignment (where the proximal surfaces of rotational angular components 1622 and 1624 are in closest proximity, e.g., as shown in FIG. 17B). Torque is defined such that positive (negative) values indicate force in the direction of decreasing (increasing) rotational angle. For purpose of generating the torque profiles, it is assumed that annular alignment components 1616 and 1618 are rotationally symmetric and do not exert torque about the z axis defined by center points 1601 and 1603. Three different magnetization configurations are considered. Line 2204 corresponds to the quad-pole configuration of FIGS. 19A and 19B. Line 2205 corresponds to the annulus design configuration of FIGS. 20A and 20B. Line 2206 corresponds to the triple-pole configuration of FIGS. 21A and 21B. As shown, the annulus design (line 2205) and triple-pole (line 2206) configurations provide a sharper peak in the torque and therefore a more salient clocking sensation for the user, as compared to the quad-pole configuration (line 2204). In addition, the triple-pole configuration provides a stronger peak torque and therefore a more salient clocking sensation than the annulus-design configuration. (The triple-pole configuration can also provide reduced flux leakage as compared to other configurations.) It should be understood that the numerical values in FIG. 22 are illustrative, and that torque in a particular embodiment may depend on a variety of other factors in addition to the magnetization configuration, such as the magnet volume, aspect ratio, and distance y0 from the center of the annular alignment component.

Figure 23:
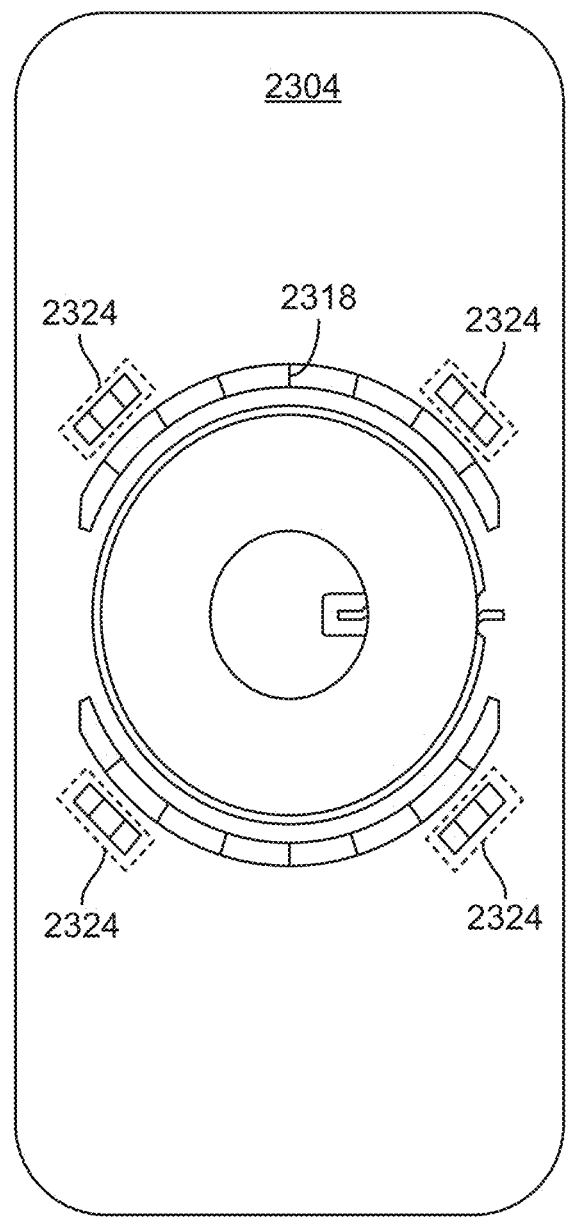
FIG. 23 shows a portable electronic device having an alignment system with multiple rotational alignment components according to some embodiments.

In the example shown in FIG. 16, a single rotational alignment component is placed outboard of the annular alignment component at a distance $y_0$ from the center of the annular alignment component. This arrangement allows a single magnetic element to generate torque that produces a salient clocking sensation for a user aligning devices. In some embodiments, other arrangements are also possible. For example, FIG. 23 shows a portable electronic device 2304 having an alignment system 2300 with multiple rotational alignment components according to some embodiments. In this example, alignment system 2300 includes an annular alignment component 2318 and a set of rotational alignment components 2324 positioned at various locations around the perimeter of annular alignment component 2318. In this example, there are four rotational alignment components 2324 positioned at angular intervals of approximately 90 degrees. In other embodiments, different numbers and spacing of rotational alignment components can be used. Each rotational alignment component 2324 can have any of the magnetization configurations described above, including z-pole, quad-pole, triple-pole, or annulus-design configurations, or a different configuration. Further, different rotational alignment components 2324 can have different magnetization configurations from each other. It should be noted that rotational alignment components 2324 can be placed close to the perimeter of annular alignment component 2318, and the larger number of magnetic components can provide sufficient torque with a shorter lever arm. Complementary rotational alignment components can be disposed around the outer perimeter of any type of annular alignment component (e.g., primary alignment components, secondary alignment components, or annular alignment components as described herein).

It will be appreciated that the foregoing examples of rotational alignment components are illustrative and that variations or modifications are possible. In some embodiments, a rotational alignment component can be provided as an optional adjunct to an annular alignment component, and a device that has both an annular alignment component and a rotational alignment component can align laterally to any other device that has a complementary annular alignment component, regardless of whether the other device has or does not have a rotational alignment component. Thus, for example, portable electronic device 1604 of FIG. 16 can align rotationally to accessory 1602 (which has both annular alignment component 1616 and rotational alignment component 1622) as well as aligning laterally to another accessory (such as wireless charger device 400 of FIG. 4) that has annular alignment component 1616 but not rotational alignment component 1622. In the latter case, lateral alignment can be achieved, e.g., to support efficient wireless charging, but there may be no preferred rotational alignment, or rotational alignment may be achieved using a nonmagnetic feature (e.g., a mechanical retention feature such as a ledge, a clip, a notch, or the like). A rotational magnetic alignment component can be used together with any type of annular magnetic alignment component (e.g., primary annular magnetic alignment components, secondary annular magnetic alignment components, or auxiliary annular magnetic alignment components as described below).

3. Primary, Secondary, and Auxiliary Annular Magnetic Alignment Components

3.1. Overview of Three-Component Magnetic Alignment Systems

In some embodiments, a magnetic alignment system can align more than two devices. Examples of magnetic alignment systems with three annular alignment components (referred to as primary, secondary, and auxiliary annular magnetic alignment components) will now be described. It should be understood that the primary and secondary annular magnetic alignment components described in this section can be identical to primary and secondary annular magnetic alignment components described above and that a given pair primary and secondary annular magnetic alignment components can be used with or without an auxiliary annular magnetic alignment component. It should also be understood that a system where alignment is desired may include more than three devices and that additional auxiliary annular alignment components can be provided to facilitate alignment of more than three devices.

Figure 24:
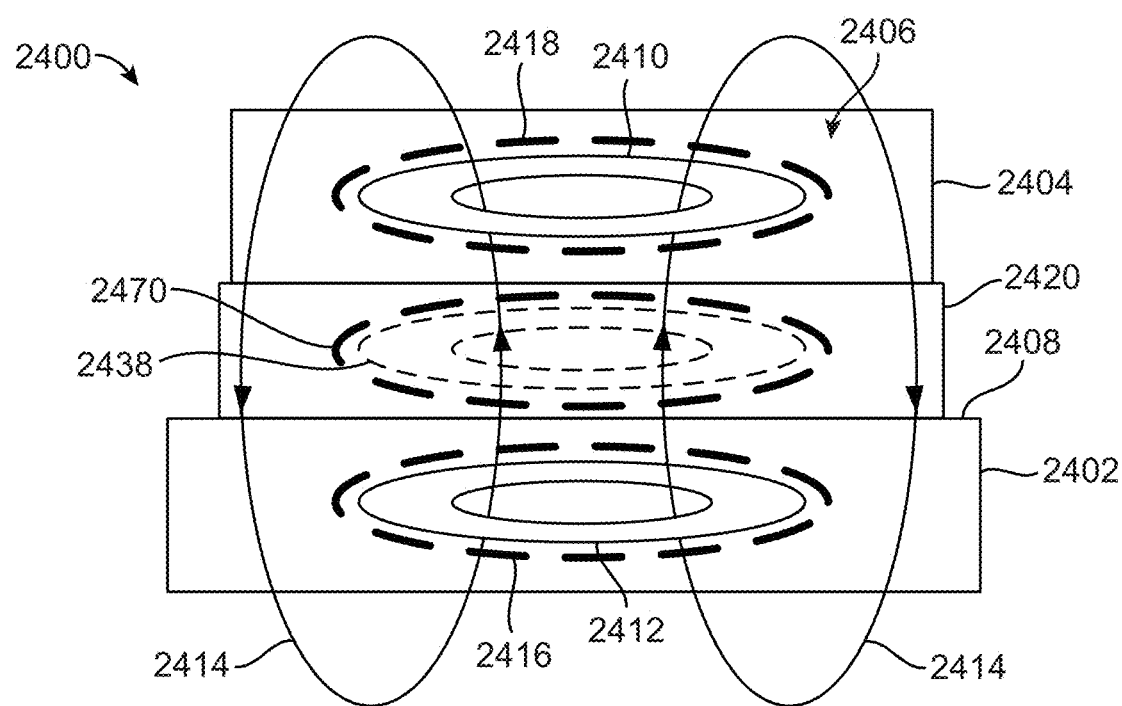
FIG. 24 shows a simplified representation of a wireless charging system incorporating a magnetic alignment system according to some embodiments.

FIG. 24 shows a simplified representation of a wireless charging system 2400 incorporating a three-component magnetic alignment system 2406 according to some embodiments. Wireless charging system 2400 includes a portable electronic device 2404, a wireless charger device 2402, and an accessory 2420 positioned between portable electronic device 2404 and wireless charger device 2402. Portable electronic device 2404 can be a consumer electronic device, such as a smart phone, tablet, wearable device, or the like, or any other electronic device for which wireless charging is desired. Wireless charger device 2402 can be any device that is configured to generate time-varying magnetic flux to induce a current in a suitably configured receiving device. For instance, wireless charger device 2402 can be a wireless charging mat, puck, docking station, or the like. Wireless charger device 2402 can include or have access to a power source such as battery power or standard AC power.

To enable wireless power transfer, portable electronic device 2404 and wireless charger device 2402 can include inductive coils 2410 and 2412, respectively, which can operate to transfer power between them. For example, inductive coil 2412 can be a transmitter coil that generates a time-varying magnetic flux 2414, and inductive coil 2410 can be a receiver coil in which an electric current is induced in response to time-varying magnetic flux 2414. The received electric current can be used to charge a battery of portable electronic device 2404, to provide operating power to a component of portable electronic device 2404, and/or for other purposes as desired. In some embodiments, wireless power transfer between wireless charger device 2402 and portable electronic device 2404 can occur regardless of whether accessory 2420 is present.

Accessory 2420 can be an accessory that is used with portable electronic device 2404 to protect, enhance, and/or supplement the aesthetics and/or functions of portable electronic device 2404. For example, accessory 2420 can be a protective case, an external battery pack, a camera attachment, or any other charge-through accessory. In some embodiments, accessory 2420 can include one or more wireless charging coils 2438. For example, accessory 2420 can be a portable external battery pack that can be attached to and carried together with portable electronic device 2404. In some embodiments, accessory 2420 can operate wireless charging coil 2438 as a receiver coil to charge its onboard battery (e.g., from wireless charger device 2402) or as a transmitter coil to provide power to portable electronic device 2404. In some embodiments, accessory 2420 cam include separate transmitter and receiver coils 2438. Accessory 2420 can operate coil(s) 2438 to transmit power or to receive and store power depending on current conditions. In still other embodiments, accessory 2420 can be an "unpowered" or "passive" accessory such as a case that contains no active circuitry, and wireless charging coil 2438 can be omitted. In such cases, accessory 2420 can be designed not to inhibit wireless power transfer between wireless charger device 2402 and portable electronic device 2404. For instance, relevant portions of accessory 2420 can be made of a material such as plastic, leather, or other material that is transparent to time-varying magnetic flux 2414.

To enable efficient wireless power transfer, it is desirable to align inductive coils 2412 and 2410 (and coil 2438 in embodiments where coil 2438 is present). According to some embodiments, magnetic alignment system 2406 can provide such alignment. In the example shown in FIG. 24, magnetic alignment system 2406 includes a primary magnetic alignment component 2416 disposed within or on a surface of wireless charger device 2402, a secondary magnetic alignment component 2418 disposed within or on a surface of portable electronic device 2402, and an auxiliary magnetic alignment component 2470 disposed within or on a surface of accessory 2420. Primary, secondary, and auxiliary magnetic alignment components 2416, 2418, and 2470 are configured to magnetically attract one another into an aligned position in which inductive coils 2410 and 2412 (and/or 2438 if present) are aligned with one another to provide efficient wireless power transfer.

Magnetic alignment system 2406 can enable modularity in that various types of accessories 2420 can align with primary and/or secondary magnetic alignment components 2416, 2418, provided that accessory 2420 includes auxiliary alignment component 2470. For instance, in some embodiments (e.g., where accessory 2420 is a protective case), accessory 2420 can mechanically couple to portable electronic device 2404 in a fixed position such that auxiliary magnetic alignment component 2470 is aligned with secondary magnetic alignment component 2418, and portable electronic device 2404 can rely wholly or partially on auxiliary magnetic alignment component 2470 to align with primary alignment component 2418 of wireless charger device 2402. Accordingly, when accessory 2420 is positioned on charging surface 2408 of wireless charger device 2402 such that primary alignment component 2416 is aligned with auxiliary alignment component 2470, secondary alignment component 2418 of portable electronic device 2404 is also aligned with primary alignment component 2416, and efficient wireless power transfer is supported.

As another example, in some embodiments where accessory 2420 is an external battery, auxiliary alignment component 2470 can attract to and align with secondary alignment component 2418 so that power from an internal power source (not shown) within accessory 2420 can be wirelessly transferred to portable electronic device 2404 using inductive coil 2438 and inductive coil 2410. The modularity of magnetic alignment system 2406 can also enable wireless charger device 2402 to stack with portable electronic device 2404 and accessory 2420. For example, auxiliary alignment component 2470 can attract and align to secondary alignment component 2418 and at the same time can attract and align to primary alignment component 2416. Accordingly, when portable electronic device 2404, accessory 2420, and wireless charger device 2402 are all stacked together, power can be transmitted wirelessly from wireless charger device 2402 to accessory 2420 (e.g., to charge an internal battery of accessory 2420) and from accessory 2420 to portable electronic device 2404. Both power transfers can be performed simultaneously; i.e., wireless charger device 2402 can provide power to accessory 2420 at the same time that accessory 2420 provides power to portable electronic device 2404. In some embodiments, to enable simultaneous power transfers, accessory 2420 can include two inductive coils 2438, one for receiving power and one for transmitting power. In other embodiments, the power transfers can be performed sequentially; e.g., wireless charger device 2402 can provide power to accessory 2420, and at a time when wireless charger device 2402 is not providing power, accessory 2420 can provide power to portable electronic device 2404.

FIG. 24 is illustrative and not limiting. For example, while FIG. 24 shows three devices stacked together, it should be understood that the same principles can be applied to form systems of four or more devices. For instance, a wireless charging system can include a portable electronic device coupled to a protective case that is attached to and magnetically aligned with an external battery, which is attached to and magnetically aligned to a wireless charger device. All the inductive coils within the respective devices can be aligned together, and wireless power can be transmitted between the wireless charger device and the external battery, between the battery and the portable electronic device, and/or between the wireless charger device and the portable electronic device. It is to be appreciated that any number of devices can be stacked together without departing from the spirit and scope of the present disclosure.

According to embodiments described herein, an alignment component (including a primary, secondary, or auxiliary alignment component) of a magnetic alignment system can be formed of arcuate magnets arranged in an annular configuration. In some embodiments, each magnet can have its magnetic polarity oriented in a desired direction so that magnetic attraction between the primary, secondary, and auxiliary alignment components provides a desired alignment. In some embodiments, an arcuate magnet can include a first magnetic region with magnetic polarity oriented in a first direction and a second magnetic region with magnetic polarity oriented in a second direction different from the first direction. As will be described, different configurations can provide different degrees of magnetic field leakage.

3.2. Magnetic Alignment Systems with a Single Axial Magnetic Orientation

Figure 25A:
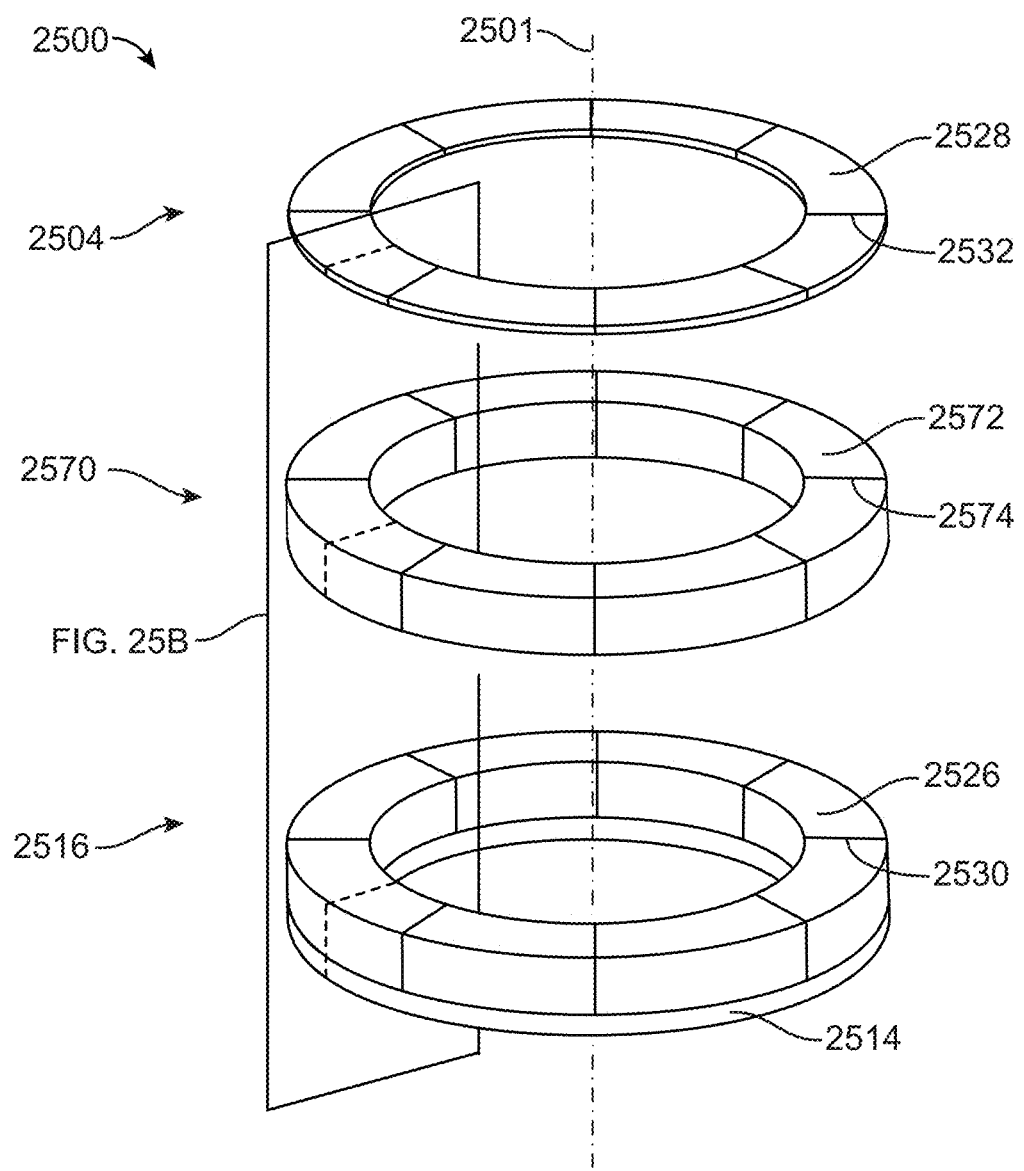
FIG. 25A shows a perspective view of a magnetic alignment system according to some embodiments.
Figure 25B:
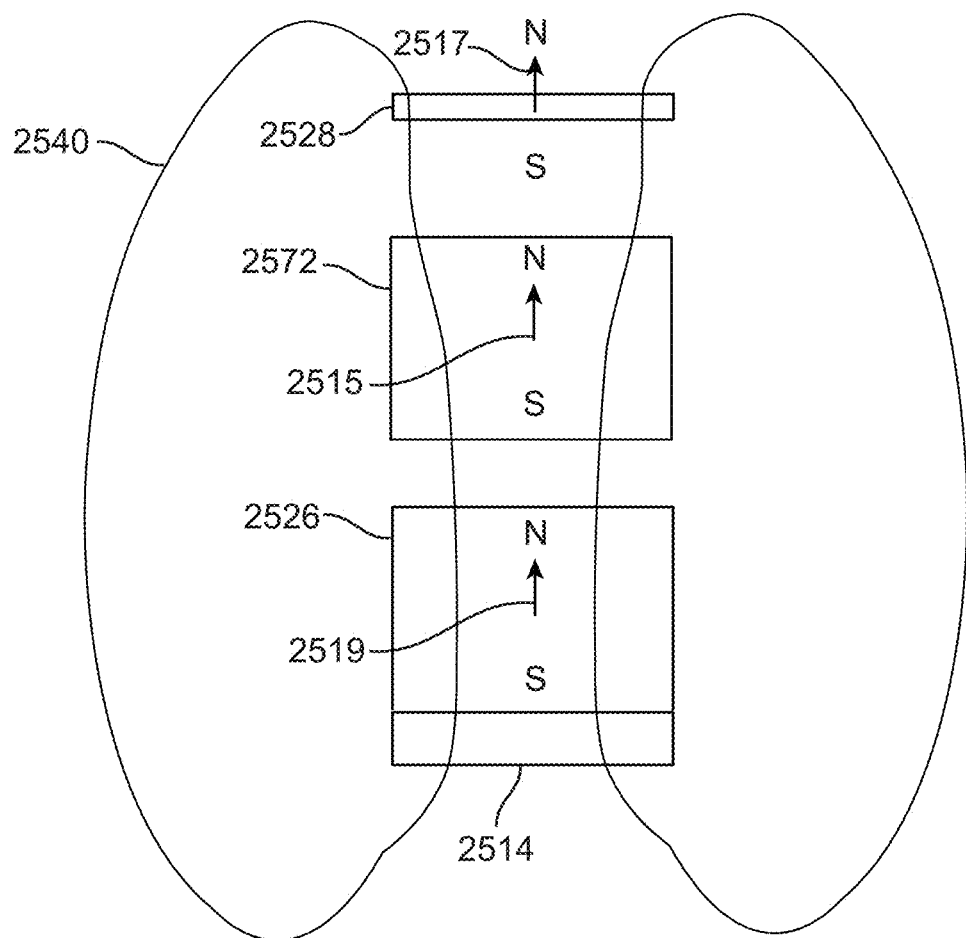
FIG. 25B shows a cross-section through the magnetic alignment system of FIG. 25A.

FIG. 25A shows a perspective view of a magnetic alignment system 2500 according to some embodiments, and FIG. 25B shows a cross-section through magnetic alignment system 2500 across the cut plane indicated in FIG. 25A. Magnetic alignment system 2500 can be an implementation of magnetic alignment system 2406 of FIG. 24. In magnetic alignment system 2500, the alignment components all have magnetic polarity oriented in the same direction (along the axis of the annular configuration).

As shown in FIG. 25A, magnetic alignment system 2500 can include a primary alignment component 2516 (which can be an implementation of primary alignment component 2416 of FIG. 24), a secondary alignment component 2518 (which can be an implementation of secondary alignment component 2418 of FIG. 24), and an auxiliary alignment component 2570 (which can be an implementation of auxiliary alignment component 2470 described above). Primary alignment component 2516, secondary alignment component 2518, and auxiliary alignment component 2570 have annular shapes and may also be referred to as "annular" alignment components. The particular dimensions can be chosen as desired. In some embodiments, the dimensions can be similar to example values given above in section 1.

Primary alignment component 2516 can include a number of sectors, each of which can be formed of one or more primary arcuate magnets 2526. Secondary alignment component 2518 can include a number of sectors, each of which can be formed of one or more secondary arcuate magnets 2528. Auxiliary alignment component 2470 can include a number of sectors, each of which can be formed of one or more auxiliary arcuate magnets 2572. In the example shown, the number of primary magnets 2526 is equal to the number of secondary magnets 2528 and to the number of auxiliary magnets 2572, and each sector includes exactly one magnet, but this is not required. Primary magnets 2526, secondary magnets 2528, and auxiliary magnets 2572 can have arcuate (or curved) shapes in the transverse plane such that when primary magnets 2526 (or secondary magnets 2528 or auxiliary magnets 2572) are positioned adjacent to one another end-to-end, primary magnets 2526 (or secondary magnets 2528 or auxiliary magnets 2572) form an annular structure as shown. In some embodiments, primary magnets 2526 can be in contact with each other at interfaces 2530, secondary magnets 2528 can be in contact with each other at interfaces 2532, and auxiliary magnets 2572 can be in contact with each other at interfaces 2574. Alternatively, small gaps or spaces may separate adjacent primary magnets 2526 or adjacent secondary magnets 2528 or adjacent auxiliary magnets 2572, providing a greater degree of tolerance during manufacturing.

In some embodiments, primary alignment component 2516 can also include an annular shield 2514 disposed on a distal surface of primary magnets 2526. In some embodiments, shield 2514 can be formed as a single annular piece of material and adhered to primary magnets 2526 to secure primary magnets 2526 into position. Shield 2514 can be formed of a material that has high magnetic permeability and/or high magnetic saturation value, such as stainless steel or low-carbon steel, and can redirect magnetic fields to prevent them from propagating beyond the distal side of primary alignment component 2516, thereby protecting sensitive electronic components located beyond the distal side of primary alignment component 2516 from magnetic interference.

Primary magnets 2526, secondary magnets 2528, and auxiliary magnets 2572 can be made of a magnetic material such as an NdFeB material, other rare earth magnetic materials, or other materials that can be magnetized to create a persistent magnetic field. Each primary magnet 2526, each secondary magnet 2528, and each auxiliary magnet 2572 can have a monolithic structure having a single magnetic region with a magnetic polarity aligned in the axial direction as shown by magnetic polarity indicators 2515, 2517, 2519 in FIG. 25B. For example, each primary magnet 2526, each secondary magnet 2528, and each auxiliary magnet 2572 can be a bar magnet that has been ground and shaped into an arcuate structure having an axial magnetic orientation. In the example shown, primary magnet 2526 has its north pole oriented toward the proximal surface and south pole oriented toward the distal surface, secondary magnet 2528 has its south pole oriented toward the proximal surface and north pole oriented toward the distal surface, and auxiliary magnet 2572 has a corresponding magnetic orientation such that the north pole of auxiliary magnet 2572 is oriented toward the proximal surface of secondary magnet 2528 and the south pole of auxiliary magnet 2572 is oriented toward the proximal surface of primary magnet 2526. In other embodiments, the magnetic orientations can be reversed such that primary magnet 2526 has its south pole oriented toward the proximal surface and north pole oriented toward the distal surface while secondary magnet 2528 has its north pole oriented toward the proximal surface and south pole oriented toward the distal surface and auxiliary magnet 2572 has a corresponding magnetic orientation such that the south pole of auxiliary magnet 2572 is oriented toward the proximal surface of secondary magnet 2528 and the north pole of auxiliary magnet 2572 is oriented toward the proximal surface of primary magnet 2526.

As shown in FIG. 25B, the axial magnetic orientations of primary magnet 2526, auxiliary magnet 2572, and secondary magnet 2528 can generate magnetic fields 2540 that exert attractive forces between primary magnet 2526 and auxiliary magnet 2572 and between auxiliary magnet 2572 and secondary magnet 2528, thereby facilitating alignment between respective devices in which primary alignment component 2516, auxiliary alignment component 2570, and secondary alignment component 2518 are disposed (e.g., as shown in FIG. 24). While shield 2514 can redirect some of magnetic fields 2540 away from regions below primary magnet 2526, magnetic fields 2540 may still propagate to regions laterally adjacent to primary magnet 2526 and secondary magnet 2528. In some embodiments, the lateral propagation of magnetic fields 2540 may result in magnetic field leakage to other magnetically sensitive components. For instance, if an inductive coil having a ferromagnetic shield is placed in the interior (or inboard) region of annular primary alignment component 2516 (or secondary alignment component 2518), leakage of magnetic fields 2540 may saturate the ferrimagnetic shield, which can degrade wireless charging performance.

It will be appreciated that magnetic alignment system 2500 is illustrative and that variations and modifications are possible. For instance, while primary alignment component 2516, auxiliary alignment component 2570, and secondary alignment component 2518 are each shown as being constructed of eight arcuate magnets, other embodiments may use a different number of magnets, such as sixteen magnets, thirty-six magnets, or any other number of magnets, and the number of primary magnets need not be equal to the number of secondary magnets. Similarly, the number of auxiliary magnets need not be equal to either the number of primary magnets or the number of secondary magnets. In other embodiments, primary alignment component 2516 and/or secondary alignment component 2518 and/or auxiliary alignment component 2570 can each be formed of a single, monolithic annular magnet; however, segmenting alignment components 2516, 2518, and 2570 into arcuate magnets may improve manufacturing, as described above with reference to FIGS. 3A and 3B.

3.3. Magnetic Alignment Systems with Closed-Loop Magnetic Configurations

As noted above with reference to FIG. 25B, a magnetic alignment system with a single axial magnetic orientation may allow lateral leakage of magnetic fields, which may adversely affect performance of other components of an electronic device. Accordingly, some embodiments provide magnetic alignment systems with a closed-loop magnetic configuration that reduces magnetic field leakage. Examples will now be described.

Figure 26A:
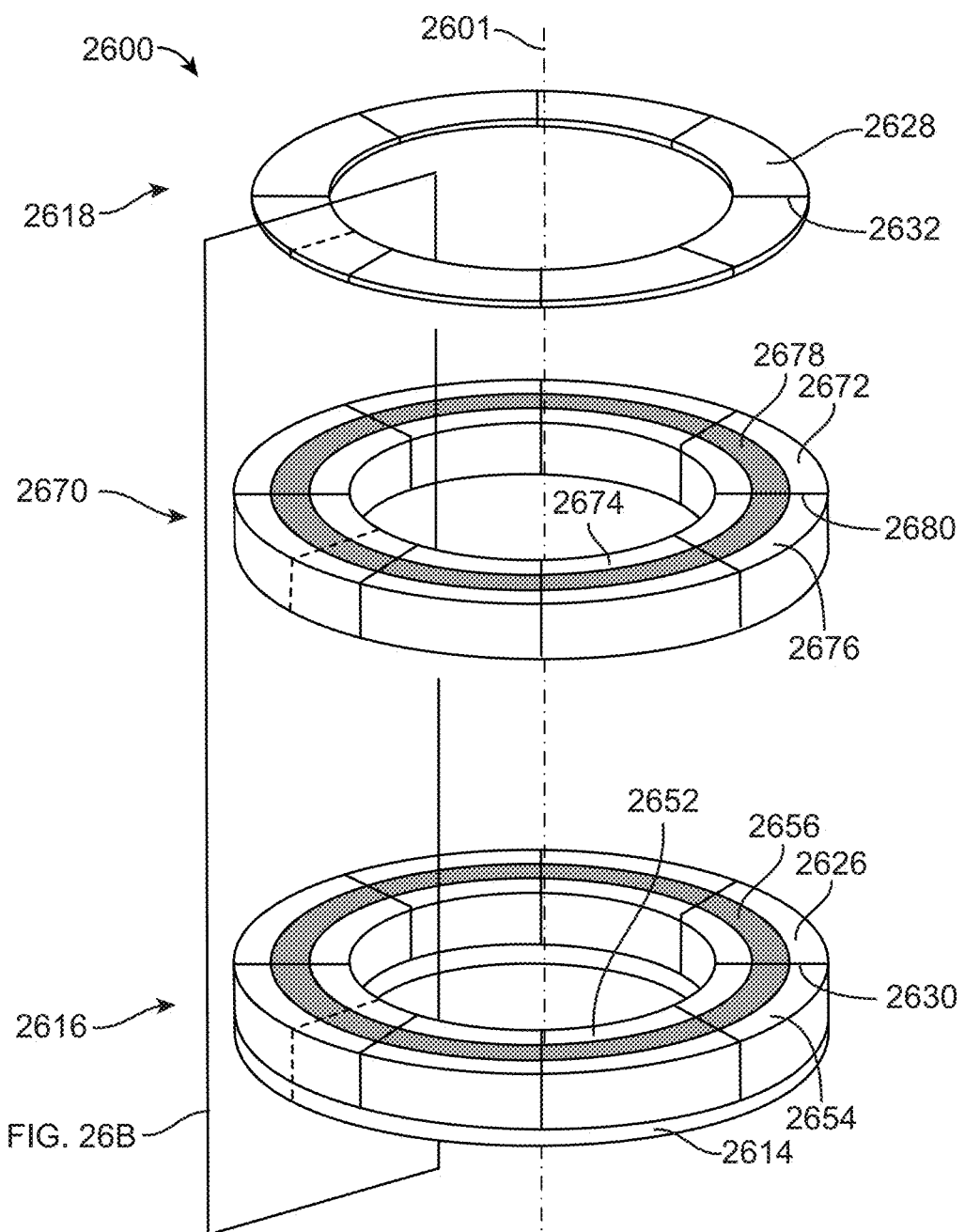
FIG. 26A shows a perspective view of a magnetic alignment system according to some embodiments.
Figure 26B:
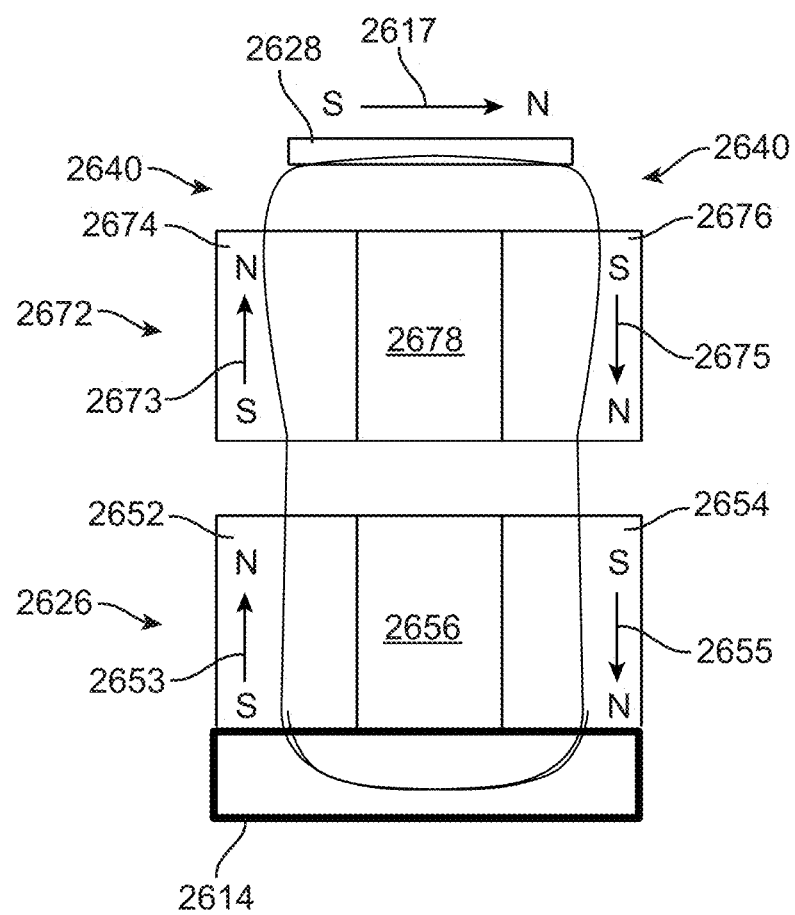
FIG. 26B shows a cross-section through the magnetic alignment system of FIG. 26A.

FIG. 26A shows a perspective view of a magnetic alignment system 2600 according to some embodiments, and FIG. 26B shows a cross-section through magnetic alignment system 2600 across the cut plane indicated in FIG. 26A. Magnetic alignment system 2600 can be an implementation of magnetic alignment system 2406 of FIG. 24. In magnetic alignment system 2600, the alignment components have magnetic components configured in a "closed loop" configuration as described below.

As shown in FIG. 26A, magnetic alignment system 2600 can include a primary alignment component 2616 (which can be an implementation of primary alignment component 2416 of FIG. 24), a secondary alignment component 2618 (which can be an implementation of secondary alignment component 2418 of FIG. 24), and an auxiliary alignment component 2670 (which can be an implementation of auxiliary alignment component 2470 of FIG. 24). Primary alignment component 2616, secondary alignment component 2618, and auxiliary alignment component 2670 have annular shapes and may also be referred to as "annular" alignment components. The particular dimensions can be chosen as desired. In some embodiments, the dimensions can be similar to example values given above in section 1.

Primary alignment component 2616 can include a number of sectors, each of which can be formed of a number of primary magnets 2626; secondary alignment component 2618 can include a number of sectors, each of which can be formed of a number of secondary magnets 2628; and auxiliary alignment component 2670 can include a number of sectors, each of which can be formed of a number of auxiliary magnets 2672. In the example shown, the number of primary magnets 2626 is equal to the number of secondary magnets 2628 and to the number of auxiliary magnets 2672, and each sector includes one magnet, but this is not required. Primary magnets 2626, secondary magnets 2628, and auxiliary magnets 2672 can have arcuate (or curved) shapes in the transverse plane such that when primary magnets 2626 (or secondary magnets 2628 or auxiliary magnets 2672) are positioned adjacent to one another end-to-end, primary magnets 2626 (or secondary magnets 2628 or auxiliary magnets 2672) form an annular structure as shown. In some embodiments, adjacent primary magnets 2626 can be in contact with each other at interfaces 2630, adjacent secondary magnets 2628 can be in contact with each other at interfaces 2632, and adjacent auxiliary magnets 2672 can be in contact with each other at interfaces 2680. Alternatively, small gaps or spaces may separate adjacent primary magnets 2626, adjacent secondary magnets 2628, or adjacent auxiliary magnets 2672, providing a greater degree of tolerance during manufacturing.

In some embodiments, primary alignment component 2616 can also include an annular shield 2614 disposed on a distal surface of primary magnets 2626. In some embodiments, shield 2614 can be formed as a single annular piece of material and adhered to primary magnets 2626 to secure primary magnets 2626 into position. Shield 2614 can be formed of a material that has high magnetic permeability, such as stainless steel, and can redirect magnetic fields to prevent them from propagating beyond the distal side of primary alignment component 2616, thereby protecting sensitive electronic components located beyond the distal side of primary alignment component 2616 from magnetic interference. In some embodiments, auxiliary alignment component 2670 does not include a similar shield, so that a stronger magnetic attraction with primary alignment component 2616 can be provided.

Primary magnets 2626, secondary magnets 2628, and auxiliary magnets 2672 can be made of a magnetic material such as an NdFeB material, other rare earth magnetic materials, or other materials that can be magnetized to create a persistent magnetic field. Each secondary magnet 2628 can have a single magnetic region with a magnetic polarity having a component in the radial direction in the transverse plane (as shown by magnetic polarity indicator 2617 in FIG. 26B). As described below, the magnetic orientation can be in a radial direction with respect to axis 2601 or another direction having a radial component in the transverse plane. Each primary magnet 2626 can include two magnetic regions having opposite magnetic orientations. For example, each primary magnet 2626 can include an inner arcuate magnetic region 2652 having a magnetic orientation in a first axial direction (as shown by polarity indicator 2653 in FIG. 26B), an outer arcuate magnetic region 2654 having a magnetic orientation in a second axial direction opposite the first direction (as shown by polarity indicator 2655 in FIG. 26B), and a central non-magnetized region 2656 that does not have a magnetic orientation. Central non-magnetized region 2656 can magnetically separate inner arcuate region 2652 from outer arcuate region 2654 by inhibiting magnetic fields from directly crossing through center region 2656. Similarly, each auxiliary magnet 2672 can include two magnetic regions having opposite magnetic orientations. For example, each auxiliary magnet 2672 can include an inner arcuate magnetic region 2674 having a magnetic orientation in a first axial direction (as shown by polarity indicator 2673 in FIG. 26B), an outer arcuate magnetic region 2676 having a magnetic orientation in a second axial direction opposite the first direction (as shown by polarity indicator 2675 in FIG. 26B), and a central non-magnetized region 2678 that does not have a magnetic orientation. Central non-magnetized region 2678 can magnetically separate inner arcuate region 2674 from outer arcuate region 2676 by inhibiting magnetic fields from directly crossing through center region 2678.

In some embodiments, each secondary magnet 2626 can be made of a magnetic material that has been ground and shaped into an arcuate structure, and a magnetic orientation having a radial component in the transverse plane can be created, e.g., using a magnetizer. Similarly, each primary magnet 2626 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 2626 can be a compound structure with two arcuate pieces of magnetic material providing inner arcuate magnetic region 2652 and outer arcuate magnetic region 2654; in such embodiments, central non-magnetized region 2656 can be formed of an arcuate piece of nonmagnetic material or formed as an air gap defined by sidewalls of inner arcuate magnetic region 2652 and outer arcuate magnetic region 2654. Any manufacturing technique that can be used to form primary magnets 2626 can also be used to form auxiliary magnets 2672. Thus, each auxiliary magnet 2672 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each auxiliary magnet 2672 can be a compound structure with two arcuate pieces of magnetic material providing inner arcuate magnetic region 2674 and outer arcuate magnetic region 2676; in such embodiments, central non-magnetized region 2678 can be formed of an arcuate piece of nonmagnetic (or demagnetized) material or formed as an air gap defined by sidewalls of inner arcuate magnetic region 2674 and outer arcuate magnetic region 2676. It should be understood that in some embodiments one manufacturing technique can be used for primary magnets 2626 while a different manufacturing technique can be used for auxiliary magnets 2672; for example, each auxiliary magnet 2672 can be monolithic while each primary magnet 2626 is a compound structure. As long as the magnetic fields of the various magnets align as described, alignment between devices can be provided. Further, as described above with reference to FIGS. 3A and 3B, the inner and outer arcuate magnetic regions of a quad-pole primary or auxiliary arcuate magnet can but need not have equal magnetic field strength; asymmetric polarization as described above can be applied.

As shown in FIG. 26B, inner arcuate magnetic region 2652 of primary magnet 2626 and inner arcuate magnetic region 2674 of auxiliary magnet 2672 can have the same magnetic orientation, as shown by polarity indictors 2653 and 2673. Similarly, outer arcuate magnetic region 2654 of primary magnet 2626 and outer arcuate magnetic region 2676 of auxiliary magnet 2672 can have the same magnetic orientation, as shown by polarity indictors 2655 and 2675. This configuration creates a magnetic attraction between primary magnet 2626 and auxiliary magnet 2672, which can facilitate alignment between them. The magnetic polarity of secondary magnet 2628 (shown by indicator 2617) can be oriented such that when secondary magnetic alignment component 2618 is aligned with auxiliary magnetic alignment component 2670, the south pole of secondary magnet 2628 is oriented toward the north pole of inner arcuate magnetic region 2674 of auxiliary magnet 2672 (and also toward the north pole of inner arcuate magnetic region 2652 of primary magnet 2626) while the north pole of secondary magnet 2628 is oriented toward the south pole of outer arcuate magnetic region 2676 of auxiliary magnet 2672 (and also toward the south pole of outer arcuate magnetic region 2654 of primary magnet 2626).

Accordingly, the respective magnetic orientations of inner arcuate magnetic regions 2652, 2674, secondary magnet 2628 and outer arcuate magnetic region 2676, 2678 can generate magnetic fields 2640 that exert an attractive force between primary magnet 2626 and auxiliary magnet 2672 and between auxiliary magnet 2672 and secondary magnet 2628, thereby facilitating alignment between respective electronic devices in which primary alignment component 2616, auxiliary alignment component 2670, and secondary alignment component 2618 are disposed (e.g., as shown in FIG. 24). Shield 2614 at the distal surface of primary magnet 2626 can redirect some of magnetic fields 2640 away from regions below primary magnet 2626. Further, the "closed-loop" magnetic field 2640 formed around central non-magnetized regions 2656 and 2678 can have tight and compact field lines that do not stray outside of primary, auxiliary, and secondary magnets 2626, 2672, 2628 as far as magnetic field 2540 strays outside of primary, auxiliary, and secondary magnets 2526, 2572, 2528 in FIG. 25B. Thus, magnetically sensitive components can be placed relatively close to primary alignment component 2616 with reduced concern for stray magnetic fields. Accordingly, as compared to magnetic alignment system 2500, magnetic alignment system 2600 can help to reduce the overall size of a device in which primary alignment component 2616 is positioned and can also help reduce noise created by magnetic field 2640 in adjacent components, such as an inductive receiving coil positioned inboard of secondary alignment component 2618.

It will be appreciated that magnetic alignment system 2600 is illustrative and that variations and modifications are possible. For instance, while primary alignment component 2616, auxiliary alignment component 2672, and secondary alignment component 2618 are each shown as being constructed of eight arcuate magnets, other embodiments may use a different number of magnets, such as sixteen magnets, thirty-six magnets, or any other number of magnets, and the number of primary magnets need not be equal to the number of secondary magnets. Similarly, the number of auxiliary magnets need not be equal to either the number of primary magnets or the number of secondary magnets. In other embodiments, secondary alignment component 2618 can be formed of a single, monolithic annular magnet. Similarly, primary alignment component 2616 and/or auxiliary alignment component 2672 can each be formed of a single, monolithic annular piece of magnetic material with an appropriate magnetization pattern as described above, or primary alignment component 2616 and/or auxiliary alignment component 2672 can each be formed of a monolithic inner annular magnet and a monolithic outer annular magnet, with an annular air gap or region of nonmagnetic material disposed between the inner annular magnet and outer annular magnet. However, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various components or individual magnets do not need to align exactly with the lateral and axial directions. The magnetic orientation can have any angle that provides a closed-loop path for a magnetic field through the primary and secondary alignment components.

3.4. Magnetic Orientation for a Closed-Loop Magnetic Alignment System

Any of the magnetic orientations described above with reference to FIG. 4, 5, 7, 8A-8C, 9A-9B, or 10 can also be applied to systems that include an auxiliary alignment component. The magnetic orientation of the auxiliary magnets can be made to match that of corresponding primary magnets.

3.5. Annular Magnetic Alignment Components with Gaps

In examples described above, the primary magnetic alignment component, secondary magnetic alignment component, and auxiliary magnetic alignment component have annular shapes. As described above (e.g., with reference to FIG. 3A), the annulus can be completely closed. In other embodiments, the annulus can include one or more gaps, where each gap can be a section of an annulus where magnetic material (or any material) is absent. An example magnetic alignment component with a gap is described above with reference to FIG. 11, and it should be understood that an auxiliary alignment component can also include one or more gaps, e.g., to accommodate a form factor of an accessory device in which an auxiliary magnetic alignment component is present and/or to accommodate electronic circuit components that may be present in the accessory device. Further, compatible annular alignment components in different devices can differ as to the number, size, and/or position of gaps.

3.6. Accessory Devices Incorporating Magnetic Alignment Components

Figure 27:
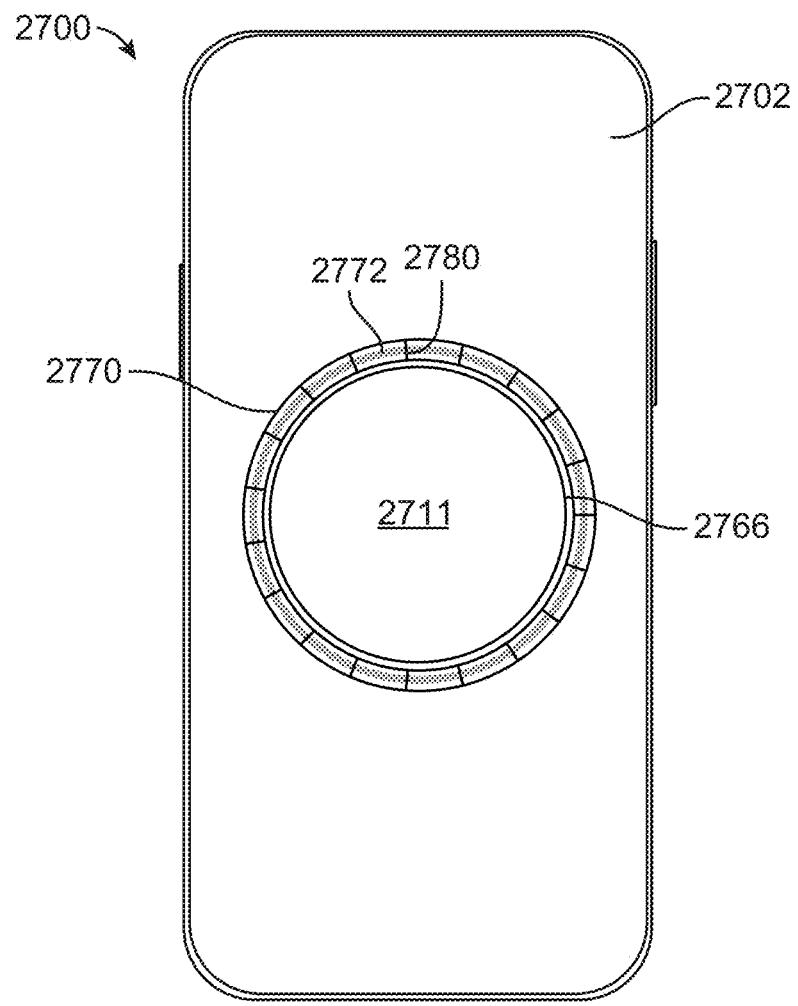
FIG. 27 shows a simplified rear view of an accessory device incorporating a magnetic alignment component according to some embodiments.

FIG. 27 shows a simplified rear view of an accessory device 2700 incorporating an auxiliary magnetic alignment component according to some embodiments. In the example shown, the accessory device incorporates an auxiliary alignment component; however, it should be understood that an accessory device can instead incorporate a primary or secondary magnetic alignment component.

Accessory device 2700 can be, for example, a protective or esthetic case for a portable electronic device such as smart phone 1200 of FIG. 12A. Accordingly, accessory device 2700 can have a housing 2702, which can be the same size as (or slightly larger than) smart phone 1200. In some embodiments, housing 2702 can be shaped as a tray that covers the side and rear surfaces of smart phone 1200, leaving the front (display) surface of smart phone 1200 exposed. Housing 2702 (or portions thereof) can be made of plastic, rubber, silicone, leather, and/or other materials. An auxiliary alignment component 2770 can be disposed within housing 2702, in a position such that, when smart phone 1200 is inserted into accessory device 2700 in the preferred orientation, auxiliary alignment component 2770 is coaxially aligned with secondary alignment component 1218 of smart phone 1200.

Auxiliary alignment component 2770 can be, for example, an implementation of any of the auxiliary alignment components described above and can include an annular arrangement of magnets 2772 with interfaces 2780, which can be air gaps or interfaces where adjacent magnets contact one another. Magnets 2772 can have a quad-pole configuration as described above; for instance, each magnet 2772 can include an inner arcuate region having an axial magnetic orientation in a first direction, an outer arcuate region having an axial magnetic orientation in a second direction opposite the first direction, and a central arcuate region having no distinct magnetic orientation. Although not shown in FIG. 27, auxiliary magnetic alignment component 2770 can include one or more gaps between adjacent magnets 2772. In some embodiments, the gap(s) can provide electrical connection paths for wires (or conductive traces) to connect between regions inboard of and outboard of auxiliary magnetic alignment component 2770, and in some embodiments, the gap(s) can be arranged to allow housing 2702 to have a reduced lateral size for use with a smart phone having a smaller form factor. For instance, the pattern of gaps can match that of magnetic alignment component 1218' of smart phone 1200' of FIG. 12B.

In some embodiments, it may be desirable to support wireless data transfer between accessory device 2700 and smart phone 1200, for instance to allow accessory device 2700 to identify itself to smart phone 1200. Accordingly, in some embodiments, a near-field communication (NFC) coil 2766 can be provided in the region inboard of magnetic alignment component 2766. In some embodiments, NFC coil 2766 can couple to a passive NFC tag that can be read by a suitably configured NFC reader (e.g., in smart phone 1200 of FIG. 12). Example embodiments of NFC coil 2766 are described in section 5 below.

In the example shown, accessory device 2700 is a passive device whose function may be protective and/or esthetic. As such, it may be desirable to make accessory device 2700 thin and to provide smooth inner and outer surfaces. In some embodiments, magnets 2772 can have a thin axial dimension so that accessory device 2700 can have smooth surfaces and a desired thinness. Accessory device 2700 can have a variety of shapes and features. For example, accessory device 2700 can be a tray that covers the side and rear surfaces of smart phone 1200, leaving the front (display) surface of smart phone 1200 exposed. Alternatively, accessory device 2700 can include a cover that can be folded over the front surface of smart phone 1200 and unfolded to allow access to the display. As another example, accessory device 2700 can be formed as a sleeve having an opening at one end (e.g., the top end or a side) to allow smart phone 1200 to be inserted into the sleeve when not in use and removed from the sleeve for use.

In the example shown, accessory device 2700 can a passive device that does not contain power-consuming components. Accordingly, the region 2711 inboard of annular alignment component 2770 can be made of the same material as the surrounding housing 2702, providing a continuous back surface for accessory device 2700. Alternatively, part or all of region 2711 may be devoid of material, allowing the corresponding portion of the rear surface of smart phone 1200 to be exposed. In some embodiments, housing 2702 of accessory device 2700 (or portions thereof) can be made of transparent material so that the rear surface of smart phone 1200 (or portions thereof) can be seen through accessory device 2700. In the absence of transparent magnetic material, an annular region of opaque material can be disposed over magnetic alignment component 2770 so that the individual magnets are not visible. The opaque material can have a color (or colors) selected for a desired esthetic effect.

In some embodiments, accessory 2700 can be an active device. For example, accessory 2700 can include an external battery that can provide power to smart phone 1200. Accordingly, central region 2711 can include one or more wireless charging coils, which can be arranged and operated as described above with reference to accessory 2420 of FIG. 24.

3.7. Wireless Charging Systems with Magnetic Alignment

Figure 28A:
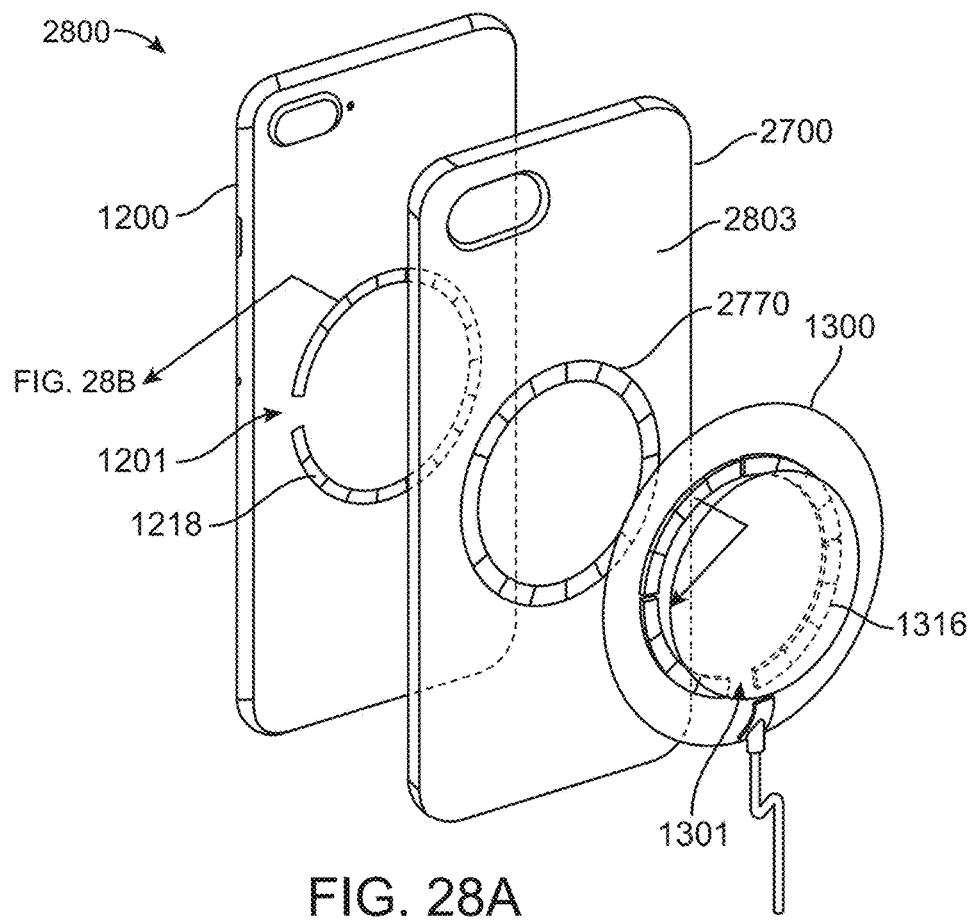
FIG. 28A shows a simplified perspective view of a system including a portable electronic device in alignment with an accessory device and a wireless charger device according to some embodiments.

FIG. 28A shows a simplified perspective view of a system 2800 including portable electronic device 1200 (of FIG. 12A) in alignment with accessory device 2700 (of FIG. 27) and wireless charger device 1300 (of FIG. 13) according to some embodiments. In FIG. 28A, portions of wireless charger device 1300 and accessory device 2700 are shown using dashed lines to avoid obscuring other details. As shown, accessory device 2700 can be placed adjacent to portable electronic device 1200, for example by inserting portable electronic device 1200 into accessory device 2700, and wireless charger device 1300 can be placed with its charging (or proximal) surface against the rear (or proximal) surface 2803 of accessory device 2700. When the devices are placed in this arrangement, secondary alignment component 1218 in portable electronic device 1200 is aligned with auxiliary alignment component 2770 of accessory device 2700 and with primary alignment component 1316 of wireless charger device 1300. Accordingly, auxiliary alignment component 2770 in accessory device 2700 and secondary alignment component 1218 in portable electronic device 120 can attract and hold primary magnetic alignment component 1316 of wireless charger device 1300 in alignment so that transmitter coil assembly 1312 of wireless charger device 1300 is aligned with coil assembly 1210 of portable electronic device 1200. As shown, wireless charger device 1300 can have any rotational orientation about an axis defined by the centers of primary magnetic alignment component 1316 and secondary magnetic alignment component 1218; for instance, gap 1201 in secondary magnetic alignment component 1218 need not align with gap 1301 in primary magnetic alignment component 1316.

Figure 28B:
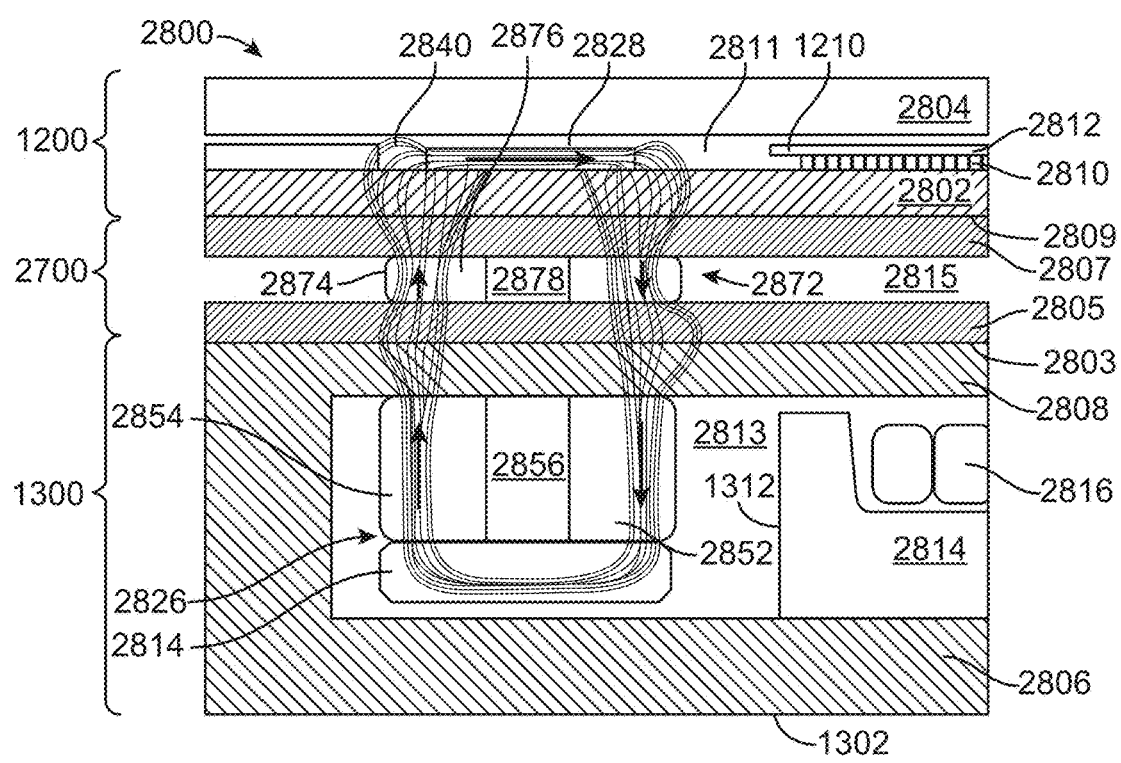
FIG. 28B shows a simplified partial cross section view of the system of FIG. 28A.

FIG. 28B shows a simplified partial cross section view of system 2800 according to some embodiments. Portable electronic device 1200 has a rear housing 2802 (which can be made of a material such as glass or plastic that is permeable to electromagnetic fields and to DC magnetic fields) and a front housing 2804 (which can include a touch screen display). Coil assembly 1210 can include an inductive receiver coil 2810 (which can be made, e.g., of stranded wire wound into a coil) and shielding 2812 (which can include, e.g., a ferrimagnetic shield). Secondary magnet 2828 forms a portion of secondary magnetic alignment component 1218 and can have a magnetic field oriented in a radially inward direction (as shown by the arrow). It should be understood that although secondary alignment component 1218 is shown in FIG. 28A, rear housing 2802 can be opaque and secondary alignment component 1218 need not be visible to a user.

Wireless charger device 1300 has a housing 1302 that includes a single-piece enclosure 2806 forming distal and side surfaces of housing 1302 and a top cap 2808 forming a proximal surface of housing 1302. As described above, enclosure 2806 and top cap 2808 can be made of the same material or different materials, and top cap 2808 can be made of a material that is permeable to AC electromagnetic fields and to DC magnetic fields. Transmitter coil assembly 1312 can include an inductive transmitter coil 2816 (which can be made, e.g., of stranded wire wound into a coil) and electromagnetic shielding 2814 (which can include, e.g., a ferrimagnetic shield). Primary arcuate magnet 2826 forms a portion of primary magnetic alignment component 1316 and can include an inner arcuate region 2852 having a magnetic field oriented in a first axial direction, an outer arcuate region 2854 having a magnetic field oriented in a second axial direction opposite the first axial direction, and a non-magnetized central arcuate region 2856. As described above, a shield 2814 can be disposed on the distal surface of primary magnet 2826. It should be understood that although primary alignment component 1316 is shown in FIG. 28A, housing 1302 can be opaque and primary alignment component 1316 need not be visible to a user.

Accessory device 2700 has a rear housing 2702 that includes a back layer 2805 (forming back surface 2803) and a front layer 2807 that contacts rear housing 2802 of portable electronic device 1200 at a surface 2809. Back layer 2805 and front layer 2807 can be made of the same material or different materials as desired. Auxiliary arcuate magnet 2872 forms a portion of auxiliary alignment component 2770 and can include an inner arcuate section 2874 having a magnetic field oriented in a first axial direction, an outer arcuate section 2876 having a magnetic field oriented in a second axial direction opposite the first axial direction, and a non-magnetized central arcuate section 2878. It should be understood that although auxiliary alignment component 2770 is shown in FIG. 28A, rear housing 2702 can be opaque and auxiliary alignment component 2770 need not be visible to a user.

When aligned, primary magnet 2826, auxiliary magnet 2872, and secondary magnet 2828 produce a closed-loop magnetic flux as shown by lines 2840. Magnetic flux 2840 can attract primary annular alignment component 1318, auxiliary annular alignment component 2770 and secondary annular alignment component 1216 into alignment such that the respective centers of primary annular alignment component 1318, auxiliary annular alignment component 2770, and secondary annular alignment component 1216 are aligned along a common axis. Since transmitter coil 2816 is fixed in a position concentric with primary alignment component 1316 and receiver coil 2810 is fixed in position concentric with secondary alignment component 1218, a result of aligning primary annular alignment component 1318, auxiliary annular alignment component 2770, and secondary annular alignment component 1216 along a common axis is that transmitter coil 2816 and receiver coil 2810 are also aligned along a common axis, thereby enabling efficient wireless power transfer. For instance, transmitter coil 2816 can be driven with an alternating current to generate time-varying magnetic fields that induce a time-varying current in receiver coil 2816. Electromagnetic shielding (e.g., shielding 2814 and 2812) can confine the AC fields to the immediate vicinity of coils 2816 and 2812. Further, in embodiments where accessory device 2700 includes one or more wireless charging coils, such wireless charging coils can also be aligned along a common axis with coils 2816 and 2810.

Some embodiments provide a gap region 2811 between secondary magnet 2828 and coil assembly 1210 that may experience low DC magnetic flux and may also experience low AC electromagnetic fields due to electromagnetic shielding 2812 around coil 2810. Similarly, some embodiments provide a gap region 2813 between primary magnet 2826 and transmitter coil assembly 1312 that may experience low DC magnetic flux and may also experience low AC electromagnetic fields due to electromagnetic shielding 2818 around transmitter coil 2816. In some embodiments, NFC antenna coils (not shown) may be placed in gap region 2811 and/or 2813, e.g., to support identification of wireless charger device 1300 by portable electronic device 1200. Similarly, an NFC antenna coil (not shown) may be placed in a corresponding region 2815 between back layer 2805 and front layer 2807 of accessory device 2700, e.g., to support identification of accessory device 2700 by portable electronic device 1200. Example embodiments of NFC antenna coils that may be placed in gap regions 2811, 2813 and/or 2815 are described in section 5 below.

As can be appreciated with reference to FIG. 28B, arcuate magnets 2828 of secondary alignment component 1218 can have a thin axial dimension so that secondary alignment component 1218 does not require an increased thickness of portable electronic device 1200. For instance, the axial thickness of each secondary alignment magnet 2828 can be less than or equal to the thickness of receiver coil assembly 1210 (including coil 2810 and shielding 2812). Primary alignment magnets 2826 can have a thicker axial dimension, e.g., occupying all of the axial space between enclosure 2806 and top cover 2808.

Similarly, each arcuate magnet 2872 of auxiliary alignment component 2770 can have a thin axial dimension so that the overall thickness of accessory device 2700 can be kept small. Back layer 2805 and front layer 2807 can be planar layers. Space between layers 2805 and 2807 that is not occupied by auxiliary alignment magnets 2872 can be an air gap, or portions or all of the space may be filled with material. In some embodiments, surfaces 2803 and 2809 do not evince a local deviation from flatness due to the presence of auxiliary alignment magnets 2872. In some embodiments, accessory device 2700 (or a back housing element thereof) can be formed as a single piece of material with auxiliary alignment component 2770 embedded therein. Auxiliary alignment magnets 2872 and primary alignment magnets 2826 can have the same radial width; in some embodiments, the radial width of auxiliary alignment magnets 2872 and primary alignment magnets 2826 can be slightly larger than the radial width of secondary alignment magnets 2828.

It should be understood that auxiliary alignment component 2770 is optional, and a charge-through accessory that does not have an auxiliary alignment component may be positioned between portable electronic device 1200 and wireless charger device 1300. Depending on the thickness and material composition of the accessory, primary annular alignment component 1316 and secondary annular alignment component 1218 may still experience sufficient attraction to provide reliable alignment between coils 2816 and 2810. However, for DC magnets, the attractive force diminishes sharply with increasing distance between magnets, so the alignment may be less strong. Accordingly, auxiliary alignment component 2770 can be used as a "repeater" that decreases the distance between adjacent magnets and thus increases the magnetic force that urges toward alignment.

Figure 29:
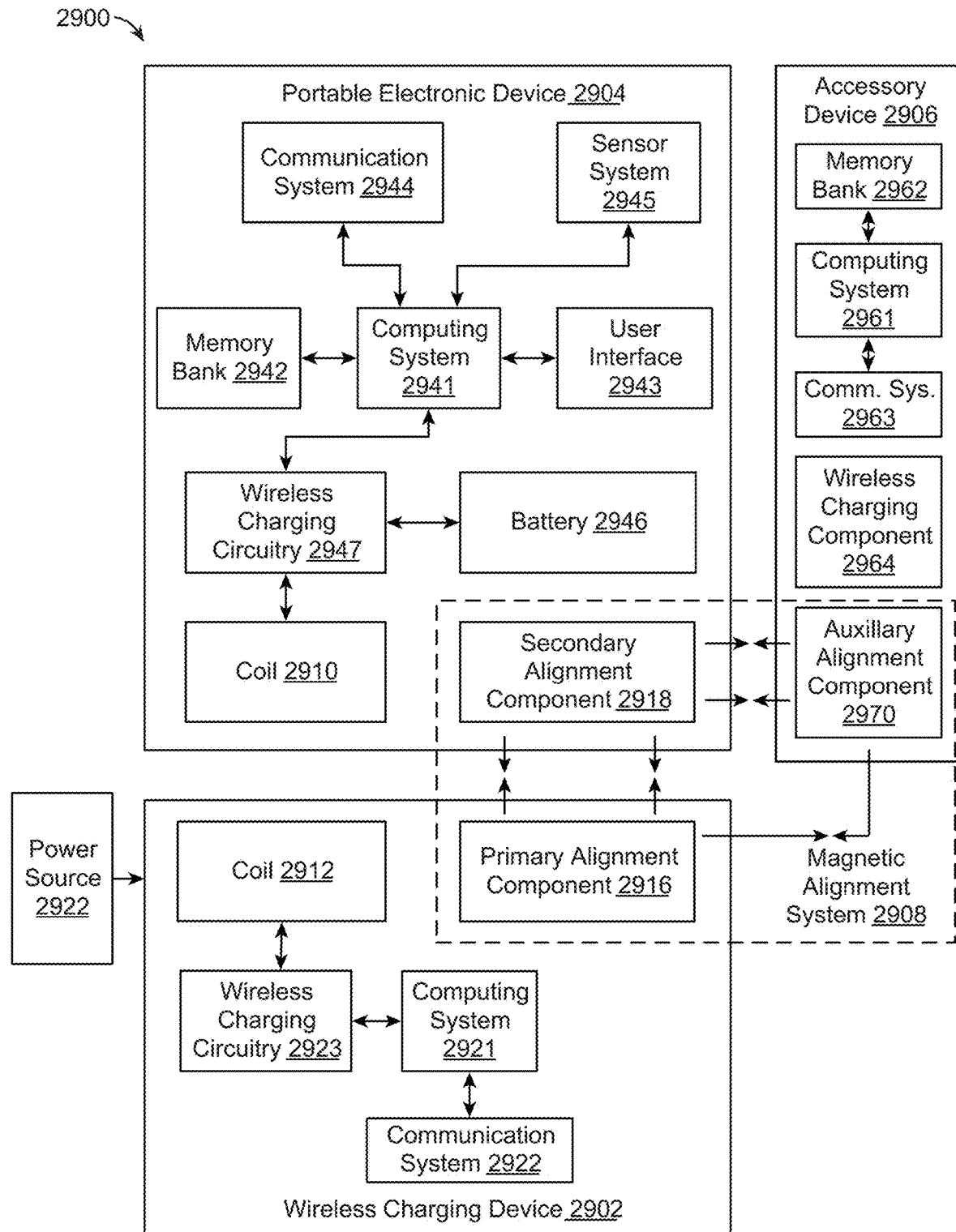
FIG. 29 is a block diagram illustrating an exemplary wireless charging system including devices that can be aligned together via a magnetic alignment system according to some embodiments.

FIG. 29 is a block diagram illustrating an exemplary wireless charging system 2900 including a portable electronic device 2904 (which can be, e.g., portable electronic device 1200 or any other portable electronic device described herein), a wireless charger device 2902 (which can be, e.g., wireless charger device 1300 or any other wireless charger device described herein), and an accessory device 2906 (which can be, e.g., accessory device 2800 or any other accessory device described herein) that can be aligned together via a magnetic alignment system 2908 according to some embodiments. Magnetic alignment system 2908 can include a primary alignment component 2916 within wireless charger device 2902, a secondary alignment component 2918 within portable electronic device 2904, and an auxiliary alignment component 2970 within accessory device 2906. Primary alignment component 2916, secondary alignment component 2918, and auxiliary alignment component 2970 can be constructed according to any of the embodiments described herein. Portable electronic device 2904 can include a computing system 2941 coupled to a memory bank 2942. Computing system 2941 can include control circuitry configured to execute instructions stored in memory bank 2942 for performing various functions for operating portable electronic device 2904. The control circuitry can include one or more programmable integrated logic circuits, such as microprocessors, central processing units (CPUs), graphics processing units (GPUs), field programmable gate arrays (FPGAs), or the like.

Computing system 2941 can also be coupled to a user interface system 2943, a communication system 2944, and a sensor system 2945 for enabling portable electronic device 2904 to perform one or more functions. For instance, user interface system 2943 can include a display, speaker, microphone, actuator for enabling haptic feedback, and one or more input devices such as a button, switch, capacitive screen for enabling the display to be touch sensitive, and the like. Communication system 2944 can include wireless telecommunication components, NFC components, Bluetooth components, and/or Wi-Fi components for enabling portable electronic device 2904 to make phone calls, interact with wireless accessories, and access the Internet. In some embodiments, communication system 2944 can include NFC reader circuitry that is used in connection with magnetic alignment system 2906 to identify one or more aligned devices; examples are described in section 5 below. Sensor system 2945 can include light sensors, accelerometers, gyroscopes, temperature sensors, magnetometers, and/or any other type of sensor that can measure a parameter of an external entity and/or environment.

All of these electrical components require a power source to operate. Accordingly, portable electronic device 2904 also includes a battery 2946 that can discharge stored energy to power the electrical components of portable electronic device 2904. To replenish the energy discharged to power the electrical components, portable electronic device 2904 includes charging circuitry 2947 and an inductive coil 2910 that can receive power from wireless charger device 2902 coupled to an external power source 2922.

Wireless charger device 2902 can include a transmitter coil 2912 for generating time-varying magnetic flux capable of inducing an electrical current in coil 2910 of portable electronic device 2904. The induced current can be used by charging circuitry 2947 to charge battery 2946. Wireless charger device 2902 can further include a computing system 2921 coupled to a communication system 2922 and wireless charging circuitry 2923. Wireless charging circuitry can include circuit components to convert standard AC power having a first set of voltage and frequency characteristics (e.g., standard AC wall power) to AC power suitable for operating coil 2910. Suitable circuit components, including rectifiers (AC-to-DC converters), boost circuits (DC-to-DC voltage boosting circuits), inverters (DC-to-AC converters), and the like, are known in the art. Computing system 2921 can include logic circuitry (such as a microprocessor, microcontroller, FPGA, or the like) configured to control the operation of wireless charger device 2902, such as to control wireless charging circuitry 2923 to use power received from external power source 2922 to generate time-varying magnetic flux to induce current in coil 2910 to charge portable electronic device 2904. In some embodiments, computing system 2921 can implement functionality confirming to the Qi standard for wireless charging (promulgated by the Wireless Power Consortium).

In some embodiments, components implementing computing system 2921 and wireless charging circuitry 2923 can be disposed within the housing that holds coil 2912 and primary alignment component 2916 (e.g., within puck-shaped housing 1302 of FIGS. 13 and 14A-14B). In other embodiments, some or all of the components implementing computing system 2921 and wireless charging circuitry 2923 can be disposed elsewhere, e.g., at the distal end of cable 1304 in FIGS. 13 and 14A. For example, the logic circuitry implementing computing system 2921 can be disposed within housing 1302 while wireless charging circuitry 2932 is disposed in a boot of a plug connector at the distal end of cable 1304. (In this case, cable 1304 can provide AC power to wireless charger device 1300.) As another example, the logic circuitry implementing computing system 2921 and circuit components implementing portions of wireless charging circuitry 2923 can be disposed within housing 1302 while circuit components implementing other portions of wireless charging circuitry 2923 are disposed in a boot of a plug connector at the distal end of cable 1304. For instance, an inverter may be disposed within housing 1302 while a rectifier and boost circuit are disposed in the boot. (In this case, cable 1304 can provide DC power to wireless charger device 1300.)

As described above, accessory device 2906 can be a passive accessory such as protective case for portable electronic device 1002 and need not include any components other than auxiliary alignment component 2970. In some embodiments, accessory device 2906 can be an active device. For instance, accessory device 2906 can include a computing system 2961 coupled to a memory bank 2962 and a communication system 2963. Computing system 2961 can execute instructions stored in memory bank 2962 to perform one or more functions using communication system 2963. In some embodiments, computing system 2961 can be configured to send data from memory bank 2962 through communication system 2963 to portable electronic device 2904 regarding a user interface theme for portable electronic device 2904 so that portable electronic device 2904 can use this data to modify its user interface. As an example, accessory device 2906 can be a protective case that has a picture of a car on it, and memory bank 2962 has information stored for configuring a user interface to include a car theme with car-related icons, animations, and/or sounds. Thus, when accessory device 2906 is installed on portable electronic device 2902, computing system 2941 can receive the car-themed user interface from accessory device 2906 and can modify user interface system 2943 according to the received car-themed data (e.g., changing what is displayed, what sounds are played to signal events, etc.). In some embodiments, accessory device 2906 can also include a wireless charging component 2964 that can aid in wireless charging between portable electronic device 2904 and wireless charger device 2902. For instance, wireless charging component 2964 can include a block of magnetic material that can help guide magnetic flux through accessory device 2906. Or, wireless charging component 2964 can include a pair of inductor coils where one inductor coil positioned proximate to wireless charger device 2902 can receive magnetic flux, which can be relayed to the other inductor coil positioned proximate to portable electronic device 2904 so that the received flux can be retransmitted to portable electronic device 2904. In some embodiments, accessory device 2906 can include a battery (not shown) to store power received from wireless charger device 2902 at a first time for delivery to portable electronic device 2904 at a later time.

While system 2900 is described with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices that use using any combination of circuitry and software to enable wireless charging operations and/or other operations where physical alignment between devices is desired.

4. Systems with Movable Magnetic Alignment Components

In embodiments described above, it is assumed (though not required) that the magnetic alignment components (including annular magnetic alignment components, and, where applicable, rotational magnetic alignment components) are fixed in position relative to the device housing (or enclosure) and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

FIGS. 30A-30C illustrate examples of moving magnets according to an embodiment of the present invention. In this example, first electronic device 3000 can be a wireless charger device or other device having a magnet 3010 (which can be, e.g., any of the annular or rotational magnetic alignment components described herein). In FIG. 30A, moving magnet 3010 can be housed in a first electronic device 3000. First electronic device 3000 can include device enclosure 3030, magnet 3010, and shield 3020. Magnet 3010 can be in a first position (not shown) adjacent to nonmoving shield 3020. In this position, magnet 3010 can be separated from device enclosure 3030. As a result, the magnetic flux 3012 at a surface of device enclosure 3030 can be relatively low, thereby protecting magnetic devices and magnetically stored information, such as information stored on payment cards. As magnet 3010 in first electronic device 3000 is attracted to a second magnet (not shown) in a second electronic device (not shown), magnet 3010 can move, for example it can move away from shield 3020 to be adjacent to device enclosure 3030, as shown. With magnet 3010 at this location, magnetic flux 3012 at surface of device enclosure 3030 can be relatively high. This increase in magnetic flux 3012 can help to attract the second electronic device to first electronic device 3000.

With this configuration, it can take a large amount of magnetic attraction for magnet 3010 to separate from shield 3020. Accordingly, these and other embodiments of the present invention can include a shield that is split into a shield portion and a return plate portion. For example, in FIG. 30B, line 3060 can be used to indicate a split of shield 3020 into a shield 3040 and return plate 3050.

In FIG. 30C, moving magnet 3010 can be housed in first electronic device 3000. First electronic device 3000 can include device enclosure 3030, magnet 3010, shield 3040, and return plate 3050. In the absence of a magnetic attraction, magnet 3010 can be in a first position (not shown) such that shield 3040 can be adjacent to return plate 3050. Again, this configuration, magnetic flux 3012 at a surface of device enclosure 3030 can be relatively low. As magnet 3010 and first electronic device is attracted to a second magnet (not shown) in a second electronic device (not shown), magnet 3010 can move, for example it can move away from return plate 3050 to be adjacent to device enclosure 3030, as shown. In this configuration, shield 3040 can be separate from return plate 3050 and the magnetic flux 3012 at a surface of device enclosure 3030 can be increased. As before, this increase in magnetic flux 3012 can help to attract the second electronic device to the first electronic device 3000.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

Figure 31B:
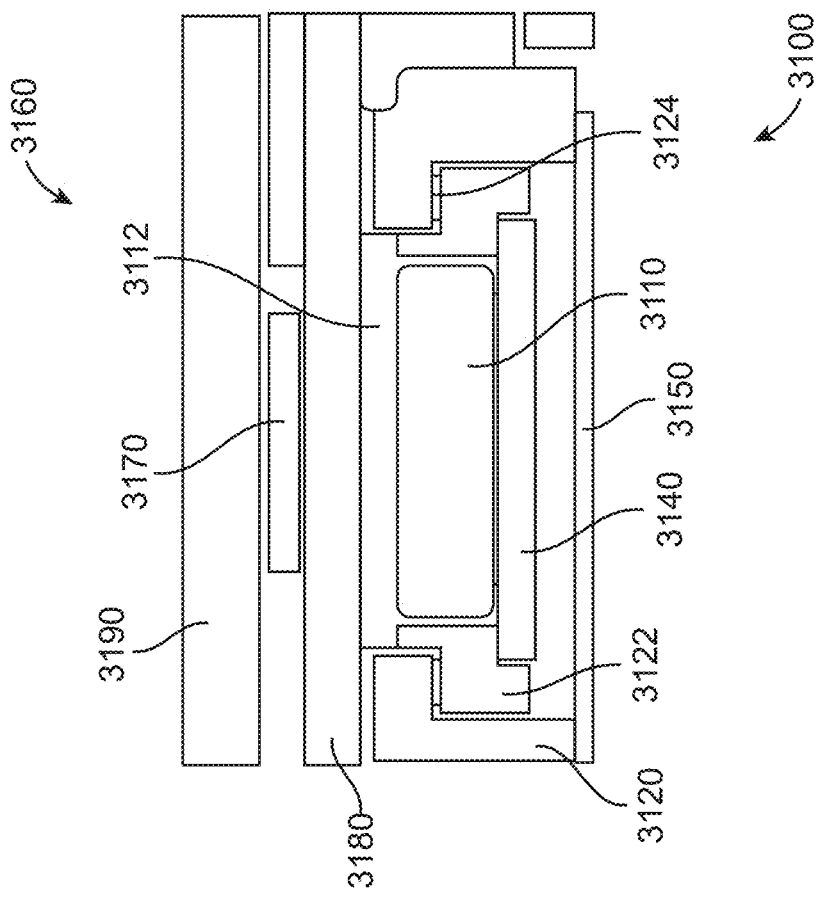
FIGS. 31A and 31B illustrate a moving magnetic structure according to an embodiment of the present invention.
Figure 31A:
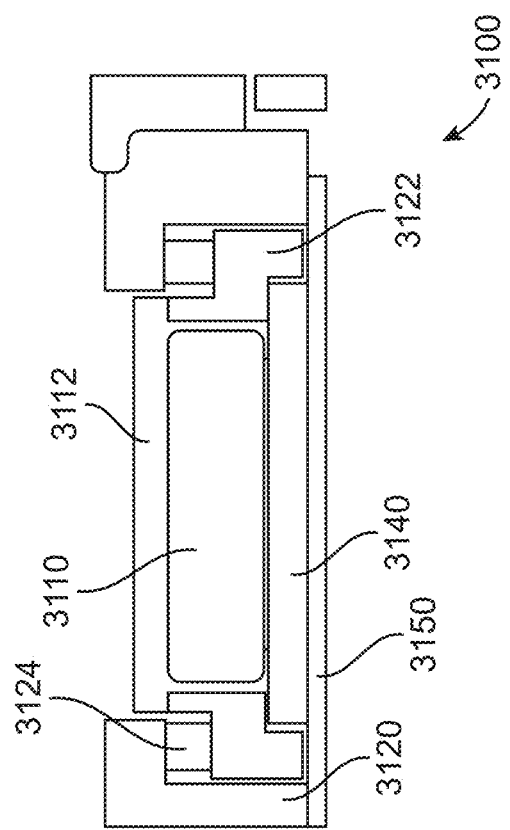

FIGS. 31A and 31B illustrate a moving magnetic structure according to an embodiment of the present invention. In this example, first electronic device 3100 can be a wireless charger device or other device having a first magnet 3110 (which can be, e.g., any of the annular or rotational magnetic alignment components described herein). FIG. 31A illustrates a moving first magnet 3110 in a first electronic device 3100. First electronic device 3100 can include first magnet 3110, protective surface 3112, housings 3120 and 3122, compliant structure 3124, shield 3140, and return plate 3150. In this figure, first magnet 3110 is not attracted to a second magnet (not shown), and therefore shield 3140 is magnetically attracted to or attached to return plate 3150. In this position, compliant structure 3124 can be expanded or relaxed. Compliant structure 3124 can be formed of an elastomer, silicon rubber open cell foam, silicon rubber, polyurethane foam, or other foam or other compressible material.

In FIG. 31B, second electronic device 3160 has been brought into proximity of first electronic device 3100. Second magnet 3170 can attract first magnet 3110, thereby causing shield 3140 and return plate 3150 to separate. Housings 3120 and 3122 can compress compliant structure 3124, thereby allowing protective surface 3112 of first electronic device 3100 to move towards or adjacent to housing 3180 of second electronic device 3160. Second magnet 3170 can be held in place in second electronic device 3160 by housing 3190 or other structure. As second electronic device 3160 is removed from first electronic device 3100, first magnet 3110 and shield 3140 can be magnetically attracted to return plate 3150, as shown in FIG. 31A.

Figure 32B:
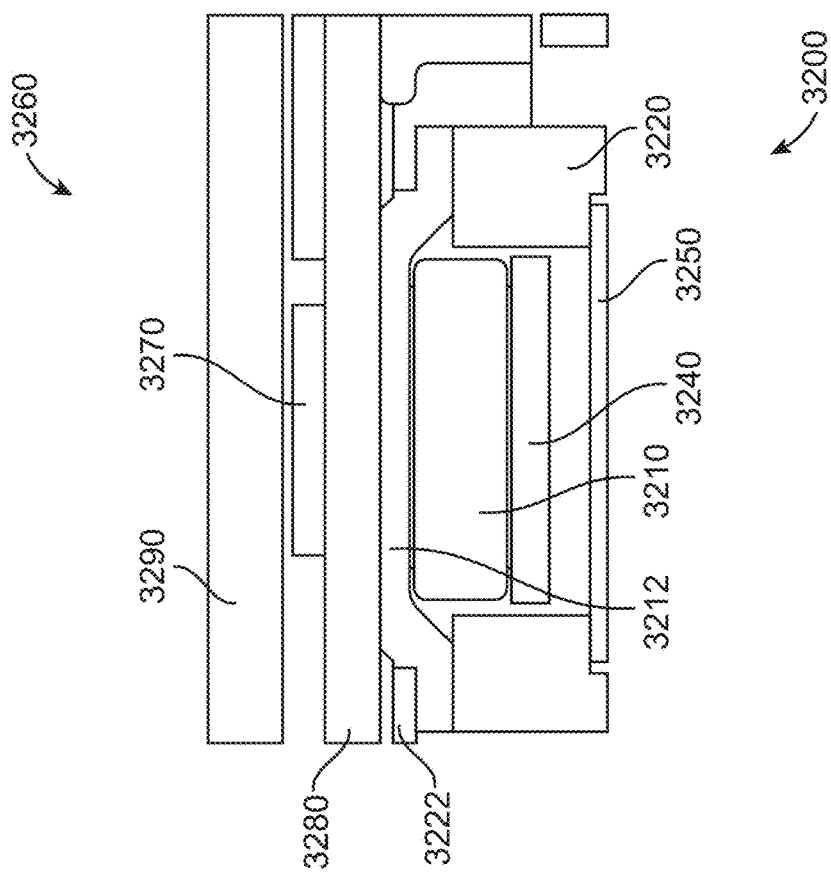
FIGS. 32A and 32B illustrate a moving magnetic structure according to an embodiment of the present invention.
Figure 32A:
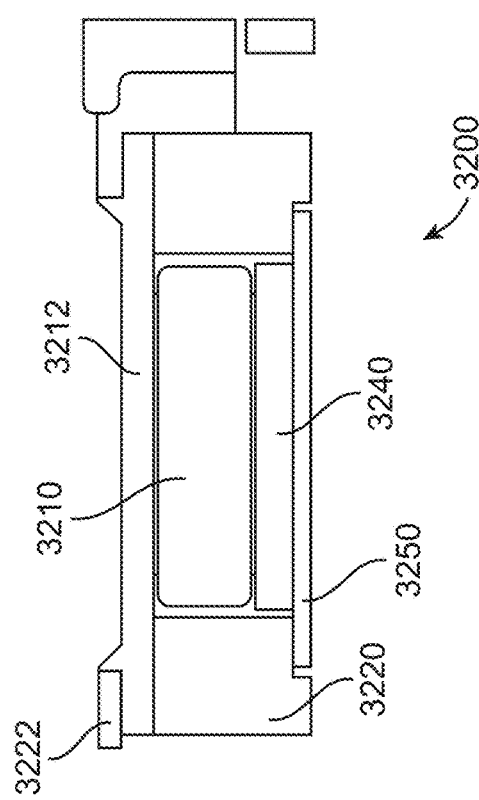

FIGS. 32A and 32B illustrate moving magnetic structures according to an embodiment of the present invention. In this example, first electronic device 3200 can be a wireless charger device or other device having a first magnet 3210 (which can be, e.g., any of the annular or rotational magnetic alignment components described herein). FIG. 32A illustrates a moving first magnet 3210 in a first electronic device 3200. First electronic device 3200 can include first magnet 3210, pliable surface 3212, housing portions 3220 and 3222, shield 3240, and return plate 3250. In this figure, first magnet 3210 is not attracted to a second magnet, and therefore shield 3240 is magnetically attached or attracted to return plate 3250. In this position, pliable surface 3212 can be relaxed. Pliable surface 3212 can be formed of an elastomer, silicon rubber open cell foam, silicon rubber, polyurethane foam, or other foam or other compressible material.

In FIG. 32B, second electronic device 3260 has been brought into the proximity of first electronic device 3200. Second magnet 3270 can attract first magnet 3210, thereby causing shield 3240 and return plate 3250 to separate from each other. First magnet 3210 can stretch pliable surface 3212 towards second electronic device 3260, thereby allowing first magnet 3210 of first electronic device 3200 to move towards housing 3280 of second electronic device 3260. Second magnet 3270 can be held in place in second electronic device 3260 by housing 3290 or other structure. As second electronic device 3260 is removed from first electronic device 3200, first magnet 3210 and shield 3240 can be magnetically attracted to return plate 3250 as shown in FIG. 32A.

Figure 33:
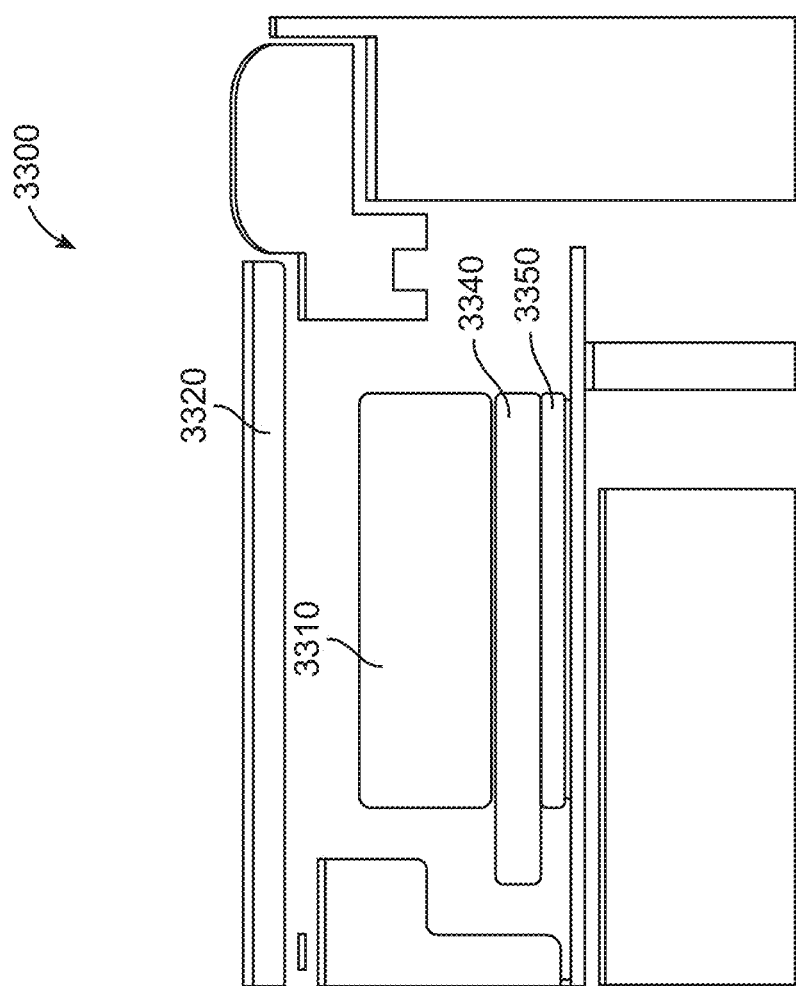
FIGS. 33-35 illustrate a moving magnetic structure according to an embodiment of the present invention.
Figure 34:
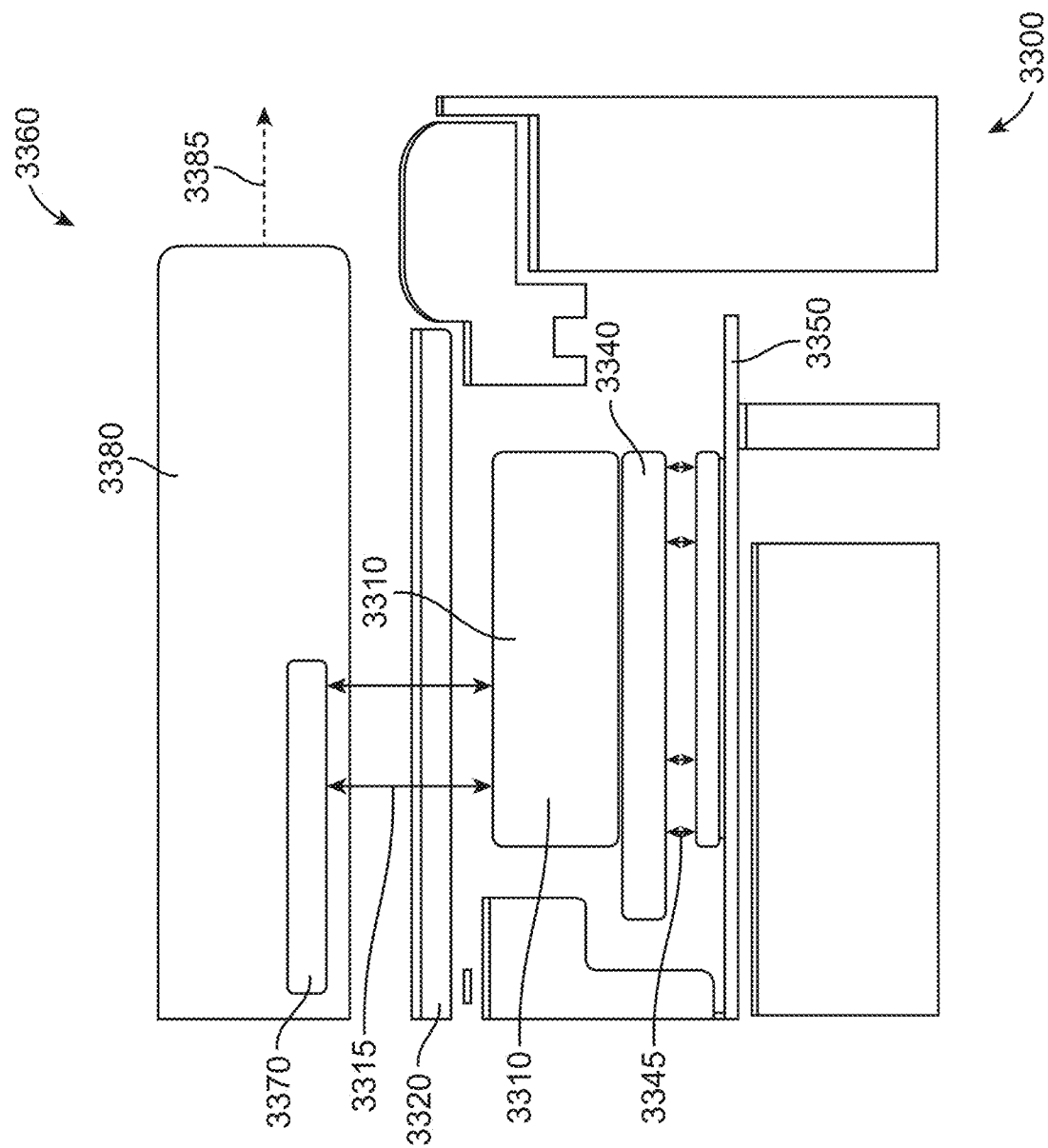
Figure 35:
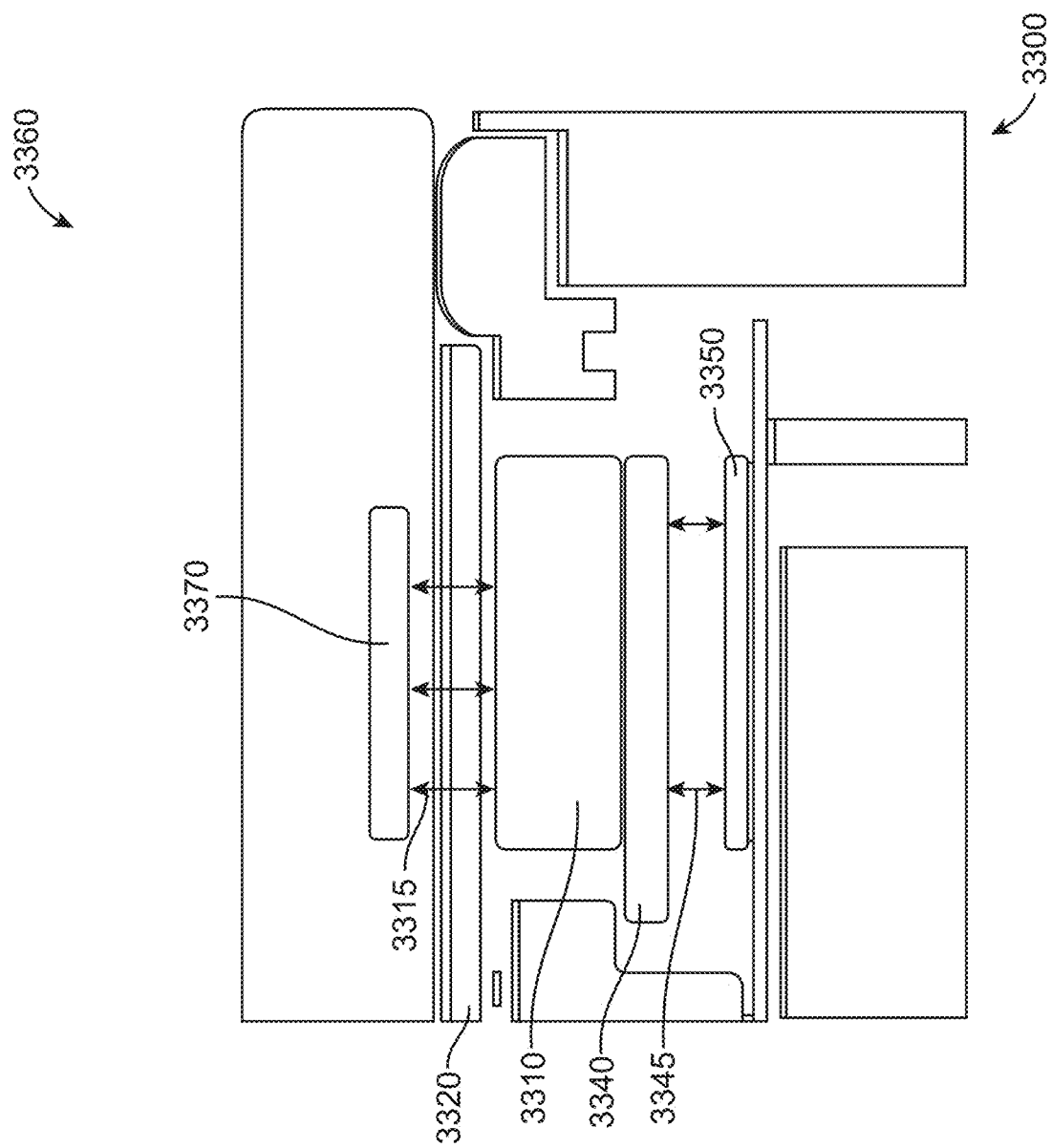

FIGS. 33-35 illustrate a moving magnetic structure according to an embodiment of the present invention. In this example, first electronic device 3300 can be a wireless charger device or other device having a first magnet 3310 (which can be, e.g., any of the annular or rotational magnetic alignment components described herein). In FIG. 33, first magnet 3310 and shield 3340 can be magnetically attracted or attached to return plate 3350 in first electronic device 3300. First electronic device 3300 can be at least partially housed in device enclosure 3320. In FIG. 34, housing 3380 of second electronic device 3360 can move laterally across a surface of device enclosure 3320 of first electronic device 3300 in a direction 3385. Second magnet 3370 in second electronic device 3360 can begin to attract first magnet 3310 in first electronic device 3300. This magnetic attraction 3315 can cause first magnet 3310 and shield 3340 to pull away from return plate 3350 by overcoming the magnetic attraction 3345 between shield 3340 and return plate 3350. In FIG. 35, second magnet 3370 in second electronic device 3360 has become aligned with first magnet 3310 in first electronic device 3300. First magnet 3310 and shield 3340 have pulled away from return plate 3350 thereby reducing the magnetic attraction 3345. First magnet 3310 has moved nearby or adjacent to device enclosure 3320, thereby increasing the magnetic attraction 3315 to second magnet 3370 in second electronic device 3360.

As shown in FIGS. 33-35, the magnetic attraction between first magnet 3310 in first electronic device 3300 and the second magnet 3370 in the second electronic device 3360 can increase when first magnet 3310 and shield 3340 pull away from return plate 3350. This is shown graphically in the following figures.

Figure 36:
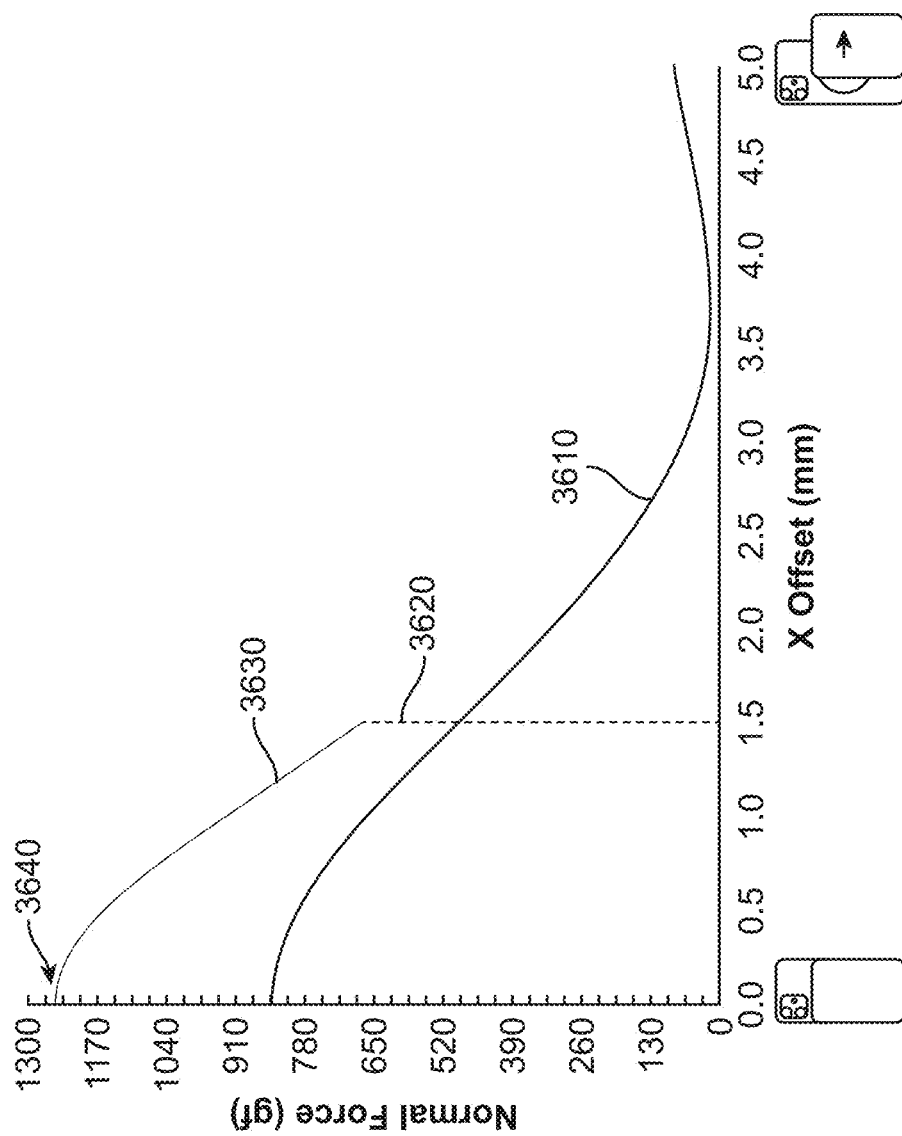
FIG. 36 illustrates a normal force between a first magnet in a first electronic device and a second magnet in a second electronic device.

FIG. 36 illustrates a normal force between a first magnet in first electronic device and a second magnet in a second electronic device as a function of a lateral offset between them. As shown in FIGS. 33-36, with a large offset between first magnet 3310 and second magnet 3570, first magnet 3310 and shield 3340 can remain attached to return plate 3350 in first electronic device 3300 and the magnetic attraction 3315 can be minimal. The shear force necessary to overcome this magnetic attraction is illustrated here as curve 3610. As shown in FIG. 34, as the offset or lateral distance between first magnet 3310 and second magnet 3370 decreases, first magnet 3310 and shield 3340 can pull away or separate from return plate 3350, thereby increasing the magnetic attraction 3315 between first magnet 3310 and second magnet 3370. This is illustrated here as discontinuity 3620. As shown in FIG. 35, as first magnet 3310 and second magnet 3370 come into alignment, the magnetic attraction 3315 increases along curve 3630 to a maximum 3640. The difference between curve 3610 and curve 3630 can show the increase in magnetic attraction between a phone or other electronic device, such as second electronic device 3360, and an attachable wireless charging device or other accessory device, such as first electronic device 3300, that results from first magnet 3310 being able to move axially. It should also be noted that in this example first magnet 3310 does not move in a lateral direction, though in other examples it is capable of such movement. Where first magnet 3310 is capable of moving in a lateral direction, curve 3630 can have a flattened peak from an offset of zero to an offset that can be overcome by a range of possible lateral movement of first magnet 3310.

Figure 37:
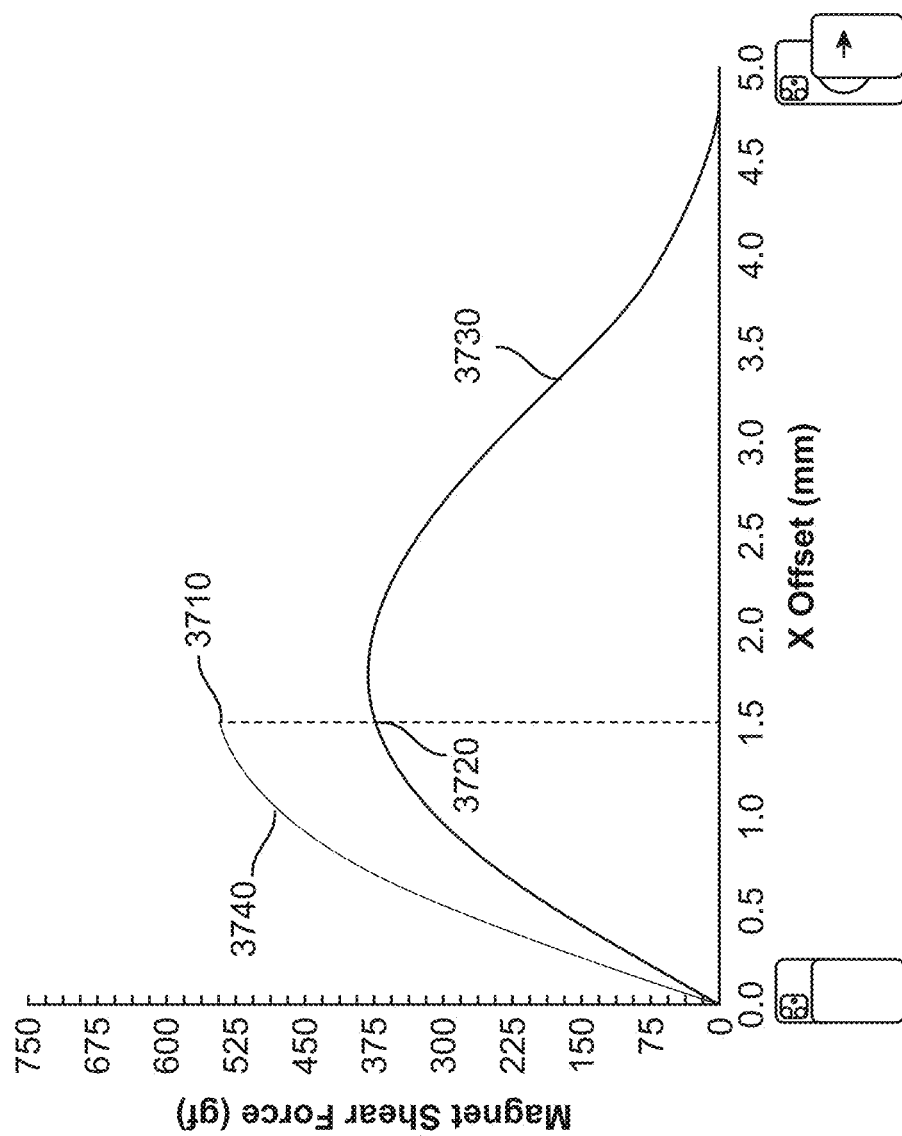
FIG. 37 illustrates a shear force between a first magnet in a first electronic device and a second magnet in a second electronic device.

FIG. 37 illustrates a sheer force between a first magnet in a first electronic device and a second magnet in a second electronic device as a function of a lateral offset between them. With no offset between first magnet 3310 and second magnet 3360, there it is no shear force to move second magnet 3370 relative to first magnet 3310, as shown in FIG. 33. As the offset is increased, the shear force, that is the force attempting to realign the magnets, can increase along curve 3740. At discontinuity 3710, first magnet 3310 and shield 3340 can return to return plate 3350 (as shown in FIGS. 33-42), thereby decreasing the magnetic shear force to point 3720. The magnetic sheer force can continue to drop off along curve 3730 as the offset increases. The difference between curve 3730 and curve 3740 can show the increase in magnetic attraction between a phone or other electronic device, such as second electronic device 3360 and an attachable wireless charging device or other accessory device, such as first electronic device 3300, that results from first magnet 3310 being able to move axially. It should also be noted that in this example first magnet 3310 does not move in a lateral direction, though in other examples it is capable of such movement. Where first magnet 3310 is capable of moving in a lateral direction, curve 3730 can remain at zero until the lateral movement of the second magnet 3370 overcomes the range of possible lateral movement of first magnet 3310.

In these and other embodiments of the present invention, it can be desirable to further increase this sheer force. Accordingly, embodiments of the present invention can provide various high friction or high stiction surfaces, suction cups, pins, or other structures to increase this sheer force. Examples are shown in the following figures.

Figure 38B:
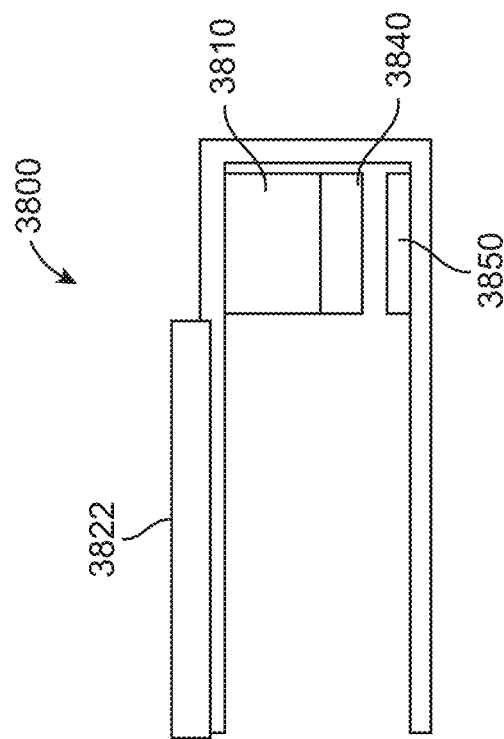
FIGS. 38A and 38B illustrate a moving magnet in conjunction with a high friction surface according to an embodiment of the present invention.
Figure 38A:
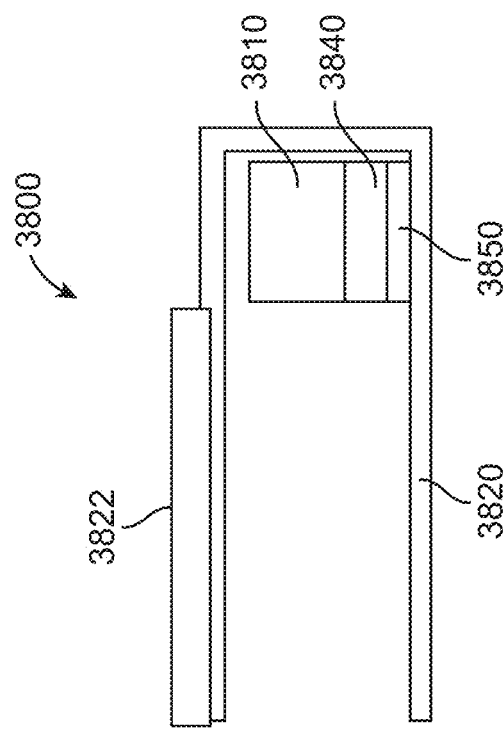

FIGS. 38A and 38B illustrate a moving magnet in conjunction with a high friction or high stiction surface according to an embodiment of the present invention. In this example, first electronic device 3800 can be a wireless charger device or other device having a first magnet 3810 (which can be, e.g., any of the annular magnetic alignment components described above). In FIG. 38A, first magnet 3810 and shield 3840 can be magnetically attracted or attached to return plate 3850 in first electronic device 3800. First electronic device 3800 can be housed in device enclosure 3820. Some or all of a surface of device enclosure 3820 can have a coating, layer, or other structure 3822. Structure 3822 can provide a high friction or high stiction surface. In FIG. 38B, first magnet 3810 and shield 3840 can be attracted to a second magnet (not shown) in a second electronic device (not shown). As before, the separation of first magnet 3810 and shield 3840 from return plate 3850 can provide an increased amount of magnetic flux to hold the second electronic device in place relative to first electronic device 3800. Structure 3822 can increase the friction or stiction between first electronic device 3800 and the second electronic device in a lateral or shear direction.

Figure 39B:
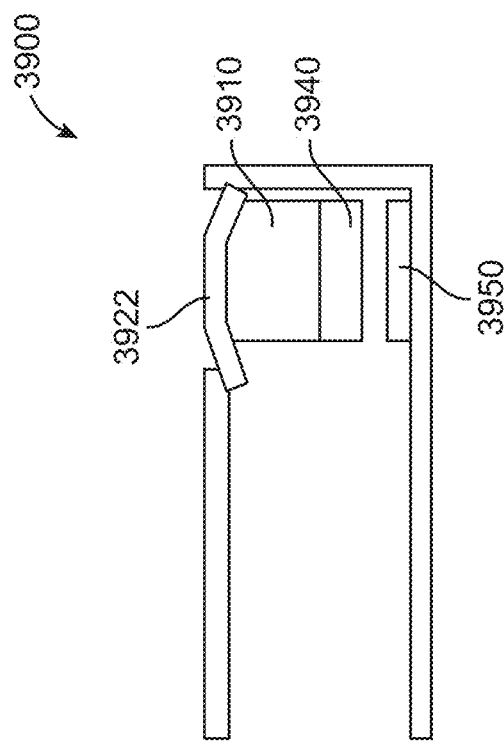
FIGS. 39A and 39B illustrate a moving magnet in conjunction with a high friction surface according to an embodiment of the present invention.
Figure 39A:
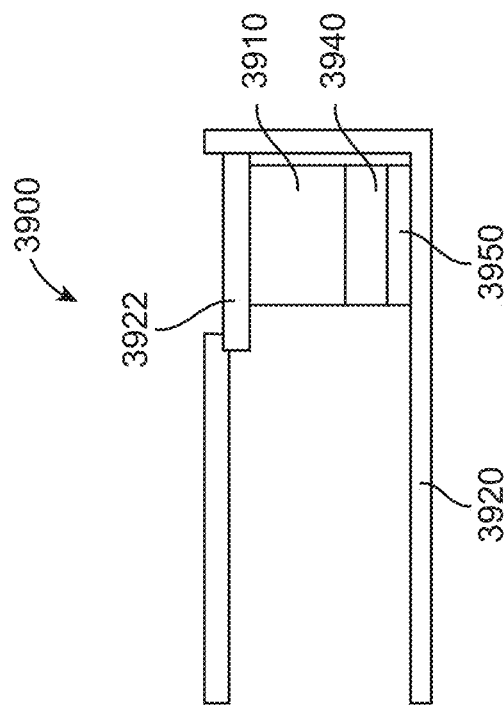

FIGS. 39A and 39B illustrate a moving magnet in conjunction with a high friction or high stiction surface according to an embodiment of the present invention. In this example, first electronic device 3900 can be a wireless charger device or other device having a first magnet 3910 (which can be, e.g., any of the annular or rotational magnetic alignment components described herein). In FIG. 39A, first magnet 3910 and shield 3940 can be magnetically attracted or attached to return plate 3950 in first electronic device 3900. First electronic device 3900 can be housed in device enclosure 3920. Some or all of a surface of device enclosure 3920 can have a coating, layer, or other structure 3922, in this example over first magnet 3910. Structure 3922 can provide a high friction or high stiction surface. In FIG. 39B, first magnet 3910 and shield 3940 can be attracted to a second magnet (not shown) in a second electronic device (not shown.) This can cause first magnet 3910 and shield 3940 to separate from return plate 3850, thereby deforming structure 3922, which can be pliable or compliant. As before, first magnet 3910 can provide an increased amount of magnetic flux to hold the second electronic device in place relative to first electronic device 3900. Structure 3922 can increase the friction or stiction between first electronic device 3900 and the second electronic device in a lateral or sheer direction.

Figure 40B:
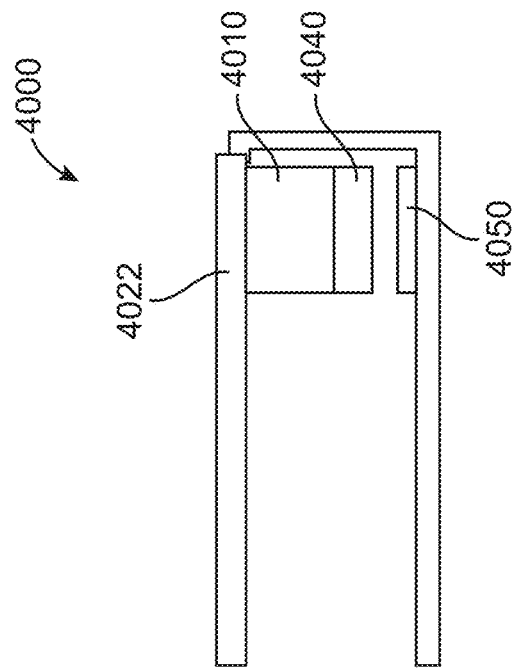
FIGS. 40A and 40B illustrate a moving magnet in conjunction with a high friction surface according to an embodiment of the present invention.
Figure 40A:
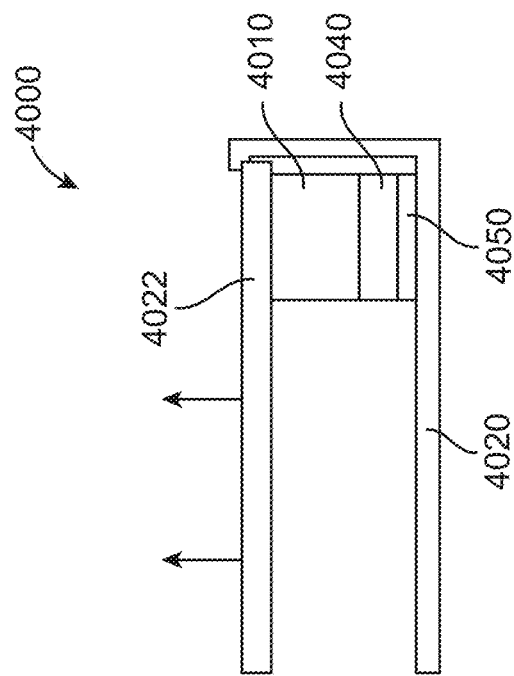

FIGS. 40A and 40B illustrate a moving magnet in conjunction with a high friction surface according to an embodiment of the present invention. In this example, first electronic device 4000 can be a wireless charger device or other device having a first magnet 4010 (which can be, e.g., any of the primary annular magnetic alignment components described above). In FIG. 40A, first magnet 4010 and shield 4040 can be magnetically attracted or attached to return plate 4050 in first electronic device 4000. First electronic device 4000 can be housed in device enclosure 4020. Some or all of a surface of device enclosure 4020 can have a coating, layer, or other structure 4022, in this example over a top surface of first electronic device 4000. Structure 4022 can provide a high friction or high stiction surface. In FIG. 40B, first magnet 4010 and shield 4040 can be attracted to a second magnet (not shown) in a second electronic device (not shown.) The separation of first magnet 4010 and shield 4040 from return plate 4050 can push the top surface formed by structure 4022 upward where it can engage the second electronic device with a high-friction surface. As before, first magnet 4010 can provide an increased amount of magnetic flux to hold the second electronic device in place relative to first electronic device 4000. Structure 4022 can increase the friction or stiction between first electronic device 4000 and the second electronic device in a lateral or sheer direction.

Figure 41B:
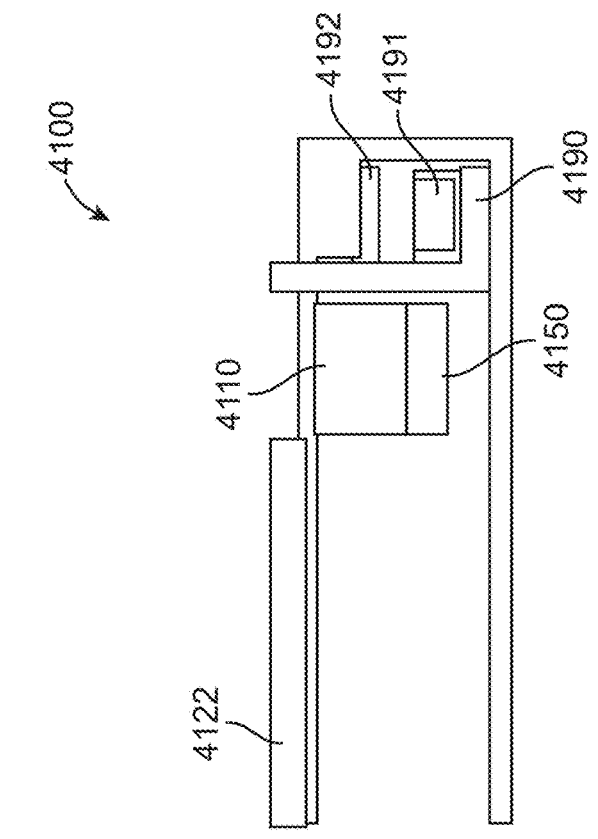
FIGS. 41A and 41B illustrate another moving magnet in conjunction with a high friction surface according to an embodiment of the present invention.
Figure 41A:
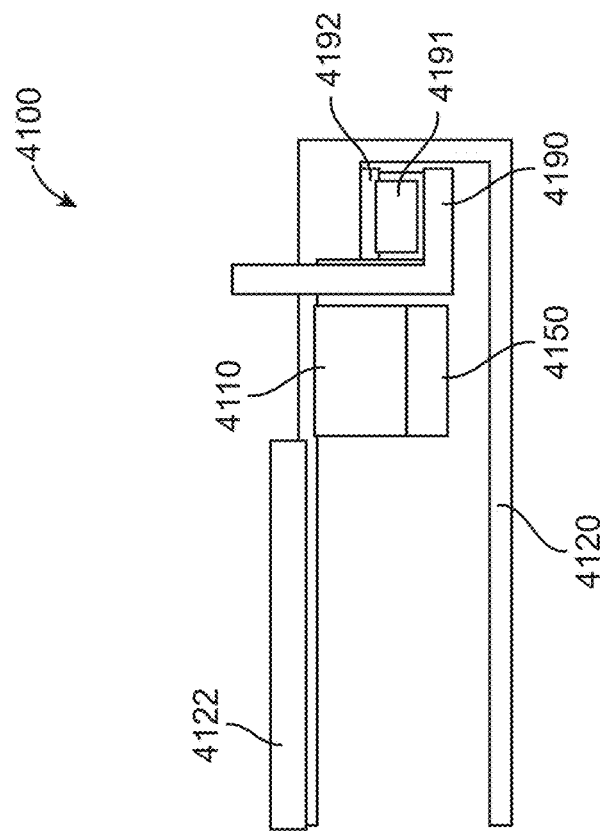

FIGS. 41A and 41B illustrate another moving magnet in conjunction with a high friction or high stiction surface according to an embodiment of the present invention. In this example, first electronic device 4100 can be a wireless charger device or other device having a first magnet 4110 (which can be, e.g., any of the annular magnetic alignment components described above). In FIG. 41A, first magnet 4110 and first shield 4150 can be fixed in place in device enclosure 4120 of first electronic device 4100. Some or all of a surface of device enclosure 4120 can have a coating, layer, or other structure 4122. Structure 4122 can provide a high friction or high stiction surface. First electronic device 4100 can further include a moving second magnet 4191 and second shield 4192, which can be attached to sliding mechanism 4190. In FIG. 41B, as a second electronic device (not shown) comes into contact with first electronic device 4100, sliding mechanism 4190 can be depressed, thereby moving second magnet 4191 away from second shield 4192 and the top surface of device enclosure 4120. The polarity of second magnet 4191 can be in opposition to, or the opposite of, the polarity of first magnet 4110, such that the net magnetic flux at a top surface of device enclosure 4120 is increased as sliding mechanism 4190 is depressed. Structure 4122 can increase the friction or stiction between first electronic device 4100 and the second electronic device in a lateral or sheer direction.

Figure 42:
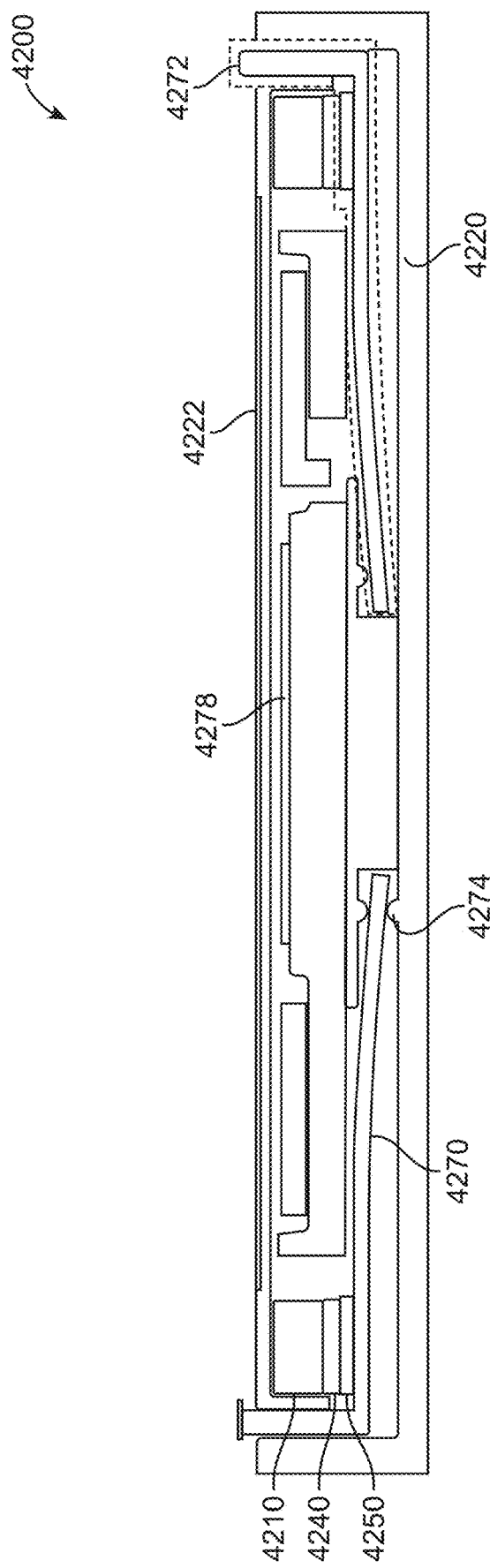
FIG. 42 illustrates a cutaway side view of another moving magnet structure according to an embodiment of the present invention.
Figure 43:
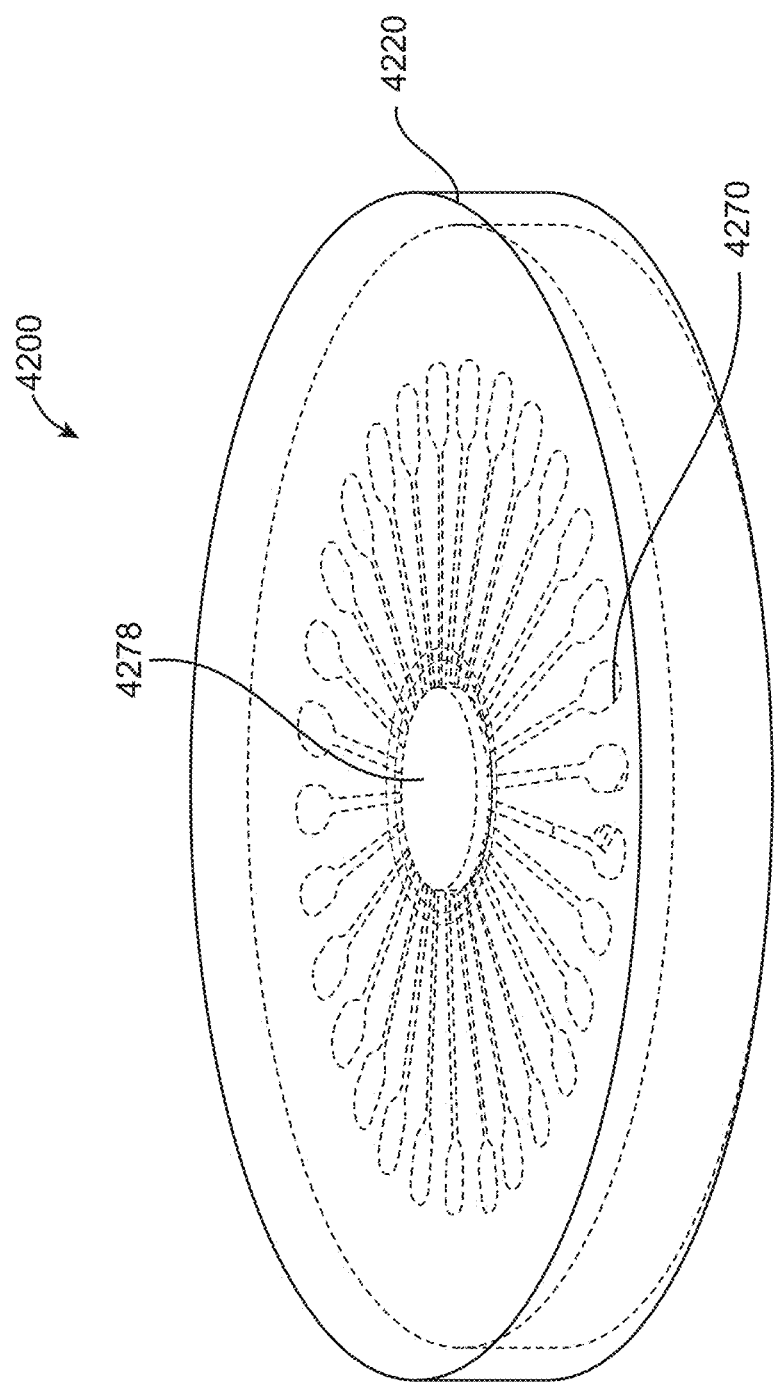
FIG. 43 is a partially transparent view of the moving magnet structure of FIG. 42.

FIG. 43 is a partially transparent view of the moving magnet structure of FIG. 42. First electronic device 4200 can be housed in device enclosure 4220. As before, first electronic device 4200 can include inductive charging, near field communication complements, or other electronic circuits for components 4278. Return plates 4250 (shown in FIG. 42) can be attached to beams 4270.

Figure 44:
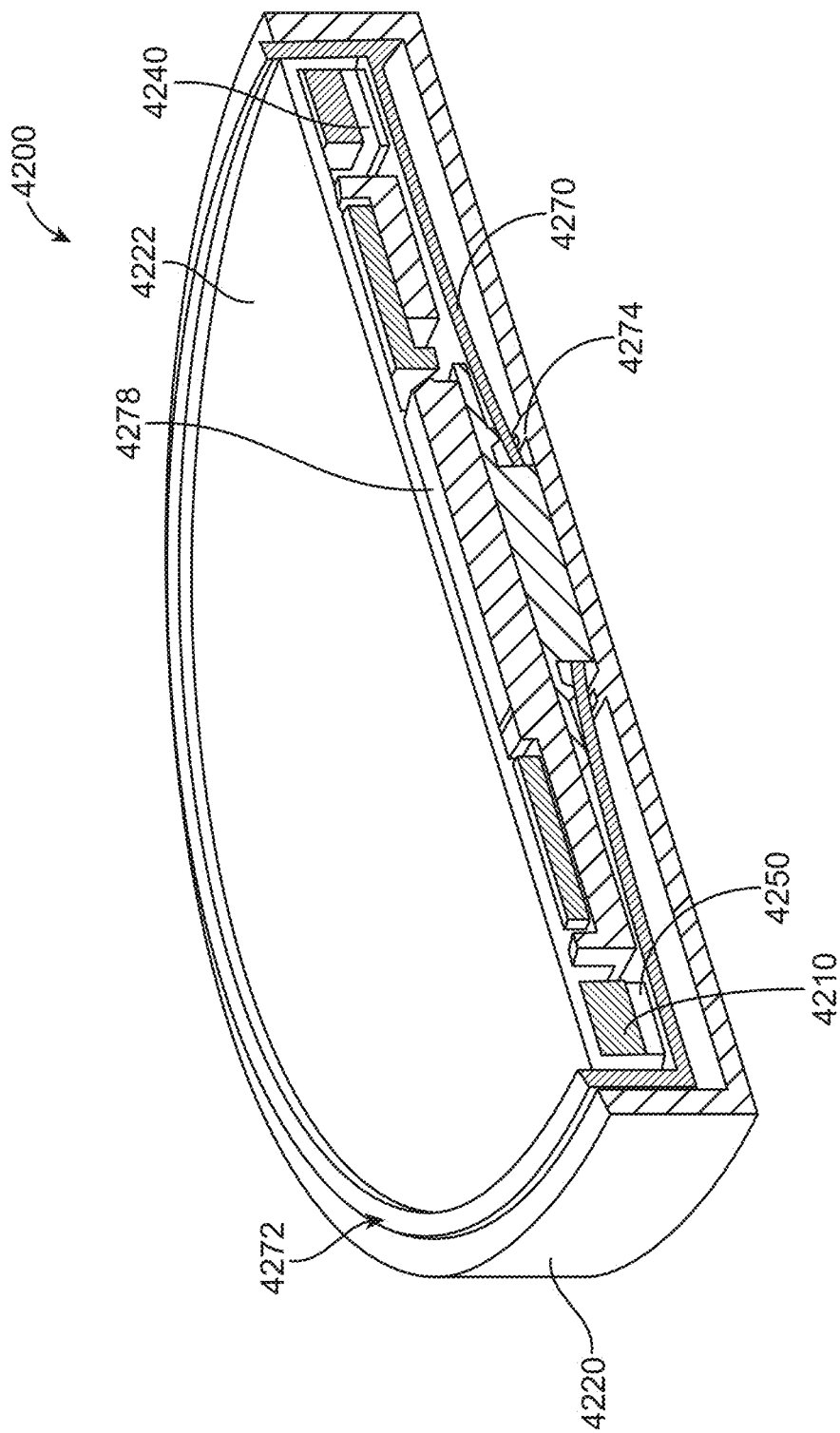
FIG. 44 is another cutaway side view of the electronic device of FIG. 42.

FIG. 44 is another cutaway side view of the electronic device of FIG. 42. First electronic device 4200 can be housed in device enclosure 4220. As before, first electronic device 4200 can include inductive charging, near field communication components, or other electronic circuits for components 4278. Return plates 4250 can be attached to beams 4270. First magnets 4210 and shield 4240 can be attracted or attached to return plate 4250. A high friction or high stiction structure 4222 can cover some or all of a top surface of first electronic device 4200. Beams 4270 can be attached to return plates 4250, can be anchored at points 4274, and can have a tip 4272 extending above top surface of device enclosure 4220.

Figure 45:
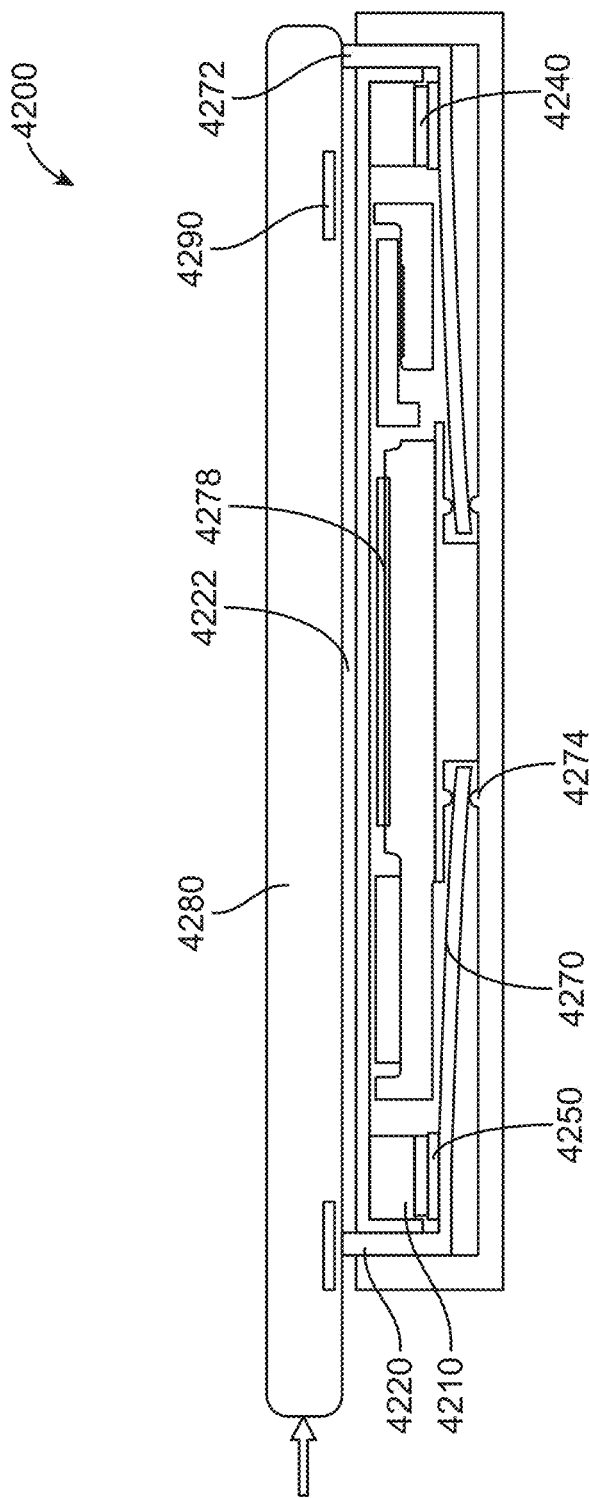
FIGS. 45 and 46 illustrate the electronic device of FIG. 42 as it engages with a second electronic device.
Figure 46:
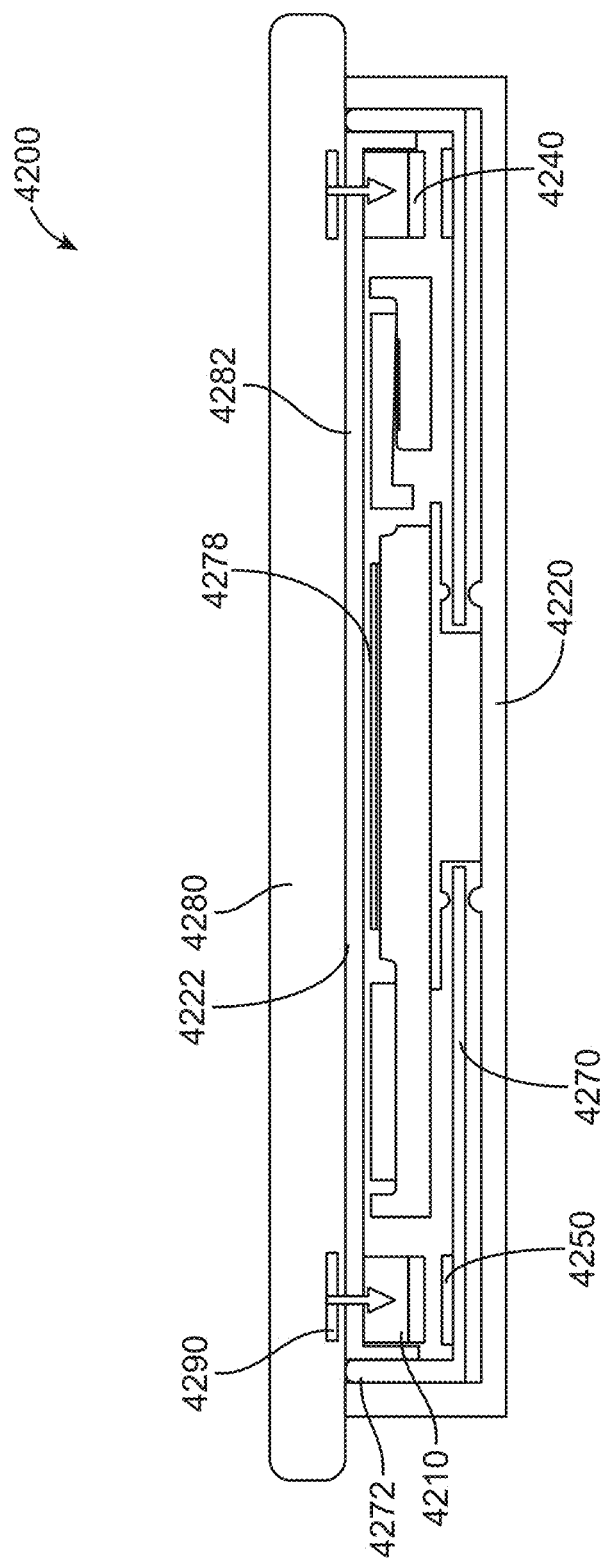

FIGS. 45 and 46 illustrate the electronic device of FIG. 42 as it engages with a second electronic device. In FIG. 45, second electronic device 4280 can include second magnets 4290. Second electronic device 4280 can engage with first electronic device 4200. First electronic device 4200 can include first magnets 4210, shields 4240, and return plates 4250. Return plates 4250 can be attached to beams 4270. Beams 4270 can include tips 4272 which can extend above a top surface of device enclosure 4220. Tips 4272 can prevent second electronic device 4280 from engaging with the high friction or high stiction structure 4222 of first electronic device 4200 until the second electronic device 4280 is aligned, or nearly aligned, with first electronic device 4200. Beams 4270 can be attached at points 4274 to device enclosure 4220. First electronic device 4200 can include components 4278.

In FIG. 46, second electronic device 4280 can be aligned with the first electronic device 4200. When this occurs, first magnets 4210 and shields 4240 can detach from return plates 4250. This can increase magnetic flux between second magnets 4290 in second electronic device 4280 and first magnets 4210 and first electronic device 4200. Tips 4272 can become depressed into device enclosure 4220 due to this increase magnetic attraction, thereby further pushing return plates 4250 away from shields 4240. High friction or high stiction structure 4222 can engage with second electronic device 4280 to increase the shear force necessary for a detachment of second electronic device 4280 from first electronic device 4200.

In these and other embodiments of the present invention, various structures can be used to constrain movement of magnets in an electronic device. Examples are shown in the following figures.

FIGS. 47A and 47B illustrate structures for constraining motions of magnets in an electronic device according to an embodiment of the present invention. In this example, first electronic device 4700 can be a wireless charger device or other device having a first magnet 4710 (which can be, e.g., any of the annular magnetic alignment components described above). In FIG. 47A, magnet 4710, shield 4740, and structure 4770 can be housed by device enclosure 4720 in electronic device 4700. Structure 4770 can include notch 4772, which can fit in tab 4724. In FIG. 47B, magnet 4710 has moved, taking along with it shield 4740 and structure 4770. Notch 4772 accepts tab 4724 as shield 4740 detaches from return plate 4750. This can constrain the motion of magnets 4710 in electronic device 4700. Electronic device 4700 can include a top device enclosure portion 4722. Tab 4724 can be formed as part of or separate from top device enclosure portion 4722.

FIGS. 48A and 48B illustrate structures for constraining motions of magnets in an electronic device according to an embodiment of the present invention. In this example, first electronic device 4800 can be a wireless charger device or other device having a first magnet 4810 (which can be, e.g., any of the annular magnetic alignment components described above). In FIG. 48A, magnet 4810, shield 4840, and return plate 4850 can be housed in device enclosure 4820 of electronic device 4800. Top device enclosure portion 4822 can include guide 4824. Guide 4824 can constrain motion of magnet 4810 in electronic device 4800. In FIG. 48B, magnet 4810 and shield 4840 have detached from return plate 4850 and have been guided into position by guide 4824. Guide 4824 can include one or more chamfered edges 4825. Again, guide 4824 can be formed along with or separate from top device enclosure portion 4822 of electronic device 4800.

FIGS. 49A and 49B illustrate structures for constraining motions of magnets in an electronic device according to an embodiment of the present invention. In this example, first electronic device 4900 can be a wireless charger device or other device having a first magnet 3010 (which can be, e.g., any of the annular magnetic alignment components described above). In FIG. 49A, magnet 4910, shield 4940, and return plate 4950 can be housed in device enclosure 4920 of electronic device 4900. Magnet 4910 and shield 4940 can be supported by structure 4970. Structure 4970 can be attached to anchor 4974 through actuators 4972. Actuators 4972 can have hinges 4973 and 4975 at each end to allow structure 4970 to move relative to anchor 4974. Anchor 4974 can be attached to, or formed as either part of, top device enclosure portion 4922 or device enclosure 4920. In FIG. 49B, magnet 4910 and shield 4940 have detached from return plate 4950. Actuators 4972 have changed positions but continued to connect structure 4970 to anchor 4974. Anchor 4974 can be attached to, or formed as either part of, top device enclosure portion 4922 or device enclosure 4920.

5. NFC Circuitry in a Magnetic Alignment System

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as a Near-Field Communication (NFC) subsystem can be provided to enable additional communication, including device identification, from a tag circuit located in one device to a reader circuit located in another device. (As used herein, "NFC" encompasses various protocols, including known standard protocols, that use near-field electromagnetic radiation to communicate data between antenna structures, e.g., coils of wire, that are in proximity to each other.) For example, each device that has an annular magnetic alignment component can also have an NFC coil that can be disposed inboard of and concentric with the annular magnetic alignment component. Where the device also has an inductive charging coil (which can be a transmitter coil or a receiver coil), the NFC coil can be disposed in an annular gap between the inductive charging coil and the annular magnetic alignment component. In some embodiments, an NFC protocol can be used to allow a portable electronic device to identify an accessory device when the respective magnetic alignment components of the portable electronic device and the accessory device are brought into alignment. For example, the NFC coil of a portable electronic device can be coupled to an NFC reader circuit while the NFC coil of an accessory device is coupled to an NFC tag circuit. When devices are brought into proximity, the NFC reader circuit of the portable electronic device can be activated to read the NFC tag of the accessory device. In this manner, the portable electronic device can obtain information (e.g., device identification) from the accessory device.

In some embodiments, an NFC reader in a portable electronic device can be triggered by detecting a change in a DC (or static) magnetic field within the portable electronic device that corresponds to a change expected when an accessory device having a complementary magnetic alignment component is brought into alignment. When the expected change is detected, the NFC reader can be activated to read an NFC tag in the other device, assuming the other device is present.

Examples of devices incorporating NFC circuitry and magnetic alignment components will now be described.

5.1. Portable Electronic Device with NFC Reader Circuitry

Figure 50:
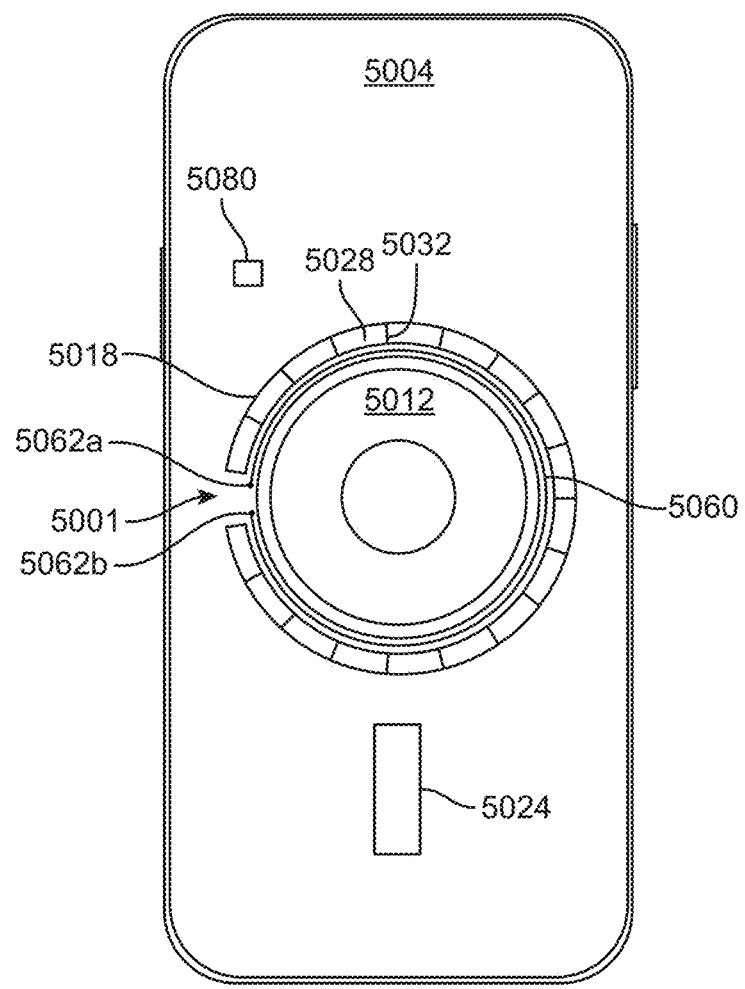
FIG. 50 shows a simplified back view of a portable electronic device according to some embodiments.

FIG. 50 shows a simplified back view of a portable electronic device 5004 according to some embodiments. In this example, portable electronic device 5004 is a smart phone, but other devices having different form factors can be substituted. Portable electronic device 5004 can include a wireless receiver coil assembly 5012. Wireless receiver coil assembly 5012 can include a wireless receiver coil for inductive power transfer from another device as well as AC magnetic and/or electric shield(s) disposed around some or all surfaces of the wireless receiver coil. A secondary annular magnetic alignment component 5018 can be disposed around wireless receiver coil assembly 5012. Secondary annular magnetic alignment component 5018 can include a number of arcuate magnets 5028 arranged in an annular configuration as shown. Each arcuate magnet 5028 can have a magnetic orientation having a radial component, e.g., radially inward or radially outward. (Examples of secondary annular magnetic alignment components that can be included in portable electronic device 5004 are described above in sections 1 and 3.) In some embodiments, secondary annular magnetic alignment component 5018 can include a gap 5001 (e.g., as described above with reference to FIG. 11), which can provide a space for electrical connections to wireless receiver coil assembly 5012 without adding to the thickness of portable electronic device 5004. In some embodiments, portable electronic device 5004 can also include a rotational alignment component 5024, which can be implemented as described above in section 2. It should also be understood that portable electronic device 5004 may have an opaque rear housing (not shown in FIG. 50) so that components such as wireless receiver coil assembly 5012 and secondary annular magnetic alignment component 5018 are not visible to a user.

According to some embodiments, an NFC coil 5060 can be disposed in an annular gap region between secondary annular magnetic alignment component 5018 and wireless receiver coil assembly 5012. NFC coil 5060 can be, for example, a single turn of a double-stranded wire (which can be made, e.g., of copper or other conductive material) having terminals 5062a, 5062b connected to an NFC reader circuit (not shown). The NFC reader circuit, which can be of generally conventional design, can be disposed on a main logic board of portable electronic device 5004, away from secondary annular magnetic alignment component 5018. In some embodiments, positioning NFC coil 5060 in the annular gap region between secondary annular magnetic alignment component 5018 and wireless receiver coil assembly 5012 can allow NFC coil 5060 to be shielded from AC electromagnetic fields generated in wireless receiver coil assembly 5012 and from DC magnetic fields of secondary annular magnetic alignment component 5018. For instance, shielding can be provided by a combination of AC shielding in receiver coil assembly 5012 and the closed-loop configuration of the arcuate magnet sections when coupled to a primary magnetic alignment component (as described above in sections 1 and 3).

Figure 51:
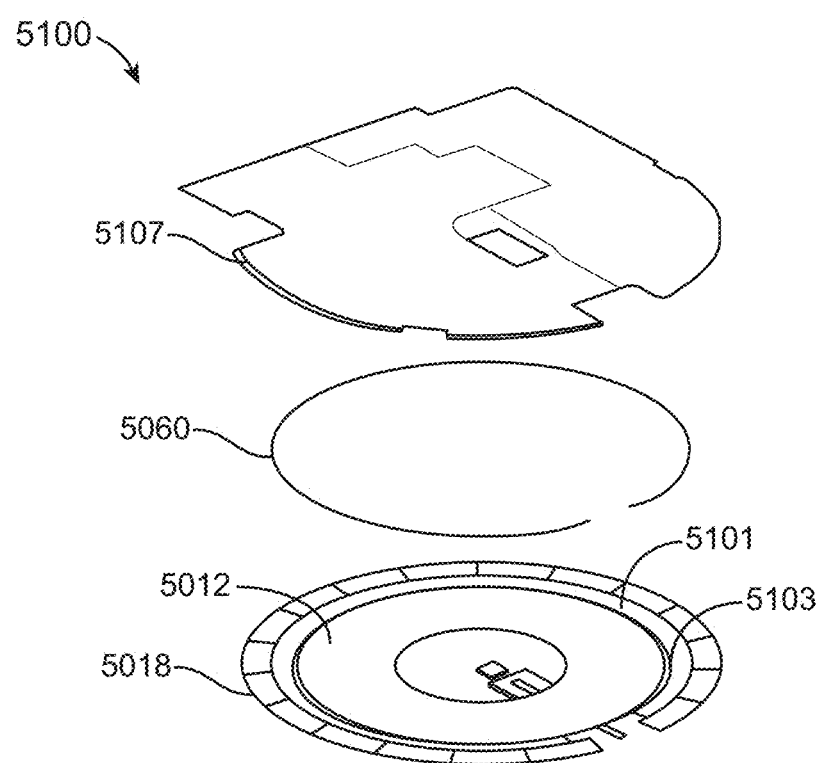
FIG. 51 shows an exploded view of a wireless charging and alignment assembly for a portable electronic device incorporating an NFC reader according to some embodiments.

FIG. 51 shows an exploded view of a wireless charging and alignment assembly 5100 for a portable electronic device incorporating an NFC reader according to some embodiments. Wireless charging and alignment assembly 5100 can include wireless receiver coil assembly 5012 and secondary annular magnetic alignment component 5018. Wireless receiver coil assembly 5012 and secondary annular magnetic alignment component 5018 can be disposed on a layer 5101 of a pressure-sensitive adhesive (PSA). In some embodiments, an electric shield 5103 for wireless receiver coil assembly 5012 can be disposed on a portion of PSA layer 5101, e.g., by depositing silver or other conductive material in an appropriate pattern. As is known in the art, electric shield 5103 can block AC electric fields emitted by wireless transmitter coil 5012 during operation while permitting AC magnetic fields to pass through. NFC coil 5060 can be disposed on PSA layer 5101 in the space between the outer edge of electric shield 5103 and the inner edge of secondary annular magnetic alignment component 5018. NFC coil 5060 can be, for example, a single-turn multi-stranded wire coil. An electromagnetic shield assembly 5107 can be disposed over the distal surface of wireless receiver coil assembly 5012, NFC coil 5060, and secondary annular magnetic alignment component 5018, thereby shielding other components of portable electronic device 5004 from electromagnetic fields generated by wireless receiver coil assembly 5012 and NFC coil 5060.

Figure 52:
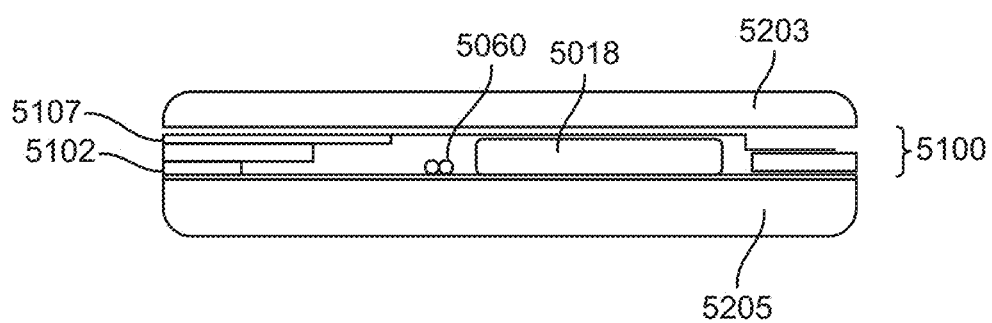
FIG. 52 shows a simplified cross-section view of a portion of the portable electronic device of FIG. 50 incorporating the assembly of FIG. 51.

FIG. 52 shows a simplified cross-section view of a portion of portable electronic device 5004 of FIG. 50 incorporating assembly 5104 of FIG. 51. As shown, wireless charging and alignment assembly 5100 can be disposed between a front housing 5203 and a back housing 5205 of portable electronic device 5001. In some embodiments, front housing 5203 can be or incorporate a touchscreen display. Back housing 5205 can be made of glass or plastic or any other material that does not interfere with wireless power or data transfer or with the magnetic fields of the annular alignment components such as secondary annular alignment component 5012. Assembly 5100 can be oriented with PSA layer 5101 and electric shield 5103 toward back housing 5205 and shield assembly 5107 toward front housing 5203 to enable wireless charging through back housing 5205.

It should be understood that portable electronic device 5004 is illustrative and that variations and modifications are possible. An assembly such as wireless charging and alignment assembly 5104 can be incorporated into a variety of electronic devices. In some embodiments, NFC coil 5060 and an NFC reader circuit coupled thereto are dedicated to identifying accessory devices having a primary magnetic alignment component that is complementary to secondary magnetic alignment component 5018, and portable electronic device 5004 can include one or more other NFC coils and associated circuitry for other applications involving NFC technology (such as point-of-sale payment transactions).

5.2. Wireless Charger Device with NFC Tag Circuit

In some embodiments, an NFC tag may be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 53:
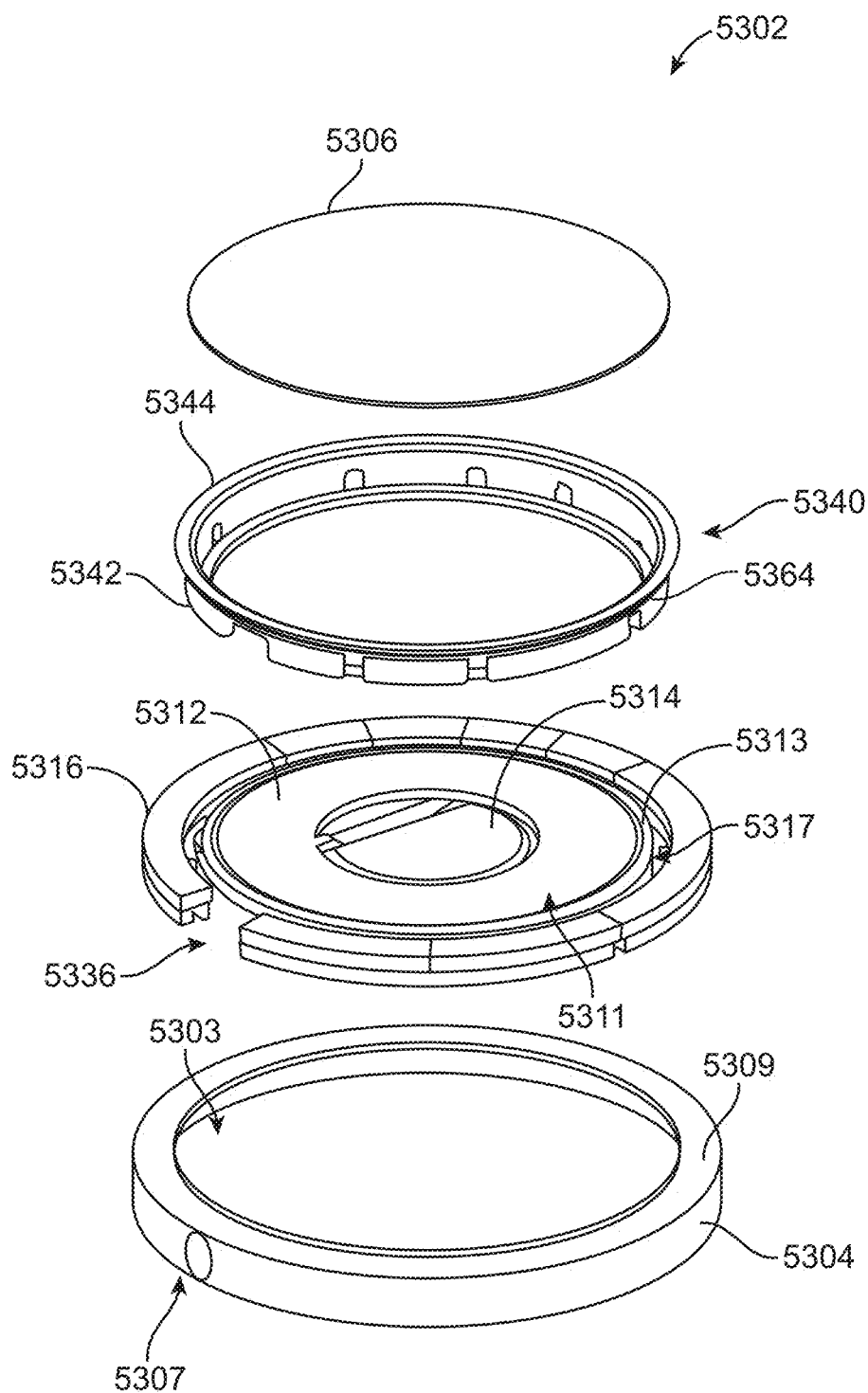
FIG. 53 shows an exploded view of a wireless charger device incorporating an NFC tag circuit according to some embodiments.
Figure 54A:
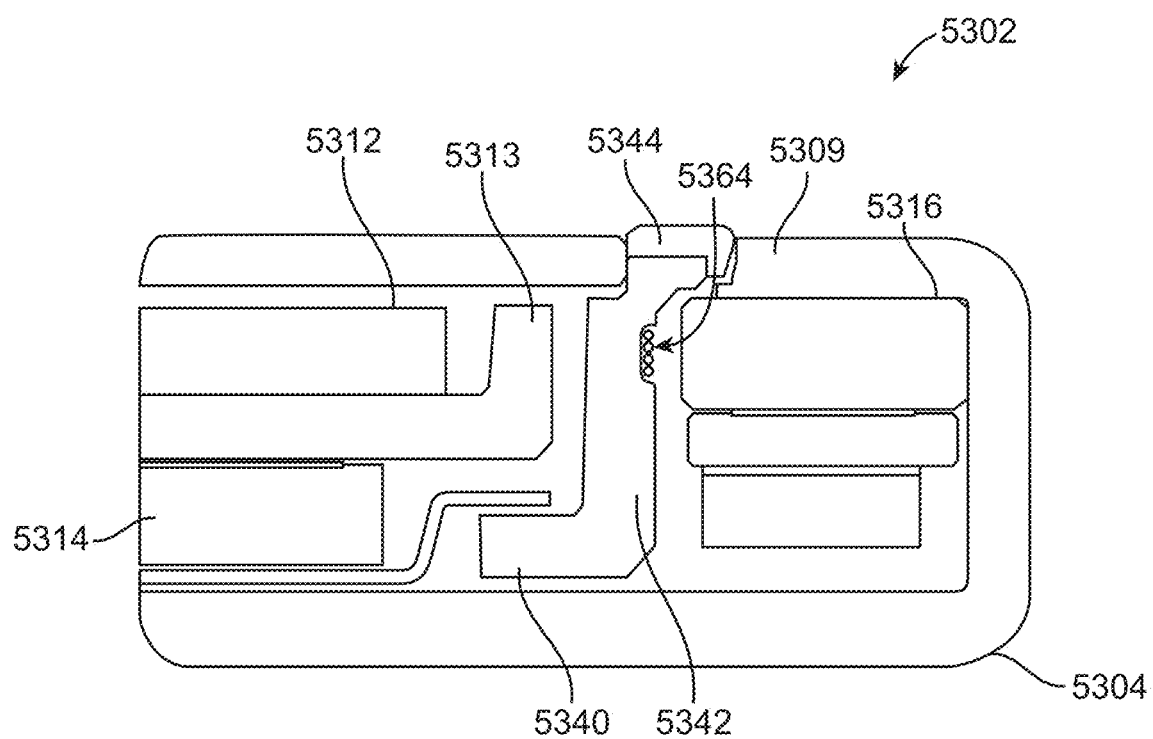
FIGS. 54A and 54B show partial cross-section views of wireless charger device according to some embodiments.

FIG. 53 shows an exploded view of a wireless charger device 5302 incorporating an NFC tag according to some embodiments, and FIG. 54A shows a partial cross-section view of wireless charger device 5302 according to some embodiments. As shown in FIG. 53, wireless charger device 5302 can include an enclosure 5304, which can be made of plastic or metal (e.g., aluminum), and a charging surface 5306, which can be made of silicone, plastic, glass, or other material that is permeable to AC and DC magnetic fields. Charging surface 5306 can be shaped to fit within a circular opening 5303 at the top of enclosure 5304.

A wireless transmitter coil assembly 5311 can be disposed within enclosure 5304. Wireless transmitter coil assembly 5311 can include a wireless transmitter coil 5312 for inductive power transfer to another device as well as AC magnetic and/or electric shield(s) 5313 disposed around some or all surfaces of wireless transmitter coil 5312. Control circuitry 5314 (which can include, e.g., a logic board and/or power circuitry) to control wireless transmitter coil 5312 can be disposed in the center of coil 5312 and/or underneath coil 5312. In some embodiments, control circuitry 5314 can operate wireless transmitter coil 5312 in accordance with a wireless charging protocol such as the Qi protocol or other protocols.

A primary annular magnetic alignment component 5316 can surround wireless transmitter coil assembly 5311. Primary annular magnetic alignment component 5316 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above in sections 1 and 3.) In some embodiments, the diameter and thickness of primary annular magnetic alignment component 5316 is chosen such that arcuate magnet sections of primary annular magnetic alignment component 5316 fit under a lip 5309 at the top surface of enclosure 5304, as best seen in FIG. 54A. For instance, each arcuate magnet section can be inserted into position under lip 5309, either before or after magnetizing the inner and outer regions. In some embodiments, primary annular magnetic alignment component 5316 can have a gap 5336 between two adjacent arcuate magnet sections. Gap 5336 can be aligned with an opening 5307 in a side surface of enclosure 5304 to allow external wires to be connected to wireless transmitter coil 5312 and/or control circuitry 5314.

A support ring subassembly 5340 can include an annular frame 5342 that extends in the axial direction and a friction pad 5344 at the top edge of frame 5342. Friction pad 5344 can be made of a material such as silicone or thermoplastic elastomers (TPE) such as thermoplastic urethane (TPU) and can provide support and protection for charging surface 5306. Frame 5342 can be made of a material such as polycarbonate (PC), glass-fiber reinforced polycarbonate (GFPC), or glass-fiber reinforced polyamide (GFPA). Frame 5342 can have an NFC coil 5364 disposed thereon. For example, NFC coil 5364 can be a four-turn or five-turn solenoidal coil made of copper wire or other conductive wire that is wound onto frame 5342. NFC coil 5364 can be electrically connected to NFC tag circuitry (not shown) that can be part of control circuitry 5314. The relevant design principles of NFC circuits are well understood in the art and a detailed description is omitted. Frame 5342 can be inserted into a gap region 5317 between primary annular magnetic alignment component 5316 and wireless transmitter coil assembly 5311. In some embodiments, gap region 5317 is shielded by AC shield 5313 from AC electromagnetic fields generated in wireless transmitter coil 5312 and is also shielded from DC magnetic fields of primary annular magnetic alignment component 5316 by the closed-loop configuration of the arcuate magnet sections.

Figure 54B:
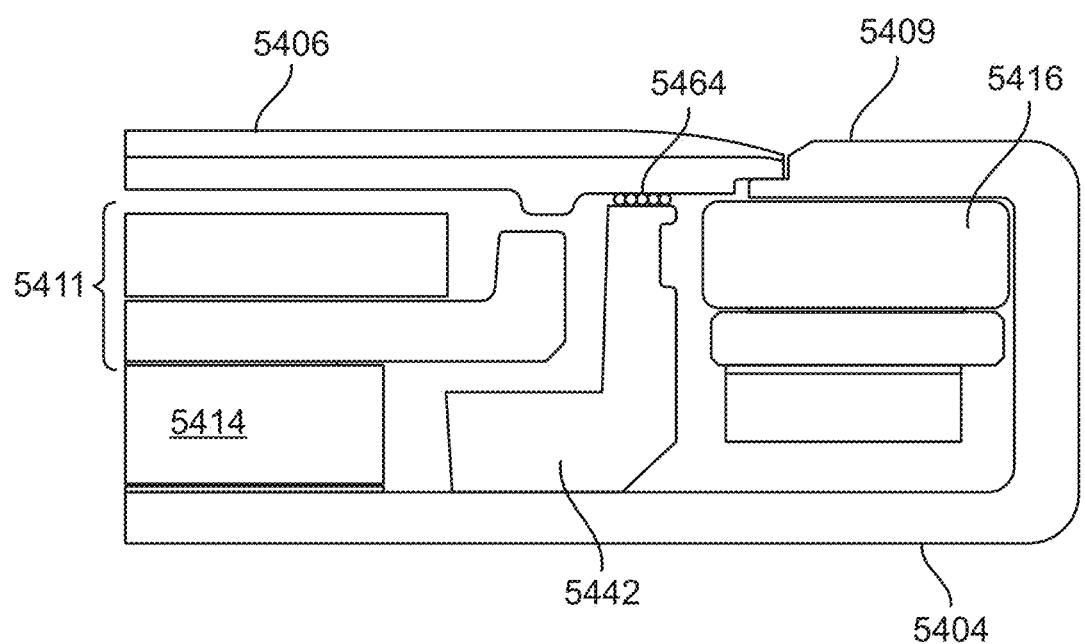

FIG. 54B shows a partial cross-section view of another wireless charger device 5402 according to some embodiments. Wireless charger device 5402 can be generally similar to wireless charger device 5302 of FIGS. 53 and 54A. For example, wireless charger device 5402 can include an enclosure 5404, which can be made of plastic or metal (e.g., aluminum), and a charging surface 5406, which can be made of silicone, plastic, glass, or other material that is permeable to AC and DC magnetic fields. Charging surface 5406 can be shaped to fit within a circular opening at the top of enclosure 5404. A wireless transmitter coil assembly 5411 can be disposed within enclosure 5304. Wireless transmitter coil assembly 5411 be similar or identical to wireless transmitter coil assembly 5311. Control circuitry 5414, which can be similar or identical to control circuitry 5314 can be disposed, e.g., under coil assembly 5411.

A primary annular magnetic alignment component 5416 can surround wireless transmitter coil assembly 5411. Primary annular magnetic alignment component 5416 can be similar or identical to primary annular magnetic alignment component 5316. In some embodiments, the diameter and thickness of primary annular magnetic alignment component 5416 is chosen such that arcuate magnet sections of primary annular magnetic alignment component 5416 fit under a lip 5409 at the top surface of enclosure 5404, similarly to the arrangement shown in FIG. 54A.

A support frame 5442 can extend between enclosure 5404 and top cap 5406. Support ring subassembly can be made of a material such as polycarbonate (PC), glass-fiber reinforced polycarbonate (GFPC), or glass-fiber reinforced polyamide (GFPA). Frame 5442 can have an NFC coil 5464 disposed thereon on an upper surface thereof. For example, NFC coil 5464 can be a four-turn or five-turn planar coil made of concentric turns of copper wire or other conductive wire that is wound onto frame 5442. (Alternatively, a solenoidal wound NFC coil similar to coil 5364 can be used.) NFC coil 5464 can be electrically connected to NFC tag circuitry (not shown) that can be part of control circuitry 5414. Frame 5442 can be inserted into a gap region between primary annular magnetic alignment component 5416 and wireless transmitter coil assembly 5411. In some embodiments, gap region 5417 is shielded by AC shield 5413 from AC electromagnetic fields generated in wireless transmitter coil 5412 and is also shielded from DC magnetic fields of primary annular magnetic alignment component 5416 by the closed-loop configuration of the arcuate magnet sections.

5.3. Accessory Device with NFC Tag Circuit

As described above in section 3, an accessory device such as a case for a mobile phone may include an auxiliary magnetic alignment component, with or without a wireless charging coil. The auxiliary magnetic alignment component can act as a "repeater" to support the use of a primary magnetic alignment component and a secondary alignment component to align the wireless charging transmitter coil of a charger device with the wireless charging receiver coil of a portable electronic device while the portable electronic device is attached to (e.g., inserted into) the accessory device.

In some embodiments, an NFC tag circuit and coil may be incorporated into an accessory device having an auxiliary magnetic alignment component. The NFC tag can be read by the NFC reader of the portable electronic device (e.g., using NFC coil 5060 and associated NFC reader circuit of portable electronic device 5004 as described above), allowing the portable electronic device to identify the accessory device when the accessory device is in proximity and aligned with the portable electronic device.

Figure 55:
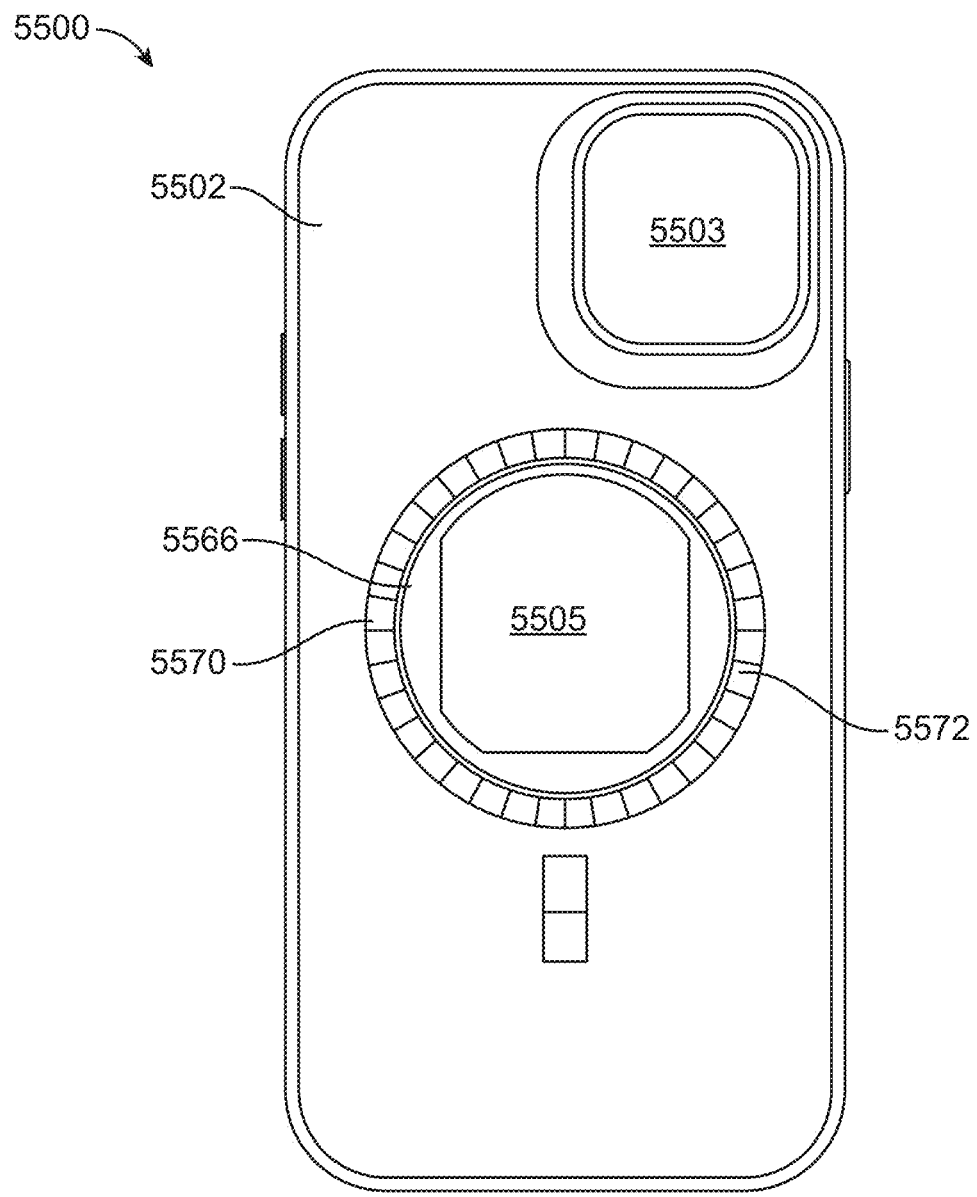
FIG. 55 shows an example of an accessory device incorporating an auxiliary alignment component with an NFC tag circuit and coil according to some embodiments.

FIG. 55 shows an example of an accessory device 5500 incorporating an auxiliary alignment component with an NFC tag circuit and coil according to some embodiments. Accessory device 5500 can be, for example, a case for portable electronic device 5004 (which can be, e.g., a smart phone). Accessory device 5500 can be shaped as a tray, sleeve, or other form factor as desired that covers and protects one or more surfaces of portable electronic device 5004. In particular, accessory device 5500 can have a rear (or back) panel 5502 that covers the rear surface of portable electronic device 5004. It should be understood that rear panel 5502 need not cover the entire rear surface of portable electronic device 5004; for example, a cutout area 5503 can be provided to expose a rear camera lens of portable electronic device 5004.

Rear surface 5502 can include an auxiliary annular magnetic alignment component 5570. Auxiliary annular magnetic alignment component 5570 can include a number of arcuate magnets 5572 arranged in an annular configuration as shown. Each arcuate magnet 5572 can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above in section 3.) Auxiliary annular magnetic alignment component 5570 can align with secondary annular magnetic alignment component 5018 of electronic device 5002.

Figure 56:
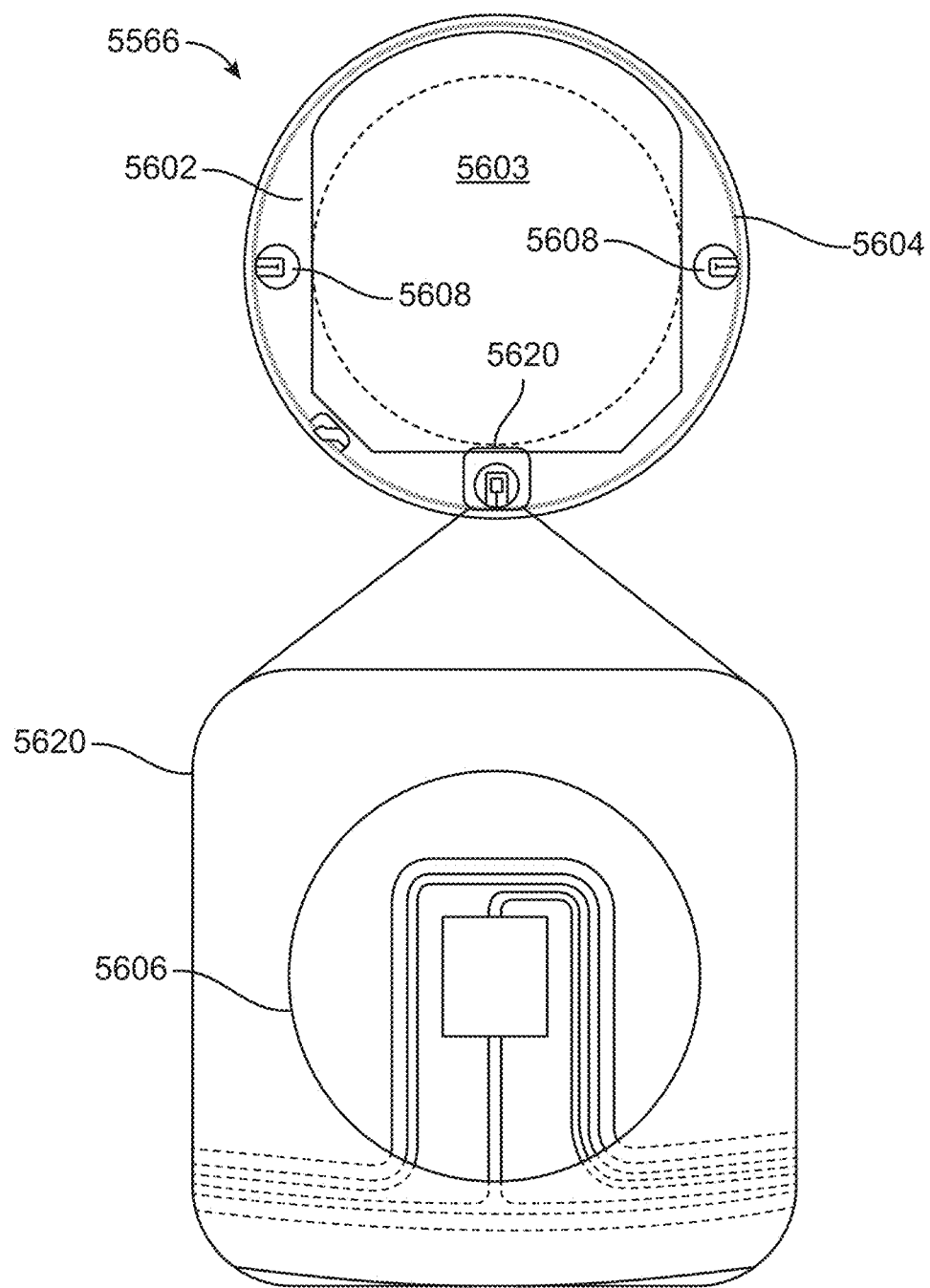
FIG. 56 shows a more detailed view of an NFC tag circuit assembly according to some embodiments.

An NFC tag circuit assembly 5566 can be disposed inboard of auxiliary annular magnetic alignment component 5316. In some embodiments, all or part of region 5505 of rear surface 5502, inboard of NFC tag circuit assembly 5566, can be a cutout area. FIG. 56 shows a more detailed view of NFC tag circuit assembly 5566 according to some embodiments. NFC tag circuit assembly 5566 can include a printed circuit on a printed circuit board (PCB) 5602 (which can be, e.g., a flexible PCB) having a circular outer perimeter that fits within the inner diameter of auxiliary annular magnetic alignment component 5572 as shown in FIG. 55. In some embodiments, PCB 5602 can be a disc. In other embodiments, PCB 5602 can have a central opening 5603, which can have various shapes. In some embodiments, the size of opening 5603 can be based on the area needed to accommodate NFC tag circuit components.

An NFC antenna coil 5604 can be disposed on a peripheral portion of PCB 5602 NFC antenna coil 5604 can be an etched planar coil on PCB 5602 and can include, e.g., four or five turns of copper or other electrically conductive material. NFC antenna coil 5604 can be coupled to an NFC tag chip 5606 (shown in inset 5620) and capacitors 5608, which can be disposed on PCB 5602 inward of NFC antenna coil 5604. NFC tag chip 5606 can be, for example, a passively powered NFC tag chip or other passively powered NFC tag circuit that is compatible with the NFC reader of a portable electronic device. Capacitors 5608 can be, for example, multilayer ceramic capacitors that support operation of NFC tag chip 5606. A particular selection and configuration of supporting capacitors depends on the NFC tag chip and coil configuration; the relevant design principles of NFC circuits are well understood in the art and a detailed description is omitted.

Figure 57:
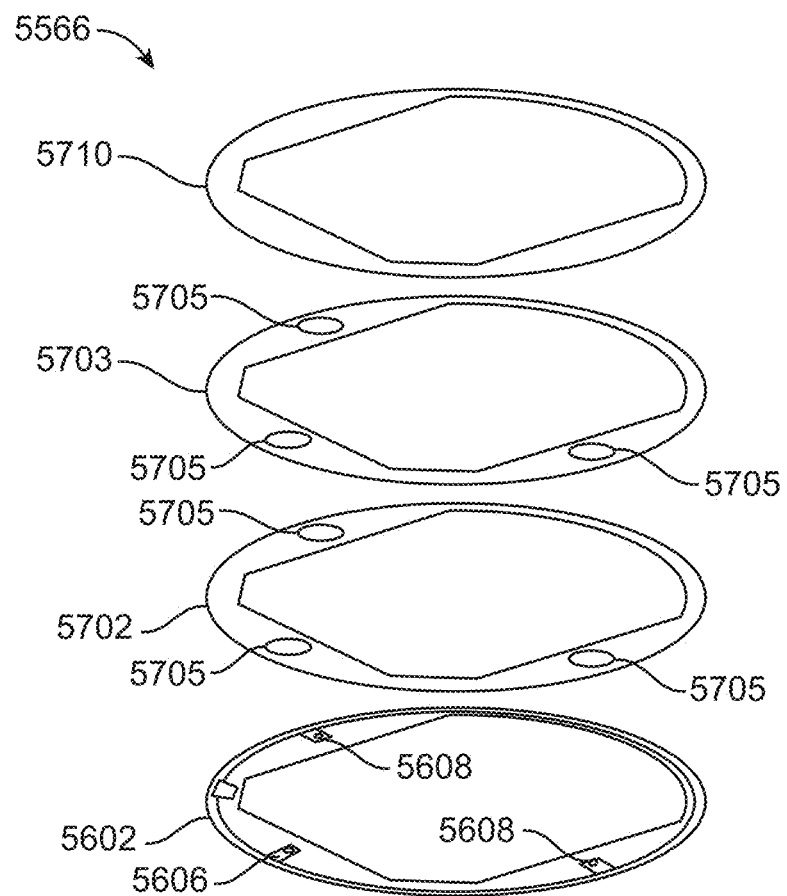
FIG. 57 shows an exploded view of an NFC tag circuit assembly according to some embodiments.

In general, NFC tag circuit 5606 and capacitors 5608 have height that extends above PCB 5602. To provide a flat profile for NFC tag circuit assembly 5566, additional tape layers may be added to PCB 5602. FIG. 57 shows an exploded view of NFC tag circuit assembly 5566 including tape layers stacked on PCB 5602 to provide uniform height according to some embodiments. PCB 5602 is shown at the bottom. Tape layers 5702 and 5703 can each be layers of polyester tape (PET) with a pressure-sensitive adhesive (PSA), and each layer can be, e.g., about 150 µm thick. As shown, each of tape layers 5702 and 5703 can be shaped to match the shape of PCB 5602 and may have holes 5705 therethrough to accommodate the height of NFC tag chip 5606 and capacitors 5608. The sum of the thicknesses of tape layers 5702 and 5703 can equal or exceed the height of NFC tag chip 5606 and capacitors 5608. (While two tape layers are shown, it should be understood that any number of tape layers can be used depending on the thickness of the tape layers and the height of the NFC circuit components.) Top layer 5710 can be, e.g., PSA, and need not have holes therethrough. In some embodiments, the total height of NFC tag circuit assembly 5566 can be less than half a millimeter.

Figure 58:
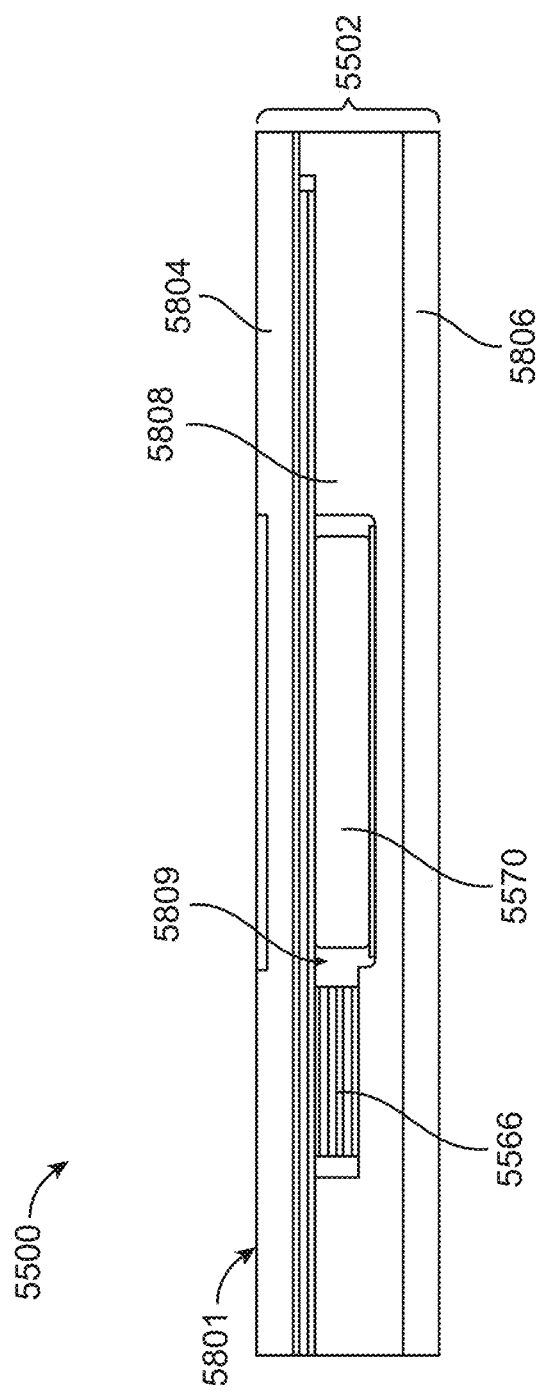
FIG. 58 shows a partial cross section view of an accessory according to some embodiments.

FIG. 58 shows a partial cross section view of charge-through accessory 5500 of FIG. 55 incorporating NFC tag circuit assembly 5566 and auxiliary alignment component 5570 according to some embodiments. Charge-through accessory 5500 can be, e.g., a tray or other case for a portable electronic device, and the portion shown in FIG. 58 can form part of rear panel 5502 of charge-through accessory 5500. (A back surface of a portable electronic device can be positioned adjacent to surface 5801.) Rear panel 5502 can have an internal structure with an inner layer 5804 and an outer layer 5806, which can be made of or incorporate silicone, plastic, leather, or other materials that are permeable to DC and AC magnetic fields. In some embodiments, inner layer 5804 and outer layer 5806 provide flat surfaces for rear panel 5502. A central layer 5808 can be disposed between inner layer 5804 and outer layer 5806. Central layer 5808 can define a recess region 5809 to accommodate NFC tag circuit assembly 5566 and an auxiliary annular magnetic alignment component 5870. Auxiliary annular magnetic alignment component 5870 can be similar or identical to auxiliary annular magnetic alignment component 5570 or other examples described above. As shown, the height of NFC tag circuit assembly 5566 can be less than or equal to the height of auxiliary alignment component 5870, and recess region 5809 can be shaped appropriately.

As shown in FIG. 56, NFC tag circuit assembly 5566 extends inward from NFC coil 5604 to provide space for NFC tag chip 5606 and capacitors 5608. Since both NFC tag circuit assembly 5566 and auxiliary annular magnetic alignment component 5570 include opaque elements, it is not possible to make all portions of rear panel 5502 of accessory 5500 transparent to reveal the rear surface of a portable electronic device held in accessory 5500. For esthetic purposes it may be desirable to minimize the width of the non-transparent region of rear panel 5502.

Figure 59:
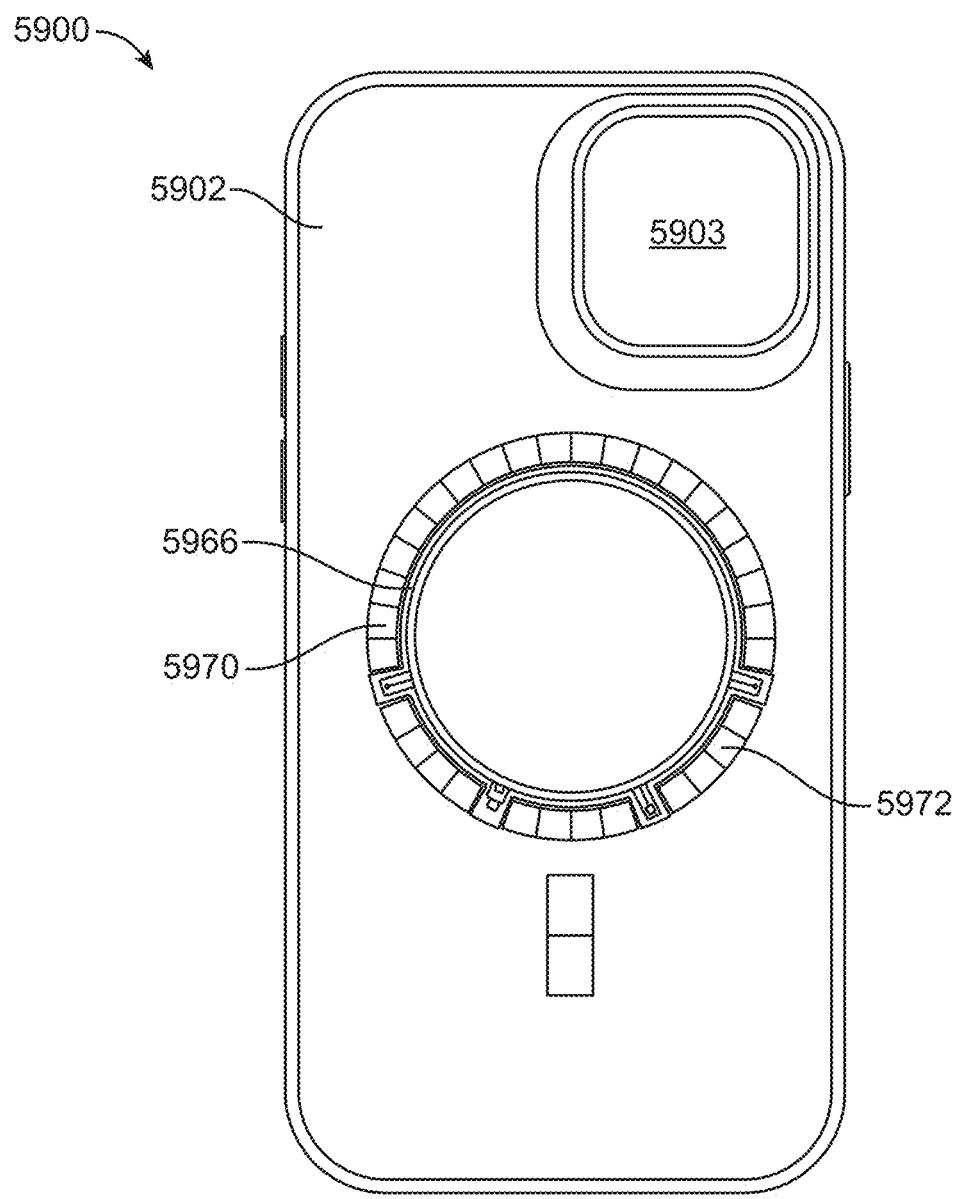
FIG. 59 shows an example of another accessory device according to some embodiments.

FIG. 59 shows an example of another accessory device 5900 having an auxiliary alignment component with an NFC tag circuit and coil according to some embodiments. Accessory device 5900 can be, for example, a case for portable electronic device 5004 (which can be, e.g., a smart phone). Like accessory device 5500 described above, accessory device 5900 can be shaped as a tray, sleeve, or other form factor as desired that covers and protects one or more surfaces of portable electronic device 5004. In particular, accessory device 5900 can have a rear (or back) panel 5902 that covers the rear surface of portable electronic device 5004. It should be understood that rear panel 5902 need not cover the entire rear surface of portable electronic device 5004; for example, a cutout area 5903 can be provided to expose a rear camera lens of portable electronic device 5004.

Rear panel 5902 can include an auxiliary annular magnetic alignment component 5970 and an NFC tag circuit assembly 5966. Auxiliary annular magnetic alignment component 5970 can include a number of arcuate magnets 5972 arranged in an annular configuration as shown. Each arcuate magnet 5972 can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above with reference to section 3.) Auxiliary annular magnetic alignment component 5970 can align with secondary annular magnetic alignment component 5018 of portable electronic device 5002.

Figure 60:
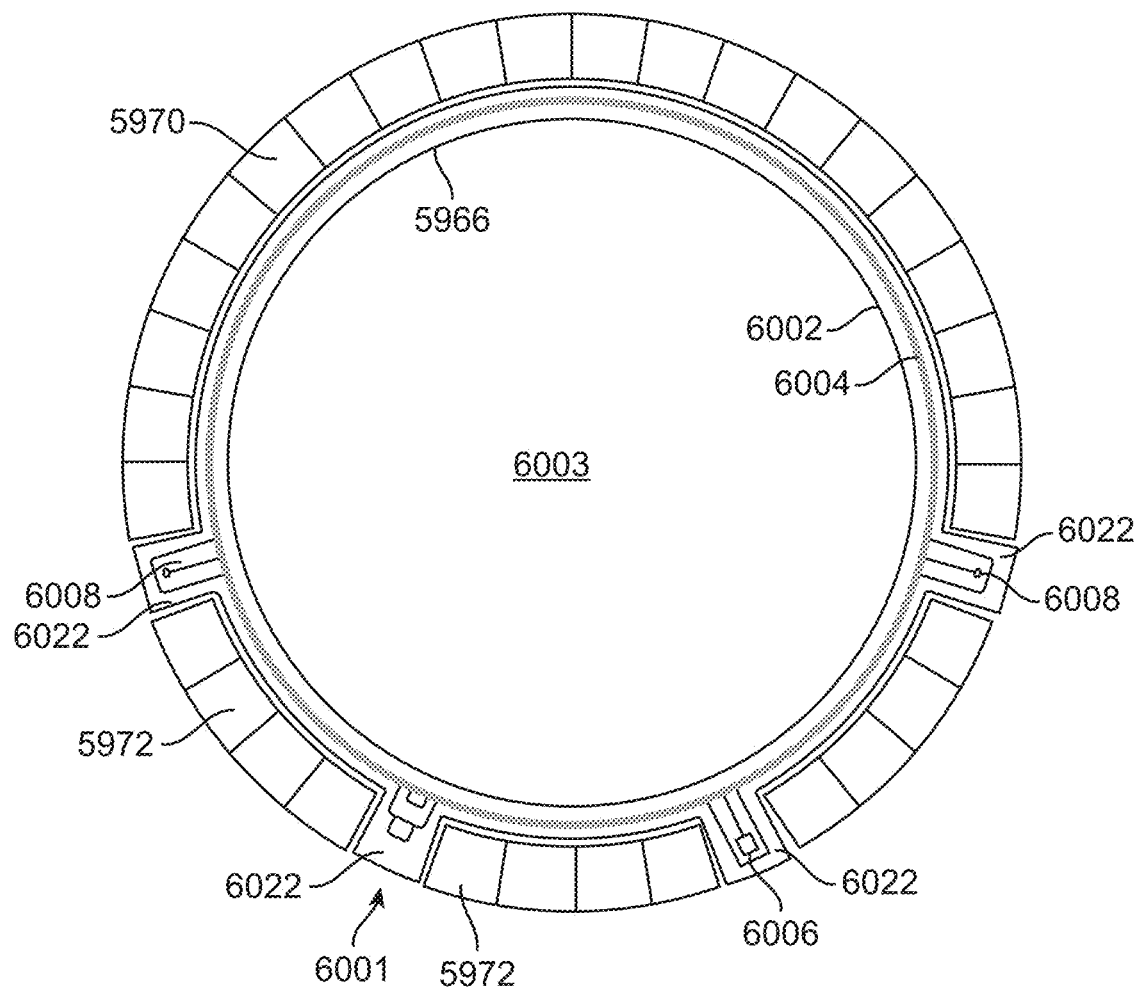
FIG. 60 shows an enlarged view of an auxiliary annular magnetic alignment component and NFC tag circuit assembly according to some embodiments.

FIG. 60 shows an enlarged view of auxiliary annular magnetic alignment component 5970 and NFC tag circuit assembly 5966 of FIG. 59 according to some embodiments. Annular alignment component 5970 can include a number of arcuate magnets 5972 arranged in an annular configuration, with gaps 6001 between selected pairs of adjacent magnets 5972. In the example shown, each gap 6001 can be created by omitting an arcuate magnet 5972. Other techniques, examples of which are described above, can be used to create gaps 6001. Gaps 6001 can accommodate components of NFC tag circuit assembly 5966, which can reduce the inward extension of NFC tag circuit assembly 5966 and increase the component-free area in center region 6003.

NFC tag circuit assembly 5966 can include a printed circuit on a PCB 6002 (e.g., a flexible PCB) having a circular inner perimeter and a circular outer perimeter with projections 6022 that extend into gaps 6001 in annular magnetic alignment component 5970. An NFC antenna coil 6004 can be disposed on the circular portion of PCB 6002. NFC antenna coil 6004 can be an etched planar coil on PCB 6002 or a wound wire coil and can include, e.g., four or five turns of copper or other electrically conductive material. NFC antenna coil 6004 can be coupled to an NFC tag chip 6006 and capacitors 6008, each of which can be disposed on a different one of projections 6022 of PCB 6002 between magnets 5972 of annular alignment component 5970. NFC tag chip 6006 and capacitors 6008 can include standard NFC tag circuit components as described above. As can be seen, PCB 6002 can add less to the width of auxiliary annular alignment component 5970 than PCB 5602 of FIG. 56. The narrower opaque assembly may be esthetically desirable in instances where rear panel 5902 of accessory 5900 is generally made of transparent material and/or in instances where the region 6003 inboard of NFC tag circuit assembly 5966 provides a hole through rear panel 5902.

Figure 61:
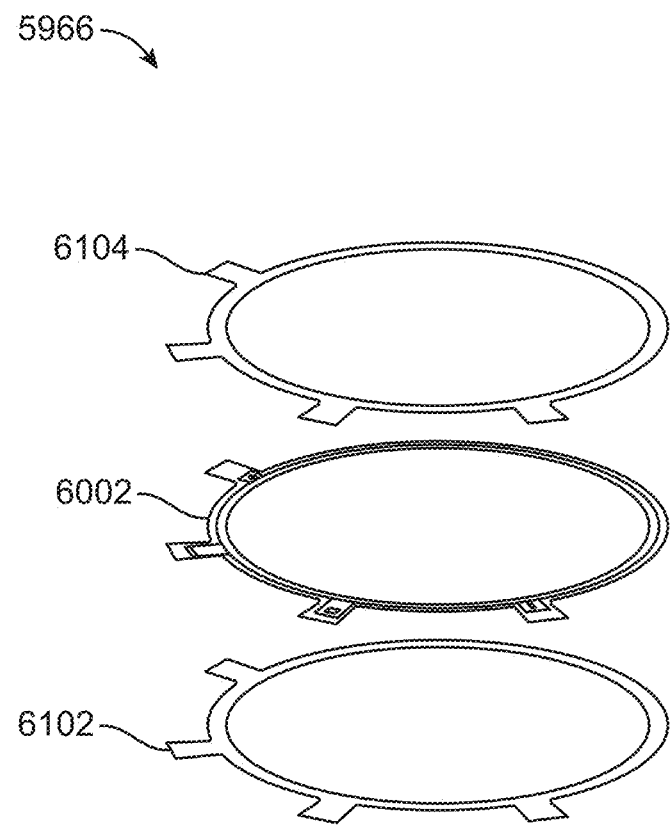
FIG. 61 shows an exploded view of an NFC tag circuit assembly according to some embodiments.

FIG. 61 shows an exploded view of NFC tag circuit assembly 5966 according to some embodiments. PCB 6002 can have a layer of PSA underneath and a tape layer 6104 on top. Tape layer 6104 can be a layer of PET with a PSA. In some embodiments, magnets 5972 of annular alignment component 5960 provide uniform height, and tape layer 6104 can overlie and encapsulate NFC tag chip 6006 and capacitors 6008.

As described above, a portable electronic device can include an annular magnetic alignment component and an NFC reader circuit, while each accessory device can include an annular magnetic alignment component and an NFC tag circuit. The NFC reader and tag circuits can be arranged such that, when the portable electronic device is brought into alignment with one or more accessory devices, the NFC reader circuit in the portable electronic device is brought into near enough proximity to the NFC tag circuit(s) of the accessory device(s) to allow the NFC reader circuit to read the NFC tag(s), thereby allowing the portable electronic device to identify the accessory device(s). The NFC tag circuits can be passive tags that are energized by the near-field of the NFC reader coil, so that an accessory device incorporating an NFC tag circuit need not have its own power supply.

Figure 62:
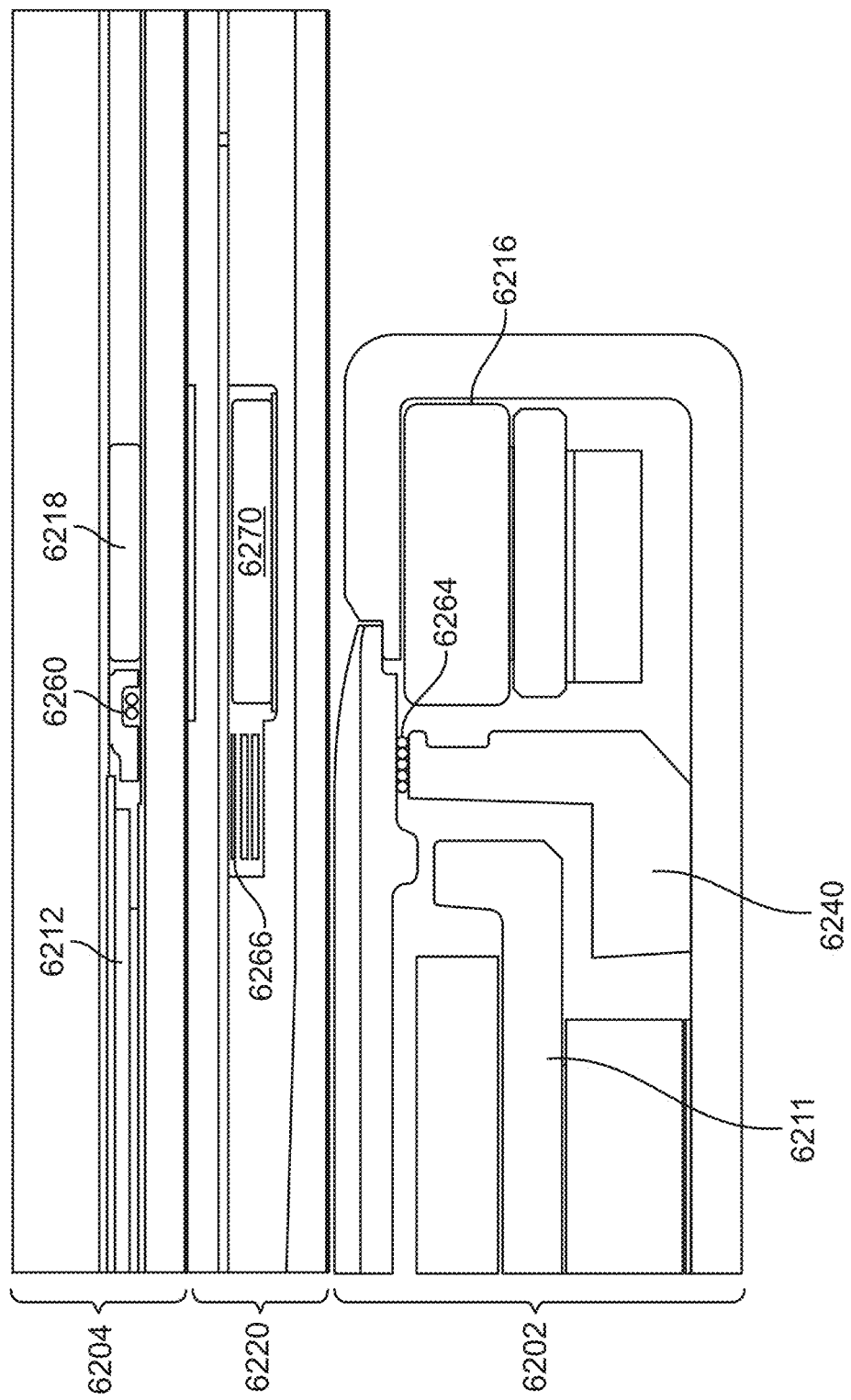
FIG. 62 shows a simplified partial cross-section view of a system that includes a wireless charger device, a portable electronic device, and an accessory device according to some embodiments.

FIG. 62 shows a simplified partial cross-section view of a system 6200 that includes a wireless charger device 6202, a portable electronic device 6204, and an accessory device 6220 according to some embodiments. Portable electronic device 6204 includes a secondary annular magnetic alignment component 6218 (which can be similar or identical to secondary magnetic alignment component 5018), a wireless receiver coil assembly 6212 (which can be similar or identical to wireless receiver coil assembly 5012 described above), and NFC coil 6260 (which can be similar to NFC coil 5060 described above) that connects to an NFC reader circuit (not shown). NFC coil 6260 can be disposed between secondary annular magnetic alignment component 6218 and wireless receiver coil assembly 6212.

Wireless charger device 6202 includes a primary annular magnetic alignment component 6216 (which can be similar or identical to primary annular magnetic alignment component 5316 described above), a wireless transmitter coil assembly 6211 (which can be similar to wireless transmitter coil assembly 5311 described above), and NFC tag circuit assembly 6240, which can be similar to support ring subassembly 5340 described above and can include NFC coil 6264 and an associated NFC tag circuit (not shown). NFC coil 6264 can be disposed between primary annular alignment component 6216 and wireless transmitter coil assembly 6211.

Accessory device 6220 includes an auxiliary annular magnetic alignment component 6270 (which can be similar or identical to auxiliary annular magnetic alignment component 5570 described above) and an NFC tag circuit assembly 6266, which can be similar or identical to NFC tag circuit assembly 5566 or NFC tag circuit assembly 5966 described above. NFC tag circuit assembly 6266 can be disposed inboard of auxiliary annular magnetic alignment component 6270.

Wireless charger device 6202 includes a primary annular magnetic alignment component 6216 (which can be similar or identical to primary annular magnetic alignment component 5316 described above), a wireless transmitter coil assembly 6211 (which can be similar to wireless transmitter coil assembly 5311 described above), and NFC tag circuit assembly 6240, which can be similar to support ring subassembly 5340 described above and can include NFC coil 6264 and an associated NFC tag circuit (not shown). NFC coil 6264 can be disposed between primary annular alignment component 6216 and wireless transmitter coil assembly 6211.

Accessory device 6220 includes an auxiliary annular magnetic alignment component 6270 (which can be similar or identical to auxiliary annular magnetic alignment component 5570 described above) and an NFC tag circuit assembly 6266, which can be similar or identical to NFC tag circuit assembly 5566 or NFC tag circuit assembly 5966 described above. NFC tag circuit assembly 6266 can be disposed inboard of auxiliary annular magnetic alignment component 6270.

As shown in FIG. 62, NFC coil 6260 of portable electronic device 6204 is in proximity to NFC coil 6266 of accessory device 6220 and to NFC coil 6264 of wireless charger device 6202. Accordingly, portable electronic device 6204 can read the NFC tags of both accessory device 6220 and wireless charger device 6202 whenever either is attached. It should be understood that at different times, accessory device 6220 may be present while wireless charger device 6202 is absent, or wireless charger device 6202 may be present while accessory device 6220 is absent. At any given time, portable electronic device 6204 can read the NFC tag of any device that happens to be present and aligned with secondary annular magnetic alignment component 6216. In some embodiments, portable electronic device 6204 can include a low-power proximity sensor that detects when an accessory device or wireless charger device is brought into alignment, and portable electronic device 6204 can activate its NFC reader circuit in response to a proximity detection event. Specific examples are described below.

Figure 63:
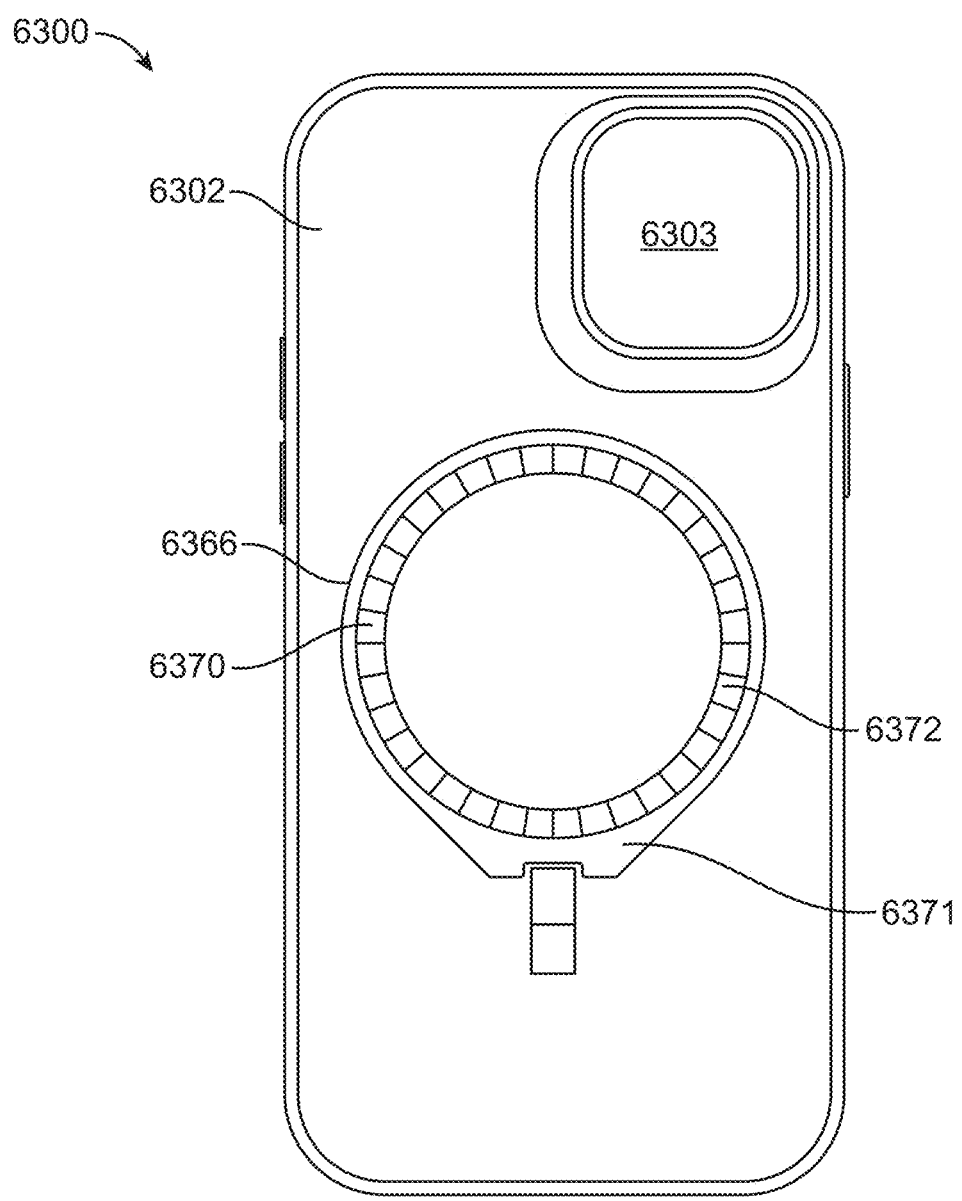
FIG. 63 shows an example of an accessory device having an auxiliary alignment component with an NFC tag circuit and coil according to some embodiments.

In the example of FIG. 62, accessory device 6220 has its NFC coil 6266 disposed inboard of secondary annular alignment component 6270. In some alternative embodiments, an NFC coil of an accessory device can be disposed outboard of the auxiliary annular alignment component. FIG. 63 shows an example of an accessory device 6300 having an auxiliary alignment component with an NFC tag circuit and coil according to some embodiments. Accessory device 6300 can be, for example, a case for portable electronic device 5004 (which can be, e.g., a smart phone). Like accessory devices 5500 and 5900 described above, accessory device 6300 can be shaped as a tray, sleeve, or other form factor as desired that covers and protects one or more surfaces of portable electronic device 5004. In particular, accessory device 6300 can have a rear (or back) panel 6302 that covers the rear surface of portable electronic device 5004. It should be understood that rear panel 6302 need not cover the entire rear surface of portable electronic device 5004; for example, a cutout area 6303 can be provided to expose a rear camera lens of portable electronic device 5004.

Rear panel 6302 can include an auxiliary annular magnetic alignment component 6370 and an NFC tag circuit assembly 6366. Auxiliary annular magnetic alignment component 6370 can include a number of arcuate magnets 6372 arranged in an annular configuration as shown. Each arcuate magnet 6372 can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above in section 3.) Auxiliary annular magnetic alignment component 6370 can align with secondary annular magnetic alignment component 5018 of portable electronic device 5002. NFC tag circuit assembly 6366 can be disposed outboard (i.e., outside the outer perimeter) of auxiliary annular magnetic alignment component 6370. Although not shown in detail, it should be understood that NFC tag circuit assembly 6366 can be constructed similarly to NFC tag circuit assembly 5566 described above. For instance, NFC tag circuit assembly 6366 can include a ring-shaped PCB with an etched NFC coil. A peripheral extension of the PCB (e.g., at region 6371) can provide an area for mounting of NFC tag circuit components (e.g., an NFC tag chip and capacitors).

Figure 64:
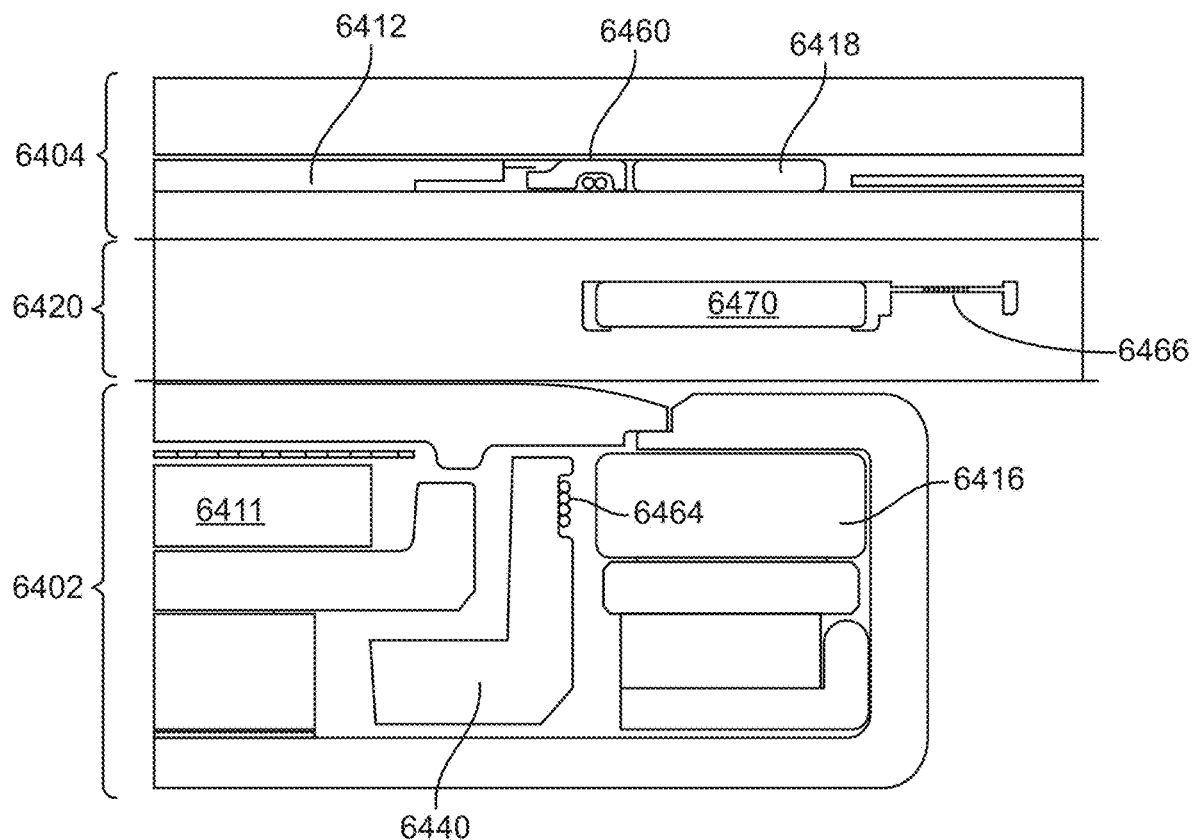
FIG. 64 shows a simplified partial cross-section view of a system that includes a wireless charger device, a portable electronic device, and an accessory device according to some embodiments.

FIG. 64 shows a system 6400 that includes a wireless charger device 6402, a portable electronic device 6404, and an accessory device 6420 according to some embodiments.

Portable electronic device 6404 includes a secondary annular magnetic alignment component 6418 (which can be similar or identical to secondary magnetic alignment component 5018), a wireless receiver coil assembly 6412 (which can be similar or identical to wireless receiver coil assembly 5012 described above), and NFC coil 6460 (which can be similar to NFC coil 5060 described above) that connects to an NFC reader circuit (not shown). NFC coil 6460 can be disposed between secondary annular magnetic alignment component 6418 and wireless receiver coil assembly 6412.

Wireless charger device 6402 includes a primary annular magnetic alignment component 6416 (which can be similar or identical to primary annular magnetic alignment component 5316 described above), a wireless transmitter coil assembly 6411 (which can be similar to wireless transmitter coil assembly 5511 described above), and NFC tag circuit assembly 6440, which can be similar to support ring subassembly 5540 described above and can include NFC coil 6464 and an associated NFC tag circuit (not shown). NFC coil 6464 can be disposed between primary annular alignment component 6416 and wireless transmitter coil assembly 6411.

Accessory device 6420 includes an auxiliary annular magnetic alignment component 6470 (which can be similar or identical to auxiliary annular magnetic alignment component 5570 described above) and an NFC tag circuit assembly 6466, which can be similar or identical to NFC tag circuit assembly 6366 described above; in particular, NFC tag circuit assembly 6466 can be disposed outboard of auxiliary annular magnetic alignment component 6470.

As shown in FIG. 64, NFC coil 6460 of portable electronic device 6404 is in proximity to NFC coil 6466 of accessory device 6420 and to NFC coil 6464 of wireless charger device 6402. Accordingly, portable electronic device 6404 can read the NFC tags of both accessory device 6420 and wireless charger device 6402 whenever either is attached. It should be understood that at different times, accessory device 6420 may be present while wireless charger device 6402 is absent, or wireless charger device 6402 may be present while accessory device 6420 is absent. At any given time, portable electronic device 6404 can read the NFC tag of any device that happens to be present and aligned with secondary annular magnetic alignment component 6416. In some embodiments, portable electronic device 6404 can include a low-power proximity sensor that detects when an accessory device or wireless charger device is brought into alignment, and portable electronic device 6204 can activate its NFC reader circuit in response to a proximity detection event. Specific examples are described below.

5.4. Proximity Detection to Trigger NFC Reader Circuit

Referring again to FIG. 50, as noted above, it may be desirable to selectively trigger the NFC reader circuit in portable electronic device 5004 when a compatible accessory comes into proximity with portable electronic device 5004. Proximity-based triggering of the NFC reader circuit can allow considerable power savings as compared to periodically polling the NFC reader circuit and can also avoid the need for the user to take any action to trigger the NFC reader circuit, other than bringing devices into proximity.

In some embodiments, an electromagnetic sensor can be used to detect when a device having an annular alignment component complementary to secondary annular alignment component 5018 is brought into alignment. For example, a three-axis magnetometer 5080 can be positioned within the rear enclosure of portable electronic device 5004 in an area near secondary annular alignment component 5018 and coupled to control logic located in a main logic board of portable electronic device 5004. Magnetometer 5080 can be a low-power component that can be periodically polled to measure a magnetic field at the location of magnetometer 5080. In particular, based on periodic polling, a "baseline" magnetic field can be established, which can include a contribution from secondary annular alignment component 5018 and from any other devices that are currently aligned with secondary annular alignment component 5018. When a device having an annular magnetic alignment component complementary to secondary annular magnetic alignment component 5018 (e.g., wireless charger device 5302 or accessory device 5500) is brought into alignment with secondary annular magnetic alignment component 5018, the magnetic field at the location of magnetometer 5080 changes abruptly relative to the baseline in a specific and predictable manner. Accordingly, a change in the measured magnetic field (relative to baseline) having a particular magnitude can be used to detect when a device with a complementary magnetic alignment component is brought into proximity with portable electronic device 5004. In some embodiments, the change can be defined as a three-dimensional vector, and detection of a device being brought into proximity can be triggered based on changes in magnitude and/or direction of the field measured by magnetometer 5080. Further, aligning different types of devices may result in different changes in the magnetic field measured by magnetometer 5080. For instance, as shown in FIG. 62, primary annular magnetic alignment component 6216 may be thicker than auxiliary annular magnetic alignment component 6270, and this difference may result in different effects on the magnetic field measured by magnetometer 5080. In addition, the change in magnetic field measured by magnetometer 5018 when a wireless charger device (e.g., wireless charger device 5302) is brought into alignment while portable electronic device 5004 is already aligned with an accessory (e.g., accessory 5500) may be different from the change measured when a wireless charger device (e.g., wireless charger device 5302) is brought into alignment while no accessory is present. Control logic (e.g., logic circuits located on a main logic board of portable electronic device 5500) can periodically (e.g., every few milliseconds or a few times per second) monitor changes in the magnetic field detected by magnetometer 5018 and can determine, based on the changes, whether a device having a complementary magnetic alignment component has been brought into proximity (or, if one such device is already known to be present, whether another such device has also been brought into proximity). In response to determining that a device has been brought into proximity, the control logic can trigger operation of NFC coil 5060 and the associated NFC reader circuit to read an NFC tag that may be present in a newly-proximate device. It should be understood that detachment (or removal from proximity) of an active or passive accessory device can also be detected by detecting changes in the magnetic field measured by magnetometer 5080.

In some embodiments, based on the information in the NFC tag of the aligned device, portable electronic device 5004 may modify some aspect of its behavior. In some embodiments, an NFC tag in an accessory device may indicate a property of the accessory device, such as its color or design style. Portable electronic device 5004 can modify its color scheme or other elements of its user interface accordingly. For instance, portable electronic device 5004 may generate a transient color wash effect on the screen in a color matching the color of the accessory device. As another example, the accessory device may be a sleeve having an opaque front panel, in which a window is provided to expose a portion of the display of portable electronic device 5004, and when portable electronic device is aligned inside the sleeve, portable electronic device 5004 can switch to a mode that displays specific content (e.g., current time or notifications) on the portion of the display that aligns with the window. In some embodiments, the accessory identification may provide context information about the environment in which the accessory is present: for example, a docking accessory may be located in a vehicle or positioned in a particular room, and portable electronic device 5004 can modify its behavior based on the context information (e.g., by switching to an in-vehicle display mode when docked in a vehicle dock). As yet another example, the accessory may be a detachable pack; when portable electronic device 5004 detects (e.g., based on magnetometer signals) that the accessory has been attached or detached, portable electronic device 5004 can store information about the attachment or detachment event (e.g., location information indicating where portable electronic device 5004 was when attachment or detachment occurred). In some embodiments, portable electronic device 5004 can provide the stored information to a user (e.g., providing location information indicating where detachment occurred to assist the user in locating the detached accessory). As a further example, accessory identification may result in portable electronic device 5004 launching a particular app associated with the accessory or unlocking certain functionality of a particular app. It should be understood from these examples that many aspects of device behavior can be modified in response to information received from an NFC tag. As a still further example, if an accessory is identified via its NFC tag as a battery pack but portable electronic device 5004 is unable to draw power from the accessory, portable electronic device 5004 can determine that the battery is dead and can alert the user accordingly. It should be understood that many aspects of behavior of a portable electronic device can be modified in response to detecting that a particular accessory has become attached or detached.

Figure 65:
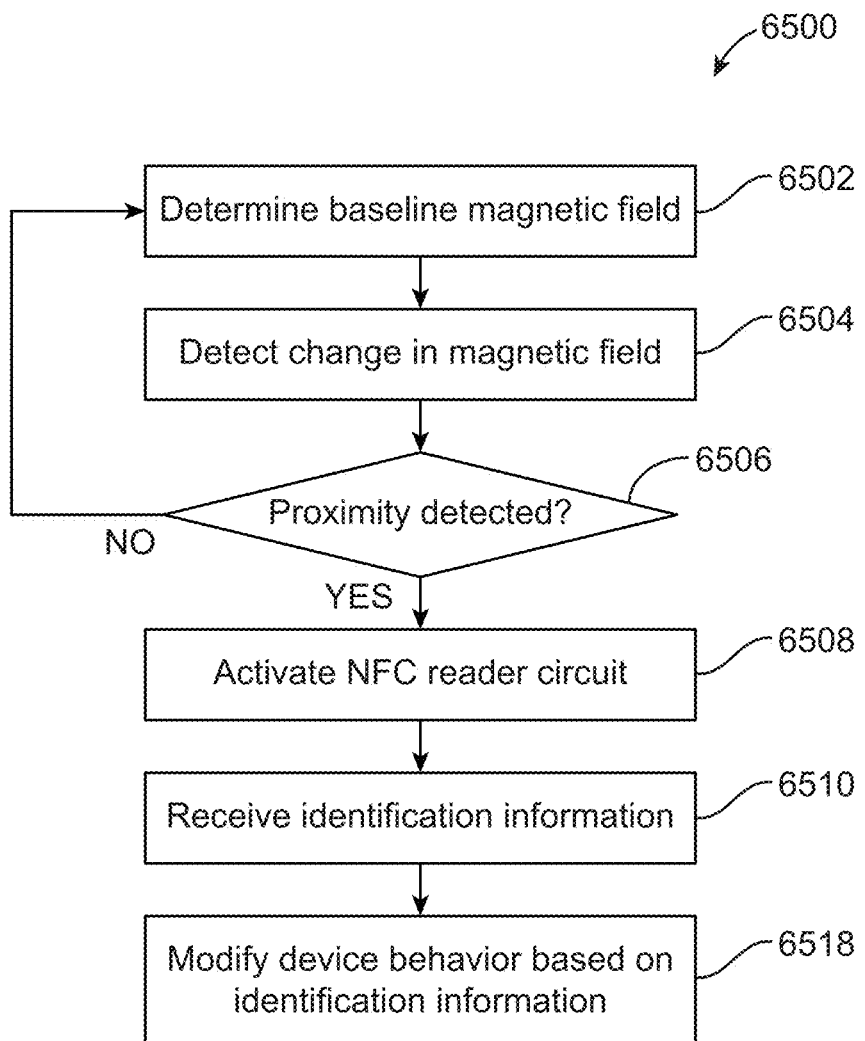
FIG. 65 shows a flow diagram of a process that can be implemented in a portable electronic device according to some embodiments.

FIG. 65 shows a flow diagram of a process 6500 that can be implemented in portable electronic device 5004 according to some embodiments. In some embodiments, process 6500 can be performed iteratively while portable electronic device 5004 is powered on. At block 6502, process 6500 can determine a baseline magnetic field, e.g., using magnetometer 5080. At block 6504, process 6500 can continue to monitor signals from magnetometer 5080 until a change in magnetic field is detected. At block 6506, process 6500 can determine whether the change in magnetic field matches a magnitude and direction of change associated with alignment of a complementary magnetic alignment component. If not, then the baseline magnetic field can be updated at block 6502. If, at block 6506, the change in magnetic field matches a magnitude and direction of change associated with alignment of a complementary alignment component, then at block 6508, process 6500 can activate the NFC reader circuitry associated with NFC coil 5060 to read an NFC tag of an aligned device. In some embodiments, NFC tags associated with different types of devices (e.g., a passive accessory versus an active accessory such as a wireless charger) are tuned to respond to different stimulating signals from the NFC reader circuitry, and information about the particular change in magnetic field can be used to determine a particular stimulating signal to be generated by the NFC reader circuitry. At block 6510, process 6500 can receive identification information read from the NFC tag. At block 6512, process 6500 can modify a behavior of portable electronic device 5004 based on the identification information, for example, generating a color wash effect as described above. After block 6512, process 6500 can optionally return to block 6502 to provide continuous monitoring of magnetometer 5080. It should be understood that process 6500 is illustrative and that other processes may be performed in addition to or instead of process 6500.

It will be appreciated that the NFC tag and NFC reader circuits described above are illustrative and that variations and modifications are possible. For example, coil designs can be modified by replacing wound wire coils with etched coils (or vice versa) and solenoidal coils with flat coils (or vice versa). "Wound wire" coils can be made using a variety of techniques, including by winding a wire, by stamping a coil from a copper sheet and molding plastic over the stamped part, or by using a needle dispenser to deposit wire on a plastic part; the wire can be heated so that it embeds into the softened plastic. Etched coils can be made by coating a surface with metal and etching away the unwanted metal. The number of turns in various NFC coils can be modified for a particular application. The choice of wound wire coils or etched coils for a particular device may depend on various design considerations. For instance, in devices that have an internal logic board, a wound wire NFC coil can terminate to the logic board; where a logic board is absent, an etched coil may simplify termination of the coil. Other design considerations may include the Q factor of the coil (a wound coil can provide higher Q in a smaller space) and/or ease of assembly.

Further, where a device that has an NFC tag circuit also has active circuitry (such as wireless charger devices that have active circuitry to control charging behavior), the NFC tag circuit is not limited to being a passive tag; an active NFC tag circuit can be provided to enable two-way communication with a compatible portable electronic device. For example, active NFC circuits in a portable electronic device and a wireless charger device can be used to support delivery of firmware updates to the wireless charger device.

Proximity-detection techniques can also be varied. For example, a different type of magnetometer (e.g., a single-axis magnetometer) can be used, or multiple magnetometers in different locations relative to the magnetic alignment components can be used. In some embodiments, a Hall effect sensor can be used instead of a magnetometer, although false positives may increase because a Hall effect sensor can generally only indicate a change or no-change rather than measuring a magnitude or direction of change. It should also be understood that proximity detection as described herein can be used for other purposes in addition to or instead of triggering an NFC reader circuit.

6. Example Devices Incorporating Magnetic Alignment Components

6.1. Wireless Charger Devices

Figure 66:
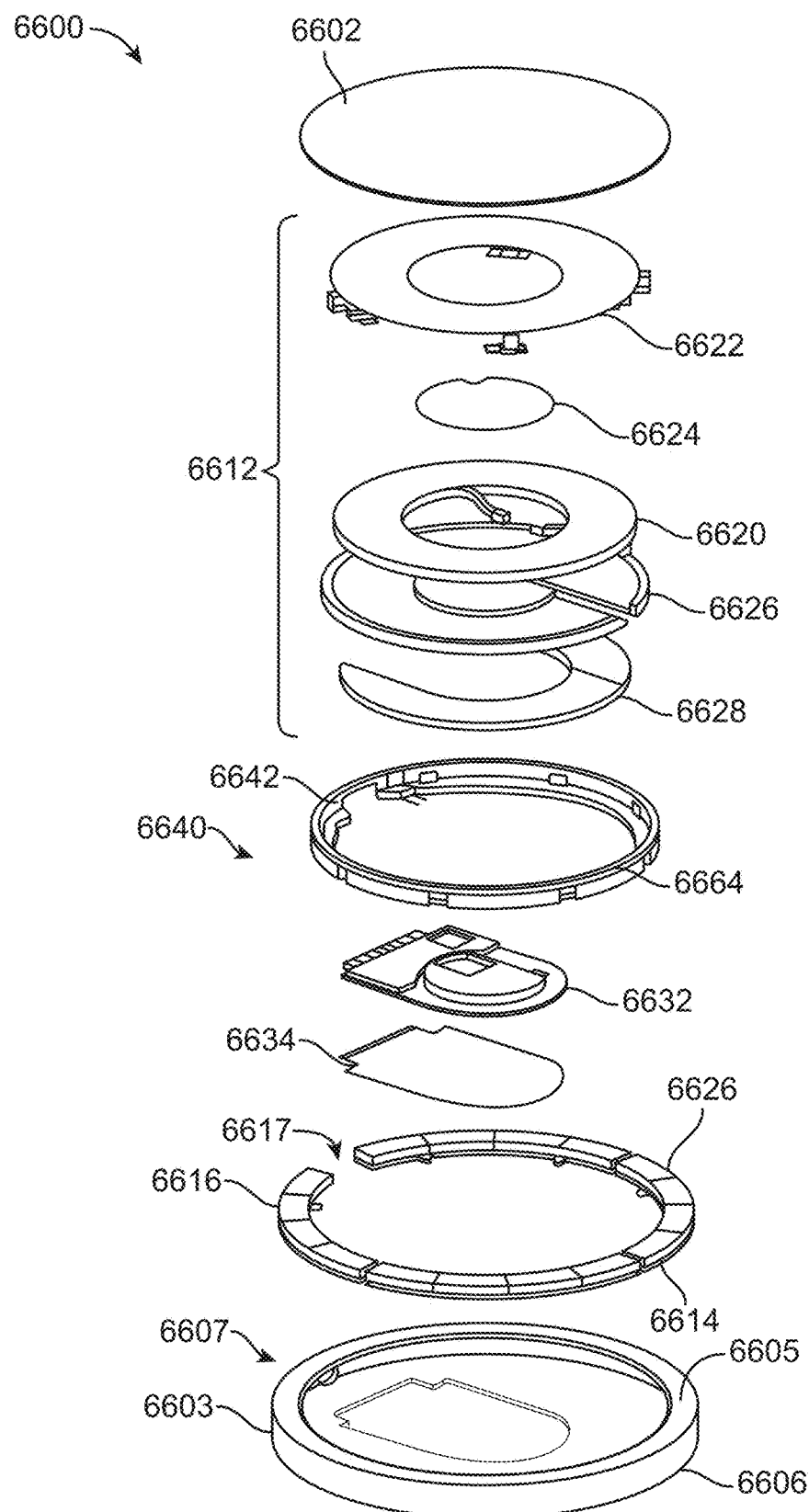
FIG. 66 shows an exploded view of a wireless charger device according to some embodiments.
Figure 67:
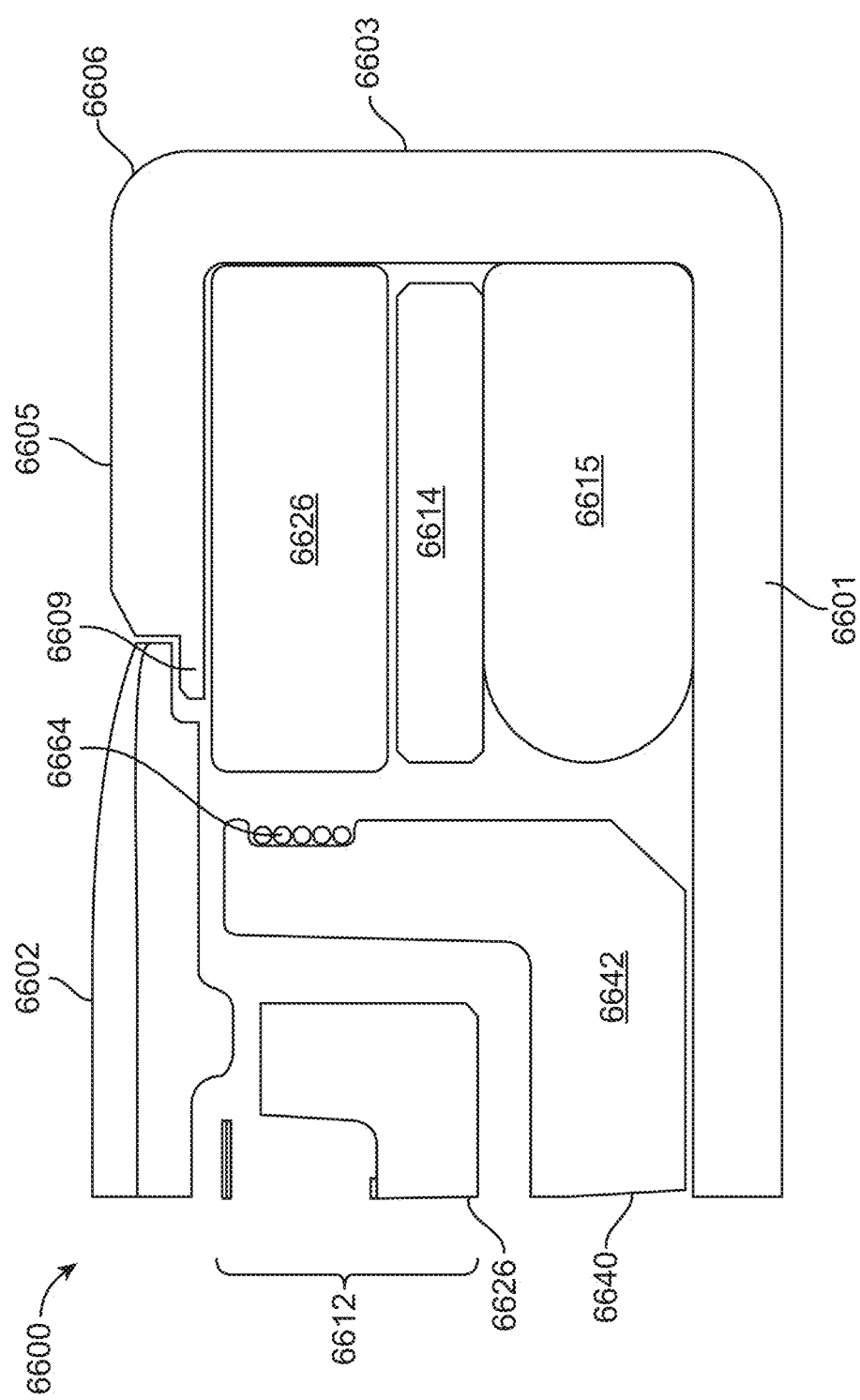
FIG. 67 shows a simplified partial cross-section view of a wireless charger device according to some embodiments.

Examples of wireless charger devices (or wireless chargers) incorporating annular magnetic alignment components are described above, e.g., with reference to FIGS. 13 and 53-54. As another example, FIG. 66 shows an exploded view of a wireless charger device 6600 according to some embodiments, and FIG. 67 shows a simplified partial cross-section view of wireless charger device 6600 according to some embodiments. Wireless charger device 6600 is similar to wireless charger device 1300 described above and can incorporate a magnetic alignment component (e.g., a primary annular alignment component as described above) as well as other features related to optimizing charging performance.

Wireless charger device 6600 can have a two-piece puck-shaped housing that includes a cap 6602 and an enclosure 6606. Cap 6602, which provides a charging surface for wireless charger device 6600, can be made of polycarbonate or other plastic and coated on the proximal side (the top side in FIGS. 66 and 67) with soft-touch silicone or the like to provide a durable surface. Other materials that are permeable to electromagnetic fields can also be used. In some embodiments, the proximal surface of top cap 6602 can be a low-friction surface (e.g., textured silicone), as wireless charger device 6600 can rely on magnetic forces rather than friction for maintaining alignment with a device to be charged. Enclosure 6606 can be made of aluminum, other electrically conductive materials, or a plastic material. As best seen in FIG. 67, enclosure 6606 can include a rear housing 6601, a sidewall 6603, and an overhanging lip 6605 with a recessed ledge 6609 on which top cap 6602 can rest. Top cap 6602 can have a small offset (e.g., 150 μm) above the upper surface of lip 6605, to prevent ferrous particles that may stick to lip 6605 from scratching the surface of a device placed in proximity to top cap 6602. In some embodiments, top cap 6602 can be sealed to recessed ledge 6609 using a suitable sealing material. Enclosure 6606 can include an opening 6607 through sidewall 6603 to allow electrical conduits (e.g., wires) to be connected between the interior and exterior of wireless charger device 6600.

An annular magnetic alignment component 6616 can include arcuate magnets 6626 disposed on an annular DC shield 6614. Magnetic alignment component 6616 can be an implementation of any of the primary annular alignment components described above. For example, each arcuate magnet 6626 can have a quad-pole configuration with an inner arcuate region having magnetic polarity oriented in a first axial direction, an outer arcuate region having magnetic polarity oriented in a second axial direction opposite the first direction, and a central non-magnetized region between the inner arcuate region and the outer arcuate region. In some embodiments, DC shield 6614 can be segmented, e.g., into four arcuate segments, and each segment of DC shield 6614 can have one or more arcuate magnets 6626 mounted thereon. The segments can be individually inserted into enclosure 6606 such that each segment fits under lip 6605 and the segments are adjacent to each other (either abutting or having small gaps to accommodate manufacturing tolerances). Fiducial surface features may be provided on the inner surface of enclosure 6606 to facilitate correct positioning of each segment. A gap 6617 that is large enough to accommodate electrical connection paths can be provided between two adjacent segments of annular magnetic alignment component 6616, and gap 6617 can be aligned with opening 6607 in enclosure 6606. To maximize the magnetic alignment force exerted by annular magnetic alignment component 6616 on a portable electronic device placed adjacent to the top surface of cap 6603, annular magnetic alignment component 6616 can be positioned such that the proximal surfaces of magnets 6626 are adjacent to (e.g., in contact with) the inner surface of lip 6605. In some embodiments, DC shield 6614 can rest on the inner surface of rear housing 6601 of enclosure 6606, and annular magnetic alignment component 6616 can extend to the full height of the inner side of sidewall 6603 so that the proximal surfaces of magnets 6626 are adjacent to the inner surface of lip 6605. In other embodiments, annular magnetic alignment component 6616 can be shorter than the inner side of sidewall 6603, and a spacer 6615 (shown in FIG. 67) can be positioned between DC shield 6614 and rear housing 6601 so that magnets 6626 are adjacent to the underside of lip 6605. In any event, adhesives (not shown) can be used to hold magnetic alignment component 6616 (or sectors thereof) in position.

A charging coil assembly 6612 can include a coil 6620, an electric shield 6622, electromagnetic shields 6626, 6628, and a shim 6624. Coil 6620 can be a coil of wound copper wire with terminals toward the center of the coil, having a proximal surface oriented toward top cap 6601 and an opposing distal surface. An upper electromagnetic shield 6626 and a lower electromagnetic shield 6628 can be made of ferrimagnetic material (e.g., MnZn). Upper electromagnetic shield 6626, which provides primary field shaping for coil 6620, can be contoured to surround the distal surface and outer sides of coil 6620 and can have a slit 6627 to provide space for a wire extending from the outer edge of coil 6620 to the terminal point in the center region of coil 6620. Lower electromagnetic shield 6628, which acts as a spacer for a main logic board 6632, can be flat and shaped to underlie coil 6620 with a trench to accommodate the wire extending from the outer edge of coil 6620 to the terminal point in the center region of coil 6620. Lower electromagnetic shield 6628 can be grounded to enclosure 6606. In some alternative embodiments, lower electromagnetic shield 6628 can be replaced with a plastic spacer. In other alternative embodiments, upper electromagnetic shield 6626 and lower magnetic shield 6628 can be formed from a single piece of ferrite material. An electric shield 6622 can be positioned over the proximal surface of coil 6620. Electric shield 6622 can be made of a flexible printed circuit board patterned with conductive material to block electric fields while being permeable to magnetic fields. Electric shield 6622 can include peripheral conductive protrusions that can be in contact with enclosure 6606 to provide grounding. Shim 6624 can be made of a polycarbonate material and can be used to provide a uniform height across the proximal surface of charging coil assembly 6612, helping to support cap 6602.

A support ring subassembly 6640 can be positioned between annular magnetic alignment component 6616 and coil assembly 6612 (as best seen in FIG. 67). Support ring subassembly 6640 can be an implementation of support ring subassembly 5340 described above with reference to FIGS. 53 and 54. For example, support ring subassembly 6640 can include an annular frame 6642 and an NFC coil 6664. Annular frame 6642 can be made, e.g., of glass-reinforced polycarbonate or other plastics. NFC coil 6664 can be, e.g., a wound copper coil of 4 or 5 turns. NFC coil 6664 can be coupled to NFC tag circuitry that can be disposed on main logic board 6632. NFC coil 6664 and associated tag circuitry can be used for device identification as described in section 5 above.

Main logic board 6632 can be disposed on a central portion of rear housing 6601 of enclosure 6606 and secured in place with a pressure-sensitive adhesive 6634. Main logic board 6632 can include contact pads for connecting to external wires through opening 6607 of enclosure 6606 and additional ground contacts for grounding enclosure 6606 and electric shield 6622. Main logic board 6632 can also include circuit components to control operation of coil 6620. For example, depending on implementation, main logic board 6632 can be coupled to receive DC power via the contact pads and can include power circuitry for driving coil 6620 (e.g., a boost circuit and an inverter). In addition or instead, main logic board 6632 can include logic circuits (e.g., a microcontroller, ASIC, FPGA, or the like) to monitor the behavior of coil 6620 and to control current supplied to coil 6620 based on the monitoring. Examples of control logic for operating a wireless charging coil are known in the art; for instance, the logic circuits can implement functionality confirming to the Qi standard for wireless charging. In some embodiments, main logic board 6632 can also include NFC tag circuit components coupled to NFC coil 6664. In some embodiments, logic circuits, power circuits, and/or NFC tag circuits can be implemented as integrated circuits mounted on main logic board 6632, and the integrated circuits may be covered by shield cans to avoid electrical interference.

Figure 68:
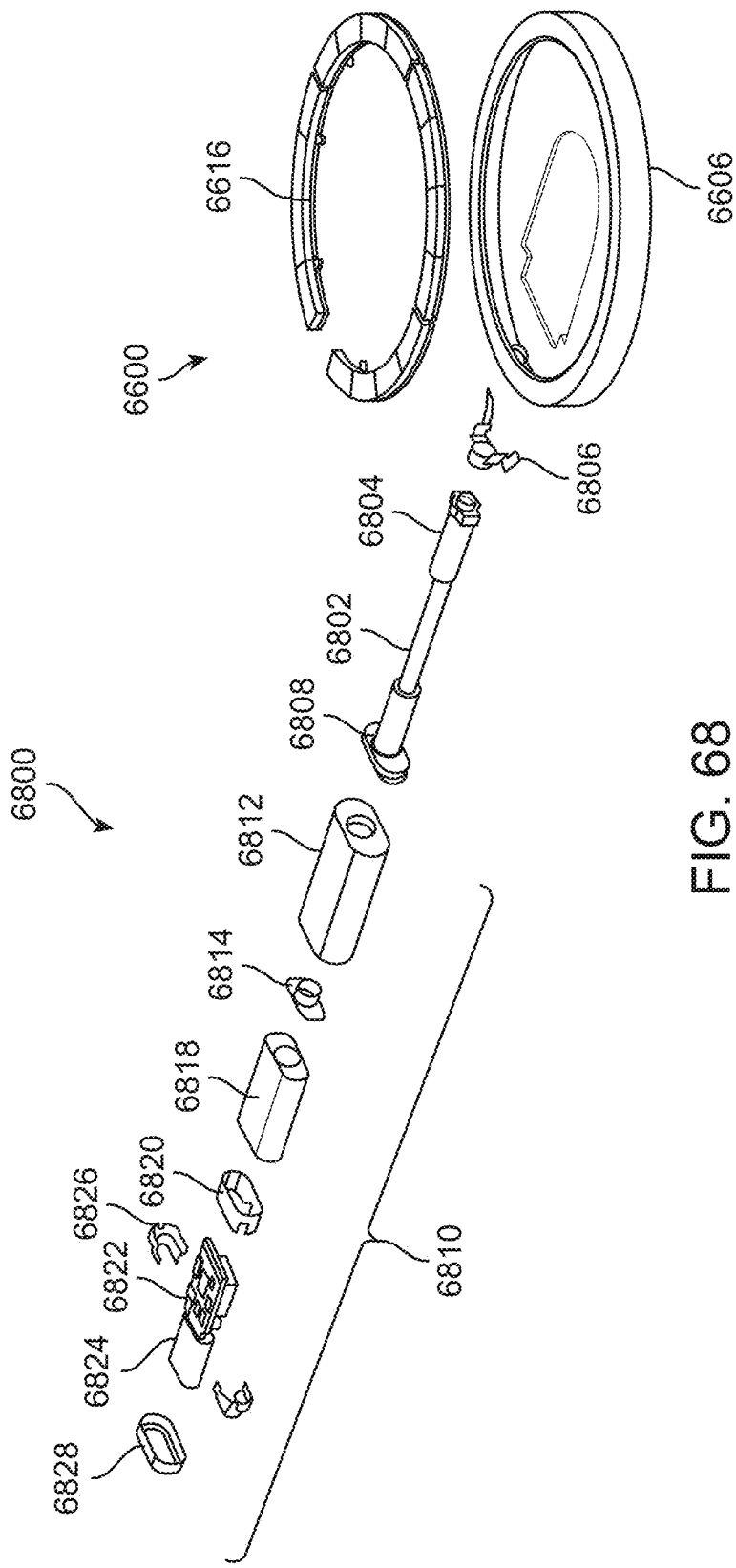
FIG. 68 shows an exploded view of a cable assembly with incorporated power circuitry that can be connected to a wireless charger device according to some embodiments.

In some embodiments, thermal performance of wireless charger device 6600 can be improved by placing some or all of the power circuitry at a location external to enclosure 6606. For example, FIG. 68 shows an exploded view of a cable assembly 6800 with incorporated power circuitry that can be connected to wireless charger device 6600 according to some embodiments. (Portions of wireless charger device 6600, in particular enclosure 6606 and annular alignment component 6616 are shown to facilitate understanding of the connection.) Cable assembly 6800 can include a cable 6802, which can be of any length desired and can include multiple wires (or other electrical conductors) that are electrically insulated from each other to carry power, ground, and data signals. Cable 6802 has a proximal end 6804 that can be captively coupled to wireless charger device 6600. For example, proximal end 6804 of cable 6802 can be inserted through opening 6607 in enclosure 6606 and secured using a crimp 6806. In various embodiments, crimp 6808 can be welded to enclosure 6606 or to DC shield 6614.

Cable 6802 has a distal end 6808 that can be captively coupled to a boot assembly 6810. Boot assembly 6810 can include a boot housing 6812 made of a plastic such as polycarbonate, polybutylene terephthalate (PBT), or the like. A crimp 6814 (e.g., made of stainless steel) can secure distal end 6808 of cable 6802 to the interior of boot housing 6812.

A circuit board 6822 can be disposed inside boot housing 6812. Circuit board 6822 can include power circuitry such as a DC boost circuit and optionally an inverter. Circuit board 6822 can also include logic circuitry to control operation of the power circuitry. Similarly to main logic board 6632 described above, the power and/or logic circuitry can be implemented using integrated circuits mounted on the surface(s) of logic board 6632. Circuit board 6822 can be connected to a connector 6824, which can be, e.g., a USB-C plug connector or other standard connector. Connector 6824 can be removably connected to an external power source (not shown) such as a USB-C adapter module that can be plugged into a standard power outlet.

An electromagnetic interference (EMI) shell 6818 can line the interior of boot housing 6812 around circuit board 6822. EMI shell 6818 can be made of a copper alloy (e.g., brass) or other conductive material and can reduce electromagnetic interference that may be caused by operation of circuitry on circuit board 6822. In some embodiments, crimp 6814 can be laser-welded to EMI shell 6818. Electrical isolation between circuit board 6822 and EMI shell 6818 can be provided using electrically insulating components such as board brace 6820 and clamshells 6826. Faceplate 6828 can be disposed over the distal end of circuit board 6822 and secured to boot housing 6812 such that connector 6824 protrudes through the opening in faceplate 6828. In some embodiments, the interior of boot housing 6812 can be filled with a thermally conductive potting material prior to attaching faceplate 6828 to improve heat transfer away from circuit board 6822.

In some embodiments, all power circuitry can be disposed on circuit board 6822, and cable 6802 can carry alternating current to wireless charger device 6600. In these embodiments, main logic board 6632 within wireless charger device 6600 can couple the AC wires of cable 6802 to coil 6620. In other embodiments, circuit board 6822 may include a portion of the power circuitry, e.g., a DC boost circuit, while other portions of the power circuitry (e.g., an inverter) are disposed on main logic board 6632. It will be appreciated that power circuitry can generate significant amounts of heat and that placing some or all of the power circuitry in boot assembly 6810 rather than within enclosure 6606 can reduce the amount of heat generated within enclosure 6606. In some embodiments, logic circuitry on main logic board 6632 can monitor the temperature locally, in boot assembly 6810 (e.g., based on signals from circuit board 6822), and in the portable electronic device being charged (e.g., using Qi communication protocols) and can reduce the charging current if temperature at any monitored location exceeds a preset upper limit. Providing high thermal conductivity in boot assembly 6810 can avoid having boot assembly 6810 become a limiting factor for charging performance.

Regardless of where the power circuitry is located, main logic board 6632 within enclosure 6606 can include logic circuits to monitor the behavior of coil 6620 and to control any power circuitry that may be located on main logic board 6632 and/or to send control signals to circuit board 6822 via data wires included in cable 6802 (e.g., implementing I²C or other point-to-point communication protocols). Circuit board 6822 can include logic circuits to respond to control signals received from main logic board 6632, e.g., by controlling power circuitry located on circuit board 6822.

It will be appreciated that wireless charger device 6600 and associated cable assembly 6800 are illustrative and that variations and modifications are possible. For example, the particular configuration of the charging coil assembly, the annular magnetic alignment component, and NFC coil assembly can be modified, e.g., according to any of the embodiments described herein. In some embodiments, an NFC coil can be omitted entirely. In some embodiments, all power and logic circuitry can be located on main logic board 6632, and boot assembly 6810 can be replaced by a standard cable boot assembly with a plug connector, such as a USB-C boot assembly. Further, the puck shape is not required, and a wireless charger device can have a larger form factor and/or a different shape. For example, a wireless charger device can be rectangular and can incorporate a rotational alignment component as described in section 2 above. A wireless charger device can be designed to meet various standards for avoiding demagnetization of magnetic-stripe cards placed on it; for example, the wireless charger device may be HiCo safe (i.e., does not demagnetize cards that were magnetized to the HiCo standard) but not LoCo safe (i.e., may demagnetize cards that were magnetized to the LoCo standard).

6.2. Portable Electronic Devices

Examples of portable electronic devices incorporating annular magnetic alignment components are described above, e.g., with reference to FIGS. 12A-12B, 16, and 50-52. Another example will now be described.

Figure 69A:
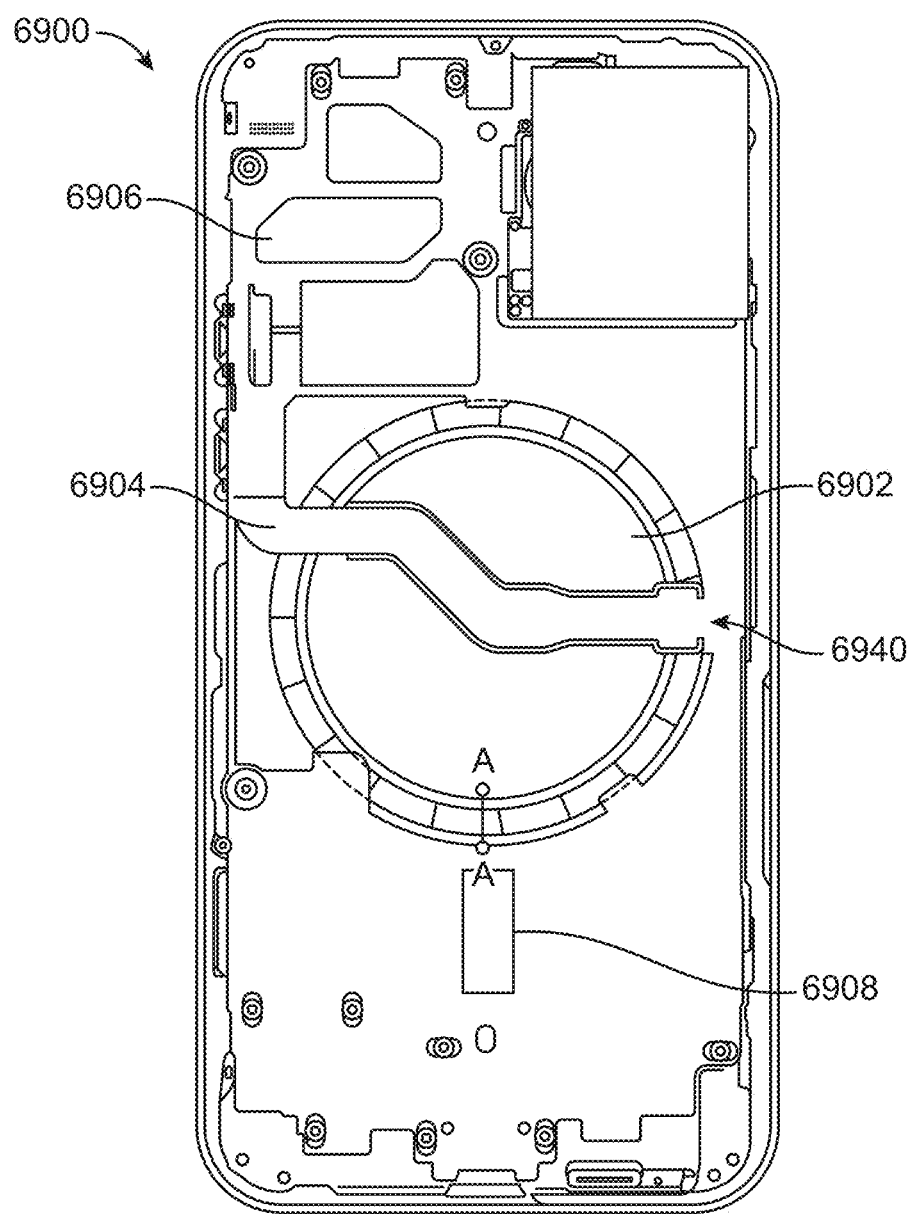
FIG. 69A shows an example of a portable electronic device having a wireless power module according to some embodiments.

FIG. 69A shows an example of a portable electronic device 6900. In this example, portable electronic device 6900 is a smart phone that has a wireless charging module 6902 that incorporates an inductive receiver coil assembly, annular alignment magnets, and an NFC reader coil. Wireless charging module 6902 is described further below. A conduit 6904 provides a pathway for electrical connections between wireless charging module 6902 and other device components 6906, which can include, e.g., a main logic board for the portable electronic device, power management circuitry, battery, and the like. The particular configuration of components 6906 is not relevant to understanding the present disclosure. Portable electronic device 6900 can also include a rotational alignment component 6908, which can be implemented according to any of the embodiments described in section 2 above.

Figure 69B:
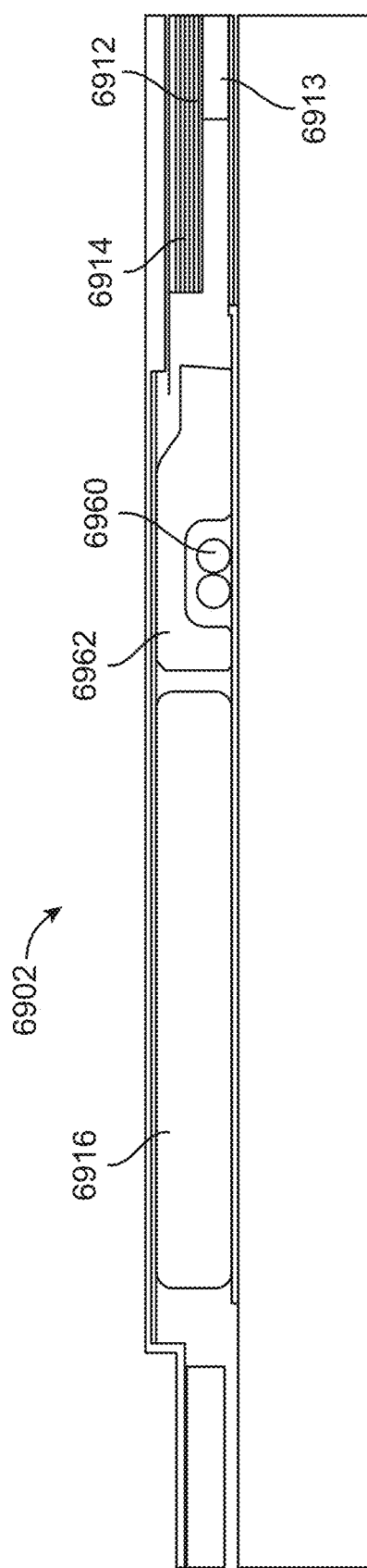
FIG. 69B shows a cross section view of the wireless power module of FIG. 69A.

FIG. 69B shows a cross section view of wireless charging module 6902 through cut line A-A of FIG. 69A. Wireless charging module 6902 can include a charging coil assembly 6912, which can include an inductive charging coil 6913 and shielding components 6914. The particular design of charging coil assembly 6912 is not critical to understanding the present disclosure. Wireless charging module 6902 can also include an annular magnetic alignment component 6916, which can be an implementation of any of the secondary annular magnetic alignment components described above. Wireless charging module 6902 can also include an NFC coil 6960, which can be disposed in a gap between annular magnetic alignment component 6916 and charging coil assembly 6912. NFC coil 6960 can be, e.g., a single-turn two-stranded copper wire disposed on or within a shim 6962, which can be made of polycarbonate or the like. In some embodiments, shim 6962 can facilitate manufacturing of NFC coil 6960 and alignment of NFC coil 6960 with other components of wireless charging module 6902.

Figure 70:
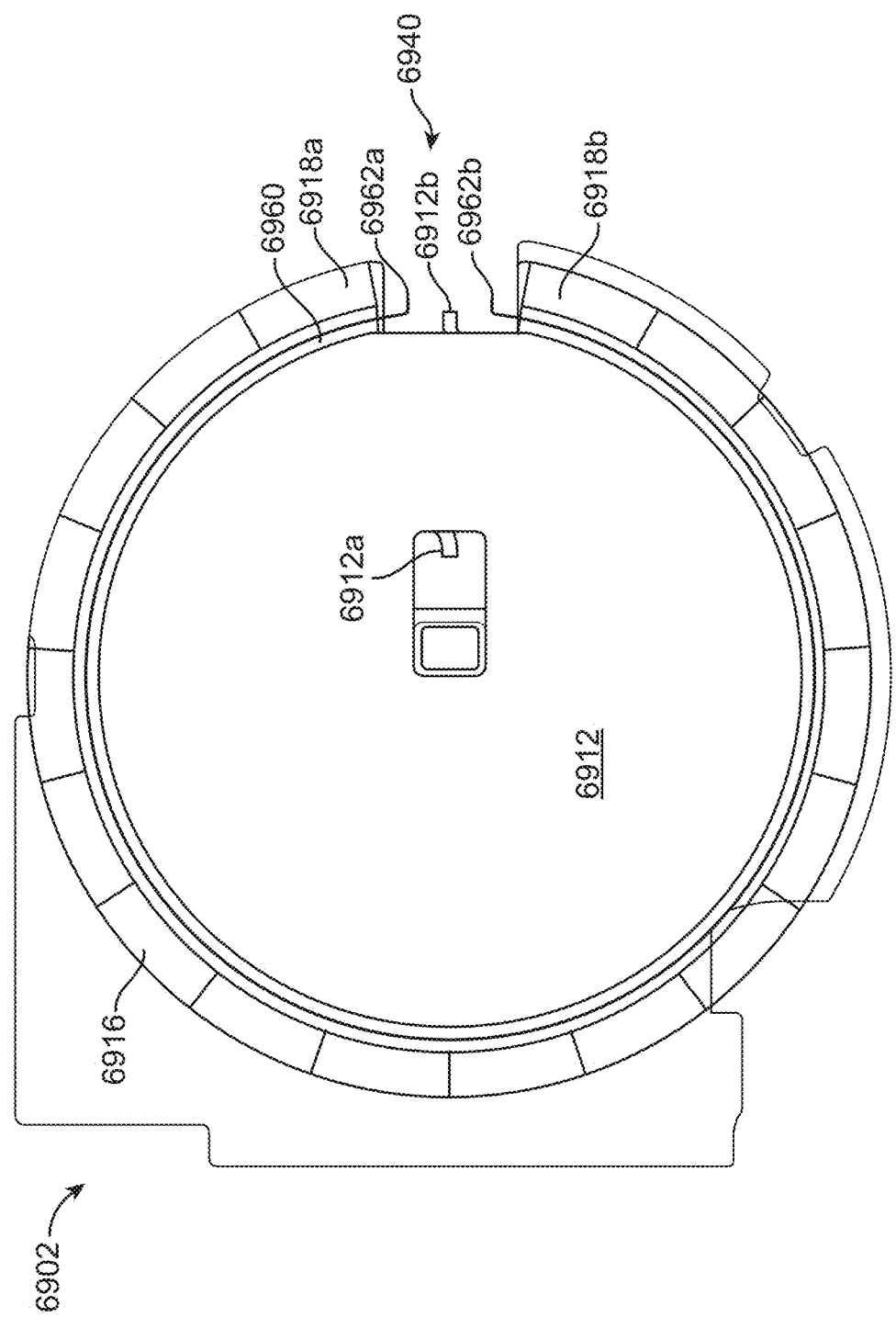
FIG. 70 shows a more detailed top view of a wireless power module according to some embodiments.

FIG. 70 shows a more detailed top view of wireless charging module 6902 according to some embodiments. As described in sections 1 and 3 above, annular alignment component 6916 can include a number of arcuate magnets 6918 arranged in an annular configuration, and each arcuate magnet 6918 can have a magnetic orientation with a radial component. A gap 6940 can be provided between arcuate magnets 6918a and 6918b to facilitate electrical connections to NFC coil 6960 and to wireless charging module 6902. In particular, terminals 6962a, 6962b of NFC coil 6960 can extend into gap 6940. Likewise, outer terminal 6912a of the inductive coil of charging assembly 6912 can also extend into gap 6940. Inner terminal 6912b of the inductive charging coil of coil assembly 6912 can be exposed through a central opening in the coil shield. As shown in FIG. 69A, conduit 6904 can extend to gap 6940 and over the center of wireless charging module 6902 and can include conductive traces or wires to provide electrical connections between wireless charging module 6902 and other components 6906. In some embodiments, other components 6906 can include NFC reader circuit components coupled to NFC coil 6960 and a magnetometer (or other sensor) and associated control logic to trigger operation of NFC coil 6960 when an accessory having a complementary annular magnetic alignment component comes into proximity.

Figure 71A:
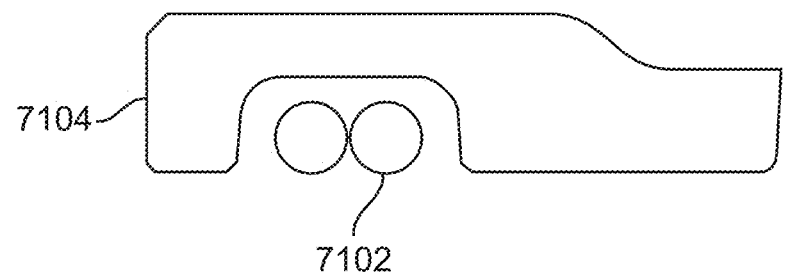
FIGS. 71A-71D show cross section views of NFC coils that can be used in a wireless power module according to various embodiments.
Figure 71B:
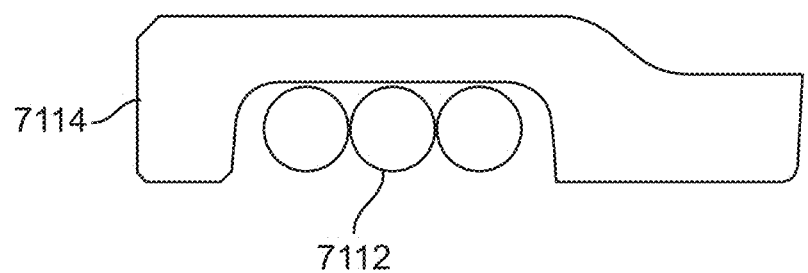
Figure 71C:
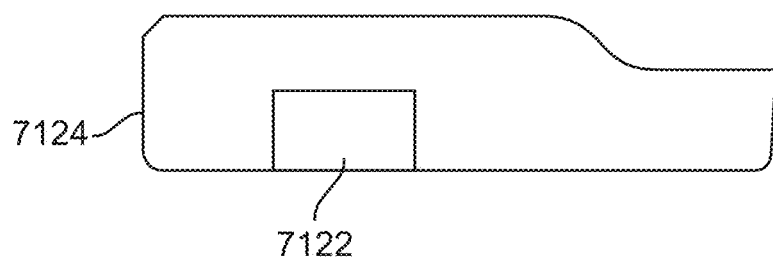
Figure 71D:
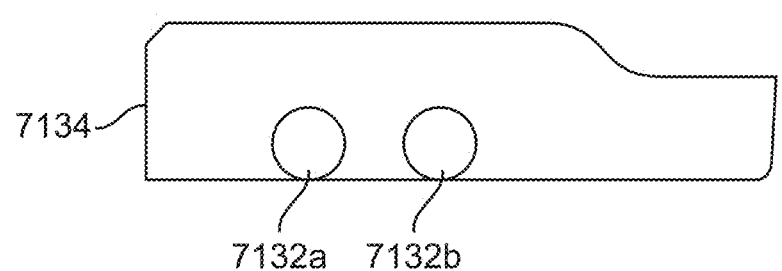

NFC coil 6960 can be implemented in various ways, including single-turn coils fabricated using a variety of manufacturing techniques. FIGS. 71A-71D show cross section views of NFC coils that can be used in wireless charging module 6902 according to various embodiments. FIG. 71A shows a double-stranded wire 7102 disposed in a coil shim 7104 (similar to the embodiment of FIG. 69B). FIG. 71B shows a triple-stranded wire 7112 disposed in a coil shim 7114. In some embodiments, one strand of wire 7112 can be a nonconductive (or dummy) strand, which may provide improved RF performance for the NFC coil. FIG. 71C shows an embodiment in which coil 7122 is insert-molded into a shim 7124. For example, a single-turn coil 7122 can be stamped from a copper foil, after which shim 7124 can be molded around coil 7122. Stamping and insert molding can allow custom shaping of the NFC coil, e.g., varying width or thickness of the stamped coil along its length, which may provide performance improvements. FIG. 71D shows an embodiment in which coil strands 7122a, 7122b are needle-dispensed into a shim 7134. A needle dispenser can deposit wires 7122a, 7122b onto molded plastic shim 7134; the wires can be heated during deposition so that they embed into the softened plastic. As with stamping and insert molding, needle-dispensing can allow custom shaping of the NFC coil, e.g., varying the strand cross-section and/or separation distance between strands along the length of the coil. Any of these or other techniques for forming an NFC coil can be used.

It will be appreciated that portable electronic device 6900 and wireless charging module 6902 are illustrative and that variations and modifications are possible. For example, it is assumed that coil assembly 6912 operates as a receiver coil to receive power via wireless power transfer. In some embodiments, coil assembly 6912 can be reconfigurable as a transmitter coil to provide power to another device. Moreover, the particular configuration of the charging coil assembly, the annular magnetic alignment component, and NFC coil assembly can be modified to suit a specific application, e.g., according to any of the embodiments described herein. In some embodiments, an NFC coil can be omitted entirely.

6.3. Cases

Examples of cases for a portable electronic device are described above, e.g., with reference to FIGS. 27, 55-61, and 63. Another example will now be described. For purposes of description, it is assumed that the case is a tray that covers the back and side surfaces of the portable electronic device, leaving the front surface (which may include a display) exposed. It is also assumed that at least the rear panel of the tray is made of a transparent material (e.g., transparent plastic) so that the back surface of the portable electronic device is visible through the back panel. It should be understood that neither of these assumptions is required; a case can have a variety of form factors, can be made of a variety of materials, and may or may not have a transparent portion.

Figure 72:
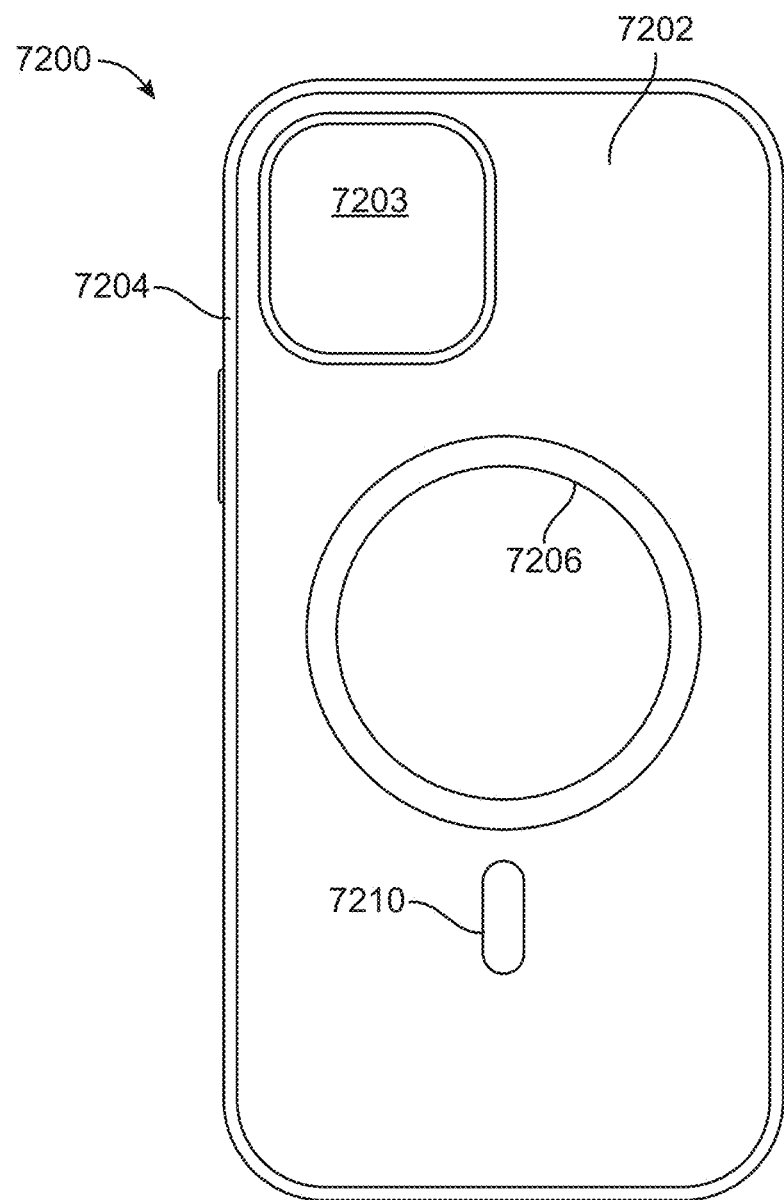
FIG. 72 shows an rear view of a case according to some embodiments.

FIG. 72 shows an rear view of a case 7200 according to some embodiments. Case 7200 can be a case for a smart phone (e.g., smart phone 6900 of FIG. 69) or other portable electronic device. Case 7200 can be shaped as a tray and can have a rear panel 7202 that covers the back surface of the portable electronic device when case 7200 is placed on the portable electronic device. Rear panel 7202 can be made of a rigid material such as plastic, and the material can be a transparent material. Rear panel 7202 need not cover all of the rear surface of the portable electronic device; for example, a cutout area 7203 can be provided to expose a rear camera lens of the portable electronic device. Side panels 7204 of case 7200 can be made of a more pliant material with a higher coefficient of friction and can include lips or other surface features that can facilitate securing a phone into case 7200. The particular construction of side panels 7204 is not relevant to understanding the present disclosure.

Rear panel 7202 can include an annular magnetic alignment assembly 7206 and a rotational alignment assembly 7210. Annular magnetic alignment assembly 7206 can include implementation of any of the auxiliary annular magnetic alignment components described above, as well as an NFC coil and tag circuit. Rotational alignment assembly 7210 can include an implementation of any of the rotational alignment components described above. In some embodiments, case 7200 can be a charge-through accessory that allows a portable electronic device to receive power from a wireless charger device without removing case 7200.

In the absence of transparent magnetic materials, annular magnetic alignment assembly 7206 and rotational alignment assembly 7210 are assumed to include opaque elements, and rear panel 7202 would not be transparent in the regions occupied by annular magnetic alignment assembly 7206 and rotational alignment assembly 7210. In some embodiments, the magnetic alignment components can be designed to reduce disruption of the transparent esthetic of back panel 7202. For example, as shown in FIG. 72, rotational alignment assembly 7210 can be shaped with rounded corners to echo the round shape of annular alignment assembly 7206. Annular alignment assembly 7206 can be constructed using design techniques that minimize the radial width of the opaque annulus. In some embodiments, some or all surfaces of annular alignment assembly 7206 and rotational alignment assembly 7210 can be covered with an opaque cosmetic material (e.g., a plastic or adhesive that is white or colored to match the side surfaces 7204 of case 7200. This opaque cosmetic material can conceal the internal structures of annular alignment assembly 7206 and rotational alignment assembly 7210 from view when case 7200 is in use.

Figure 73A:
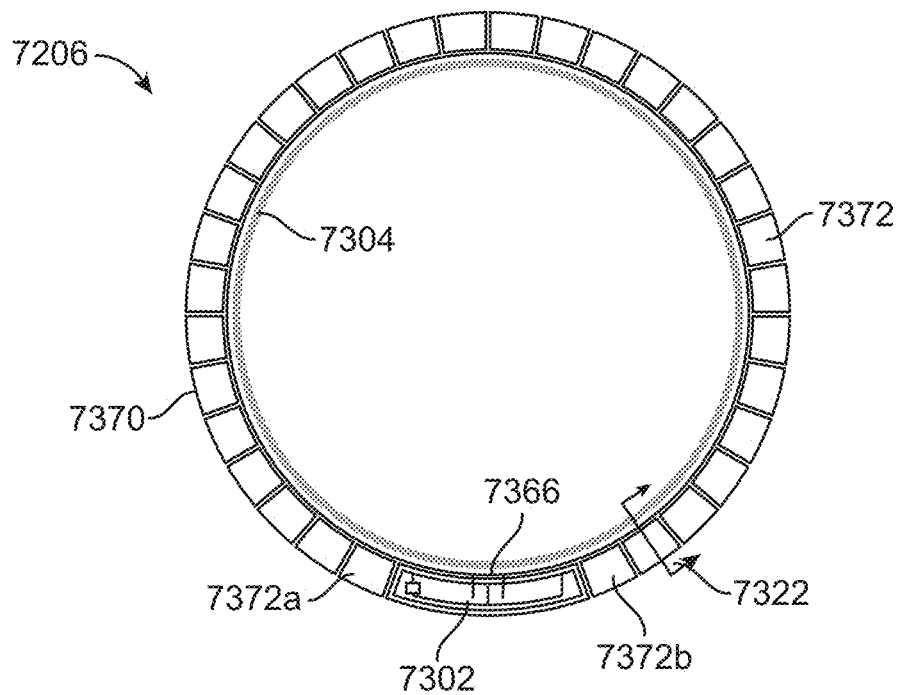
FIG. 73A shows a simplified axial view of internal components of an annular alignment assembly for a case according to some embodiments.

In various embodiments, annular alignment assembly 7206 can be implemented using techniques described in section 5.3 above (e.g., with reference to FIGS. 59-61 and 63). In other embodiments, the design can be modified to further reduce the radial width of annular alignment assembly 7206. FIG. 73A shows a simplified axial view of internal components of an annular alignment assembly 7206 according to some embodiments, and FIG. 73B shows a cross section through cut line 7322 of FIG. 73A.

Annular alignment assembly 7206 can include an annular magnetic alignment component 7370, which can be an implementation of any of the auxiliary magnetic alignment components described above. For example, auxiliary magnetic alignment component 7370 can include a number of arcuate magnets 7372 arranged in an annular configuration. Each arcuate magnet 7372 can have a quad-pole configuration with an inner arcuate region having magnetic polarity oriented in a first axial direction, an outer arcuate region having magnetic polarity oriented in a second axial direction opposite the first direction, and a central non-magnetized region between the inner arcuate region and the outer arcuate region. An NFC tag circuit subassembly 7366 can include an annular NFC antennal coil 7304 disposed inboard and near the inner edge of annular magnetic alignment component 7370 and an NFC tag circuit 7302 disposed in a gap between magnets 7372a, 7372b. FIG. 73B shows the positioning of NFC antenna coil 7304 relative to annular alignment component 7370. NFC antenna coil 7304 can be a wound wire coil of, e.g., 5 or 6 turns, formed on a tape layer 7306.

Figure 73B:
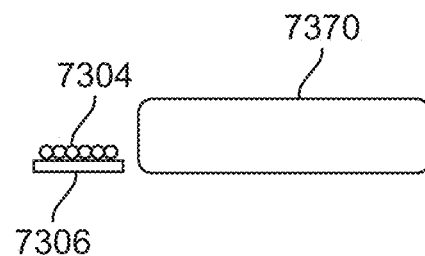
FIG. 73B shows a cross section view of the annular alignment assembly of FIG. 73A.
Figure 73C:
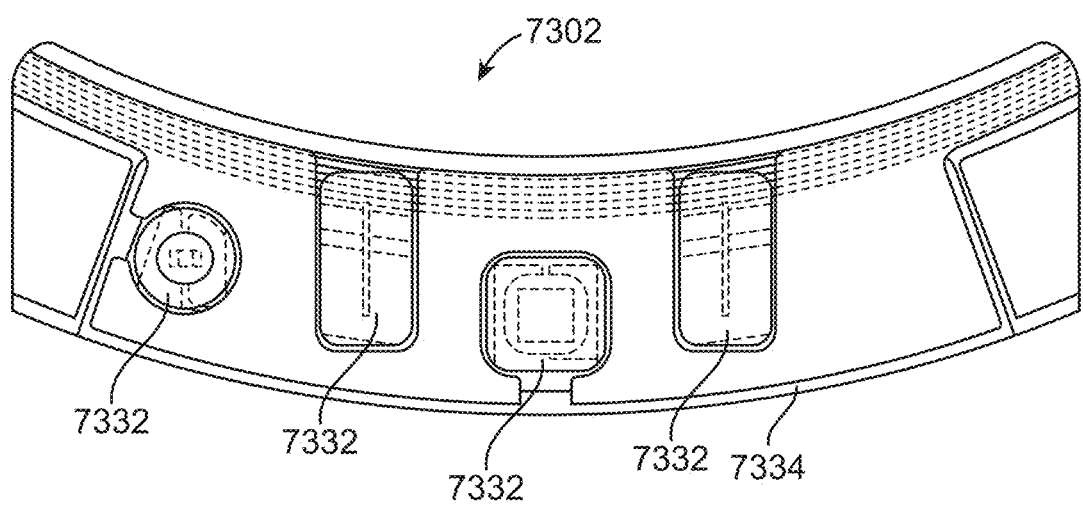
FIG. 73C shows a more detailed view of an NFC tag circuit assembly according to some embodiments.

FIG. 73C shows a more detailed view of NFC tag circuit 7302 according to some embodiments. As shown, NFC tag circuit 7302 can include tag circuit components 7332 disposed on a flexible PCB 7334. Like other NFC tag circuit components referred to herein, tag circuit components 7332 can be of conventional design and can include a tag chip and supporting components such as capacitors. NFC antenna coil 7304 can terminate into flexible PCB 7334.

As shown in FIG. 73B, using wound NFC antenna coil 7304 can allow the radial width of NFC antenna coil 7304 to be reduced relative to etched-coil embodiments described in section 5.3 above. To further reduce width, arcuate magnets 7372 can be made with a reduced radial width. In some embodiments, to compensate for the reduction in magnetic field strength resulting from reduced width, the thickness of arcuate magnets 7372 can be increased.

Figure 74:
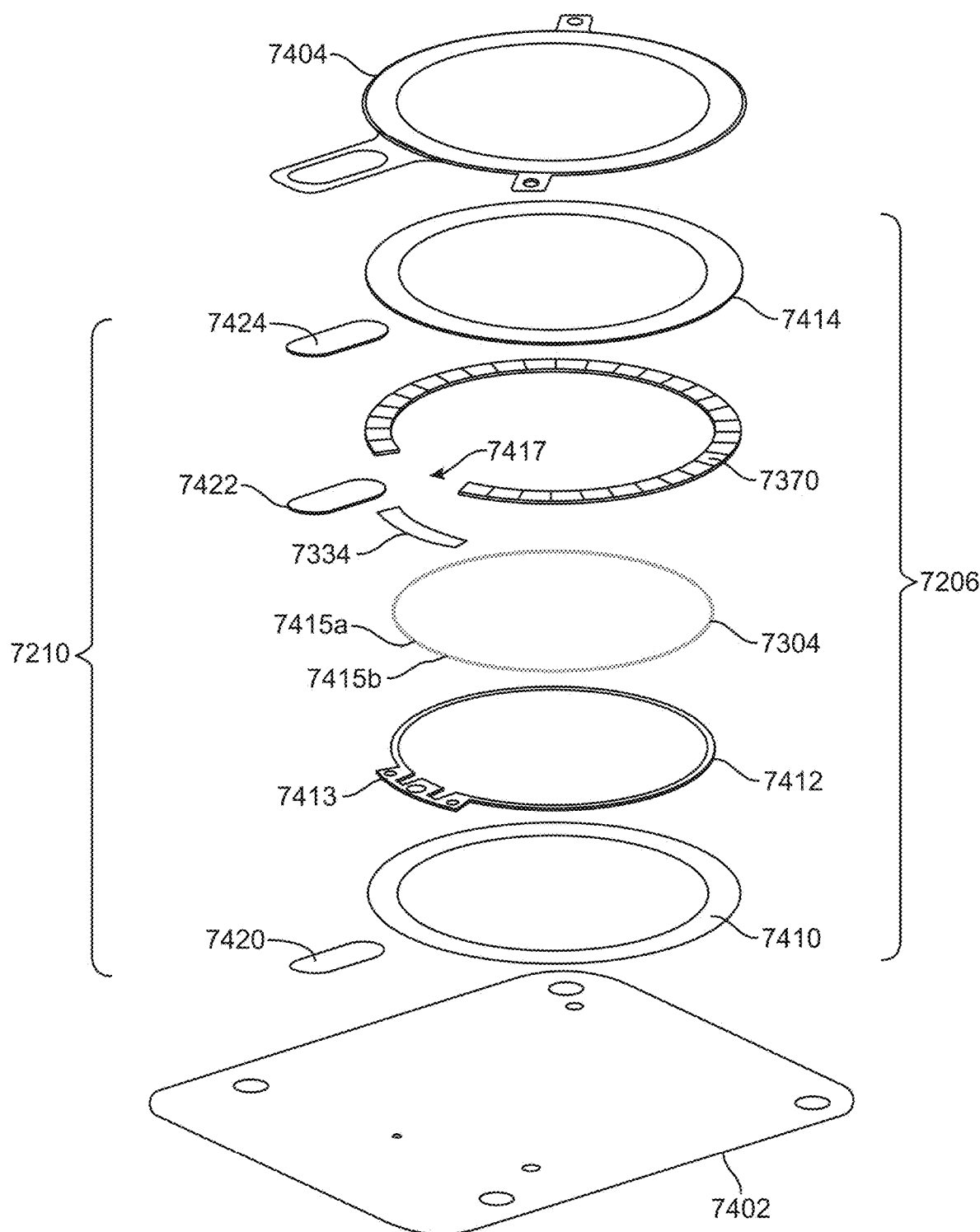
FIG. 74 shows an exploded view of an annular alignment assembly and rotational alignment assembly according to some embodiments.

FIG. 74 shows an exploded view of annular alignment assembly 7206 and rotational alignment assembly 7210 according to some embodiments. Shown at the bottom and top of FIG. 74 are a carrier sheet 7402 and pull tab 7404. Carrier sheet 7402 and pull tab 7404 can be made of silicone-coated PET or the like. In some embodiments, carrier sheet 7402 and pull tab 7404 are used to facilitate construction of annular alignment assembly 7206 and rotational alignment assembly 7210 and are removed before or during installation of annular alignment assembly 7206 and rotational alignment assembly 7210 into an accessory. Annular alignment assembly 7206 can include a bottom film 7410, a coil shim 7412, NFC antenna coil 7304, PCB 7334, annular alignment component 7370, and a cosmetic cap 7414. Rotational alignment assembly 7210 can include a bottom film 7420, one or more rotational alignment magnets 7422, and a cosmetic cap 7424. Rotational alignment magnet(s) 7422 can implement a rotational alignment component as described in section 2 above; various magnetization patterns can be used.

Bottom films 7410, 7420 can be made of materials such as an industrial film coated with pressure-sensitive adhesive. Coil shim 7412 can provide height alignment for NFC coil 7304 and PCB 7334 with annular alignment component 7370. In some embodiments, coil shim 7412 can have a patterned section 7413 that has openings corresponding to the locations of tag circuit components 7332 (which are on the underside of PCB 7334 in the view shown in FIG. 74). Patterned section 7413 can help to provide uniform thickness for annular alignment assembly 7206, avoiding bumps or dimples associated with tag circuit components 7332. Terminal ends 7415a, 7415b of NFC coil 7304 can connect to pads on PCB 7334. PCB 7334 can fit into gap 7417 in annular alignment component 7370. Cosmetic caps 7414, 7424 can be made of polycarbonate and adhered to magnetic alignment components 7370, 7422 using pressure-sensitive adhesive. As noted above, cosmetic caps 7414, 7424 can have a color and/or pattern selected for esthetic effect.

Figure 75:
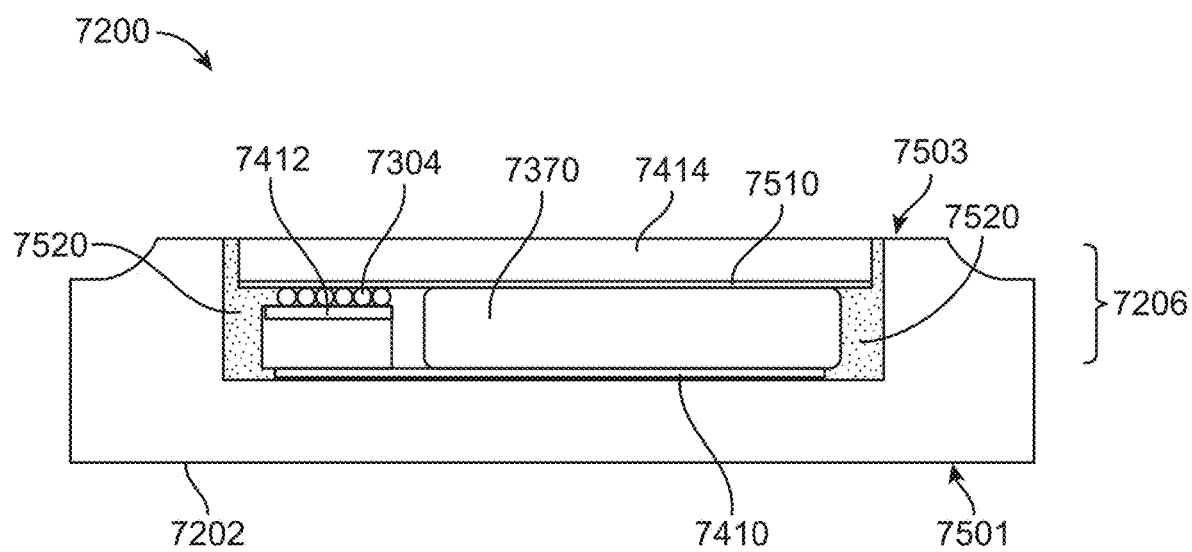
FIG. 75 shows a cross-section view of a portion of a rear panel of a case according to some embodiments.

FIG. 75 shows a cross-section view of a portion of rear panel 7202 of case 7200 according to some embodiments, showing a portion of annular alignment assembly 7206. Rear panel 7202 has an inner surface 7501 that would be oriented toward the interior of the case, contacting the back surface of a portable electronic device that is inserted into the case. Rear panel 7202 also has an outer surface 7503, which is an exterior surface that is visible when a portable electronic device is inserted into the case. In this example, outer surface 7503 has a raised area in the vicinity of annular alignment assembly 7206; however a raised area is not required, and outer surface 7503 of rear panel 7202 can be flat. Annular alignment assembly 7206 can be inset into outer surface 7503 with cosmetic cap 7414 facing outward. Gaps between the sides of annular alignment assembly 7206 and rear panel 7202 can be filled, e.g., by an opaque liquid adhesive 7520.

It will be appreciated that case 7200, annular alignment assembly 7206, and rotational alignment assembly 7210 are illustrative and that variations and modifications are possible. For example, an alignment assembly similar to assembly 7206 can be constructed for any of the combinations of NFC tag circuits and annular magnetic alignment components described in section 5 above, and an annular alignment assembly can be inserted into a rear panel of a case, which might be transparent, translucent, or opaque. A rotational alignment component or assembly can be included or omitted as desired. Further, an annular alignment assembly can be inserted into other types of accessories, not limited to cases, with or without a rotational alignment assembly.

Annular alignment assembly 7206 is designed for use in a rigid case or other accessory. However, cases and other accessories need not be rigid. For example, a case can be formed as a sleeve having front and rear panels with an open end (or "throat") into which a portable electronic device can be inserted so that the front and back sides of the portable electronic device are covered. For ease of insertion and removal, it can be helpful to construct the front and rear panels with at least some degree of flexibility. In some embodiments, a flexible annular magnetic alignment component can be provided by constructing the annular magnetic alignment component from a thin magnet made of polymers infused with a powdered ferromagnetic material or the like. Flexible or rubberized polymers can be used so that the resulting magnet has some flexibility. In some embodiments, a single flexible annular magnet can be formed, or a flexible annular magnetic alignment component can be formed of multiple arcuate sections. The axial thickness may be kept small to optimize flexibility. Flexible magnets, however, tend to have lower magnetic field strength than rare earth magnets. In some embodiments where portable electronic device uses a magnetometer to detect proximity of an accessory having an annular alignment component (e.g., as described in section 5.4 above), the magnetometer may not be able to reliably sense the field of the flexible magnet without setting thresholds so low as to result in a high rate of false positives. Accordingly, in some embodiments, a flexible annular alignment component can be modified to increase its magnetic field strength. For example, the radial width of the flexible annular alignment component can be increased, either around the entire circumference or just in a region (e.g., a quadrant) close to the magnetometer. The latter option may create a rotational asymmetry of magnetic field that can result in a "clocking" effect. As another technique to increase sensed magnetic field, an additional flexible magnet (referred to herein as a "triggering" magnet) can be placed outboard of the annular alignment component. For example, a small square or rectangular triggering magnet can be placed at a location that would be close to the magnetometer (e.g., magnetometer 5080 in FIG. 50) when the sleeve is in alignment with the mobile device. In some embodiments, the sleeve may be a charge-through accessory, and it may be desirable to avoid having the triggering magnet interfere with detection of a second accessory attaching to the distal surface of the charge-through accessory. Accordingly, a triggering magnet can have a weak magnetic field that can be sensed due to short distance to the magnetometer.

7. Alignment Modules

As described above, magnetic alignment components can be incorporated into a variety of devices, including portable electronic devices and accessories such as cases and wireless charger devices. In some embodiments, a magnetic alignment component can be provided in an alignment module (optionally with other components such as an inductive charging coil) that can be incorporated into a device. An alignment module can include an annular alignment component (which can be a primary, secondary, or auxiliary alignment component) enclosed in a package that is sized and shaped to facilitate incorporation into a variety of devices in which an alignment component can be included. In some embodiments, the alignment module can also include a rotational alignment component (as described in section 2 above) enclosed in the same package and held in the desired position relative to the annular alignment component. In some embodiments, the package may also enclose a wireless charging coil and/or an NFC tag circuit as described above. In embodiments where the alignment module includes active circuitry (such as an inductive charging coil assembly and/or logic board), electrical contacts may be provided at the exterior of the package to enable connection to the included active circuitry. Examples will now be described.

7.1. Charger Alignment Modules

Figure 76A:
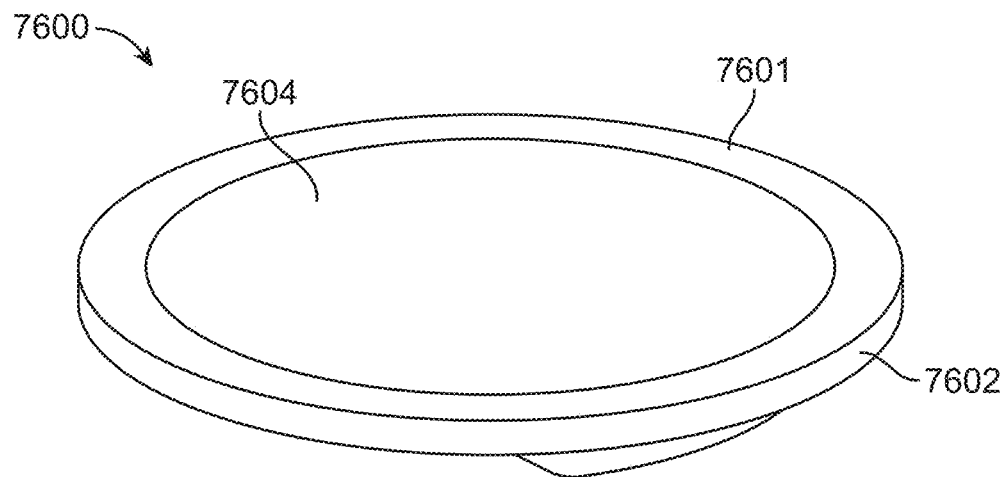
FIGS. 76A and 76B show top and bottom perspective views of a charger alignment module according to some embodiments.
Figure 76B:
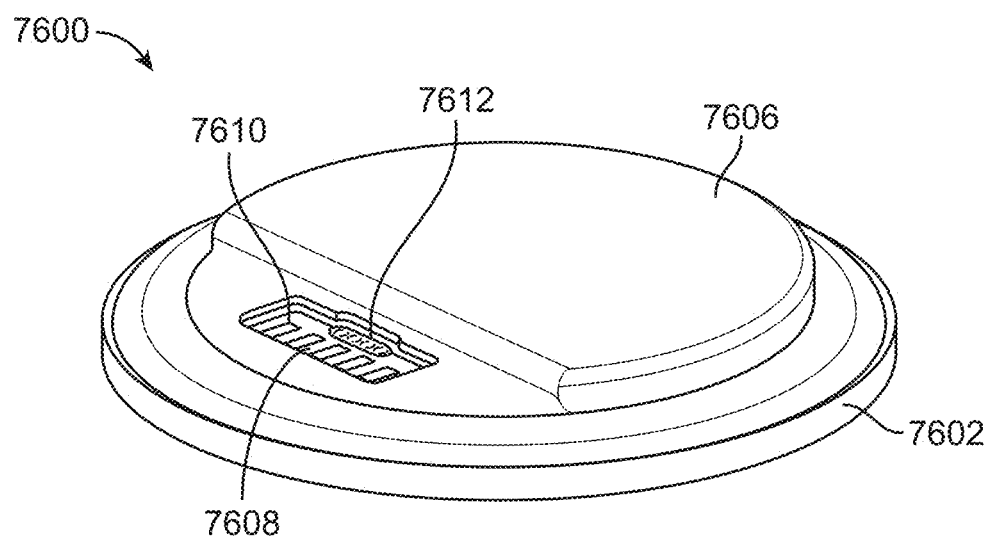

Alignment modules according to some embodiments may include a wireless charging coil and an annular alignment component. FIGS. 76A and 76B show top and bottom perspective views of a charger alignment module 7600 according to some embodiments. Charger alignment module 7600 has a two-piece housing that includes a cap 7601 (best seen in FIG. 76A) and a rear enclosure 7606 (best seen in FIG. 76B). Cap 7601 can provide a cosmetic face that may be visible to a user when charger alignment module 7600 is incorporated into an accessory device such as a docking station. Cap 7601 can include a charging surface 7604 and a surrounding rim region 7602. Charging surface 7604 can be made of silicone or plastic with a hard-touch coating, or any other material that is permeable to AC and DC magnetic fields. Rim region 7602 can be made of plastic or other material that is permeable to DC magnetic fields. Rear enclosure 7606 can be made of metal (e.g., aluminum) and shaped to accommodate an inductive charging coil and a logic board as described below. In some embodiments, it is assumed that rear enclosure 7606 will not be visible to a user when charger alignment module 7600 is incorporated into an accessory device such as a docking station. Rear enclosure 7606 can include an opening 7608 with exposed electrical contacts 7610. As described below, exposed electrical contacts 7610 can be disposed on a logic board and coupled by conductive traces to components housed inside charger alignment module 7600. In some embodiments, exposed electrical contacts 7610 include contacts for electrical power for the charging coil and contacts for USB data signals (D+ and D−), power, and ground; however, any combination of contacts may be provided. In addition, coil calibration contacts 7612 may also be exposed within rear enclosure 7606. In some embodiments, coil calibration contacts 7612 are exposed during manufacture of charger alignment module 7600 to support calibration of the inductive charging coil inside charger alignment module 7600 (e.g., testing of coil resistance); after calibration, contacts 7612 can be covered with an encapsulating sealant material prior to delivering charger alignment module 7600 to a third party for incorporation into an accessory device.

Figure 77:
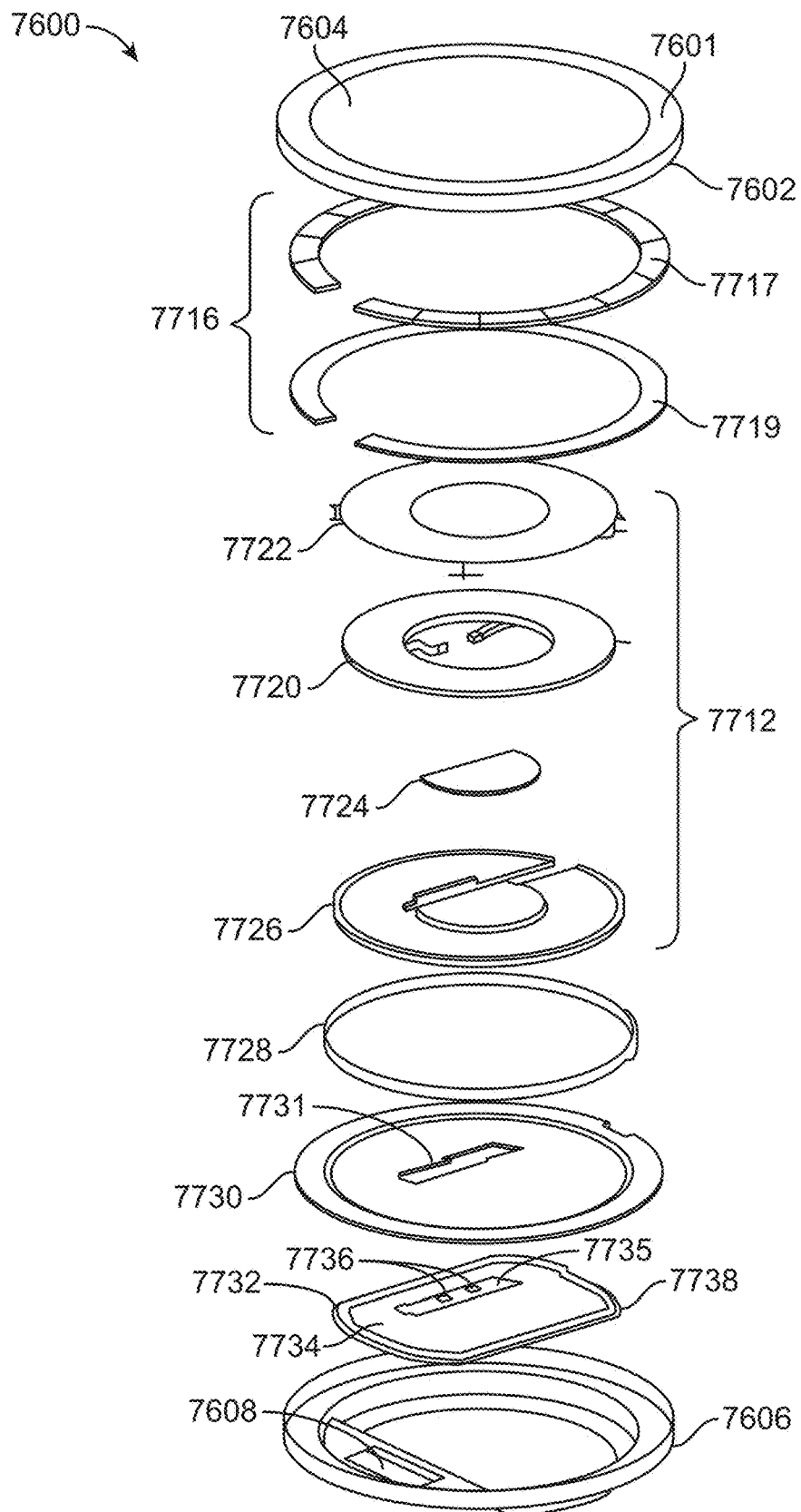
FIG. 77 shows an exploded view of a charger alignment module according to some embodiments.

FIG. 77 shows an exploded view of charger alignment module 7600 according to some embodiments. Cap 7601 is shown at the top, and rear enclosure 7606 is shown at the bottom. A primary annular alignment component 7716 is disposed under cap 7601, e.g. under rim region 7602. Primary annular alignment component 7716 can be an implementation of any of the primary annular alignment components described above. For example, primary annular alignment component 7716 can include primary arcuate magnets 7717 arranged in an annular configuration with each primary arcuate magnet 7717 having a quad-pole configuration with an inner arcuate magnetic region having magnetic polarity oriented in a first axial direction, an outer arcuate magnetic region having magnetic polarity oriented in a second axial direction opposite the first direction, and a central non-magnetized region between the inner arcuate magnetic region and the outer arcuate magnetic region. An annular DC magnetic shield 7719 can be disposed on the distal surface of primary arcuate magnets 7717. As described above, DC magnetic shield 7719 can be made of steel or other material having high magnetic permeability and can redirect magnetic fields to prevent them from propagating beyond the distal side of primary annular alignment component 7716.

An inductive charging coil assembly 7712 can be disposed inboard of primary annular alignment component 7716. Inductive charging coil assembly 7712 can include an inductive charging coil 7720, an electric shield 7722 disposed on a proximal side of inductive charging coil 7720, an electromagnetic shield 7726 disposed on a distal side of inductive charging coil 7720, and a shim 7724. Inductive charging coil 7720 can be a wound wire coil. Electric shield 7722 can include a thin layer of conductive material to block or reduce AC electric fields during operation of coil 7720 while being permeable to magnetic flux. Electromagnetic shield 7726 can be a ferrite or the like that extends over the distal surface and outer sides of coil 7720. Shim 7724 can be made of plastic or other nonconductive material and can be provided to level coil 7720 with the top of electromagnetic shield 7726, providing additional support for charging surface 7604. A variety of inductive charging coil assemblies can be used as inductive charging coil assembly 7712.

A fence 7728 can be formed of aluminum or the like and interposed between the outer side of electromagnetic shield 7726 and the inner side of DC shield 7719. Fence 7728 can provide isolation of electromagnetic shield 7726 from DC shield 7719, helping to keep DC magnetic flux from entering the region of coil 7720, which may improve charging efficiency.

DC shield 7718, fence 7728, and electromagnetic shield 7726 can be mounted on a midplate 7730. Midplate 7730 can be made of aluminum or other electrically conductive material. An opening 7731 through midplate 7730 can be provided to allow electrical connections to the end terminals of coil 7720. In some embodiments, midplate 7730 can be welded to rear enclosure 7606 and to fence 7728. In some embodiments, the thickness of annular alignment component 7716 can be equal to the thickness of coil assembly 7712. In embodiments where annular alignment component 7716 is thinner than coil assembly 7712, spacers (similar to spacers 6615 of FIG. 67) can be used to position magnets 6626 adjacent to cap 6602.

A logic board 7732 can be mounted on the distal surface of midplate 7730 using an adhesive 7734, which can be, e.g., a temperature sensitive adhesive. Logic board 7732 can be a printed circuit board with electronic components mounted on the underside (not shown in FIG. 77). The electronic components can include power circuitry (e.g., boost circuit, inverter) to drive inductive charging coil 7720 and control circuitry (e.g., a microcontroller, FPGA, ASIC, or the like) to control operation of the power circuitry. Examples of suitable components and circuits are known in the art, and a detailed description is omitted. Rear enclosure 7606 can be shaped to accommodate the electronic components on the underside of logic board 7732, and midplate 7730 can provide shielding between logic board 7732 and coil 7720. The underside of logic board 7732 can also include external electrical contacts that align with opening 7608 in rear enclosure 7606 (e.g., contacts 7610, 7612 as shown in FIG. 76B). The top surface of logic board 7732 (shown in FIG. 77) can be partially covered by adhesive 7734, leaving certain regions exposed. For example, exposed region 7735 can align with opening 7731 in midplate 7730 and may include contacts 7736 for connecting to the terminals of coil 7720. As another example, a grounded region 7738 can be exposed at the periphery of logic board 7732. Grounded region 7738 can provide electrical grounding for midplate 7730.

It will be appreciated that charger module 7600 is illustrative and that variations and modifications are possible. A variety of inductive coils and shielding arrangements can be used, and any of the annular alignment components described above may also be included. Further, while charger module 7600 is not shown as including an NFC tag circuit and coil, those skilled in the art with access to the present disclosure will appreciate that an NFC tag circuit and coil can be incorporated similarly to other examples of wireless charger devices described above. In some embodiments, charger module 7600 can include a wound NFC coil terminates to external electrical contacts 7608, and a third-party accessory manufacturer can couple the NFC coil to an external NFC tag circuit, allowing the accessory manufacturer to control the tag data. Exposed contacts are helpful to enable a third party to connect external wiring or other components to charger module 7600. In the embodiment shown, the external contacts are exposed through the rear surface of the housing; however external contacts can be exposed through any surface of the housing. For cosmetic reasons, it may be undesirable to expose the external contacts through the front surface of the charger module and to instead use surfaces (such as the rear surface or a side surface) that are expected to be hidden from view when the charger module is incorporated into an accessory.

Figure 78:
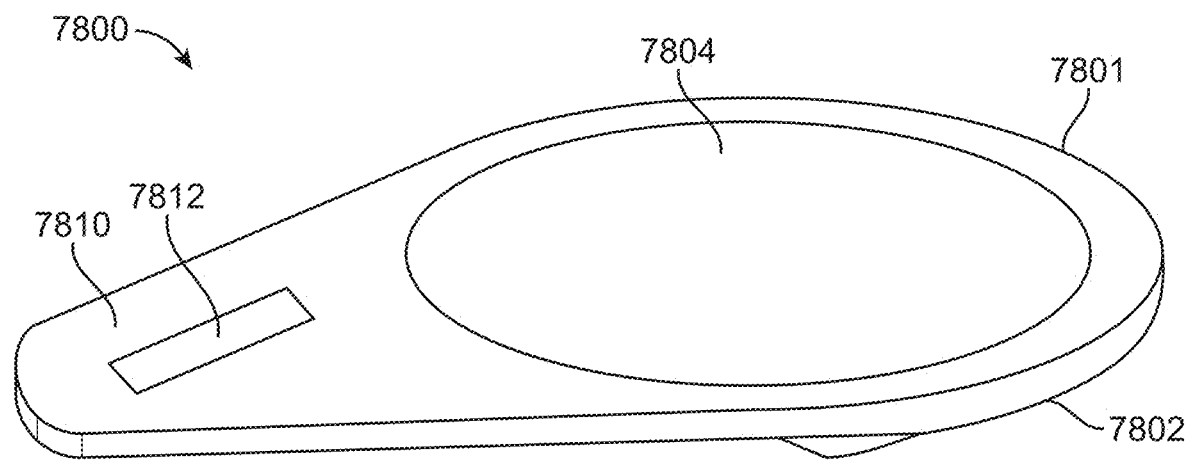
FIG. 78 shows a top perspective view of a teardrop-shaped charger module according to some embodiments.

In addition, a puck shape is not required, and a charger module can have a larger form factor. For example, a charger module can have a rectangular or teardrop-shaped top surface and can incorporate a rotational alignment component as described in section 2 above. FIG. 78 shows a top perspective view of a teardrop-shaped charger module 7800 according to some embodiments. Charger module 7800 can be similar or identical to charger module 7600 except for the shape of the housing 7801. Top cap 7802 can include a charging area 7804 under which an assembly including a charging coil assembly, annular magnetic alignment component (e.g., as shown in FIG. 77), and control circuitry can be provided. Top cap 7802 can also include an extension portion 7810, and a rotational magnetic alignment component 7812 can be disposed in extension portion 7810 at an appropriate distance from the center of the annular magnetic alignment component as described above in section 2. The bottom enclosure of charger module 7800 can also extend similarly to top cap 7802. Other shapes, including rectangular shapes (e.g., as shown in FIG. 16), can also be provided.

7.2. Accessory Insert Modules

Figure 79A:
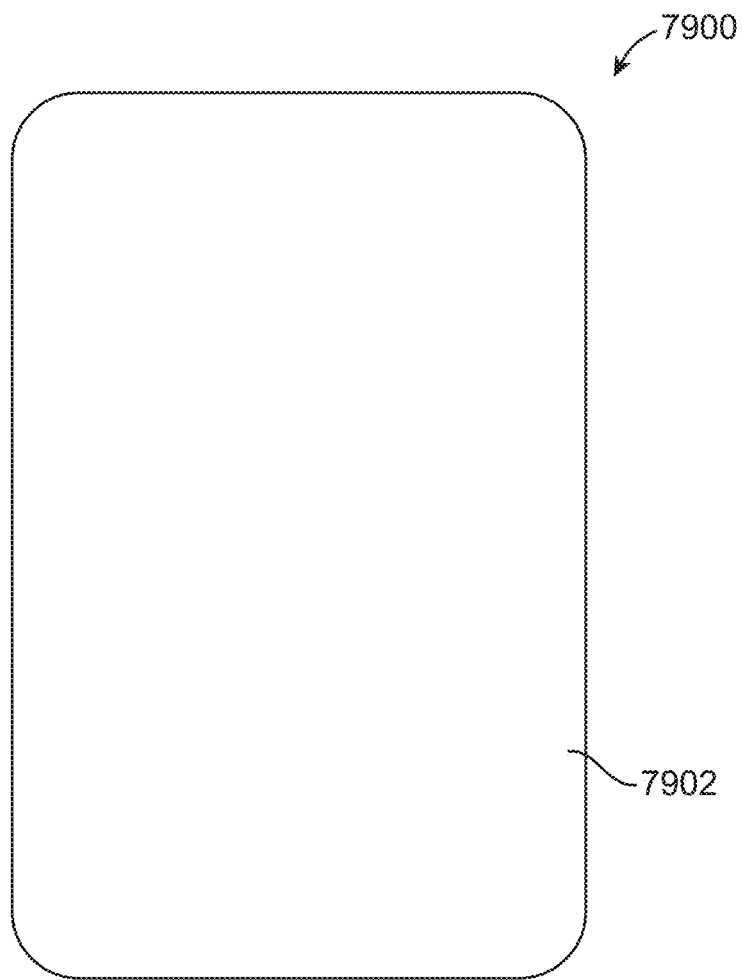
FIG. 79A is a front view and FIG. 79B is a top view of an accessory insert module according to some embodiments.
Figure 79B:
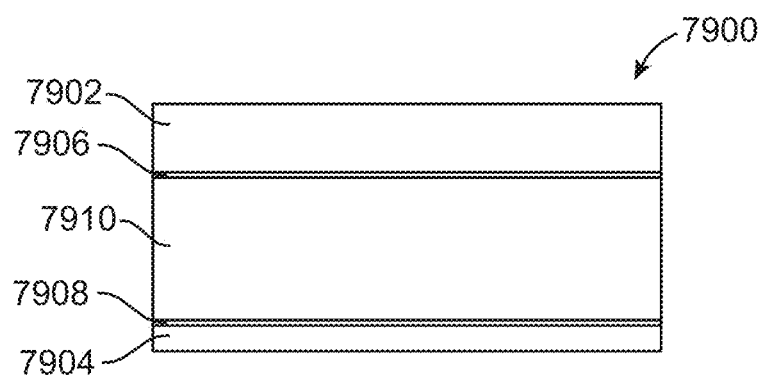

In some embodiments, an alignment module is provided for insertion into a "passive" accessory that does not include an inductive charging circuit. FIG. 79A is a front view and FIG. 79B is a top view of an accessory insert module 7900 according to some embodiments. As shown in FIG. 79A, accessory insert module 7900 can be shaped as a rectangle with rounded corners as shown (or with square corners if desired) and can have flat front and back surfaces. As shown in FIG. 79B, accessory insert module 7900 can have a layered structure with front and back outer layers 7902, 7904, which can be made of encapsulant material (e.g., plastic) and a central magnet-holding layer 7910. Adhesive layers 7906, 7908 can be disposed between front and back outer layers 7902, 7904 and central magnet-holding layer 7910.

Figure 80:
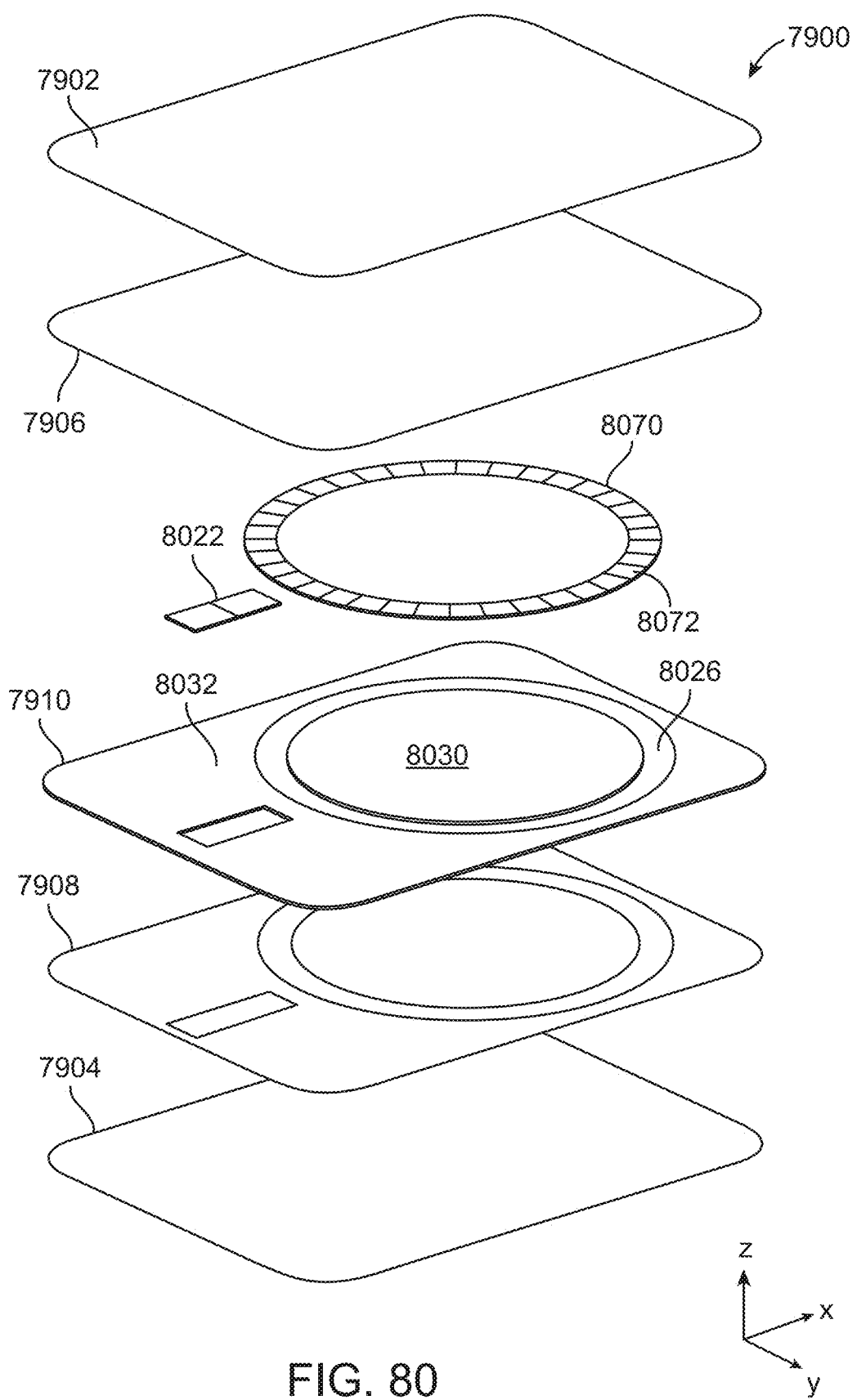
FIG. 80 shows an exploded view of an accessory insert module according to some embodiments.

FIG. 80 shows an exploded view of accessory insert module 7900 according to some embodiments. Central magnet-holding layer 7910 can be made of plastic with an annular opening 8026 and a rectangular opening 8032. Annular opening 8026 can be sized and shaped such that an annular alignment component 8070 fits within annular opening 8026. Annular alignment component 8070 can be an implementation of any of the auxiliary annular alignment components described above. For example, auxiliary annular alignment component 8070 can include primary arcuate magnets 8072 arranged in an annular configuration with each primary arcuate magnet 8072 having a quad-pole configuration with an inner arcuate magnetic region having magnetic polarity oriented in a first axial direction, an outer arcuate magnetic region having magnetic polarity oriented in a second axial direction opposite the first direction, and a central non-magnetized region between the inner arcuate magnetic region and the outer arcuate magnetic region. Rectangular opening 8032 can be sized and shaped such that a rotational alignment component 8022 fits within rectangular opening 8032. Rotational alignment component 8022 can be an implementation of a rotational alignment component as described above and can include, for example, one or more magnets having a z-pole, quad-pole, triple-pole, or annulus design configuration.

In some embodiments, magnet-holding layer 7910, annular alignment component 8070, and rotational alignment component 8022 can all have the same z-height, which can help to keep accessory insert module 7900 flat in the lateral (xy) plane, particularly where the overall z-height of accessory insert module 7900 is small. In the example shown, magnet-holding layer 7910 includes a region 8030 inboard of annular alignment component 8070 that is detached from the rest of magnet-holding layer 7910. As shown, region 8030 can be occupied by a discrete disc of material having the same thickness as the rest of magnet-holding layer 7910, and this too can help to preserve the lateral flatness of accessory insert module 7910. In other embodiments, region 8030 can be empty.

Accessory insert module 7900 can be used in an accessory such as a case for a portable electronic device. To reduce bulk of the case, it may be desirable for accessory insert module 7900 to be quite thin, e.g., a total thickness of about 1 mm. For example, front and back outer layers 7902 and 7904 and magnet-holding layer 7910 can be made of a polycarbonate film such as LEXAN™ SD8B24 film (a product of SABIC Innovative Plastics). Front and back outer layers 7902 and 7904 can each have a thickness of about 0.2 mm while magnet-holding layer 7910 can have a thickness of about 0.5 mm. (As noted above, the thickness of annular alignment component 8070 and rotational alignment component 8072 can be the same as the thickness of magnet-holding layer 7910.) Adhesive layers 7906 and 7908 can be, e.g., pressure sensitive adhesive with a thickness of about 0.2 mm. It should be understood that these dimensions can be modified as desired. In general, thinner front and back outer layers allow a given annular alignment component 8070 and rotational alignment component 8072 to exert stronger magnetic forces on complementary devices, and thinner magnets (and magnet-holding layer 7910) allow the overall thickness of an accessory incorporating insert module 7900 to be reduced.

Figure 81:
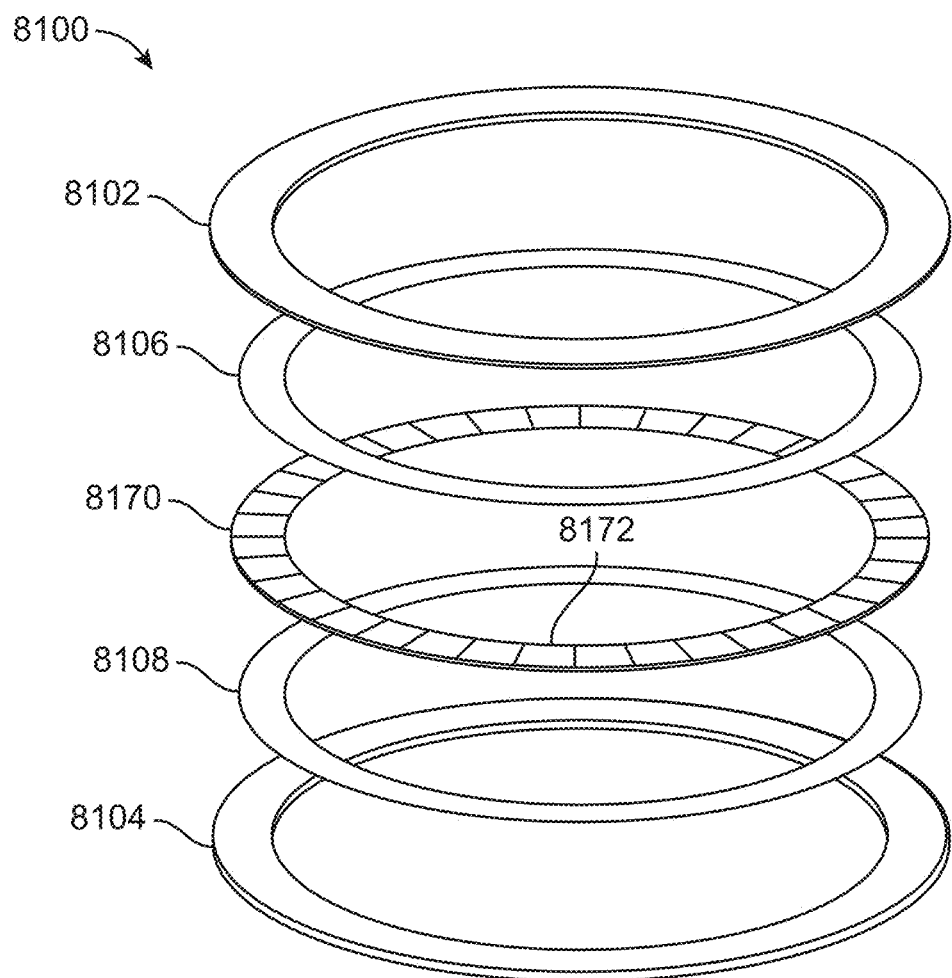
FIG. 81 shows an exploded view of an accessory insert module according to some embodiments.

In some embodiments, accessory insert module 7900 can be made of opaque materials and can be inserted into a variety of accessories such as protective cases, sleeves, trays, and the like. The opacity of accessory insert module 7900 may interfere with certain esthetic options, such as a transparent case back. Some embodiments of accessory insert modules can provide a reduced region of opacity as compared to accessory insert module 7900. FIG. 81 shows an exploded view of an accessory insert module 8100 according to some embodiments. Accessory insert module 8100 has an annular shape, with an annular front enclosure 8102 and an annular rear enclosure 8104 surrounding annular alignment component 8170 Annular alignment component 8170 can be an implementation of any of the auxiliary annular alignment components described above. For example, auxiliary annular alignment component 8170 can include primary arcuate magnets 8172 arranged in an annular configuration with each primary arcuate magnet 8172 having a quad-pole configuration with an inner arcuate magnetic region having magnetic polarity oriented in a first axial direction, an outer arcuate magnetic region having magnetic polarity oriented in a second axial direction opposite the first direction, and a central non-magnetized region between the inner arcuate magnetic region and the outer arcuate magnetic region. Adhesive layers 8106, 8108, each of which can be, e.g., a pressure-sensitive adhesive, can hold annular alignment component in place within an enclosure formed by front enclosure 8102 and rear enclosure 8104. Front enclosure 8102 and rear enclosure 8104 can be made, e.g., of injection molded polycarbonate or other similar material. Accessory insert module 8100 can be opaque, but because of its reduced opaque area relative to accessory insert module 7900, accessory insert module 8100 may be more esthetically appealing in transparent cases and other applications where a transparent surface is desired.

Figure 82:
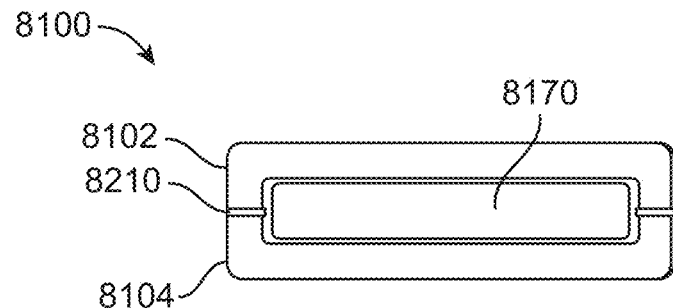
FIGS. 82 and 83 show partial cross-section views of accessory insert modules according to various embodiments.
Figure 83:
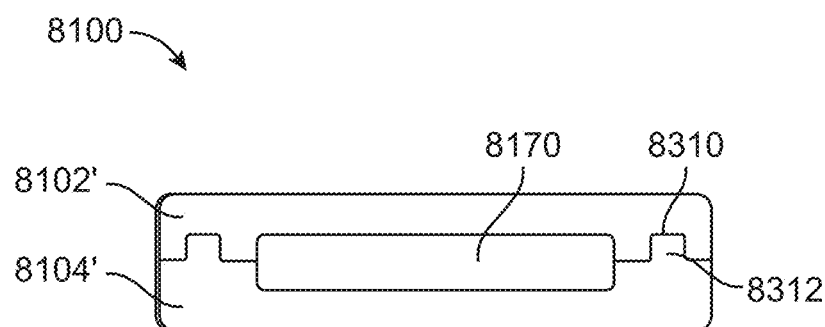

In the embodiment shown in FIG. 81, front enclosure 8102 and/or rear enclosure 8104 can have sidewalls so that magnets 8172 are surrounded on all sides. The joint where front enclosure 8102 and rear enclosure 8104 meet can be formed in several ways. FIGS. 82 and 83 show partial cross-section views of accessory insert modules according to various embodiments, illustrating options for joining front enclosure 8102 and rear enclosure 8104. In FIG. 82, front enclosure 8102 and rear enclosure 8104 of accessory insert module 8100 can be joined by an ultrasonic or laser weld 8210, fully enclosing annular alignment component 8170. FIG. 83 shows a variation in which a front enclosure 8102' of accessory insert module 8100 includes a notch 8310 while rear enclosure 8104' includes a projection 8312 that fits into notch 8310. For example, front enclosure 8102' with notch 8310 can be formed in a first injection molding process, after which magnets are arranged in front enclosure 8102' to form annular alignment component 8170. Thereafter, a second injection molding process can be used to form rear enclosure 8104', filling in notch 8310.

Figure 84:
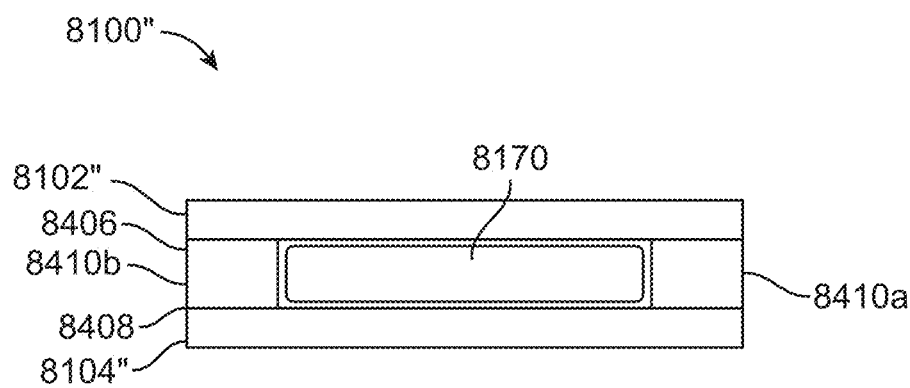
FIG. 84 is a partial cross section view of an annular accessory insert module according to some embodiments.

In still other embodiments, sidewalls can be formed separately from front enclosure 8102 and rear enclosure 8104, providing a "stacked" construction similar to accessory insert module 7900 described above. FIG. 84 is a partial cross section view of an annular accessory insert module 8100" according to some embodiments with a "stacked" construction. Annular accessory insert module 8100" can have the same annular shape as accessory insert module 8100. In this embodiment, however, front enclosure 8102" and rear enclosure 8104" can be planar annular structures formed of polycarbonate or the like. Sidewalls 8410a and 8410b can be formed as concentric annular rings of polycarbonate having a thickness that can be the same as (or slightly greater than) the thickness of annular alignment component 8170. Adhesive layers 8406, 8408, which can be, e.g., pressure-sensitive adhesive, can hold the structure together.

It will be appreciated that these accessory insert modules are illustrative and that variations and modifications are possible. A variety of materials can be used, and any of the annular alignment components described above may be included. Further, while the various accessory insert modules are not shown as including an NFC tag circuit and coil, those skilled in the art with access to the present disclosure will appreciate that an NFC tag circuit and coil can be incorporated similarly to examples of accessory devices described above.

8. Additional Embodiments

While the invention has been described with reference to specific embodiments, those skilled in the art will appreciate that variations and modifications are possible. For instance, although the annular alignment modules are described as being made from arcuate magnets that form sectors, it will be understood that if the magnets are sufficiently small relative to the dimensions of the annular structure, trapezoidal or square magnets can approximate the behavior of arcuate magnets. Magnetic alignment components can have any dimensions, and annular magnetic alignment components can be used with or without rotational alignment components and with or without NFC circuitry. Where NFC circuitry is present, a given device can have NFC reader circuitry or NFC tag circuitry (or both) in combination with any of a primary, secondary, or auxiliary annular magnetic alignment component, and a variety of NFC coil geometries can be implemented. Magnetic alignment components can be used with an inductive charging coil to facilitate alignment of the coils as described above, or a magnetic alignment component can be present in a device that does not have an inductive charging coil. Further, a portable electronic device that has a magnetic alignment component around an inductive charging coil can be charged by a wireless charger device that does not have a magnetic alignment component, and conversely, a wireless charger device that has a magnetic alignment component can be used to charge a portable electronic device that has an inductive charging coil but not a magnetic alignment component. In these situations, the magnetic alignment component may not facilitate alignment between the devices, but it need not interfere with wireless power transfer.

In addition, while a portable electronic device has been described as receiving power wirelessly, those skilled in the art will appreciate that an inductive power coil may be operable to transmit as well as receive power wirelessly, and in some embodiments a portable electronic device can be reconfigurable to operate either as a transmitter or receiver for wireless power transfer.

Further, while it is contemplated that magnetic alignment components of the kind described herein can be used to facilitate alignment between transmitter and receiver coils for wireless power transfer between devices, use of magnetic alignment components is not so limited, and magnetic alignment components can be used in a variety of contexts to hold one device in relative alignment with another, regardless of whether either or both devices have wireless charging coils. Thus, for instance, a tripod (or other type of stand), which can hold a portable electronic device in a particular positon and orientation, can include a primary annular magnetic alignment component (and a rotational alignment component) to hold the portable electronic device in place; the magnetic alignment component can be used in addition to or instead of mechanical retention features to secure the portable electronic device to the tripod.

Accordingly, ecosystems of devices are contemplated. The ecosystem can include a variety of portable electronic devices having various form factors, such as smart phones, tablets, or other devices that can operate on battery power and can receive power via wireless power transfer. The ecosystem can also include a variety of wireless charger devices such as pucks, mats, docks, or the like. The ecosystem can also include "charge-through" accessories (such as cases) that may be interposed between a portable electronic device and a wireless charger device; the charge-through accessory is designed to permit magnetic flux to pass through the interposed portion of the accessory to allow wireless charging while the accessory is present. In such an ecosystem, each portable electronic device can be manufactured to include a secondary annular magnetic alignment component (e.g., having a radial or transverse magnetic orientation as described above) having dimensions of radial width and outer diameter that are constant across the ecosystem. Each wireless charger device can be manufactured to include a primary annular magnetic alignment component complementary to the secondary annular magnetic alignment components of the portable electronic devices (e.g., having a quad-pole configuration as described above), allowing wireless charger devices to be used interchangeably with different portable electronic devices. Each charge-through accessory can be manufactured to include an auxiliary annular magnetic alignment component complementary to the primary and secondary annular magnetic alignment components, again allowing interchangeable use of wireless charger devices with different charge-through accessories (and portable electronic devices).

Such ecosystems can also include other passive accessory devices (i.e., accessory devices that do not include inductive charging coils) that may be designed to attach to a portable electronic device using magnetic alignment components but that do not support charge-through operation. Examples include tripods or other stands, attachable accessory cases that may hold credit cards or other magnetized items that may be susceptible to demagnetization during wireless power transfer, or other accessories that are intended for use with a portable electronic device that is not being charged. Such accessory devices can be manufactured to include either a secondary annular magnetic alignment component or an auxiliary annular magnetic alignment component and may or may not include a rotational alignment component.

Such ecosystems can also include a "retrofitting" accessory device that may be used to provide magnetic alignment capability for a portable electronic device that was originally manufactured without a magnetic alignment component. A retrofitting accessory can have one or more mechanical retention features (e.g., sides and lips of a case shaped as a tray) that hold the smart phone (or other portable electronic device) in a fixed relative alignment with the housing of the accessory. The accessory can include a secondary magnetic alignment component (matching the specifications of the secondary alignment component for the ecosystem), and the secondary magnetic alignment component can be positioned in the retrofitting accessory so that when the portable electronic device is held in place by the mechanical retention feature(s), the inductive charging coil is centered within the secondary magnetic alignment component. Such an accessory can allow a portable electronic device that was manufactured without a magnetic alignment component to enjoy the benefits of magnetic alignment when used with devices in the magnetic alignment ecosystem.

It should be understood that, within a given ecosystem, any or all of the devices that include annular alignment components may also include rotational alignment components as described above. For instance, within an ecosystem, all portable electronic devices having a secondary annular alignment component that are large enough to accommodate a rotational alignment component outboard of the secondary annular alignment component can have a rotational alignment component. Devices having a primary alignment component or auxiliary alignment component might or might not have a rotational alignment component, depending on form factor and intended use.

It should also be understood that, within a given ecosystem, any or all of the devices that include annular alignment components may also include NFC circuitry for device identification as described above. For instance, within an ecosystem, any portable electronic device can have an NFC reader circuit as described above, while any device having a primary annular alignment component or auxiliary annular alignment component can have an NFC tag circuit as described above.

It should also be understood that some devices may include multiple annular alignment components. For instance, a wireless charger device may be designed with two or more separate wireless charging coils spaced apart from each other to allow multiple portable electronic devices to be charged at the same time. Each wireless charging coil can have a surrounding primary annular alignment component, and each primary alignment component can have an associated rotational alignment component and/or NFC coil.

In some embodiments, an alignment module that includes an annular alignment component can be packaged for easy installation into an accessory device, wireless charger device, or portable electronic device. For example, an alignment module can include a primary, secondary, or auxiliary annular magnetic alignment component as described above in an enclosing structure (or housing) that protects the magnets and holds them in position In some embodiments, a rotational magnetic alignment component can be included along with the annular magnetic alignment component, and in some embodiments, an NFC circuit can be included. The enclosing structure can be, for instance, a plastic structure, at least part of which can be transparent. As another example, the alignment module can include a wireless charging coil (e.g., a transmitter coil) centered within the annular alignment component. The enclosing structure can provide exposed electrical contacts for making electrical connections to the wireless charging coil. Such alignment modules can be made by one entity and sold to a different entity to incorporate into devices such as cases, wireless charging docks, or the like.

Various features described herein related to detection of devices and exchange of information (e.g., using NFC) can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa. Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium). Further, in regard to any collection or exchange of information or data by or between devices, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the invention can include, but are not limited to, any of the following.

In some embodiments, an electronic device (e.g., a portable electronic device) can comprise: a housing having an interface surface; an inductive coil disposed within the housing and having an axis normal to the interface surface, the inductive coil being configured to transfer power wirelessly through the interface surface; and an annular magnetic alignment component disposed within the housing coaxial with and outboard of the inductive coil. The annular magnetic alignment component can have a magnetic orientation in a radial direction. The annular magnetic alignment component can comprise a plurality of arcuate magnets, and each of the arcuate magnets can have a magnetic polarity that is oriented in a radially inward (or radially outward) direction. The annular magnetic alignment component can include a gap, and an electrically conductive path connected to the inductive coil can pass through the gap. The annular magnetic alignment component can include a first gap and a second gap on opposite sides of the annular magnetic alignment component. A battery can be disposed within the housing, and the inductive coil can be coupled to the battery. The inductive coil can be configured to receive and/or transmit power wirelessly through the interface surface.

In some embodiments, an electronic device (e.g., a wireless charger device) can comprise: a housing having a charging surface; an inductive coil disposed within the housing and having an axis normal to the charging surface, the inductive coil being configured to transfer power wirelessly through the charging surface; and an annular magnetic alignment component disposed within the housing coaxial with and outboard of the inductive coil. The annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. The annular magnetic alignment component can comprise a plurality of arcuate magnets, and each arcuate magnet can have a first region with a magnetic polarity oriented in the first axial direction, a second region with a magnetic polarity oriented in the second axial direction, and a non-magnetized region between the first region and the second region. The annular magnetic alignment component can include a gap, and an electrically conductive path connected to the inductive coil can pass through the gap. The inductive coil can be configured to transmit and/or receive power wirelessly through the charging surface.

In some embodiments, an accessory for use with a portable electronic device can comprise: a housing having a first interface surface and a second interface surface opposite the first interface surface; an annular magnetic alignment component disposed within the housing and having an axis normal to the first interface surface and the second interface surface. The annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. The annular magnetic alignment component can comprise a plurality of arcuate magnets. Each arcuate magnet can have a first region with a magnetic polarity oriented in the first axial direction, a second region with a magnetic polarity oriented in the second axial direction, and a non-magnetized region between the first region and the second region. The annular magnetic alignment component can include a gap. The annular magnetic alignment component can include a first gap and a second gap on opposite sides of the annular magnetic alignment component.

In some embodiments, a magnetic alignment system can comprise: a primary alignment component formed of a plurality of primary arcuate magnets arranged in an annular configuration defining an axis and a secondary alignment component formed of a plurality of secondary arcuate magnets arranged in an annular configuration. Each primary arcuate magnet can comprise: a primary inner arcuate magnetic region having a magnetic orientation in a first direction along the axis; a primary outer arcuate magnetic region having a magnetic orientation in a second direction opposite the first direction; and a non-magnetized primary central arcuate region disposed between the primary inner arcuate region and the primary outer arcuate region. Each secondary arcuate magnet having a magnetic orientation that is in a radial direction with respect to a center of the secondary alignment component. The primary alignment component can be disposed in a first electronic device surrounding a first inductive charging coil, and the secondary alignment component can be disposed in a second electronic device surrounding a second inductive charging coil; when the primary alignment component and the secondary alignment component are aligned along a common axis, the first inductive charging coil and the second inductive charging coil can be also aligned along the common axis.

In some embodiments, an electronic device (e.g., a portable electronic device) can comprise: a housing having an interface surface; an inductive coil disposed within the housing and having an axis normal to the interface surface, the inductive coil being configured to transfer power wirelessly through the interface surface; an annular magnetic alignment component disposed within the housing coaxial with and outboard of the inductive coil, the annular magnetic alignment component having a magnetic orientation in a radial direction; and a rotational alignment component comprising a magnet disposed outside an outer perimeter of the annular magnetic alignment component. The rotational alignment component can comprises a magnet having at least two different regions of opposing magnetic orientations. In these and other embodiments, the magnet can have a rectangular shape in a plane transverse to an axis defined by the annular magnetic alignment component. For example, the at least two different regions of opposing magnetic orientations can include: a first region extending along a first long side of the rectangular shape and having a first magnetic orientation; and a second region extending along a second long side of the rectangular shape and having a second magnetic orientation opposite the first magnetic orientation. As another example, the at least two different regions of opposing magnetic orientations can include: a first region extending along a first long side of the rectangular shape and having a first magnetic orientation; a second region extending along a second long side of the rectangular shape and having the first magnetic orientation; and a third region extending along the rectangular shape and positioned midway between the first region and the second region, the third region having a second magnetic orientation opposite the first magnetic orientation. In these and other embodiments, the annular magnetic alignment component can comprise a plurality of arcuate magnets, each having a magnetic polarity that is oriented in a radially inward direction. In these and other embodiments, a battery can be disposed within the housing, and the inductive coil can be coupled to the battery. In these and other embodiments, the inductive coil can be configured to receive and/or transmit power wirelessly through the interface surface.

In some embodiments, an electronic device (e.g., a wireless charger device) can comprise: a housing having a charging surface; an inductive coil disposed within the housing and having an axis normal to the charging surface, the inductive coil being configured to transfer power wirelessly through the charging surface; an annular magnetic alignment component disposed within the housing coaxial with and outboard of the inductive coil; and a rotational alignment component comprising a magnet disposed outside a perimeter of the annular magnetic alignment component. In these and other embodiments, the annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the rotational alignment component can comprise a magnet having at least two different regions of opposing magnetic orientations. For example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; and a second region extending along a second long side of the rectangular shape and having a second magnetic orientation opposite the first magnetic orientation. As another example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; a second region extending along a second long side of the rectangular shape and having the first magnetic orientation; and a third region extending along the rectangular shape and positioned midway between the first region and the second region, the third region having a second magnetic orientation opposite the first magnetic orientation. In these and other embodiments, the annular magnetic alignment component can comprise a plurality of arcuate magnets. Each arcuate magnet can have a first region with a magnetic polarity oriented in the first axial direction, a second region with a magnetic polarity oriented in the second axial direction, and a non-magnetized region between the first region and the second region. In these and other embodiments, the inductive coil can be configured to transmit power wirelessly through the charging surface.

In some embodiments, an accessory for use with a portable electronic device can comprise: a housing having a first interface surface and a second interface surface opposite the first interface surface; an annular magnetic alignment component disposed within the housing and having an axis normal to the first interface surface and the second interface surface; and a rotational alignment component comprising a magnet disposed outside a perimeter of the annular magnetic alignment component. In these and other embodiments, the annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the rotational alignment component comprises a magnet having at least two different regions of opposing magnetic orientations. For example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; and a second region extending along a second long side of the rectangular shape and having a second magnetic orientation opposite the first magnetic orientation. As another example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; a second region extending along a second long side of the rectangular shape and having the first magnetic orientation; and a third region extending along the rectangular shape and positioned midway between the first region and the second region, the third region having a second magnetic orientation opposite the first magnetic orientation. In these and other embodiments, the annular magnetic alignment component can comprise a plurality of arcuate magnets. Each arcuate magnet can have a first region with a magnetic polarity oriented in the first axial direction, a second region with a magnetic polarity oriented in the second axial direction, and a non-magnetized region between the first region and the second region.

In some embodiments, a portable electronic device (or other electronic device) can comprise: a housing having an interface surface; an inductive coil disposed within the housing and having an axis normal to the interface surface, the inductive coil being configured to transfer power wirelessly through the interface surface; an annular magnetic alignment component disposed within the housing coaxial with and outboard of the inductive coil, the annular magnetic alignment component including a plurality of sectors, each sector having a magnetic orientation with a radial component; and a near-field communication (NFC) coil disposed within the housing and coaxial with the inductive coil, the NFC coil configured to wirelessly exchange signals with another device through the interface surface. In these and other embodiments, the NFC coil can be coupled to an NFC reader circuit. In these and other embodiments, the NFC coil is positioned in a gap (which can be an annular gap) between the inductive coil and the annular magnetic alignment component. In these and other embodiments, each sector of the annular magnetic alignment component can comprise one or more arcuate magnets, each arcuate magnet having a magnetic polarity oriented in a radial direction. In these and other embodiments, alternating sectors of the annular magnetic alignment component can have opposite magnetic orientations. In these and other embodiments, the annular magnetic alignment component can include a gap between two of the sectors. An electrically conductive path connecting the NFC coil to an NFC reader circuit can pass through the gap, as can an electrically conductive path connecting to the inductive coil. In these and other embodiments, a rotational alignment component comprising a magnet can be disposed within the housing and outboard of (or outside a perimeter of) the annular magnetic alignment component.

In some embodiments, a wireless charging device can comprise: a housing having a charging surface; an inductive coil disposed within the housing and having an axis normal to the charging surface, the inductive coil being configured to transfer power wirelessly through the charging surface; an annular magnetic alignment component disposed within the housing coaxial with and outboard of the inductive coil; and a near-field communication (NFC) coil disposed within the housing and coaxial with the inductive coil, the NFC coil configured to wirelessly exchange signals with another device through the charging surface. In these and other embodiments, the annular magnetic alignment component can include a plurality of sectors, each sector comprising: an inner arcuate region having a magnetic polarity oriented in a first axial direction (e.g., having a south magnetic pole oriented toward the charging surface); an outer arcuate region having a magnetic polarity oriented in a second axial direction opposite the first axial direction; and a non-magnetized central arcuate region disposed between the inner arcuate region and the outer arcuate region. In these and other embodiments, an annular magnetic shield can be disposed at a distal surface of the annular magnetic alignment component. In these and other embodiments, the NFC coil is coupled to an NFC tag circuit, which can be a passive NFC tag circuit or an active NFC tag circuit. In these and other embodiments, the NFC coil is positioned between the inductive coil and the annular magnetic alignment component, e.g., in an annular gap between the inductive coil and the annular magnetic alignment component. In these and other embodiments, the first axial direction can be the same direction for all of the sectors. Alternatively, alternating sectors can have opposite first axial directions. In these and other embodiments, each sector of the annular magnetic alignment component includes one or more arcuate magnets each having a quad-pole configuration. In these and other embodiments, the annular magnetic alignment component can include a gap between two of the sectors. An electrically conductive path connected to the inductive coil can pass through the gap, as can an electrically conductive path connecting the NFC coil to an NFC tag circuit.

In some embodiments, an accessory device can comprise: a housing having an interface surface; an annular magnetic alignment component disposed within the housing and having an axis normal to the interface surface; and a near-field communication (NFC) coil disposed within the housing and coaxial with the annular magnetic alignment component, the NFC coil configured to wirelessly exchange signals with another device through the interface surface. In these and other embodiments, the annular magnetic alignment component including a plurality of sectors, each sector comprising: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the NFC coil can be coupled to an NFC tag circuit. In these and other embodiments, the NFC coil can be positioned inboard of the annular magnetic alignment component, and other components of an NFC tag circuit can be positioned inboard of the annular magnetic alignment component and/or in one or more gaps between sectors of the annular magnetic alignment component. Alternatively, the NFC coil can be positioned outboard of the annular magnetic alignment component.

In some embodiments, a portable electronic device can comprise: a housing having an interface surface; an inductive coil disposed within the housing and having an axis normal to the interface surface, the inductive coil being configured to transfer power wirelessly through the interface surface; an annular magnetic alignment component disposed within the housing coaxial with and outboard of the inductive coil, the annular magnetic alignment component including a plurality of sectors, each sector having a magnetic orientation with a radial component; a near-field communication (NFC) coil disposed within the housing and coaxial with the inductive coil, the NFC coil coupled to an NFC reader circuit and configured to wirelessly exchange signals with another device through the interface surface; a magnetometer disposed near the interface surface and outboard of the annular magnetic alignment component; and control circuitry coupled to the magnetometer and configured to trigger operation of the NFC reader circuit based at least in part on a change in a magnetic field detected by the magnetometer. In these and other embodiments, the magnetometer can be a three-axis magnetometer and the change in the magnetic field can includes a change in either or both of a magnitude or a direction of the magnetic field. In these and other embodiments, the control circuitry can be further configured to trigger operation of the NFC reader circuit in the event that the change in the magnetic field corresponds to an expected change associated with an accessory device having a second magnetic alignment component complementary to the annular magnetic alignment component of the portable electronic device becoming aligned with the portable electronic device. In these and other embodiments, the NFC reader circuit can be operable in a plurality of operating modes associated with different types of accessory devices, and the control circuitry is further configured to select one of the operating modes for the NFC reader circuit based at least in part on the change in the magnetic field detected by the magnetometer. In these and other embodiments, the control circuitry can be further configured to receive NFC tag data from the NFC reader circuit and to modify a behavior of the portable electronic device based on the received NFC tag data. In these and other embodiments, the NFC coil can be positioned in a gap between the inductive coil and the annular magnetic alignment component. In these and other embodiments, the annular magnetic alignment component can include a plurality of sectors, each sector having a magnetic orientation with a radial component, and the control circuitry can be further configured to trigger operation of the NFC reader circuit in the event that the change in the magnetic field corresponds to an expected change associated with an accessory device having a second magnetic alignment component becoming aligned with the portable electronic device, wherein the second magnetic alignment component is a second annular magnetic alignment component having a quad-pole magnetic configuration that is complementary to the annular magnetic alignment component of the portable electronic device.

In some embodiments, a portable electronic device can comprise: a housing having an interface surface; an annular magnetic alignment component disposed within the housing; a near-field communication (NFC) coil disposed within the housing and coaxial with the annular magnetic alignment component, the NFC coil coupled to an NFC reader circuit and configured to wirelessly exchange signals with another device through the interface surface; a magnetometer disposed near the interface surface and outboard of the annular magnetic alignment component; and control circuitry coupled to the magnetometer and configured to trigger operation of the NFC reader circuit based at least in part on a change in a magnetic field detected by the magnetometer. In these and other embodiments, the magnetometer can be a three-axis magnetometer and the change in the magnetic field can include a change in either or both of a magnitude or a direction of the magnetic field. In these and other embodiments, the control circuitry can be further configured to trigger operation of the NFC reader circuit in the event that the change in the magnetic field corresponds to an expected change associated with an accessory device having a second magnetic alignment component complementary to the annular magnetic alignment component of the portable electronic device becoming aligned with the portable electronic device. In these and other embodiments, the NFC reader circuit can be operable in a plurality of operating modes associated with different types of accessory devices and wherein the control circuitry can be further configured to select one of the operating modes for the NFC reader circuit based at least in part on the change in a magnetic field detected by the magnetometer. In these and other embodiments, the control circuitry can be further configured to receive NFC tag data from the NFC reader circuit and to modify a behavior of the portable electronic device based on the received NFC tag data. In these and other embodiments, the annular magnetic alignment component includes a plurality of sectors, each sector having a magnetic orientation with a radial component. In these and other embodiments, the control circuitry can be further configured to trigger operation of the NFC reader circuit in the event that the change in the magnetic field corresponds to an expected change associated with an accessory device having a second magnetic alignment component becoming aligned with the portable electronic device, wherein the second magnetic alignment component is a second annular magnetic alignment component having a quad-pole magnetic configuration that is complementary to the annular magnetic alignment component of the portable electronic device.

In some embodiments, a method of identifying an accessory can comprise: operating, by a portable electronic device having a first annular magnetic alignment component, a magnetometer to monitor a magnetic field near the first annular magnetic alignment component; detecting, by the portable electronic device, a change in the magnetic field indicative that an accessory having a second annular magnetic alignment component complementary to the first annular magnetic alignment component has come into proximity with the portable electronic device; and in response to detecting the change in the magnetic field, operating, by the portable electronic device, an NFC reader circuit that includes an NFC coil coaxial with the first annular magnetic alignment component to read an NFC tag of the accessory. In these and other embodiments, the change in the magnetic field can include a change in either or both of a magnitude or a direction of the magnetic field. In these and other embodiments, the NFC reader circuit is operable in a plurality of operating modes associated with different types of accessory devices, and the method can further comprise selecting one of the operating modes for the NFC reader circuit based at least in part on the change in a magnetic field detected by the magnetometer. In these and other embodiments, the method can further comprise modifying a behavior of the portable electronic device based on identification data read from the NFC tag of the accessory, such as changing an element displayed on a display of the portable electronic device.

In some embodiments, a wireless charging module can comprise: a housing having a charging surface and a second surface having an opening therethrough (the opening can be opposite the charging surface or elsewhere on the housing); an inductive coil assembly disposed within the housing, the inductive coil assembly including an electrically conductive coil; an annular magnetic alignment component disposed within the housing and surrounding the inductive coil assembly; and control circuitry disposed within the housing, the control circuitry being coupled to the electrically conductive coil and to a plurality of external electrical contacts and being configured to operate the electrically conductive coil to transfer power wirelessly through the charging surface using input power received from the external electrical contacts, where the external electrical contacts are exposed through the opening in the second surface of the housing. In these and other embodiments, the annular magnetic alignment component can include a plurality of sectors, each sector comprising: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, a conductive midplate can be disposed within the housing. The midplate can have a proximal surface oriented toward the charging surface and a distal surface opposite the proximal surface, and the inductive coil assembly can be mounted on the proximal surface of the midplate. In these and other embodiments, the control circuitry can comprise a logic board having circuit components mounted thereon. Where a midplate is present, the logic board can be mounted on the distal surface of the midplate. For instance, the midplate can have an opening therethrough, and the logic board can be coupled to the electrically conductive coil through the opening in the midplate. In these and other embodiments, an annular magnetic shield can be disposed at a distal surface of the annular magnetic alignment component. In these and other embodiments, the external electrical contacts include a calibration contact, which can be covered with a sealant material following calibration. In these and other embodiments, the inductive coil assembly can further include: an electric shield disposed between the electrically conductive coil and the charging surface; and an electromagnetic shield covering a surface of the electrically conductive coil opposite the electric shield.

In some embodiments, a wireless charging module can comprise: a housing having a charging surface and a second surface having an opening therethrough (the opening can be opposite the charging surface or elsewhere on the housing); an inductive coil assembly disposed within the housing, the inductive coil assembly including an electrically conductive coil and an electromagnetic shield; an annular magnetic alignment component disposed within the housing and surrounding the inductive coil assembly; a near-field communication (NFC) coil disposed within the housing and coaxial with the inductive coil assembly, the NFC coil configured to wirelessly exchange signals with another device through the charging surface; and control circuitry disposed within the housing, the control circuitry being coupled to the electrically conductive coil and to a plurality of external electrical contacts and being configured to operate the electrically conductive coil to transfer power wirelessly through the charging surface using input power received from the external electrical contacts, and the external electrical contacts can be exposed through the opening in the second surface of the housing. In these and other embodiments, the annular magnetic alignment component can include a plurality of sectors, each sector comprising: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the NFC coil can be coupled to an NFC tag circuit. In these and other embodiments, the NFC coil can be positioned between the inductive coil assembly and the annular magnetic alignment component (e.g., in an annular gap between the inductive coil assembly and the annular magnetic alignment component). In these and other embodiments, a conductive midplate can be disposed within the housing, the midplate having a proximal surface oriented toward the charging surface and a distal surface opposite the proximal surface. The inductive coil assembly can be mounted on the proximal surface of the midplate with the electromagnetic shield oriented toward the midplate. In these and other embodiments, the control circuitry can comprise a logic board, and the NFC coil can be terminated into the logic board. Where a midplate is present, the logic board is mounted on the distal surface of the midplate. For instance, the midplate can have an opening therethrough, and the logic board can be coupled to the electrically conductive coil through the opening in the midplate.

In some embodiments, a wireless charging module can comprise: a housing having a charging surface and a second surface having an opening therethrough; an inductive coil assembly disposed within the housing, the inductive coil assembly including an electrically conductive coil and an electromagnetic shield; an annular magnetic alignment component disposed within the housing and surrounding the inductive coil assembly; a rotational alignment component comprising a magnet disposed within the housing outside a perimeter of the annular magnetic alignment component; and control circuitry disposed within the housing, the control circuitry being coupled to the electrically conductive coil and to a plurality of external electrical contacts and being configured to operate the electrically conductive coil to transfer power wirelessly through the charging surface using input power received from the external electrical contacts, where the external electrical contacts are exposed through the opening in the second surface of the housing. In these and other embodiments, the annular magnetic alignment component can include a plurality of sectors, each sector comprising: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, a conductive midplate can be disposed within the housing, the midplate having a proximal surface oriented toward the charging surface and a distal surface opposite the proximal surface. The inductive coil assembly can be mounted on the proximal surface of the midplate with the electromagnetic shield oriented toward the midplate. In these and other embodiments, the control circuitry can comprise a logic board. Where a midplate is present, the logic board can be mounted on the distal surface of the midplate. For instance, the midplate can have an opening therethrough, and the logic board can be coupled to the electrically conductive coil through the opening in the midplate. In these and other embodiments, the rotational alignment component can comprise a magnet having at least two different regions of opposing magnetic orientations.

In some embodiments, an alignment module can include: an annular magnetic alignment component including a plurality of arcuate magnets; and an encapsulating structure surrounding and holding the arcuate magnets in an annular arrangement. Each arcuate magnet can have, for example: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the encapsulating structure can have an annular shape. For instance, the encapsulating structure can comprise an annular front enclosure and an annular rear enclosure joined at inner and outer edges thereof. The annular front enclosure and the annular rear enclosure can made of plastic or other materials. Joining of the annular front enclosure and the annular rear enclosure can be by a weld, or the annular front enclosure can be formed in a first injection molding stage after which the annular rear enclosure is injection molded onto the annular front enclosure (or vice versa). In these and other embodiments, the encapsulating structure can comprise an annular front enclosure, an annular back enclosure, an annular inner side enclosure and an annular outer side enclosure and wherein the annular front enclosure and the annular back enclosure are joined to the annular inner side enclosure and the annular outer side enclosure by adhesive. In these and other embodiments, an alignment module can also comprise: a rotational alignment component comprising a rectangular magnet, and the encapsulating structure can hold the rectangular magnet in a fixed position outboard of the annular magnetic alignment component.

In some embodiments, an alignment module can comprise: an annular magnetic alignment component including a plurality of arcuate magnets; a rotational alignment component comprising a rectangular magnet and disposed outside a perimeter of the annular magnetic alignment component; and an encapsulating structure holding the annular magnetic alignment component and the rotational alignment component in a fixed spatial relationship to each other. Each arcuate magnet can have: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the encapsulating structure can comprise: a front planar layer; a back planar layer; and a magnet-holding layer, the magnet-holding layer having a circular opening therethrough to accommodate the annular magnetic alignment component and a rectangular opening therethrough to accommodate the rectangular magnet. In these and other embodiments, the magnet-holding layer, the arcuate magnets, and the rectangular magnet can have equal thicknesses, and the magnet-holding layer includes a disc of material filling a region inboard of the annular magnetic alignment component. In these and other embodiments, a first adhesive layer can attach the front planar layer to the magnet-holding layer, and a second adhesive layer can attach the back planar layer to the magnet-holding layer. In these and other embodiments, the front planar layer and the back planar layer can be rectangular layers with rounded corners. In these and other embodiments, the encapsulating structure can have an opening through a region inside an inner perimeter of the annular magnetic alignment component.

In some embodiments, an alignment module can comprise: an annular magnetic alignment component including a plurality of arcuate magnets, an encapsulating structure surrounding and holding the arcuate magnets in an annular arrangement; and a near-field communication (NFC) coil disposed within the encapsulating structure and coaxial with the annular magnetic alignment component, the NFC coil coupled to an NFC tag circuit. In these and other embodiments, each arcuate magnet can have: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the NFC coil can be disposed inboard of the annular magnetic alignment component, and other NFC tag circuit components can be disposed inboard of the annular magnetic alignment component and or in gaps between certain arcuate magnets of the annular magnetic alignment component. In these and other embodiments, the encapsulating structure can comprise: a front planar layer; a back planar layer; and a magnet-holding layer, the magnet-holding layer having a circular opening therethrough to accommodate the annular magnetic alignment component (and the NFC coil). In these and other embodiments, the magnet-holding layer and the arcuate magnets can have equal thicknesses. In these and other embodiments, the magnet-holding layer can include a disc of material filling a region interior to the annular magnetic alignment component and the NFC coil. In these and other embodiments, an alignment module can further comprise: a rotational alignment component comprising a rectangular magnet and disposed outboard (or outside a perimeter) of the annular magnetic alignment component, and the magnet-holding layer can have a rectangular opening therethrough to accommodate the rotational alignment component.

Accordingly, although the invention has been described with respect to specific embodiments, it will be appreciated that the invention is intended to cover all modifications and equivalents within the scope of the following claims.

What is claimed is:

1. A wireless charging device comprising:
   a housing having a charging surface;
   an inductive coil disposed within the housing and having an axis normal to the charging surface, the inductive coil being configured to transfer power wirelessly through the charging surface;

an annular magnetic alignment component disposed within the housing coaxial with and outboard of the inductive coil, the annular magnetic alignment component including a plurality of sectors, each sector including one or more arcuate magnets, each arcuate magnet comprising:
   an inner arcuate region having a magnetic polarity oriented in a first axial direction;
   an outer arcuate region having a magnetic polarity oriented in a second axial direction opposite the first axial direction; and
   a non-magnetized central arcuate region disposed between the inner arcuate region and the outer arcuate region; and
a near-field communication (NFC) coil disposed within the housing, outboard of the inductive coil, and coaxial with the inductive coil, the NFC coil configured to wirelessly exchange signals with an NFC coil of a portable device through the charging surface.

2. The wireless charging device of claim 1 further comprising:
   an annular magnetic shield disposed at a distal surface of the annular magnetic alignment component.

3. The wireless charging device of claim 1 wherein the NFC coil is coupled to an NFC tag circuit.

4. The wireless charging device of claim 1 wherein the NFC coil is positioned between the inductive coil and the annular magnetic alignment component.

5. The wireless charging device of claim 1 wherein the first axial direction has a south magnetic pole toward the charging surface.

6. The wireless charging device of claim 1 wherein the first axial direction is the same direction for all of the sectors.

7. The wireless charging device of claim 1 wherein alternating sectors have opposite first axial directions.

8. The wireless charging device of claim 1 wherein the annular magnetic alignment component includes a gap between two of the sectors.

9. The wireless charging device of claim 8 wherein an electrically conductive path connected to the inductive coil passes through the gap.

10. An accessory device comprising:
   a housing having an interface surface;
   an annular magnetic alignment component disposed within the housing and having an axis normal to the interface surface, the annular magnetic alignment component including a plurality of sectors, each sector comprising:
      an inner arcuate region having a magnetic polarity oriented in a first axial direction;
      an outer arcuate region having a magnetic polarity oriented in a second axial direction opposite the first axial direction; and
      a non-magnetized central arcuate region disposed between the inner arcuate region and the outer arcuate region; and
   a near-field communication (NFC) coil disposed within the housing and coaxial with the annular magnetic alignment component, the NFC coil configured to wirelessly exchange signals with another device through the interface surface.

11. The accessory device of claim 10 wherein the NFC coil is coupled to an NFC tag circuit.

12. The accessory device of claim 10 wherein the NFC coil is positioned inboard of the annular magnetic alignment component.

13. The accessory device of claim 10 wherein the NFC coil is positioned outboard of the annular magnetic alignment component.

* * * * *